US012228111B2

(12) United States Patent
Arefi

(10) Patent No.: US 12,228,111 B2
(45) Date of Patent: Feb. 18, 2025

(54) METHODS OF CONSTRUCTING A GEOTHERMAL HEAT EXCHANGER IN A GEOTHERMAL RESERVOIR, AND GEOTHERMAL HEAT EXCHANGERS CONSTRUCTED IN A GEOTHERMAL RESERVOIR

(71) Applicant: Babak Bob Arefi, Spring, TX (US)

(72) Inventor: Babak Bob Arefi, Spring, TX (US)

( * ) Notice: Subject to any disclaimer, the term of this patent is extended or adjusted under 35 U.S.C. 154(b) by 0 days.

(21) Appl. No.: 18/687,231

(22) PCT Filed: Aug. 31, 2022

(86) PCT No.: PCT/US2022/042220
§ 371 (c)(1),
(2) Date: Feb. 27, 2024

(87) PCT Pub. No.: WO2023/034425
PCT Pub. Date: Mar. 9, 2023

(65) Prior Publication Data
US 2024/0271831 A1 Aug. 15, 2024

Related U.S. Application Data

(60) Provisional application No. 63/239,250, filed on Aug. 31, 2021.

(51) Int. Cl.
*F24T 50/00* (2018.01)
*F03G 4/00* (2006.01)
(Continued)

(52) U.S. Cl.
CPC .............. *F03G 4/02* (2021.08); *F03G 4/029* (2021.08); *F24T 10/15* (2018.05); *F24T 50/00* (2018.05)

(58) Field of Classification Search
CPC ............ F24T 10/15; F24T 50/00; F03G 4/063
See application file for complete search history.

(56) References Cited

U.S. PATENT DOCUMENTS

| 2010/0288466 | A1 | 11/2010 | Danko |
| 2012/0117967 | A1 | 5/2012 | Loveday et al. |

(Continued)

FOREIGN PATENT DOCUMENTS

| CN | 111365752 A | * | 7/2020 | ............ F24D 11/003 |
| DE | 102015002744 A1 | * | 11/2015 | .............. F24T 10/20 |

OTHER PUBLICATIONS

International Preliminary Report of Patentability (Chapter II of PCT App No. PCT/US2022/042220) Dec. 5, 2023.

*Primary Examiner* — Jonathan R Matthias
(74) *Attorney, Agent, or Firm* — McCutcheon Joseph, PLLC

(57) ABSTRACT

Provided is a method of constructing a geothermal heat exchanger comprised of a geothermal well(s) that maximizes heat transfer from sweet spots of geothermal energy of a geothermal reservoir to the geothermal well(s). The method involves dynamically identifying the sweet spots, and selecting a predetermined shape and/or increasing a dimension of the geothermal well(s) within the sweet spots to increase a surface area of contact between the geothermal well(s) and the sweet spots. The method further involves calculating a mathematical best fit line to minimize a distance between the geothermal well(s) and the sweet spots, and forming at least a part of the geothermal well(s) to, or to a proximity of, the sweet spots along the mathematical best fit line. Methods may include increasing an effective thermal radius of the geothermal well(s) by geothermal fracturing, geothermal acidizing, or geothermal multilateral wells, and embedding thermal energy storage (TES) materials therein.

8 Claims, 102 Drawing Sheets

(51) Int. Cl.
*F03G 4/02* (2006.01)
*F24T 10/15* (2018.01)

(56) References Cited

U.S. PATENT DOCUMENTS

| | | |
|---|---|---|
| 2014/0102094 A1 | 4/2014 | Shim et al. |
| 2017/0141724 A1* | 5/2017 | O'Donnell .............. F24T 10/15 |
| 2018/0202288 A1 | 7/2018 | Elbadawy et al. |
| 2019/0086345 A1 | 3/2019 | Clemenzi et al. |
| 2019/0128068 A1 | 5/2019 | Danko |
| 2019/0211810 A1 | 7/2019 | Santarelli |

* cited by examiner

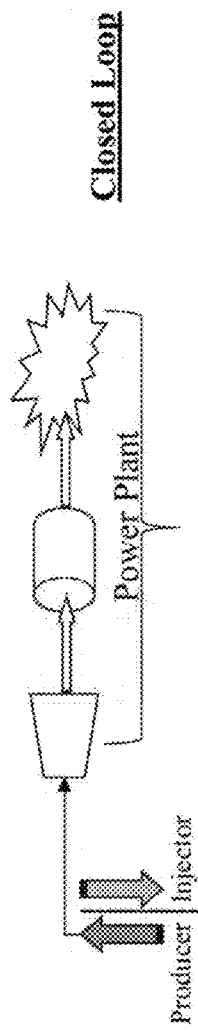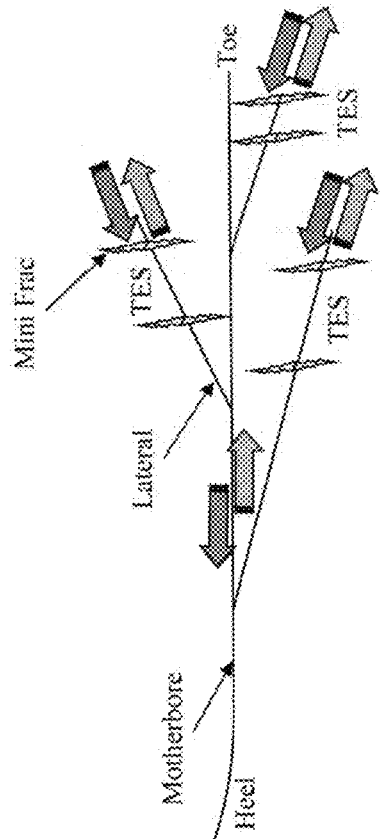

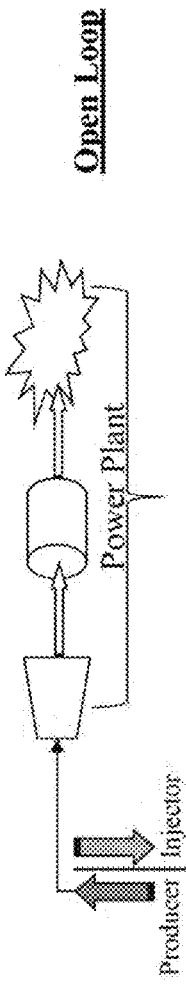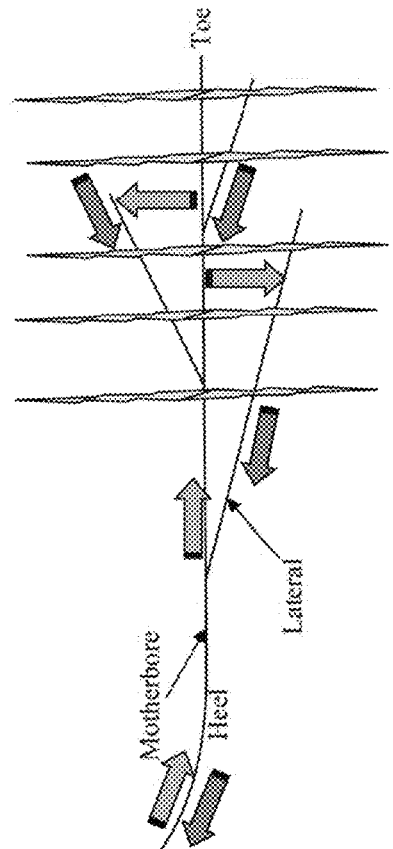
Figure 4-B
Open Loop
Centric Multilateral Horizontal Well using Natural or Hydraulic fractures.
Number of laterals can be from one to N with any level, azimuth, inclination angle and length.

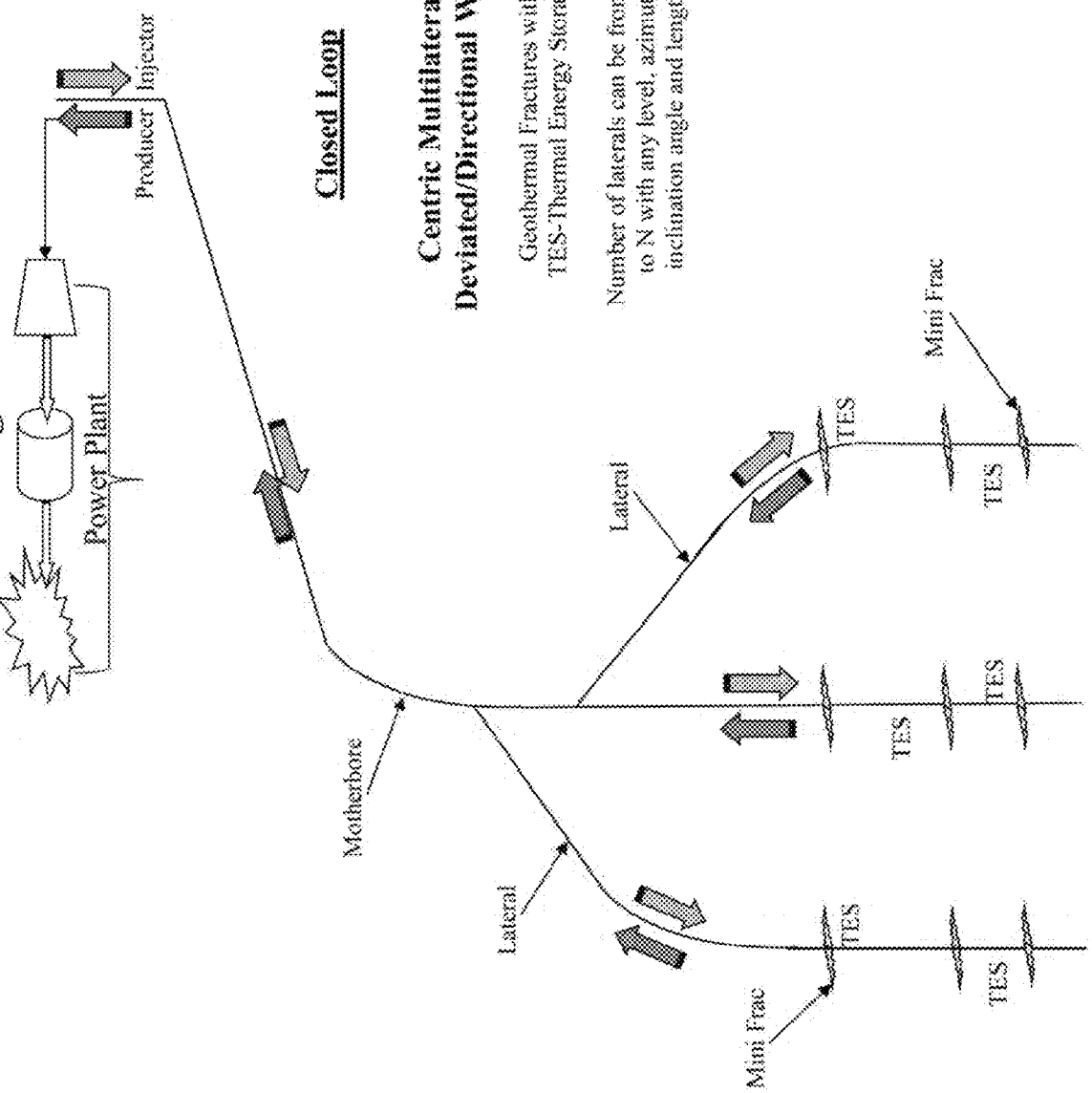

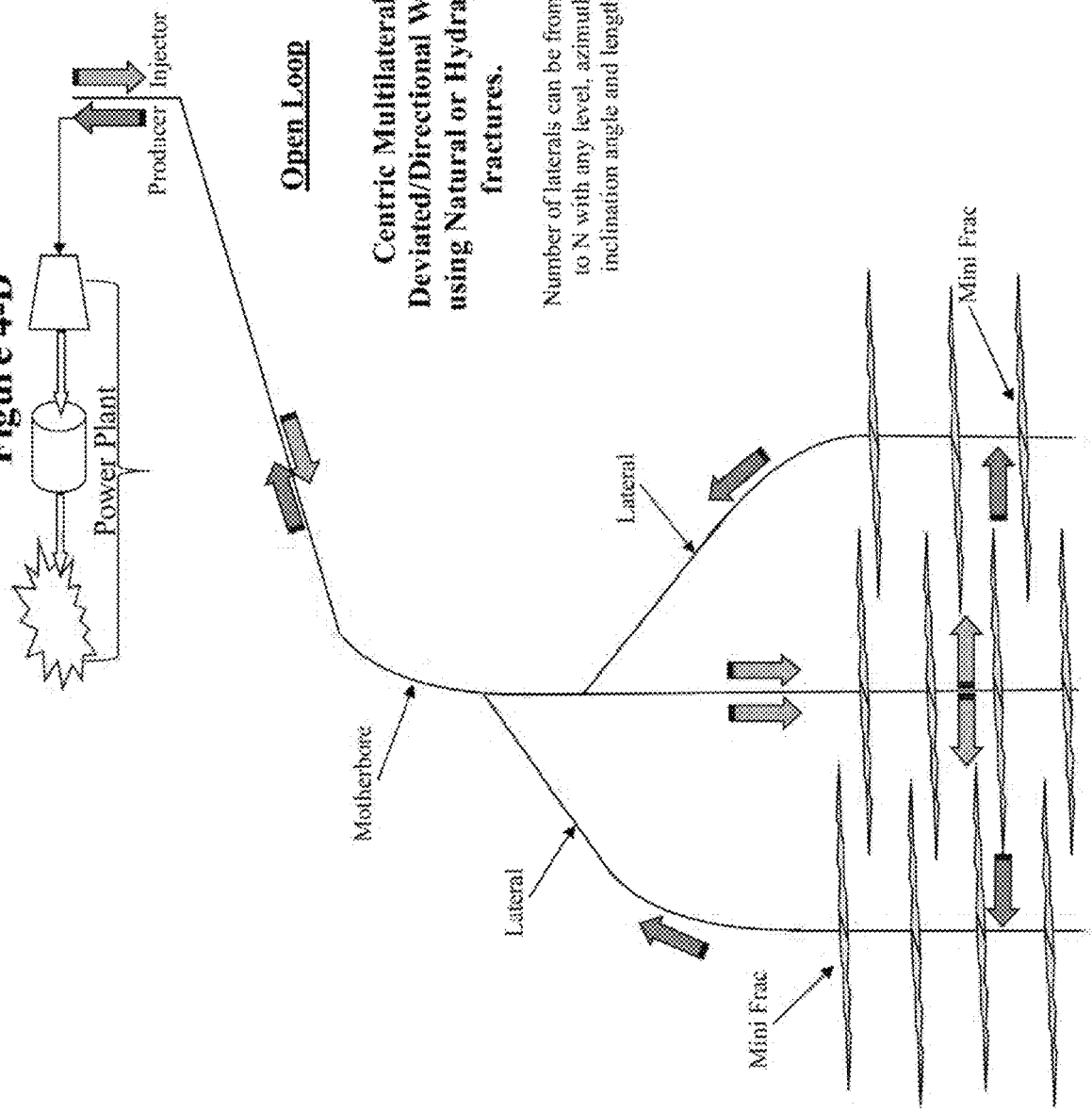

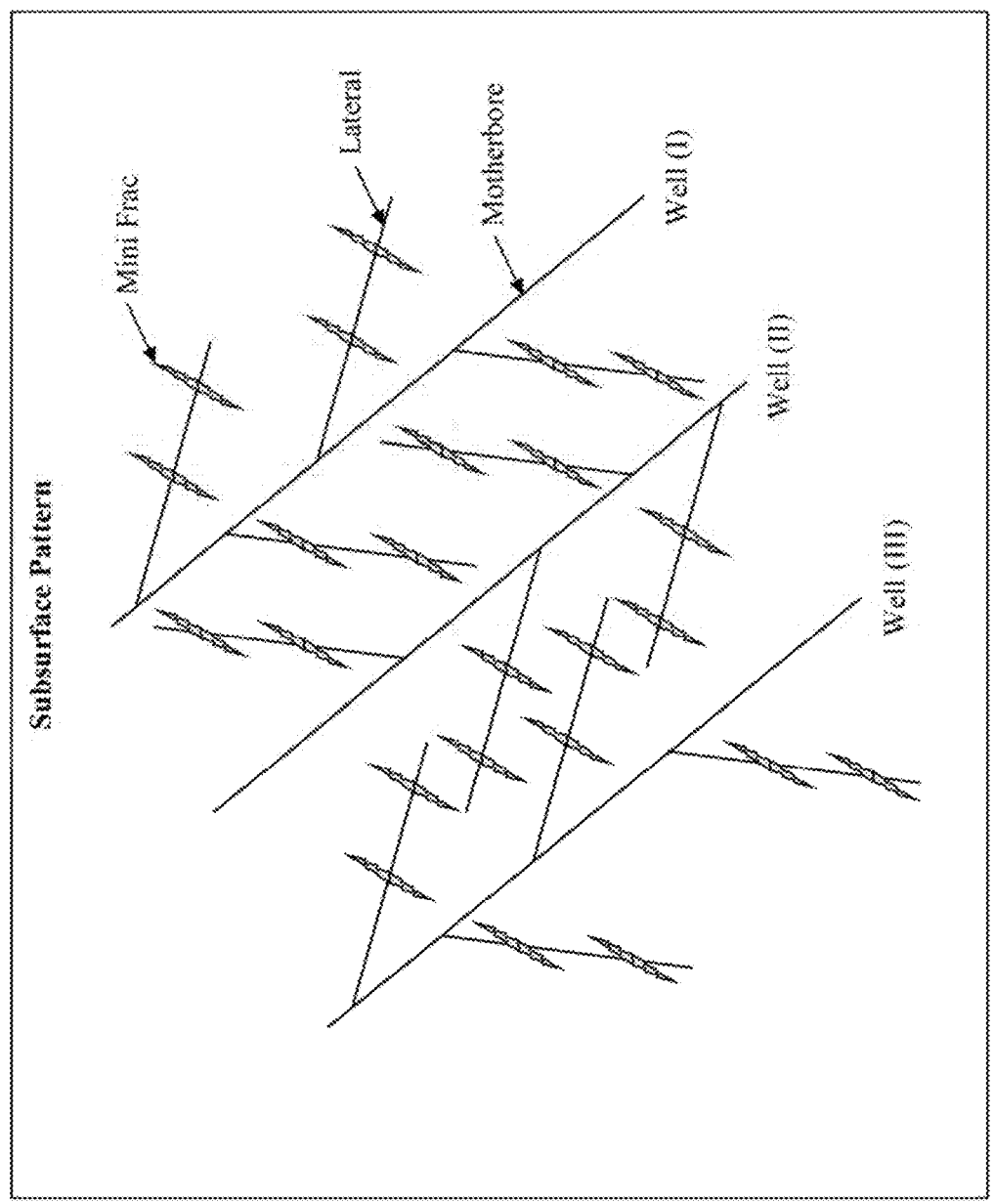
Figure 4-E

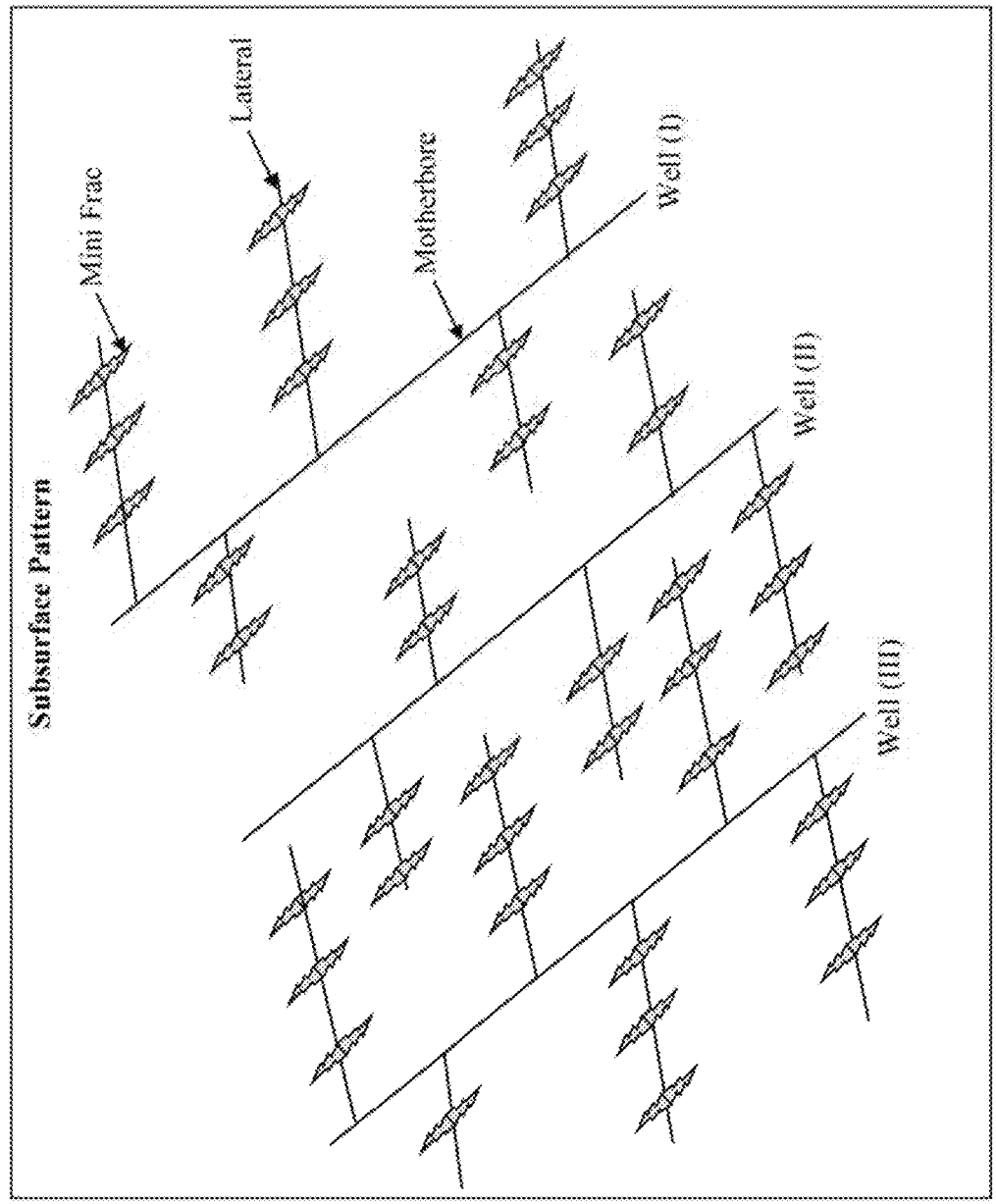

Figure 5-114

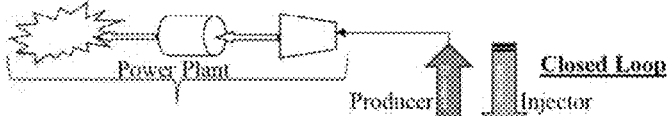

United/Merged Parallel Coiled Horizontal Wells.

Bottom-Hole Temperature ($T_b$) ∝ Depth (D)

Coiled Section might be buckled to give more surface area.

Height and Length of coiled section can be any size.

Wells can be at the same plane and same depth or different.

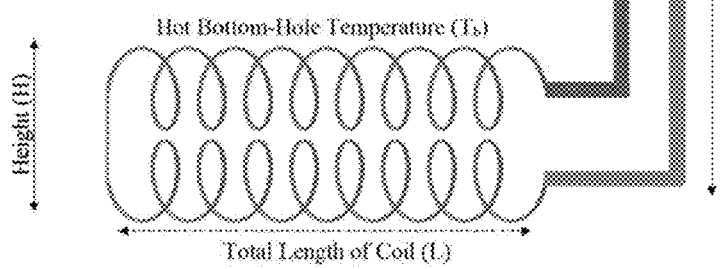

Figure 5-115

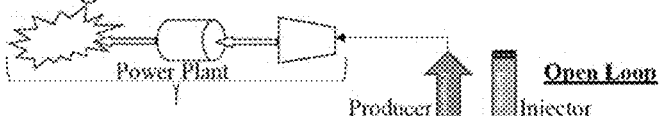

United/Merged Parallel Coiled Horizontal Wells.

Bottom-Hole Temperature ($T_b$) ∝ Depth (D)

Coiled Section might be buckled to give more surface area.

Height and Length of coiled section can be any size.

Wells can be at the same plane and same depth or different.

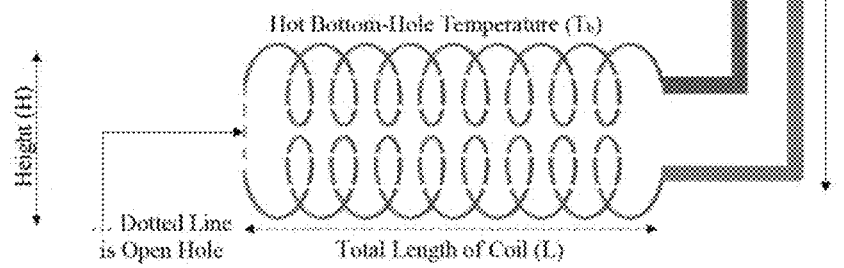

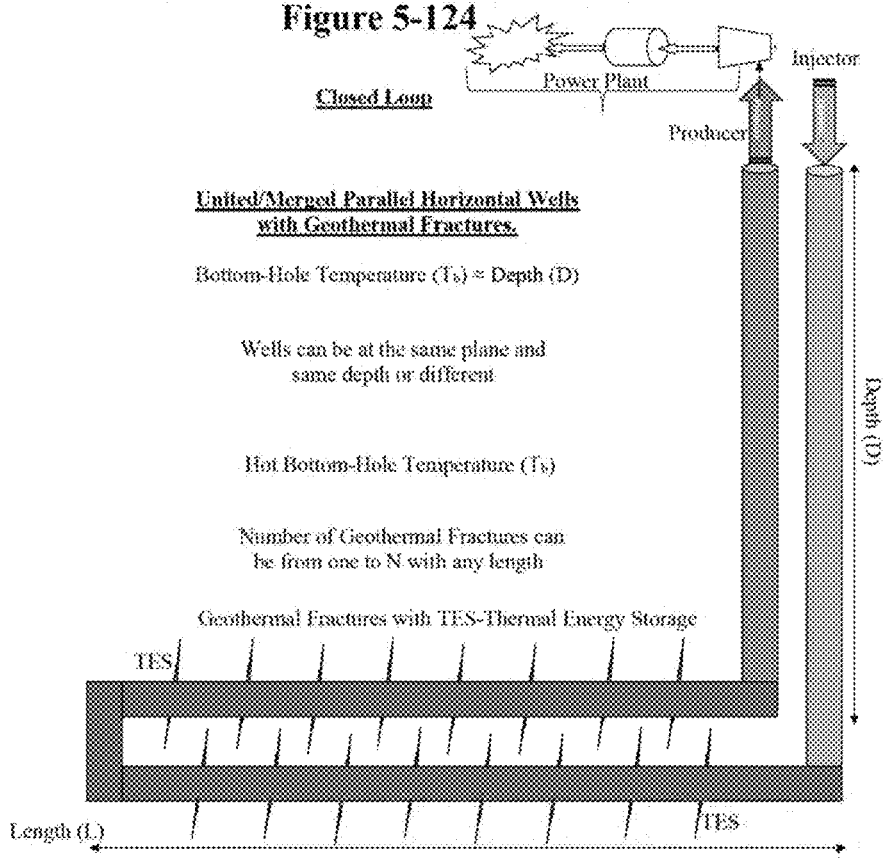
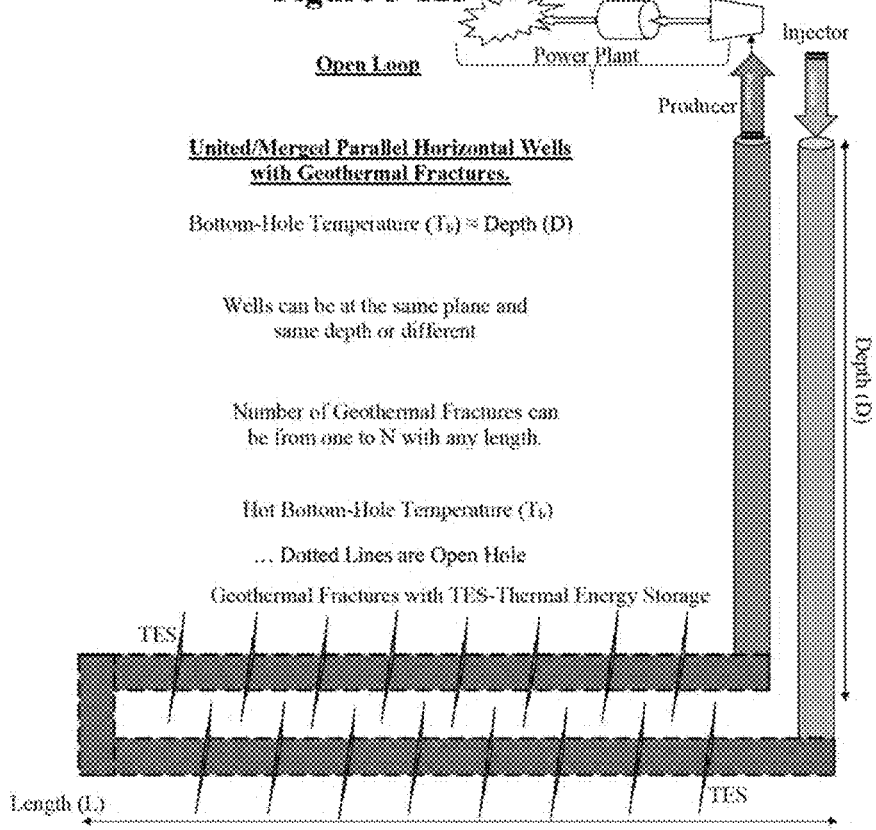

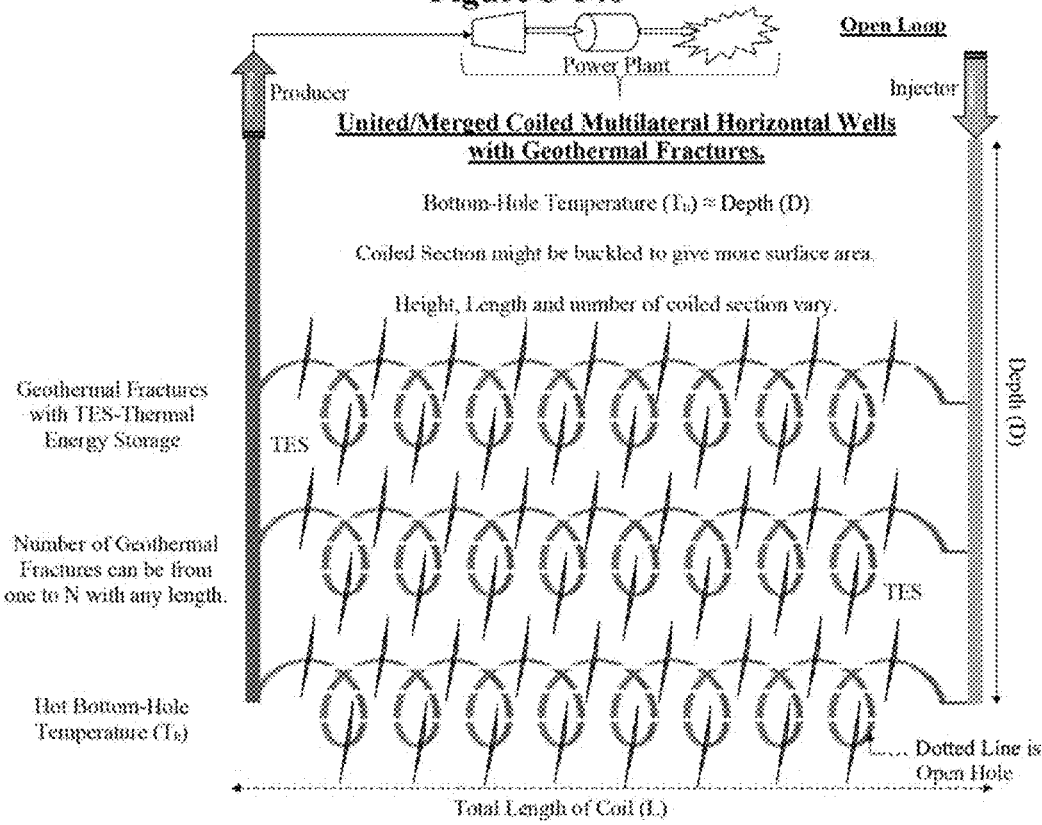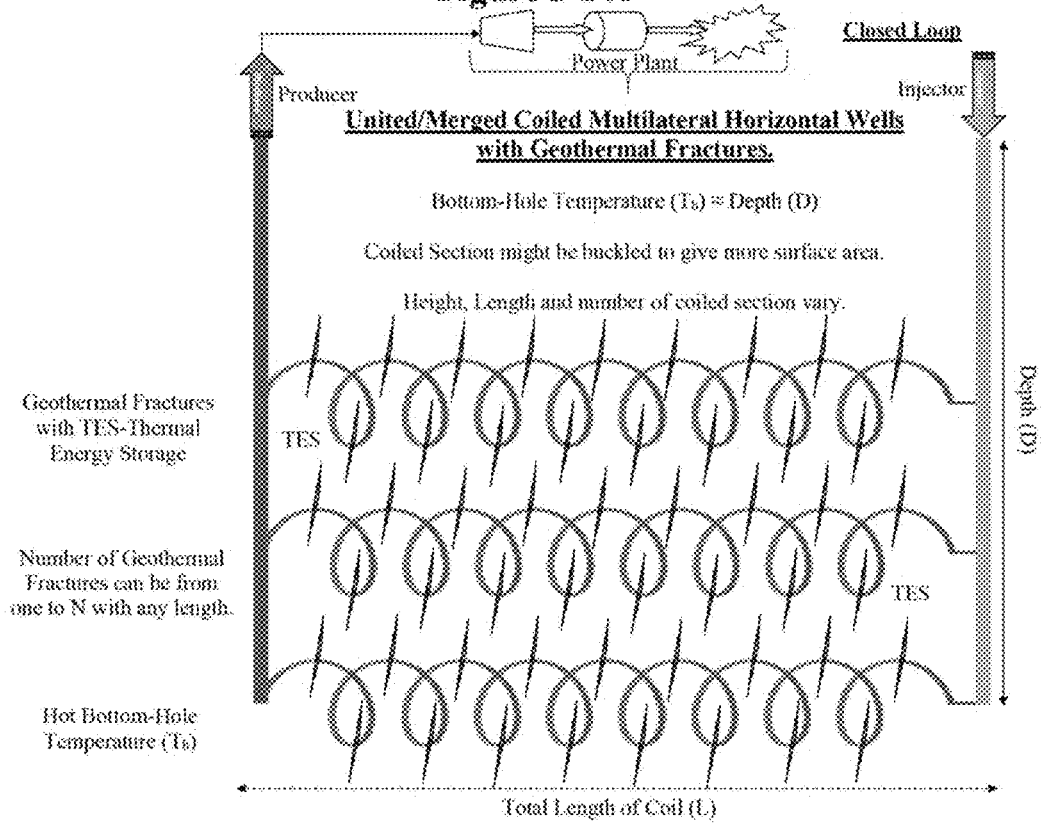

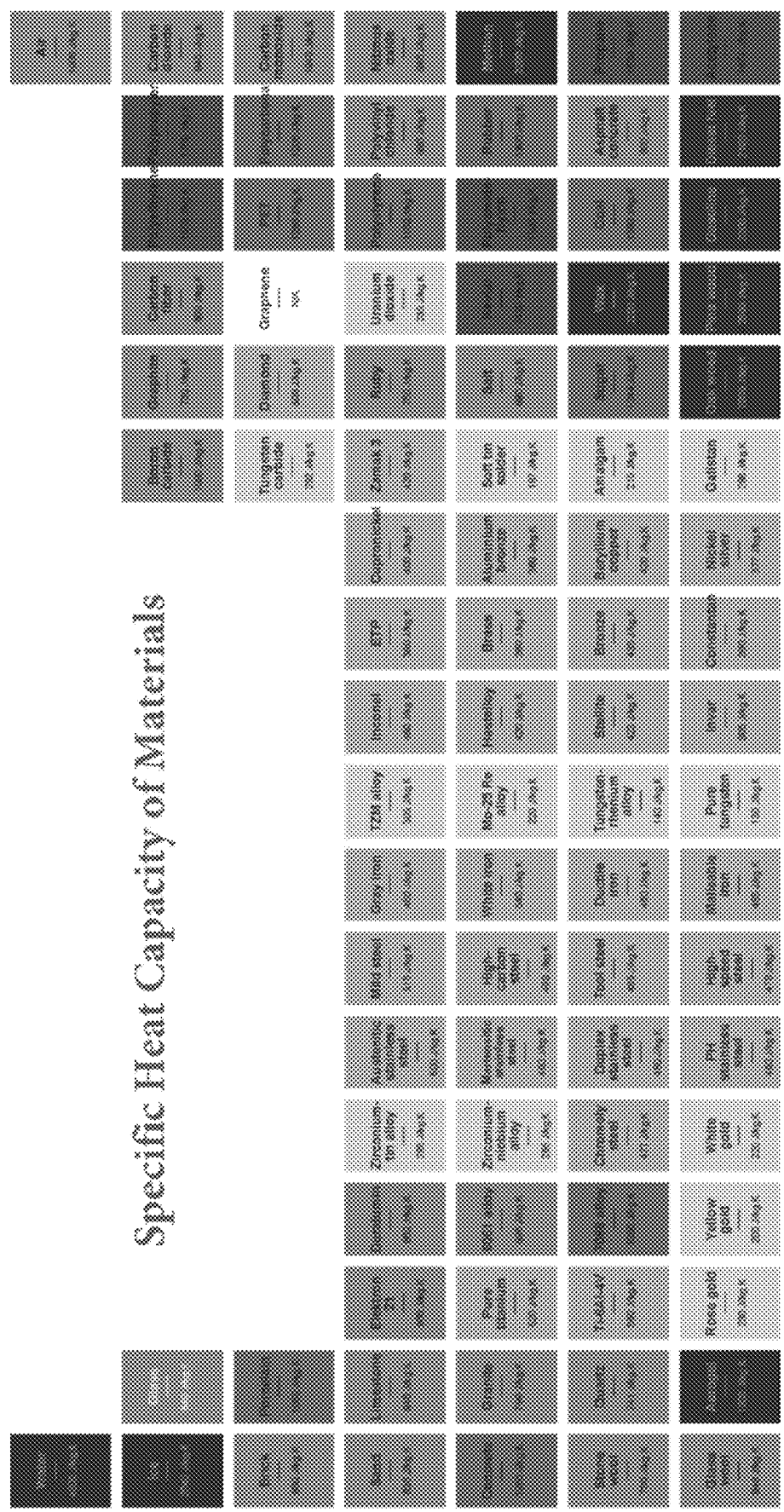
Figure 7-A
Specific Heat Capacity of Materials

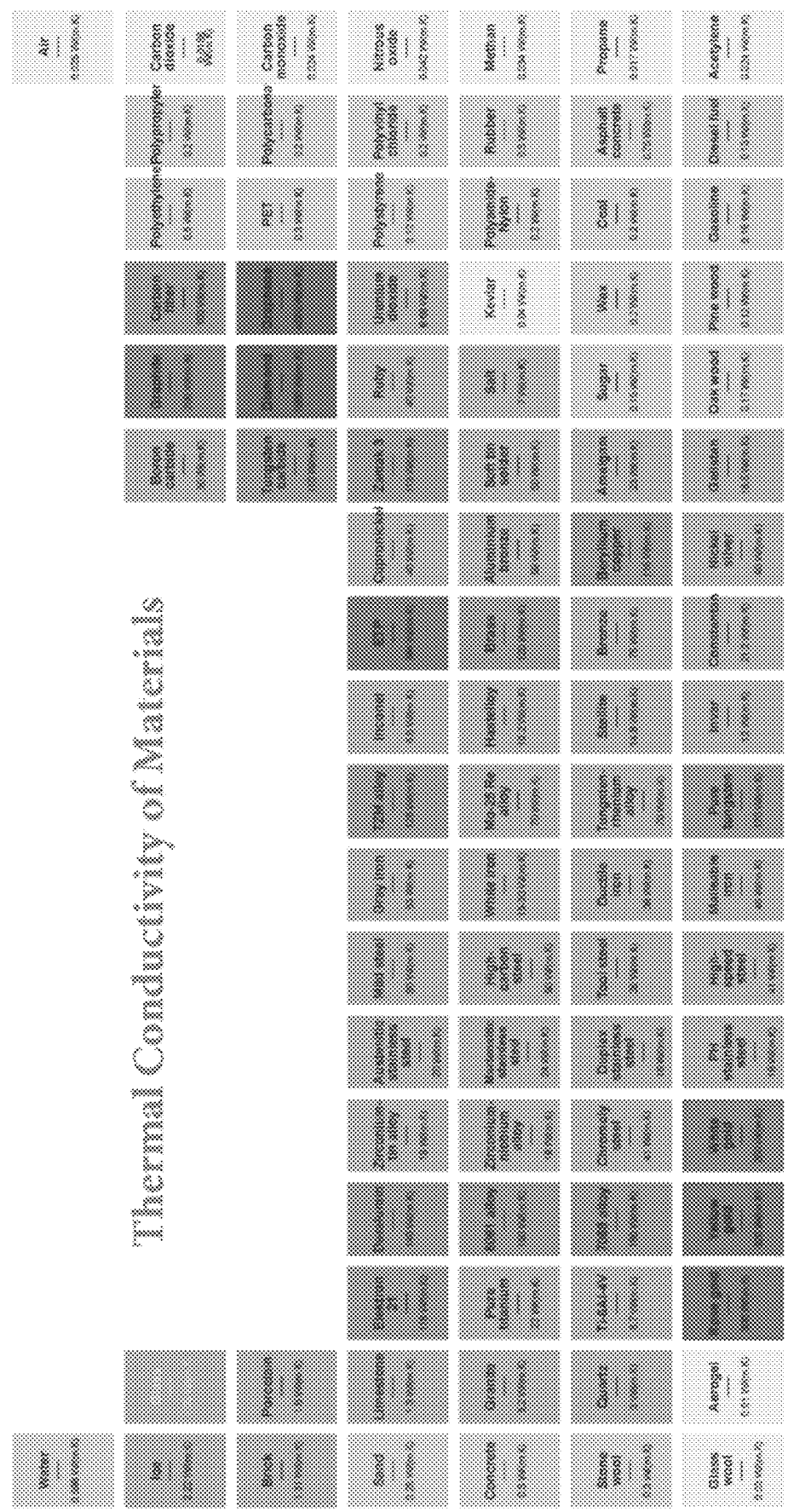
Figure 7-B

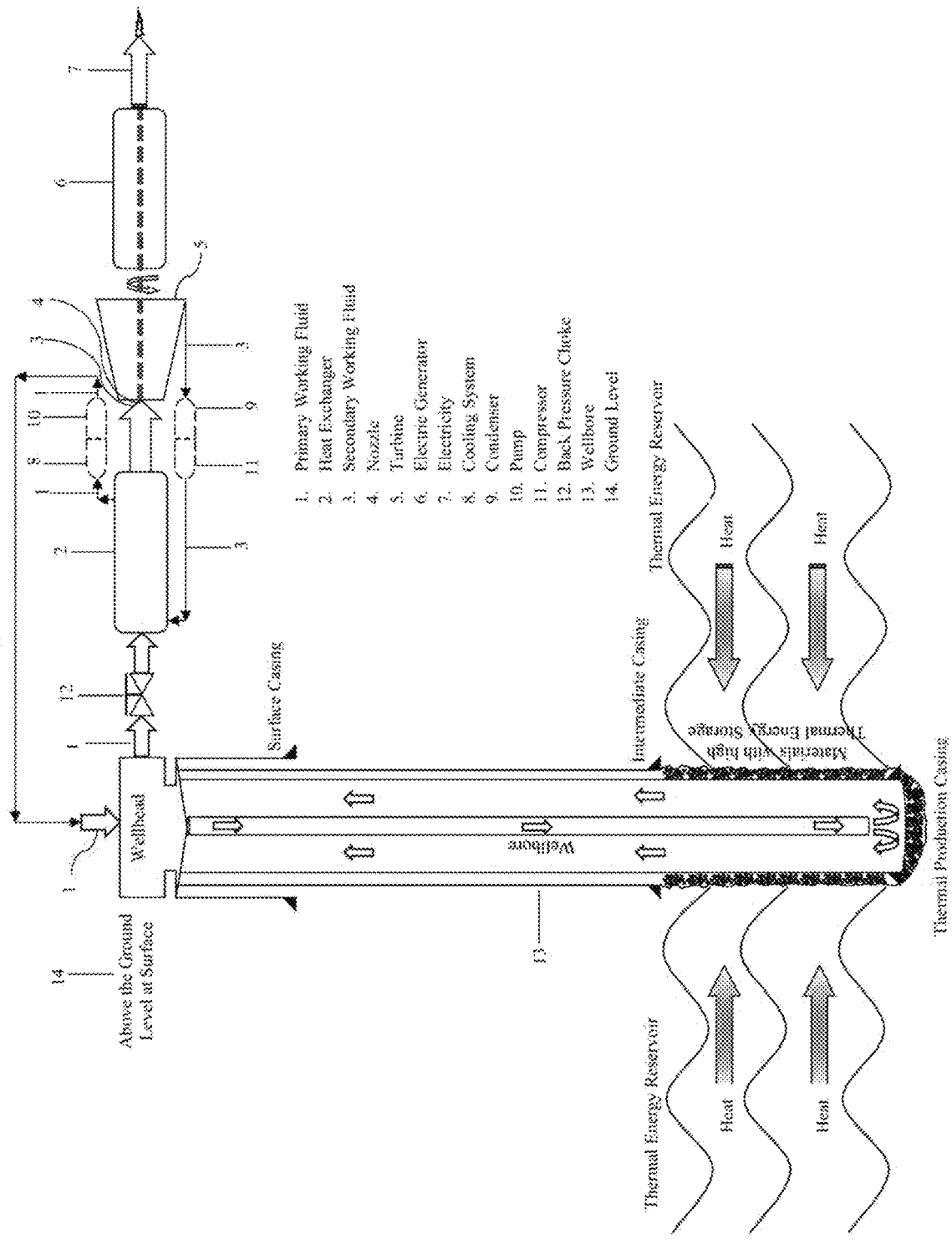
Figure 8-A

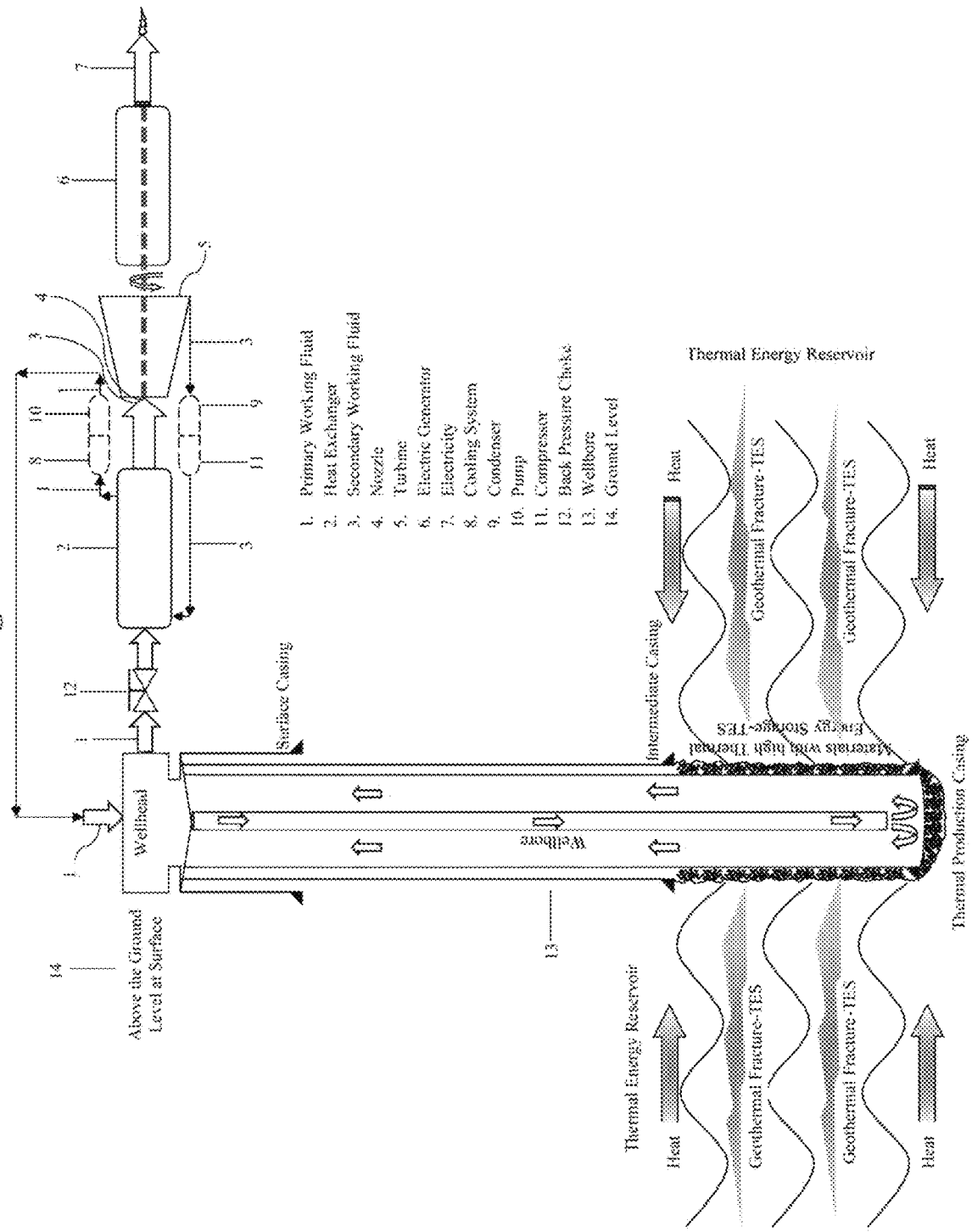
Figure 8-B

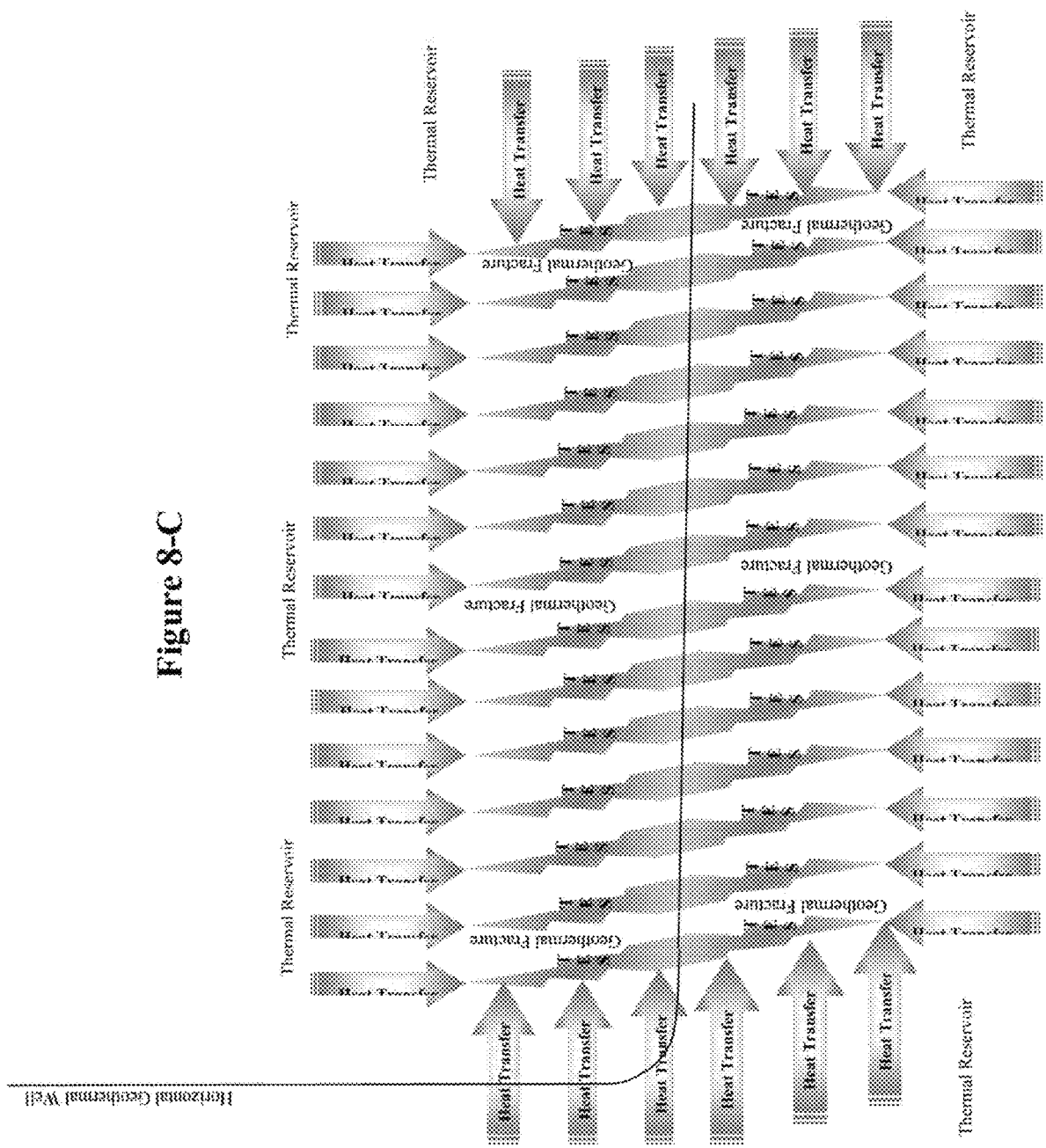
Figure 8-C

METHODS OF CONSTRUCTING A GEOTHERMAL HEAT EXCHANGER IN A GEOTHERMAL RESERVOIR, AND GEOTHERMAL HEAT EXCHANGERS CONSTRUCTED IN A GEOTHERMAL RESERVOIR

CROSS REFERENCE TO RELATED APPLICATIONS

This application is a U.S. National Stage patent application claiming priority to and the benefit of an International Patent Cooperation Treaty (PCT) Application No. PCT/US2022/042220, titled "Methods of Constructing a Geothermal Heat Exchanger in a Geothermal Reservoir, and Geothermal Heat Exchangers Constructed in a Geothermal Reservoir," filed on Aug. 31, 2022, that claims priority to and the benefit of U.S. Provisional Application No. 63/239,250, filed on Aug. 31, 2021. The disclosures of the prior applications are hereby incorporated by reference herein in their entireties.

TECHNICAL FIELD

The present disclosure relates to geothermal energy systems which generate electricity. In particular, the present disclosure relates to geothermal heat exchangers that are formed of at least one geothermal well, and methods of constructing such geothermal heat exchangers. The geothermal heat exchangers have a configuration that maximizes heat transfer from sweet spots of geothermal energy to the geothermal wells. The transferred heat can subsequently be converted to kinetic energy and mechanical energy for driving an electricity generator to generate electricity.

BACKGROUND

Geothermal energy systems extract heat from an underground geologic formation, such as a hot rock reservoir. In a typical geothermal energy system, water is pumped down into an underground rock formation to transfer thermal energy of the rock formation to the surface. At the surface, the heated water in the form of steam is utilized in a process that drives a turbine and an electrical generator to produce electrical power. The water may then be pumped back into the underground formation to repeat the cycle.

SUMMARY

Geothermal wells have been drilled deep into the earth to reach underground temperatures high enough to heat water to a level where its kinetic energy is able to do work in a turbine that drives an electricity generator. Currently, geothermal wells are planned and constructed based on a heat map (see, e.g., FIG. 2) of the Earth. In this technique, the wells are located predominantly in areas at which underground thermal energy sources are closer to the Earth's surface, e.g., nearby the Pacific Ocean, where high downhole temperatures can be reached at a shallower depth. These wells were constructed as open loop systems through natural or man-made fissures nearby the source of thermal energy. The aim was to heat the water and then from the same well or another well produce steam that is passed through a turbine to run an electricity generator. A significant number of these wells have been constructed as simply a conduit between the surface and subsurface, without suitable engineering considerations into well design and construction.

The present disclosure discusses new approaches and concepts for locating, designing and constructing productive geothermal wells so that the wells need not be confined to the traditional heat map locations, nor be as dependent on the depth of the geothermal well. The present disclosure discusses engineeringly constructing downhole heat exchangers, i.e., "geothermal heat exchangers", that are formed of one or more geothermal wells provided at specific underground locations ("sweet spots") which maximize heat transfer from geothermal energy sources of a geothermal reservoir to the geothermal wells. The transferred heat can be harnessed for subsequently generating a greater amount of electricity via a turbine that drives an electricity generator. Subsurface characteristics govern the design of every geothermal well construction. Placing a geothermal well in a prolific subsurface location, depth, length, pattern, direction of horizontal/lateral section, with proper spacing between geothermal fracturing/acidizing stages and the correct distance from any other wells, are some of the main factors to efficiently produce geothermal energy. Because geothermal reservoirs are heterogeneous, their behaviors and characteristics are difficult to predict. Subsurface data can be acquired, such as by temperature logs, mud logging, logging while drilling (e.g., via a Thermal Logging Tool (TLT)), and analyzed to build models of the subsurface. These models may include thermodynamic, geologic, and/or geo-mechanical models. The models may indicate the location of the geothermal sweet spots and thus the correct design (e.g., shape, pattern, dimension, direction) of the geothermal well to construct the well (e.g., motherbore and possibly laterals) in the most thermally prolific sections of the geothermal reservoir.

The present disclosure further discusses increasing the contact surface area of the geothermal well with sweet spots of geothermal energy and/or reducing the distance between the sweet spots and the geothermal well to result in a prolific geothermal well, and hence more electricity that can be produced from the geothermal well. To enhance geothermal productivity, the effective thermal radius of the geothermal well within the sweet spots can be increased by geothermal fracturing or geothermal acidizing with fluid entrained with thermal energy storage (TES) materials. The thermal energy storage (TES) materials are embedded within the geothermal fractures or the geothermal acidized zones to absorb the thermal energy and a far-field thermal energy of the geothermal reservoir, store the thermal energy and the far-field thermal energy, and conduct the thermal energy and the far-field thermal energy to the geothermal well. Further, geothermal multilateral wells can be formed to increase the effective thermal radius of the geothermal well, and can be embedded with the thermal energy storage (TES) materials for a similar benefit.

The present disclosure thus describes geothermal heat exchangers and methods of constructing geothermal heat exchangers that maximize heat transfer from sweet spots of geothermal energy to the geothermal wells. Maximizing the transfer of thermal energy increases the kinetic energy of the working fluid passing through the geothermal heat exchangers, and hence the potency in which the working fluids can drive the turbine or other mechanical device of a geothermal energy system. Driving the turbine or other mechanical device with more energy increases the amount of electromagnetic induction in the electricity generator that is driven by the turbine or other mechanical device, and as a result the amount of electricity produced by the electricity generator increases.

In one embodiment, a method of constructing a geothermal heat exchanger as a system of one or more geothermal wells comprises: identifying one or more substantially homogenous sweet spots of geothermal energy of a heterogeneous geothermal reservoir comprising a temperature sufficient to boil a working fluid at a predetermined pressure; designing the geothermal heat exchanger to be comprised of at least one geothermal well that maximizes heat transfer from the one or more substantially homogenous sweet spots of geothermal energy to the at least one geothermal well by at least one of: (i) selecting a predetermined shape of the at least one geothermal well within the one or more substantially homogenous sweet spots of geothermal energy; and (ii) increasing a dimension of the at least one geothermal well within the one or more substantially homogenous sweet spots of geothermal energy, in order to increase a surface area of contact between the at least one geothermal well and the one or more substantially homogenous sweet spots of geothermal energy; calculating a mathematical best fit line to minimize a distance between the at least one geothermal well and the one or more substantially homogenous sweet spots of geothermal energy; and forming at least a part of the at least one geothermal well to, or to a proximity of, the one or more substantially homogenous sweet spots of geothermal energy of the heterogeneous geothermal reservoir along the calculated mathematical best fit line.

In another embodiment, a geothermal heat exchanger comprises: a system of one or more geothermal wells comprising at least one of: (i) a predetermined shape within one or more substantially homogenous sweet spots of geothermal energy of a heterogeneous geothermal reservoir; and (ii) a predetermined dimension within the one or more substantially homogenous sweet spots of geothermal energy of a heterogeneous geothermal reservoir, wherein each of the predetermined shape and the predetermined dimension increases a surface area of contact between the one or more geothermal wells and one or more substantially homogenous sweet spots of geothermal energy, to maximize heat transfer from the one or more substantially homogenous sweet spots of geothermal energy to the one or more geothermal wells, the one or more substantially homogenous sweet spots of geothermal energy having a temperature sufficient to boil a working fluid at a predetermined pressure, wherein at least a part of the one or more geothermal wells extends to, or to a proximity of, the one or more substantially homogenous sweet spots of geothermal energy of the heterogeneous geothermal reservoir along a calculated mathematical best fit line to minimize a distance between the one or more geothermal wells and the one or more substantially homogenous sweet spots of geothermal energy.

In a further embodiment, a method of constructing a geothermal heat exchanger comprises: identifying one or more geothermal zones of thermal energy as sweet spots of a geothermal reservoir having a temperature sufficient to boil a working fluid at a predetermined pressure; forming a geothermal well to, or to a proximity of, the one or more geothermal zones of thermal energy of the geothermal reservoir; increasing an effective thermal radius of the geothermal well by at least one of: (i) fracturing from the geothermal well to form at least one geothermal fracture into the geothermal reservoir; (ii) acidizing from the geothermal well into the geothermal reservoir to form at least one geothermal acidized zone in the geothermal reservoir; and (iii) forming at least one lateral from the geothermal well into the geothermal reservoir to form a geothermal multilateral well; and embedding one or more thermal energy storage (TES) materials into one of the at least one geothermal fracture, the at least one geothermal acidized zone, and the at least one lateral of the multilateral well, wherein increasing the effective thermal radius of the geothermal well increases a surface area of contact of the geothermal well with the one or more geothermal zones of thermal energy, and the thermal energy storage (TES) materials absorb the thermal energy and a far-field thermal energy of the geothermal reservoir, store the thermal energy and the far-field thermal energy, and conduct the thermal energy and the far-field thermal energy to the geothermal well.

In yet another embodiment, a geothermal heat exchanger comprises: a geothermal well extending to, or to a proximity of, one or more geothermal zones of thermal energy as sweet spots of a geothermal reservoir; at least one of: (i) at least one geothermal fracture into the geothermal reservoir from the geothermal well; (ii) at least one geothermal acidized zone into the geothermal reservoir from the geothermal well; and (iii) at least one lateral from the geothermal well into the geothermal reservoir, wherein each of the at least one geothermal fracture, the at least one acidized zone, and the at least one lateral increases an effective thermal radius of the geothermal well to increase a surface area of contact of the geothermal well with the one or more geothermal zones of thermal energy; and one or more thermal energy storage (TES) materials embedded into one of the at least one geothermal fracture, the at least one acidized zone, and the at least one lateral of the multilateral well, wherein the thermal energy storage (TES) materials absorb the thermal energy and a far-field thermal energy of the geothermal reservoir, store the thermal energy and the far-field thermal energy, and conduct the thermal energy and the far-field thermal energy to the geothermal well.

BRIEF DESCRIPTION OF THE FIGURES

The summary above, as well as the following detailed description of illustrative embodiments, is better understood when read in conjunction with the appended drawings. For the purpose of illustrating the present disclosure, exemplary constructions of the disclosure are shown in the drawings. However, the disclosure is not limited to specific methods and instrumentalities disclosed herein.

FIGS. 4-A to 4-F illustrate different embodiments of some geothermal heat exchangers.

FIGS. 5-1 to 5-173 illustrate further embodiments of some geothermal heat exchangers.

FIG. 7-A is a Table showing specific heat capacity characteristics of some materials.

FIG. 7-B is a Table showing thermal conductivity characteristics of some materials.

FIGS. 8-A to 8-C illustrate implementations of thermal energy storage (TES) materials in a geothermal heat exchanger, according to some embodiments.

DETAILED DESCRIPTION

Figure 1:
FIG. 1 is an illustration of a conventional geothermal energy system.

While processes, systems and devices are described herein by way of examples and embodiments, those skilled in the art recognize the processes, systems and devices are not limited to the embodiments or drawings described. It should be understood that the drawings and description are not intended to be limited to the particular form disclosed. Rather, the intention is to cover all modifications, equivalents and alternatives falling within the spirit and scope of the appended claims and description. Any headings used herein are for organization purposes only and are not meant to limit the scope of the description of the claims. As used herein, the word "may" is used in a permissive sense (i.e., meaning having the potential to) rather than the mandatory sense (i.e., meaning must). Similarly, the words "include," "including," and "includes" mean including, but not limited to. The present disclosure describes particular embodiments and with reference to certain drawings, but the subject matter is not limited thereto.

The present disclosure will provide description to the accompanying drawings, in which some, but not all embodiments of the subject matter of the disclosure are shown. Indeed, the subject matter may be embodied in many different forms and should not be construed as limited to the embodiments set forth herein, rather, these embodiments are provided so that this disclosure satisfies all the legal requirements. The disclosure herein is illustrative and explanatory of one or more embodiments and variations thereof, and it will be appreciated that various changes in the design, organization, means of operation, structures and location, methodology, and use of mechanical equivalents may be made without departing from the spirit of the invention. Because many varying and different embodiments may be made within the scope of the concept(s) herein taught, and because many modifications may be made in the embodiments described herein, it is to be understood that the details herein are to be interpreted as illustrative and non-limiting.

Certain terminology is used in the following description for convenience only and is not limiting. Certain words used herein designate directions in the drawings to which reference is made. Unless specifically set forth herein, the terms "a," "an" and "the" are not limited to one element, but instead should be read consistent with the meaning of "one or more," "at least one," and "one or more than one." As used herein "another" means at least a second or more. The terminology includes the words noted above, derivatives thereof and words of similar import.

Unless otherwise defined, all technical and scientific terms used herein have the same meaning as commonly understood by one of ordinary skill in the art.

FIG. 1 illustrates a conventional geothermal energy system in which water is pumped down into a heterogenous rock formation, or geothermal reservoir, where the water absorbs thermal energy from the rock formation and transfers thermal energy as steam to a power plant at the surface. The steam is then cooled to a liquid state, and the water is again pumped back into the heterogenous geothermal reservoir to repeat the cycle. As the thermal energy of the geothermal reservoir is absorbed by the water over time in the heat production process, the thermal energy in the geothermal reservoir becomes depleted. Due to the heterogeneous nature of the geothermal reservoir (e.g., differences in lithology, thermal conductivity, and/or specific heat capacity of rock formation), it takes time for the thermal energy of a depleted geothermal reservoir to be replenished via, for example, heat from the Earth's core. Because it can take many months for a depleted heterogenous geothermal reservoir t8o re-absorb sufficient thermal energy to adequately heat water for the geothermal energy system, the depleted geothermal well can become unproductive.

Figure 2:
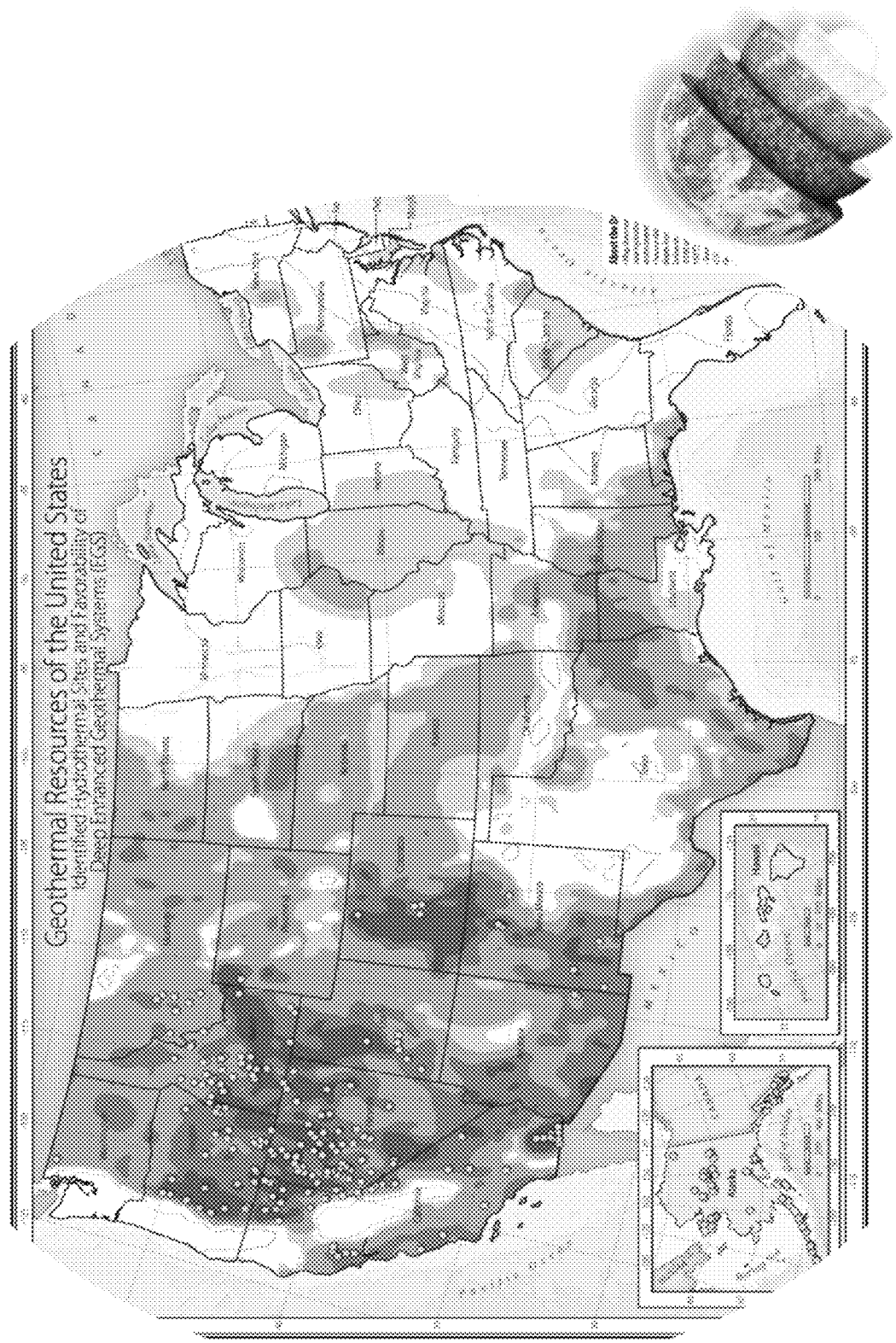
FIG. 2 illustrates a heat map of the United States.

The conventional geothermal energy systems discussed above are constructed primarily in areas at which underground thermal energy sources are closer to the Earth's surface where high downhole temperatures can be reached at a shallower depth. These areas are indicated in heat maps, such as the heat map of the United States shown in FIG. 2. While underground thermal energy sources indicated by heat maps may be easier to access, the heterogenous rock formations in geothermal energy systems lead to the problems discussed above. The present disclosure discusses geothermal heat exchangers formed of geothermal wells, and methods of constructing such geothermal heat exchangers, that overcome these problems. In particular, the present disclosure discusses approaches and concepts for locating, designing and constructing productive geothermal heat exchangers in which the geothermal wells are not confined to the traditional heat map locations, are not so dependent on the depth of the geothermal well.

The design and construction of the geothermal heat exchangers of the present disclosure take into consideration the following heat transfer equation:

$$\frac{Q}{t} = \frac{KA(T_2 - T_1)}{d}$$

in which: Q=an amount of heat transferred; t=time; K=thermal conductivity of a material; A=contact surface area; d=distance; $T_1$=Temperature on one side the material; and $T_2$=Temperature on the other side of the material. According to the heat transfer equation, increasing the contact surface area "A" between a geothermal well (of lower thermal energy) and a geothermal reservoir (of higher thermal energy) and decreasing the distance "d" between the geothermal well and the geothermal reservoir produce a greater amount of heat transfer "Q" over time "t". $T_1$ would be the temperature of the geothermal well, while $T_2$ would be the temperature in the geothermal reservoir.

As discussed below, the geothermal heat exchanger of the present disclosure can be constructed in view of the heat transfer equation to increase or maximize the surface area of contact "A" between the geothermal well and the geothermal energy source by (i) selecting a predetermined shape of the geothermal well within one or more substantially homogenous sweet spots of geothermal energy of a heterogeneous geothermal reservoir; and/or (ii) increasing a dimension of the geothermal well within one or more substantially homogenous sweet spots of geothermal energy of the heterogeneous geothermal reservoir. In the present disclosure, 'dimension' refers to a diameter of the geothermal well, and/or a length of the geothermal well within the sweet spots. "Sweet spot' means an area of the geothermal reservoir having a homogenous lithology, homogenous thermal conductivity, and homogeneous specific heat capacity. 'Substantially' means at least 51% of the sweet spot is homogeneous (e.g., having the same lithology, thermal conductivity, and specific heat capacity). A substantially homogenous sweet spot can produce continuous heat transfer over time as compared to a heterogeneous geothermal reservoir that requires many months to replenish with thermal energy. This is because the homogeneity of the sweet spots makes the thermal conductivity of the sweet spot more consistent, such that the ability of the sweet spots to re-absorb thermal energy is not impeded by other materials that may not be as conductive. Substantially homogenous sweet spots can thus relatively quickly replenish depleted thermal energy as compared to the heterogeneous geothermal reservoir.

The geothermal heat exchanger of the present disclosure can also be constructed in view of the heat transfer equation to minimize the distance "d" between the geothermal well and the one or more substantially homogenous sweet spots of geothermal energy by first calculating a mathematical best fit line to the one or more substantially homogenous sweet spots. The mathematical best fit line is a curve or linear line, or a combination of the two, having a best fit to the one or more substantially homogenous sweet spots. The geothermal well can then be constructed to, or to a proximity of, the one or more substantially homogenous sweet spots of geothermal energy along the calculated mathematical best fit line.

Figure 3:
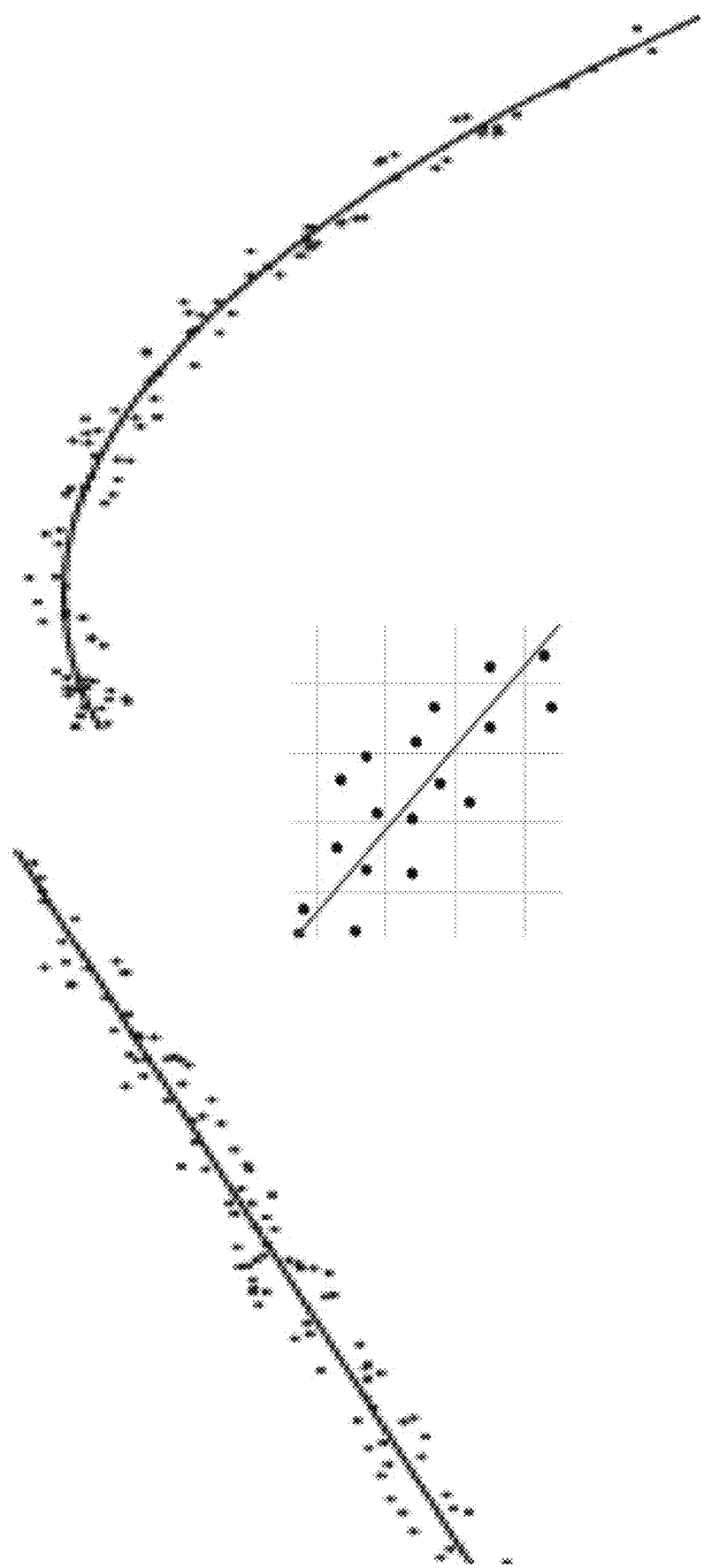
FIG. 3 shows some examples of mathematical best fit lines.

FIG. 3 illustrates some examples of mathematical best fit lines. As is apparent from FIG. 3, the mathematical best fit line may be a linear line or may be a curved line. In some cases, the mathematical best fit line may be a combination of a curved line(s) and a linear line(s). Each of these lines, as shown for example in FIG. 3, has a best fit to a series of data points so that the line approximately fits the data points. In other words, the mathematical best fit line has a shortest distance "d" to the series of points. The one or more substantially homogenous sweet spots may appear as series of data points in a heterogeneous geothermal reservoir. In this regard, the geothermal heat exchanger of the present disclosure can be constructed along the calculated mathematical best fit line so that the geothermal well approximately fits the one or more substantially homogenous sweet spots. In one embodiment, the mathematical best fit line may be calculated using the 'least squares' method, which is a standard approach in regression analysis to approximate the solution of overdetermined systems (sets of equations in which there are more equations than unknowns) by minimizing the sum of the squares of the residuals (a residual being the difference between an observed value and the fitted value provided by a model) made in the results of each individual equation. The Least Squares Regression Line is the line that makes the vertical distance from the data points to the regression line as small as possible. It's called a "least squares" because the best line of fit is one that minimizes the variance. Of course, other methods may be used to calculate the mathematical best fit line, such as interpolation, smoothing, extrapolation, which are known calculation methods in the field of mathematics.

One embodiment of a method of constructing a geothermal heat exchanger, such as any of the ones illustrated in FIGS. 4A to 4F, may include first identifying one or more geothermal zones of thermal energy as sweet spots of a geothermal reservoir. The geothermal zones of thermal energy should have a temperature sufficient to boil a working fluid at the pressure, e.g., a predetermined pressure, which exists at the geothermal zones. The identification of the geothermal energy zones can be based on acquired subsurface data that may include, among other things, temperature logs, mud logs, and logging while drilling (LWD) information. This data may be obtained via logging tools, such as a thermal logging tool (TLT). Other tools may implement acoustics, gamma rays, resistivity, and bulk density/neutron porosity. The acquired information can be analyzed via modeling software than can build models (e.g., thermal, geologic, and/or geo-mechanical models) of the subsurface which indicate the location of the geothermal sweet spots. The software may be executed by a computer program stored on a non-transitory computer readable recording medium (not shown), such as write/readable and read-only memory devices within a computer, including a read-only memory and a flash memory. Other examples of non-transitory computer readable recording mediums include a CD-ROM disk readable by a CD-ROM drive, a hard-disk drive, and portable storage devices that may be connected to a computer via a USB port. The computer program may contain codes and instructions that are executed on a computer to create the models.

Once the geothermal zones of thermal energy as sweet spots of the geothermal reservoir are identified, the geothermal heat exchanger can be constructed by drilling or otherwise forming a geothermal well to, or to a proximity of, the one or more geothermal zones of thermal energy of the geothermal reservoir. For instance, FIG. 4-A shows a geothermal well (e.g., 'motherbore') extending from the surface to, or to a proximity of, one or more geothermal zones of thermal energy of the geothermal reservoir.

It is noted that the construction of the geothermal well can be performed based on real time dynamic subsurface modeling. Dynamic real time modeling incorporates subsurface data in real time to convert static models to coupled dynamic models with respect to the geology, thermal attributes, geo-mechanics and other geothermal reservoir characteristics. The attributes of the geothermal reservoir can be collected with mud logging and logging while drilling (LWD) or other tools, and analyzed in real time via software that also calculates the location of production thermal zones ('pay zones') as sweet spots of geothermal energy. The process of dynamic real time modeling may include first creating three static models of geology, geothermal reservoir and geo-mechanics using existing data, such as seismic information, drilling logs, core samples, production data, and possible drilling history of the field. In a predicted geological model, natural fractures can be specified. Using logs such as sonic and drilling events, an estimated geo-mechanical model can be generated. Considering the existing data and heat production records, a geothermal reservoir model can be simulated. These three models can be bound and coupled. A static model of the reservoir can then be built, and bottom hole locations can be targeted. While drilling the formation to reach the bottom hole targets, built static models can be updated in real time with actual downhole data coming from mud logging, logging while drilling (LWD), and logging tools to create accurate dynamic models. Accordingly, construction of the geothermal well can be adjusted to match with the underground dynamic models in order to and produce a prolific geothermal well.

After surface locations are identified, a planned trajectory and drilling program can be created. If there is not enough subsurface information to build these three models, the well can be constructed as a wildcat and/or an exploratory well. While drilling the planned trajectory, subsurface data can be acquired and gathered in real time through mud logging, such as formation cuttings coming from the subsurface to surface (e.g., the shale shakers) and logging while drilling (LWD). In mud logging, the type and shape of cuttings are analyzed, and fluid contents are determined. A temperature log can identify the thermal sweet spots within the formation. Acoustics, gamma rays, resistivity, and bulk density/neutron porosity can also be implemented. Utilizing the resistivity and gamma will help to steer construction of the geothermal well to the sweet spots of the geothermal reservoir. Also, the data acquisition by logs can be incorporated into real time analysis to build of dynamic models. Sweet spots may also be dynamic and change over time as field heat production continues and geothermal and thermal reservoir characteristics, such as stresses, temperature and lithology, change during the life of the geothermal reservoir. Patterns of sweet spot movement over time can be estimated via the collected data and associated software programs. Coupled subsurface modeling (geology, geo-mechanics and geothermal reservoir) can approximate dynamic sweet spot patterns through time and life of the geothermal reservoir based on actual subsurface data acquisition and reservoir behavior analysis. This information can be then used to validate, correct and deepen knowledge in the subsurface analysis of the geothermal reservoir and its behavior. For example, sonic data acquired will help recognize the stress region changes within the geothermal reservoir, and can be used to adjust the geo-mechanical model. Thermal logs will play a significant role to identify and understand the thermal behavior and characteristics of the sweet spots.

After all these data acquisitions of the subsurface, static models can be dynamically adjusted and updated in real time. Due to heterogeneity of the geothermal reservoir, drilling and simultaneously analyzing in real time the geothermal reservoir can be the most accurate way to place the geothermal well and any laterals or fracs or acidized zones in the most prolific thermal sections ('sweets spots') of the geothermal reservoir. Accordingly, dynamic real time modeling involves using available static data to design a static model of the geothermal well before actual construction begins. As the geothermal well is constructed, existing logging and mud logging tools are used to update the static model in real time. The construction can be modified dynamically by adjusting the design to and place the geothermal well in the determined sweet spots. In essence, the construction of the geothermal well (e.g., mother bore and possibly laterals) can be steered in real time to the prolific sections of the geothermal reservoir based on the dynamic subsurface models.

Once the geothermal well has been constructed, it may be desirable to increase the effective thermal radius of the geothermal well beyond the actual radius of the geothermal well in order to have more exposure with the geothermal reservoir. More exposure increases the surface area of contact "A" of the geothermal well with the one or more geothermal zones of thermal energy. As discussed above with respect to the heat transfer equation, increasing the surface area of contact "A" of the geothermal well can improve heat transfer and the conductivity of the geothermal reservoir with the geothermal well. For instance, FIG. 4-A shows that the effective thermal radius of the geothermal well (e.g., 'motherbore') can be increased by forming at least one lateral from the geothermal well (e.g., 'motherbore') into the geothermal reservoir to form a geothermal multilateral well. The lateral(s) extends further into the geothermal reservoir beyond the actual diameter of the geothermal well (e.g., 'motherbore') to increase the surface area of contact "A" of the geothermal well (e.g., 'motherbore' and lateral(s)) with geothermal zones of thermal energy (sweet spots) in the geothermal reservoir. The lateral(s) can be placed precisely within the sweet spots in the geothermal reservoir based on the modeling discussed above, and can thus avoid unnecessary damage to the geothermal reservoir and the environment. The number and location of the lateral(s) may depend on the lithology and characteristics of geothermal reservoir, heat production objectives, long-term plan for the geothermal heat exchanger, and cost. One example of lateral(s) construction is to sidetrack with a directional bottom hole assembly from the bottom of the motherbore (toe) to an upper part (heel).

After drilling the motherbore, side tracks can occur at determined locations to penetrate through the thermal sweet spots and place the laterals within these sweet spots. Laterals can be placed based on mathematical best fit calculations to cover the most thermal sweet spots. The number of laterals, the lengths, and directions can all be based on real time dynamic subsurface modeling.

Additional ways to increase the effective thermal radius of the geothermal well is by geothermal fracturing or geothermal acidizing from the geothermal well to form at least one geothermal fracture or acidized zone into the geothermal reservoir. For instance, FIG. 4-A shows mini geothermal fractures (or acidized zones) at particular locations from the laterals. Due to heterogeneity of the geothermal reservoir, areas with higher thermal energy may be scattered throughout the reservoir, and thermal conductivity of the formation within the geothermal reservoir can vary. Therefore, having just a single wellbore (e.g., motherbore) or multilateral using a mathematical best fit trajectory may not cover all of the geothermal sweet spots in one specific area. As a geothermal well produces thermal energy, heat transfer within the formation from the far-field to the geothermal well can depend on materials within the heterogeneous thermal reservoir. Depending on conductivity of the materials, heat will be absorbed and transferred to the wellbore with different speed and quantities. Geothermal fracturing or geothermal acidizing can provide a consistent, high quality and quantity of heat transfer.

Figures 1, 5:
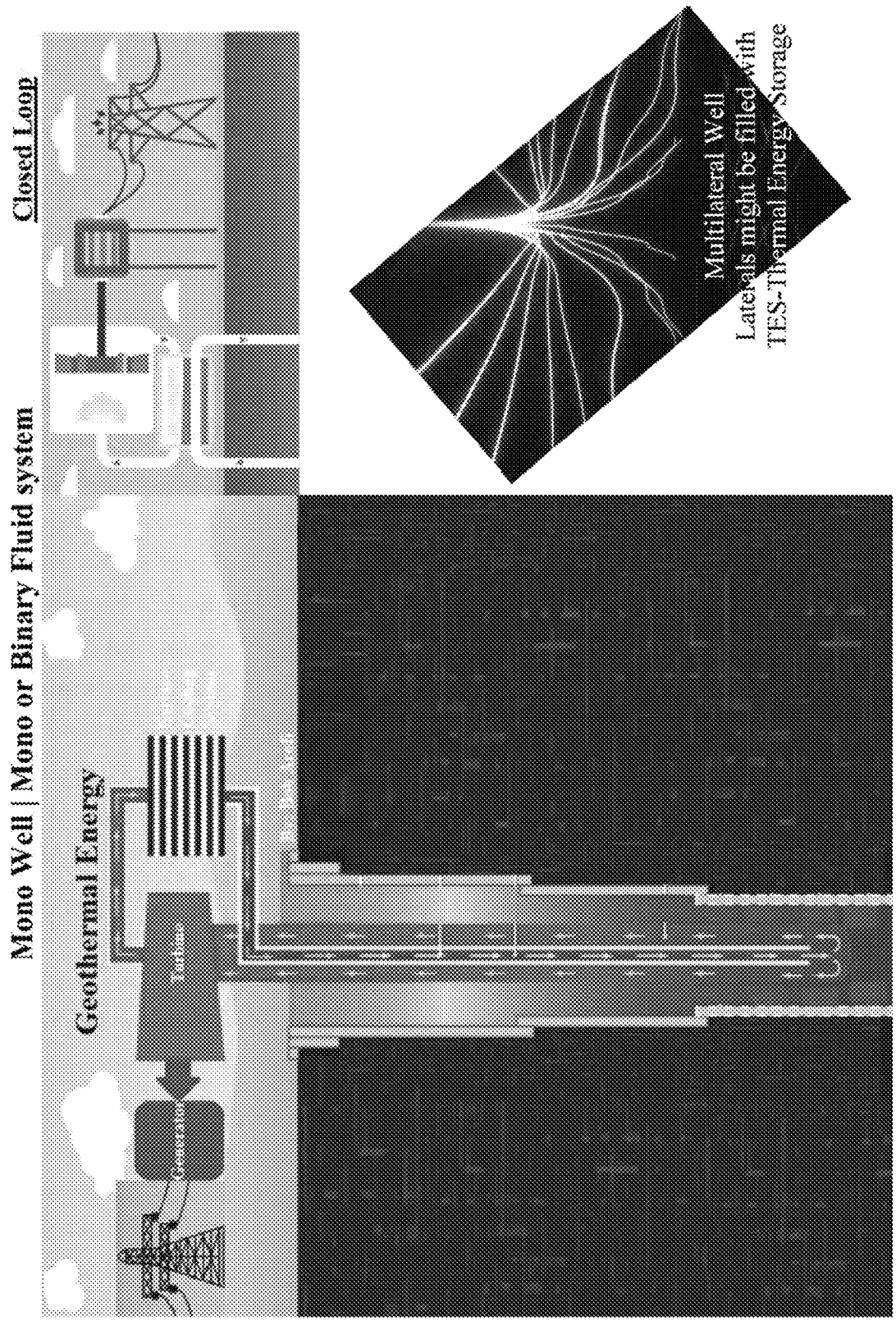
Figures 2, 5:
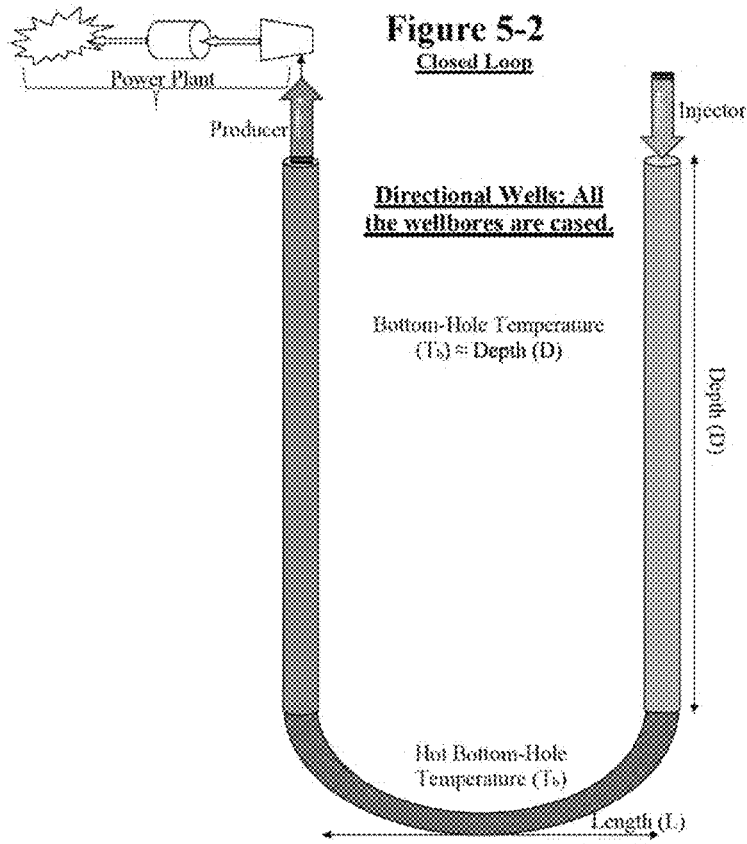
Figures 3, 5:
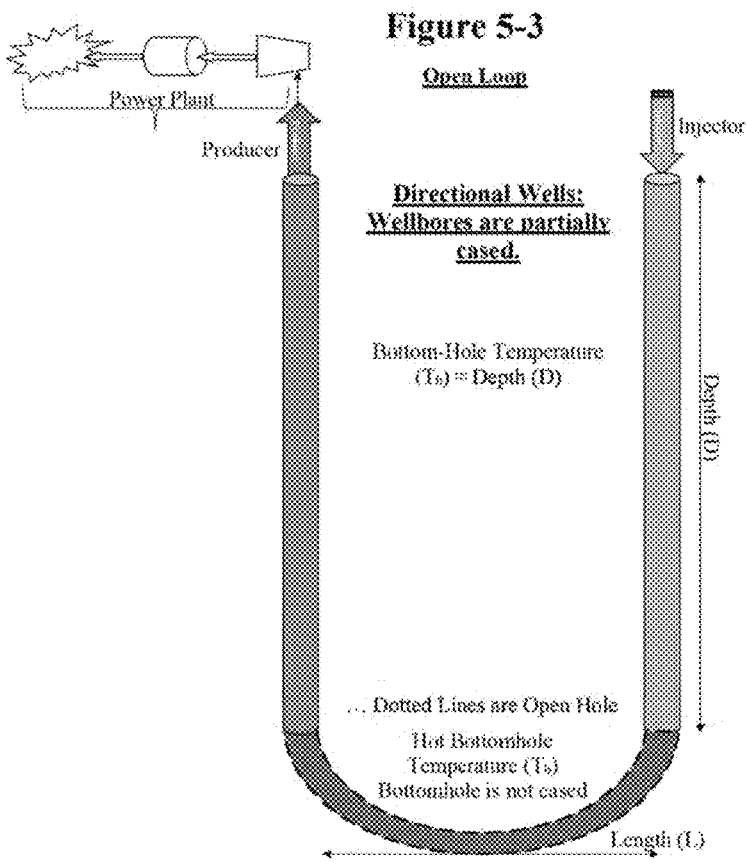

In geothermal fracturing/acidizing, the formation is fractured and/or acidized with a fluid entrained with materials having high thermal energy storage (TES) capacity, such as salt, sodium nitrate, potassium nitrate, and calcium nitrate, silicon, and graphene, and nanoparticles, etc. The present disclosure is not limited to these thermal energy storage (TES) materials, and may include other materials, such as those shown in FIGS. 7A and 7B. The thermal energy storage (TES) may be embedded into each of the geothermal fractures and the geothermal acidized zones and stay within the formation. The thermal energy storage (TES) may also be embedded into the laterals of the multilateral well discussed above. The thermal energy storage (TES) materials absorb not only the thermal energy from the geothermal sweet spots, but also the far-field thermal energy of the geothermal reservoir. The thermal energy storage (TES) materials store the thermal energy and the far-field thermal energy, and conduct the thermal energy and the far-field thermal energy to the geothermal well. The thermal energy storage (TES) materials can be more homogenous than the formation, and act like thermal magnets to absorb and store thermal energy of the geothermal reservoir (formation) within themselves. When a geothermal well starts to produce heat, these thermal energy storage (TES) materials can provide consistent, high quality and greater heat to the geothermal well of the geothermal heat exchanger. Desirable thermal energy storage (TES) materials should have a relatively high thermal conductivity ("K" in the heat transfer equation) to pass the stored thermal energy to the geothermal well. The thermal conductivity, quantified as W/m.K, of several materials that may be used in the geothermal heat exchangers discussed herein is shown in FIG. 7-B. In addition, ideal thermal energy storage (TES) materials should have a relatively low specific heat capacity to raise its temperature relatively quickly when absorbing heat. The specific heat capacity, quantified in J/kg.K, of several materials that may be used in the geothermal heat exchangers discussed herein is shown in FIG. 7-A. In some embodiments of the geothermal heat exchanger and methods discussed herein, the thermal energy storage (TES) materials comprise a specific heat capacity that is less than that of water, and comprise a specific thermal conductivity that is greater than that of water. FIGS. 7A and 7B shows several examples of thermal energy storage (TES) materials that have a specific heat capacity that is less than water and a specific thermal conductivity that is greater than water. Furthermore, ideal thermal energy storage (TES) materials should have a relatively high latent energy in order to store absorbed thermal energy for a relatively longer period of time.

In some cases, the thermal energy storage (TES) materials may be comprised of phase change materials (PCM). Phase change materials (PCM) are substances which absorb or release large amounts of latent heat when they go through a change in their physical state, i.e., from solid to liquid and vice versa. There are two principal classes of phase change material: organic (carbon-containing) materials derived either from petroleum, from plants or from animals; and salt hydrates, which generally either use natural salts from the sea or from mineral deposits or are by-products of other processes. Phase change materials (PCM) include ionic liquids, salt hydrates, fatty acids and esters, and various paraffins (such as octadecane). Geothermal fracturing/acidizing in the proper sections of the geothermal well can increase the effective heat transfer and enhance connectivity of the geothermal reservoir to the geothermal heat exchanger. By implementing geothermal fractures/acidized zones, the amount of reservoir exposure in proper thermal sweet spots through the geothermal well can be drastically increased. As a result, heat production of the geothermal well can be greatly enhanced.

The difference between geothermal fracturing and hydraulic fracturing is in the type of fluid used. The main purpose in hydraulic fracturing is to increase connectivity of fluid movement. In geothermal fracturing/acidizing, the main purpose is to embed thermal energy storage (TES) materials within geothermal sweet spots of the heterogeneous geothermal reservoir. The thermal energy storage (TES) materials enhance the heat transfer from the formation and make the heat transfer rate more consistent within heterogeneous the geothermal reservoir. Due to homogeneity, the geothermal fractures/acidized zones in the geothermal sweet spots of the geothermal reservoir can generate consistent heat transfer to the geothermal well from far-field of the geothermal reservoir. The combination of multilateral wells and geothermal fractures/acidizing in prolific geothermal sections of geothermal reservoir can maximize the heat transfer. It is noted that geothermal fracturing/acidizing can be performed in a single geothermal well through the determined geothermal thermal sweet spots, without any laterals (i.e., without having a multilateral well). However, a lateral may help provide more exposure of the geothermal well into and through the prolific geothermal regions of the geothermal reservoir.

Geothermal fractures can be hydraulically created by continuously pumping fluid with thermal energy storage (TES) materials or via a batch of fluid with thermal energy storage (TES) materials. It may be preferable to continuously pump the fluid instead of a batch of fluid to increase the consistency and efficiency of continuous thermal storage and heat transfer. Fracturing fluid may include viscous fluid with a significant amount of thermal energy storage (TES) materials such as those discussed above, possibly with proppants such as sand to keep the fractures open, and fibers to keep the particles consistently in place. Pumping hydraulically the fracturing fluid with thermal energy storage (TES) materials with a high frequency of proppants can establish pillars within the fractures to enhance the conductivity and optimize connectivity of the geothermal reservoir towards geothermal well. In addition, viscosity agents and fibers can be pumped to prevent dispersing proppants from the surface all the way through the fracture tips and minimize material loss into the formation. The pillars can create open pathways inside the geothermal fractures, enabling heat transfer through stable channels of thermal energy storage (TES) materials. The thermal energy storage (TES) materials will fill entire fractures from the tip in far-field to the geothermal wellbore. The selection of geothermal fracturing or geothermal acidizing may depend on the type of the formation into which either acid or neutral fluid with significant amount of thermal energy storage (TES) materials can be injected. For example, in a limestone formation, pumping acid in the proper thermal sweet spots is preferred, whereas in a tight sandstone reservoir, neutral fluid such as water should be used. Pumping acid to break and dissolve the limestone formation can enhance the conductivity and exposure of the geothermal reservoir into geothermal well. Dissolved formation around the geothermal well can increase the effective thermal radius and eventually increase heat transfer. The real time dynamic modeling of the subsurface as discussed above can determine whether to fracture with neutral fluid or acid. Drilling rig equipment can be modified to perform hydraulic fracturing/acidizing after drilling the sections.

Figures 4, 5:
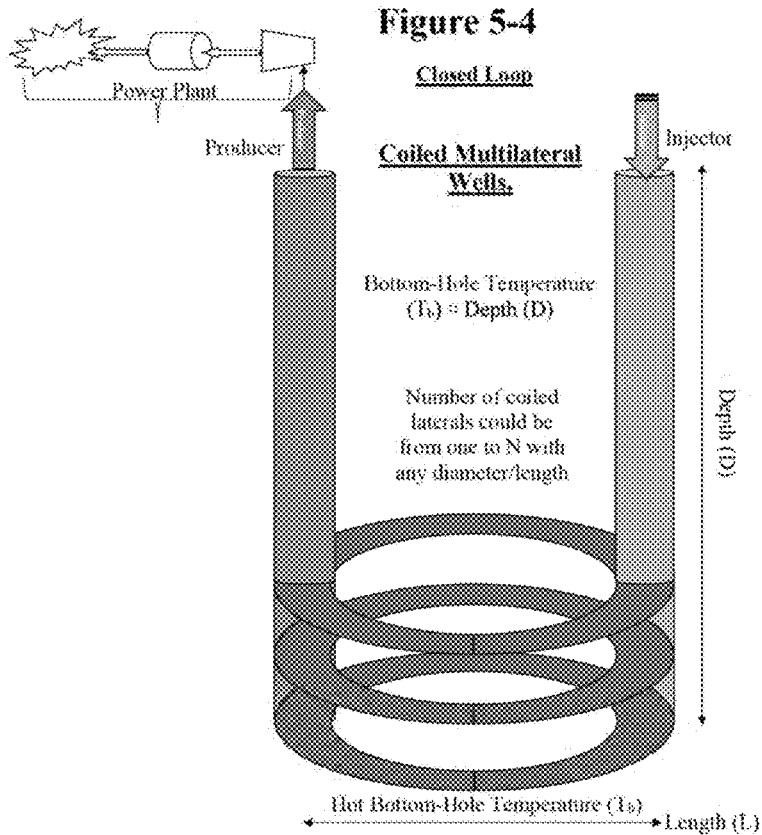
Figure 5:
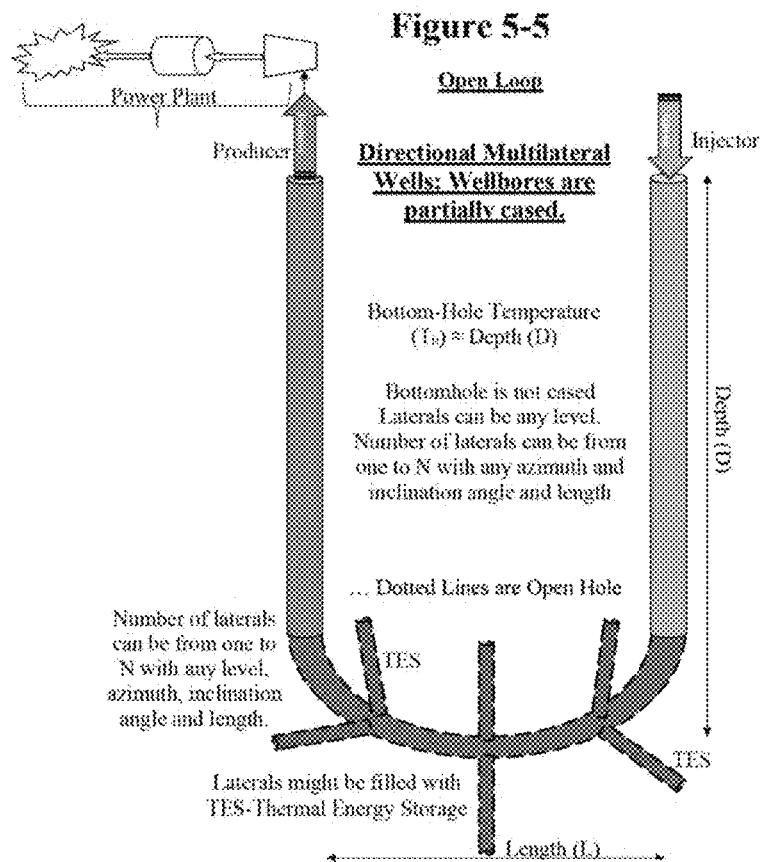

FIG. 4-A shows that a working fluid is injected into the geothermal well (e.g., 'motherbore') of the geothermal heat exchanger and travels through the geothermal heat exchanger (i.e., laterals, geothermal fractures, and/or acidized zones) to absorb thermal energy from the sweet spots of geothermal energy in the geothermal reservoir. The working fluid heated by the absorbed thermal energy is then produced by being extracted from the geothermal heat exchanger through the geothermal well. The thermal energy in the heated working fluid can be converted to kinetic energy and mechanical energy for turning the blades of a turbine that rotates a shaft connected to an electricity generator. The rotating shaft drives the electricity generator to generate electricity via electromagnetic induction. Increasing the amount of thermal energy absorbed by the working fluid in the geothermal heat exchanger increases the temperature and kinetic energy of the working fluid that can be converted to work in the turbine, so that the turbine can drive the electricity generator with more energy and thus generate more electricity.

FIGS. 4A to 4F illustrate different embodiments of geothermal heat exchangers that can be constructed by the methods discussed above. In each chase, the geothermal heat exchanger includes a geothermal well extending to, or to a proximity of, one or more geothermal zones of thermal energy as sweet spots of a geothermal reservoir. The geothermal heat exchanger includes at least one of: (i) at least one geothermal fracture into the geothermal reservoir from the geothermal well; (ii) at least one geothermal acidized zone into the geothermal reservoir from the geothermal well; and (iii) at least one lateral from the geothermal well into the geothermal reservoir. As discussed above, each of the geothermal fracture(s), the acidized zone(s), and the lateral(s) increases an effective thermal radius of the geothermal well to increase a surface area of contact of the geothermal well with the one or more geothermal zones of thermal energy. As discussed above, one or more thermal energy storage (TES) materials may be embedded into the geothermal fracture(s), the acidized zone(s), and the lateral(s) of the multilateral well. The thermal energy storage (TES) materials absorb the thermal energy and a far-field thermal energy of the geothermal reservoir, store the thermal energy and the far-field thermal energy, and conduct the thermal energy and the far-field thermal energy to the geothermal well, as discussed above. The thermal energy storage (TES) materials may possess any of the characteristics discussed above and combinations thereof.

FIG. 4-A illustrates an embodiment of a multilateral geothermal heat exchanger with geothermal mini-fracs/acidizing zones from the laterals. FIG. 4-B illustrates an embodiment of a multilateral geothermal heat exchanger with geothermal fracturing/acidizing zones extending across the geothermal well (e.g., 'motherbore') and laterals. FIG. 4-C illustrates an embodiment of a multilateral deviated/directional geothermal heat exchanger with geothermal mini-fracs/acidizing zones from the laterals. FIG. 4-D illustrates an embodiment of a multilateral deviated/directional geothermal heat exchanger with geothermal fracturing/acidizing extending across the geothermal well (e.g., 'motherbore') and laterals. FIGS. 4-E and 4-F illustrate further embodiments of a multilateral geothermal heat exchanger. These geothermal heat exchangers each include multiple geothermal wells each having geothermal mini-fracs/acidizing zones from the laterals.

Figures 5, 6:
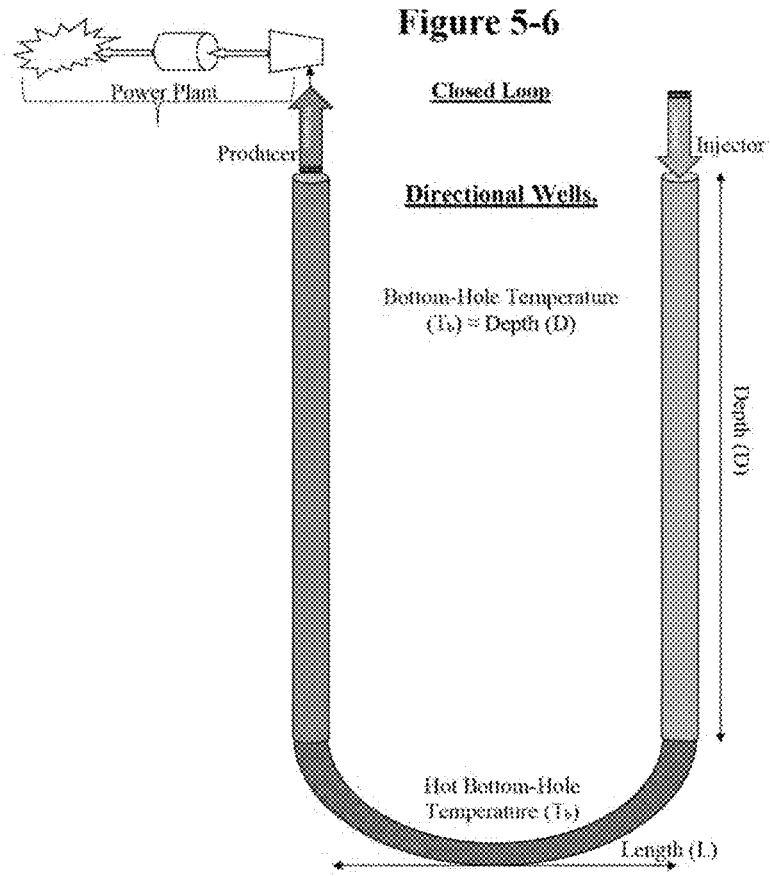
Figures 5, 6, 7:
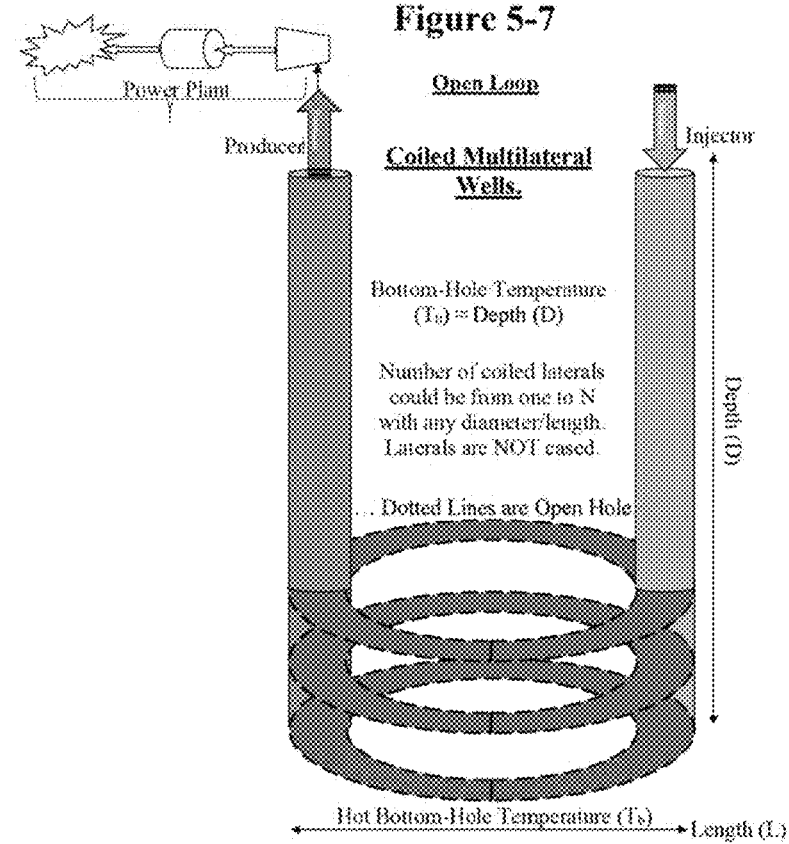
Figures 5, 6, 7, 8:
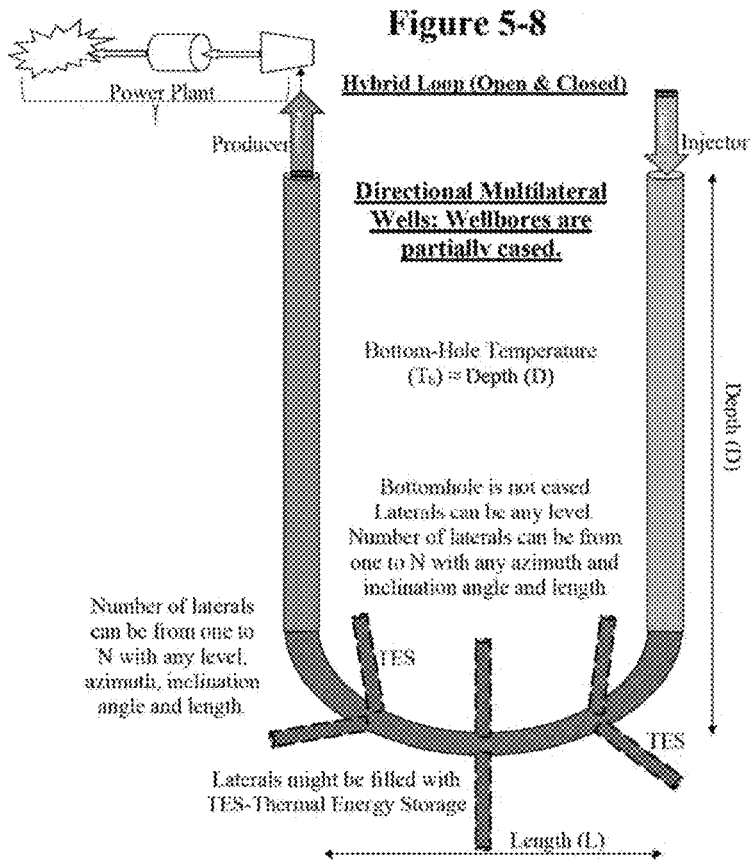
Figures 5, 6, 7, 8, 9:
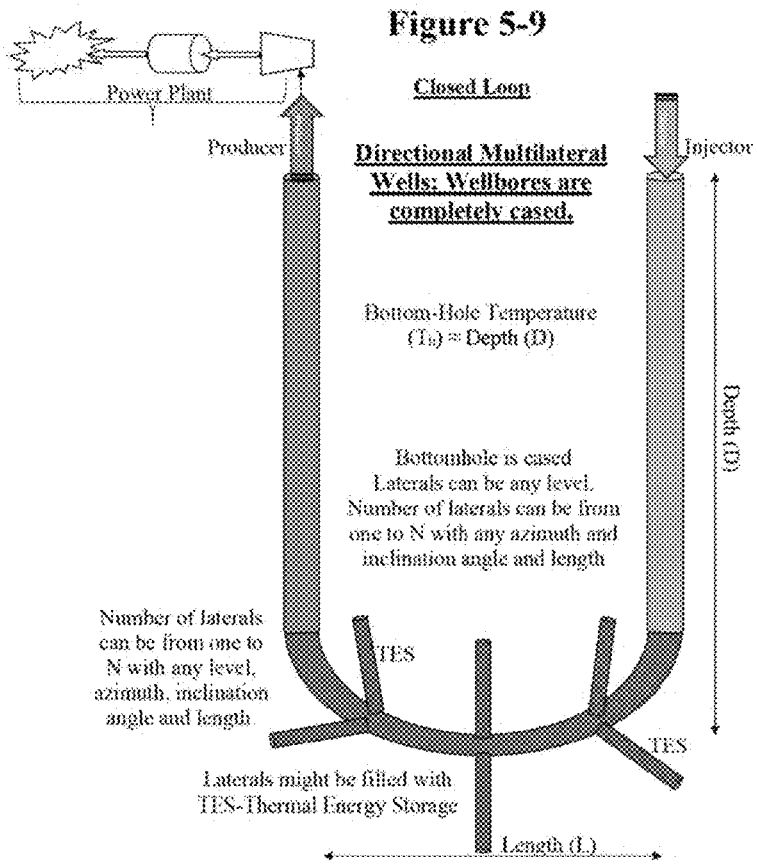
Figures 5, 6, 7, 8, 9, 10:
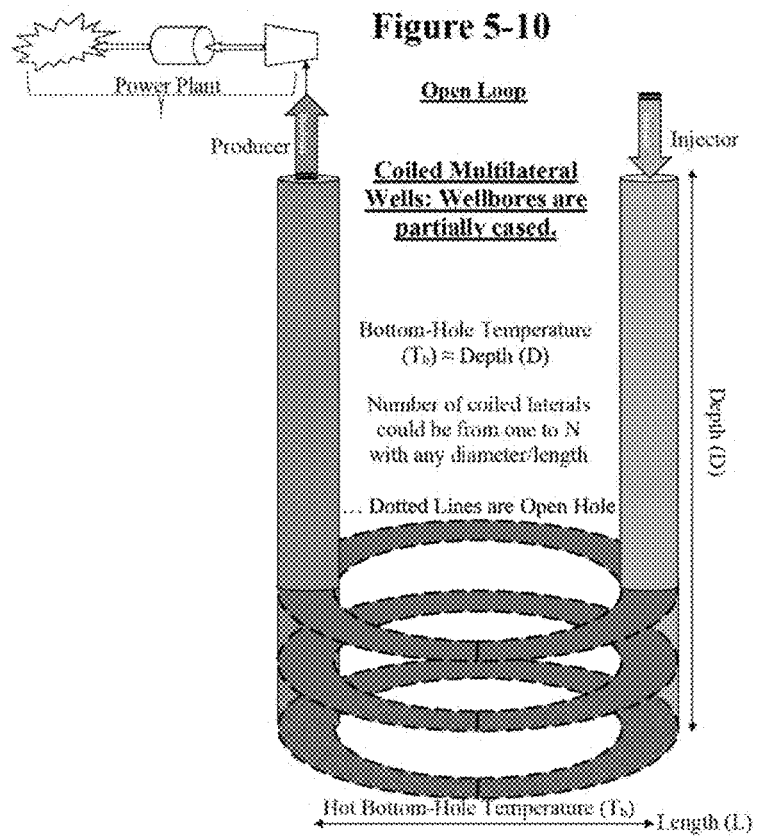
Figures 5, 6, 7, 8, 9, 10, 11:
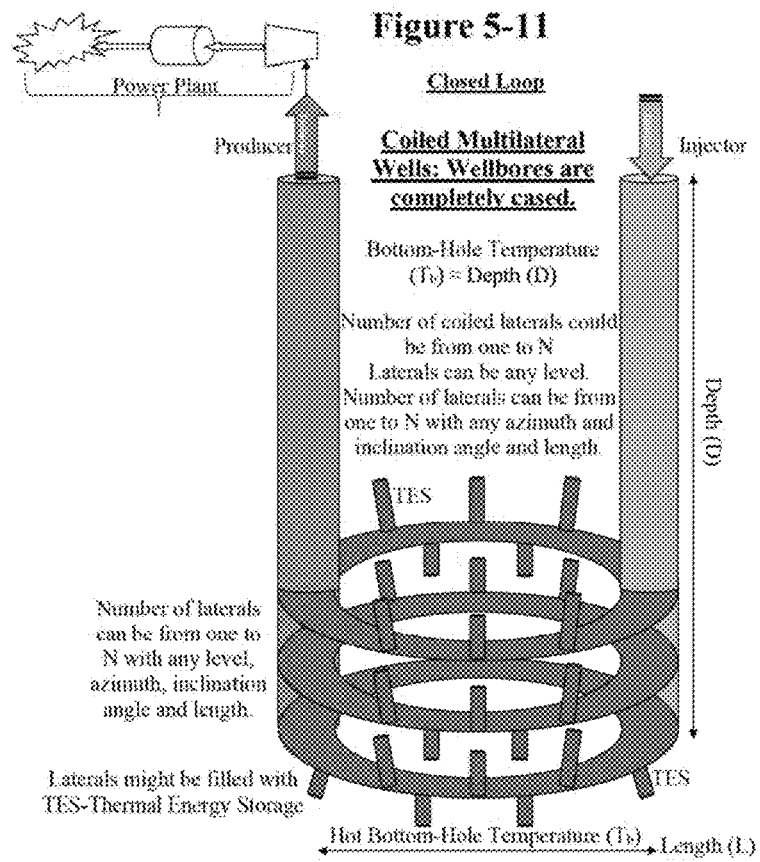
Figures 5, 6, 7, 8, 9, 10, 11, 12:
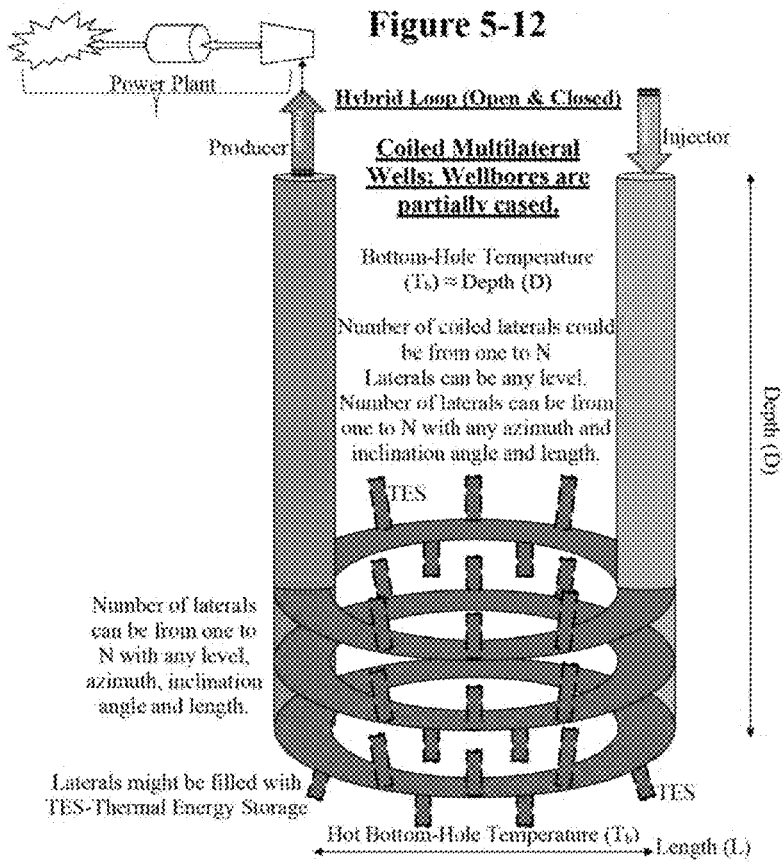
Figures 5, 6, 7, 8, 9, 10, 11, 12, 13:
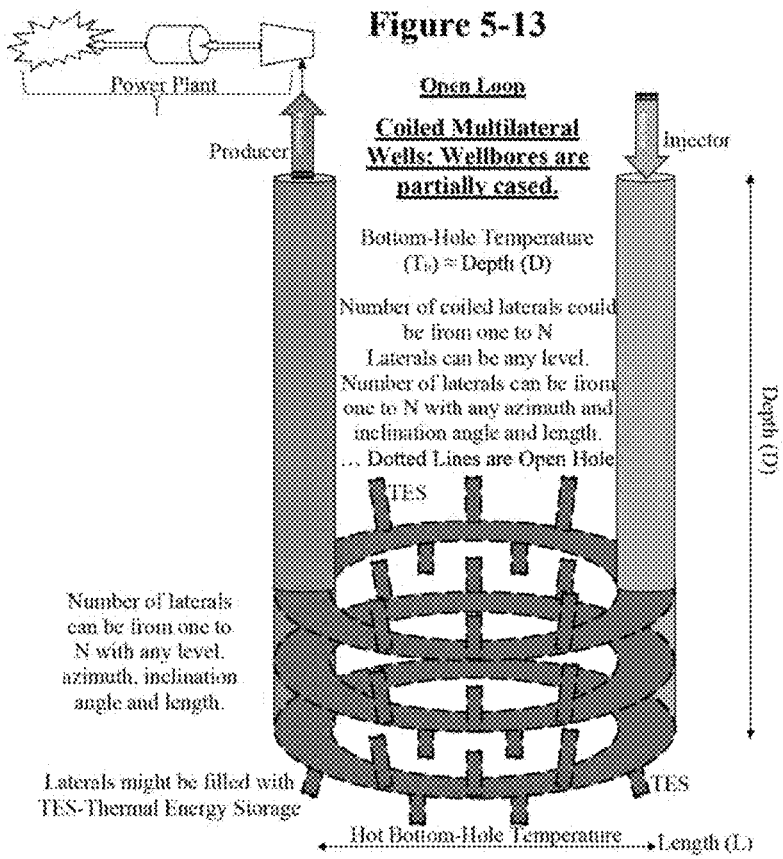
Figures 5, 6, 7, 8, 9, 10, 11, 12, 13, 14:
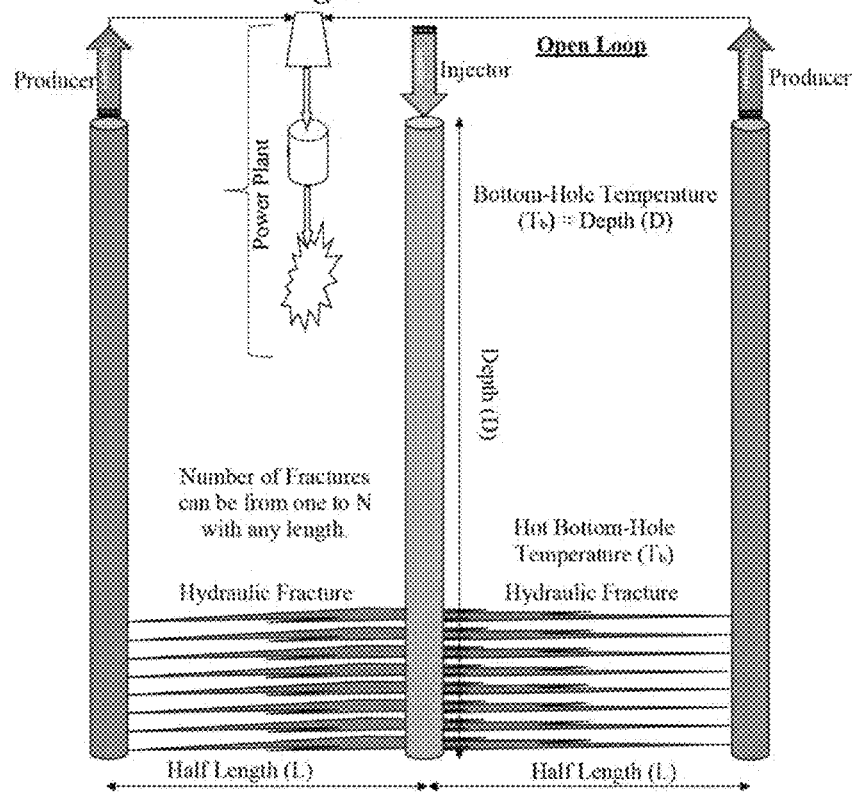
Figures 5, 6, 7, 8, 9, 10, 11, 12, 13, 14, 15:
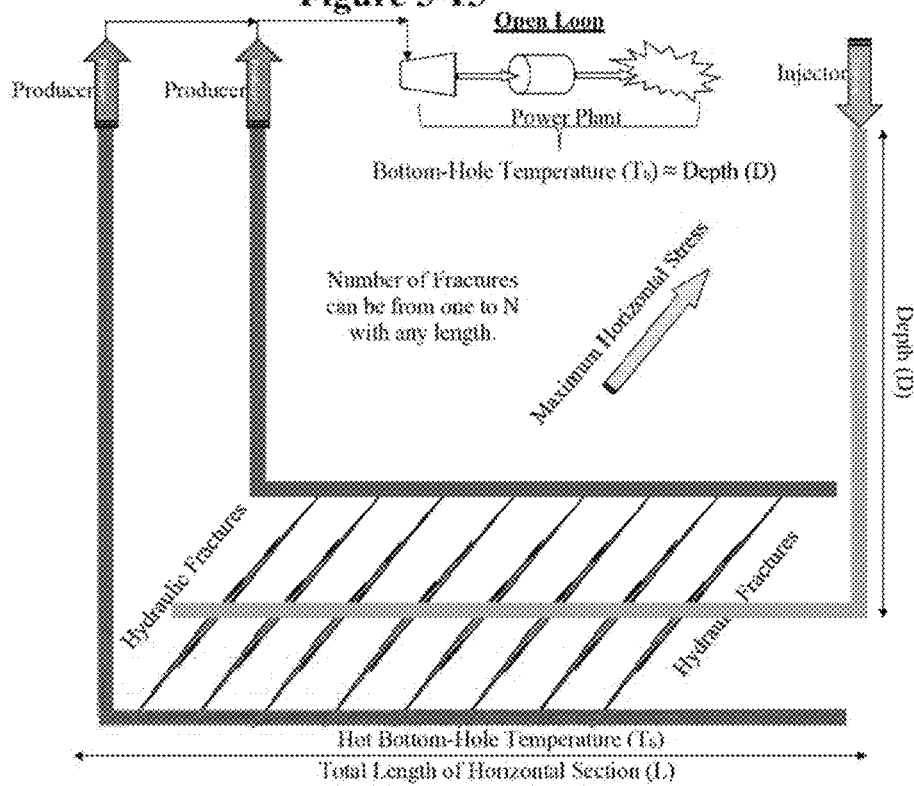
Figures 5, 6, 7, 8, 9, 10, 11, 12, 13, 14, 15, 16:
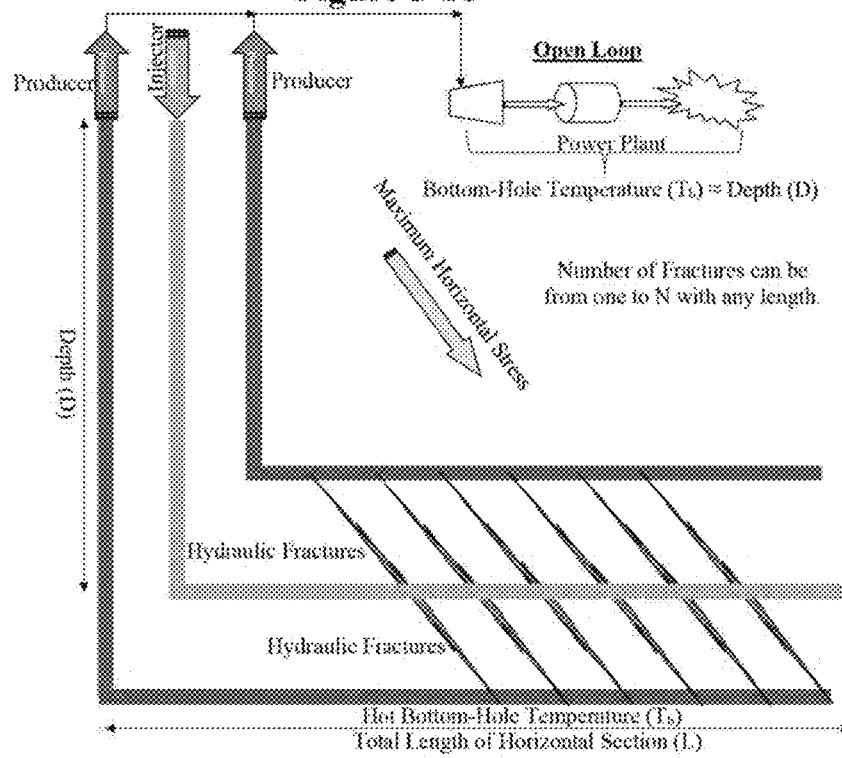
Figures 5, 6, 7, 8, 9, 10, 11, 12, 13, 14, 15, 16, 17:
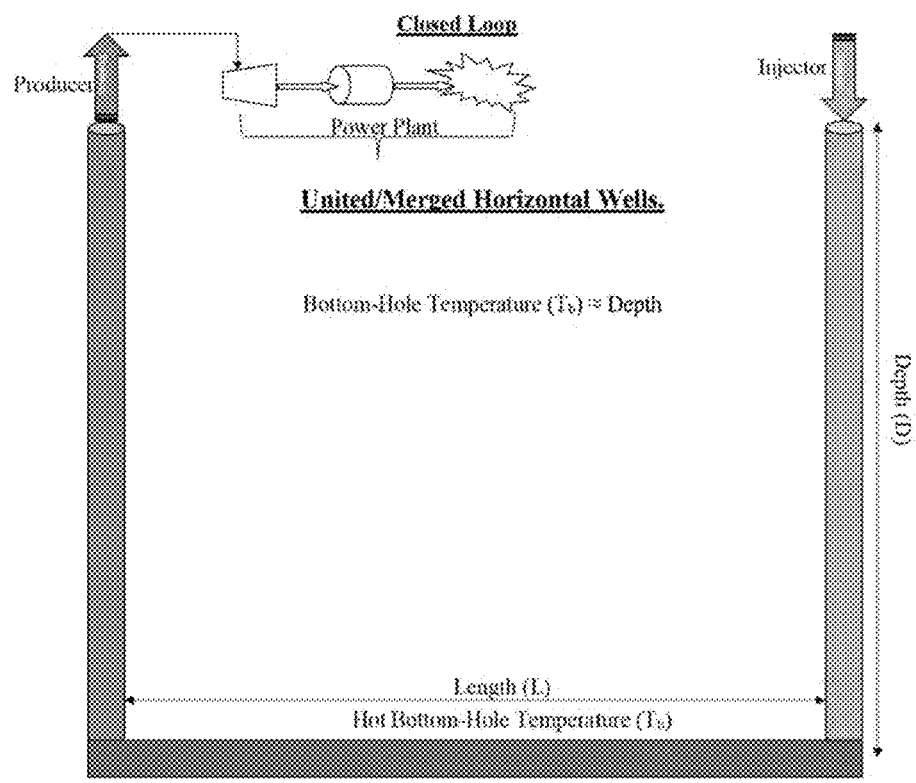
Figures 5, 6, 7, 8, 9, 10, 11, 12, 13, 14, 15, 16, 17, 18:
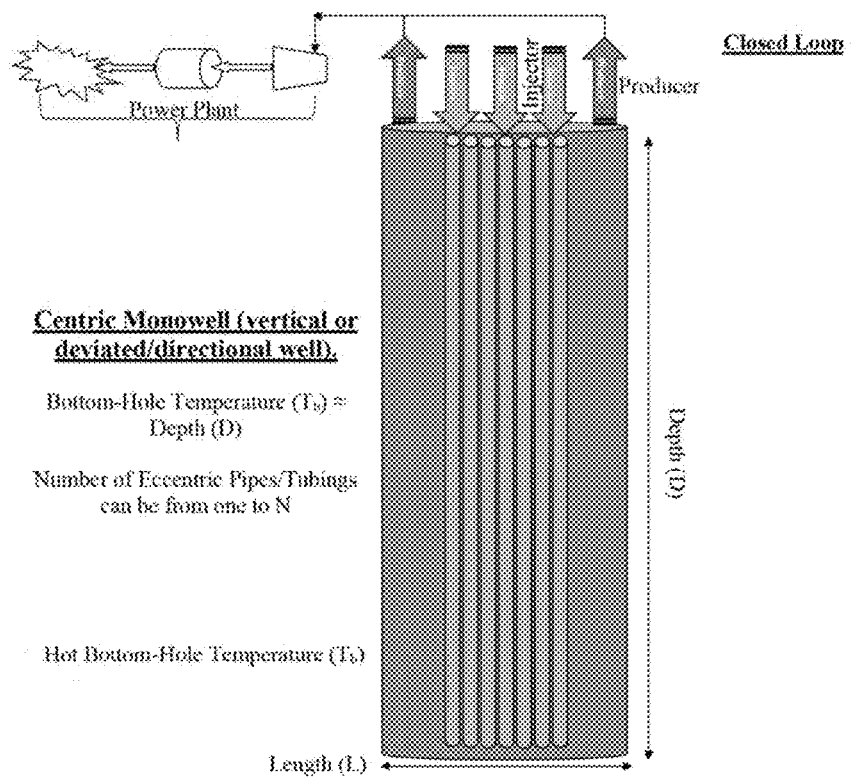
Figures 5, 6, 7, 8, 9, 10, 11, 12, 13, 14, 15, 16, 17, 18, 19:
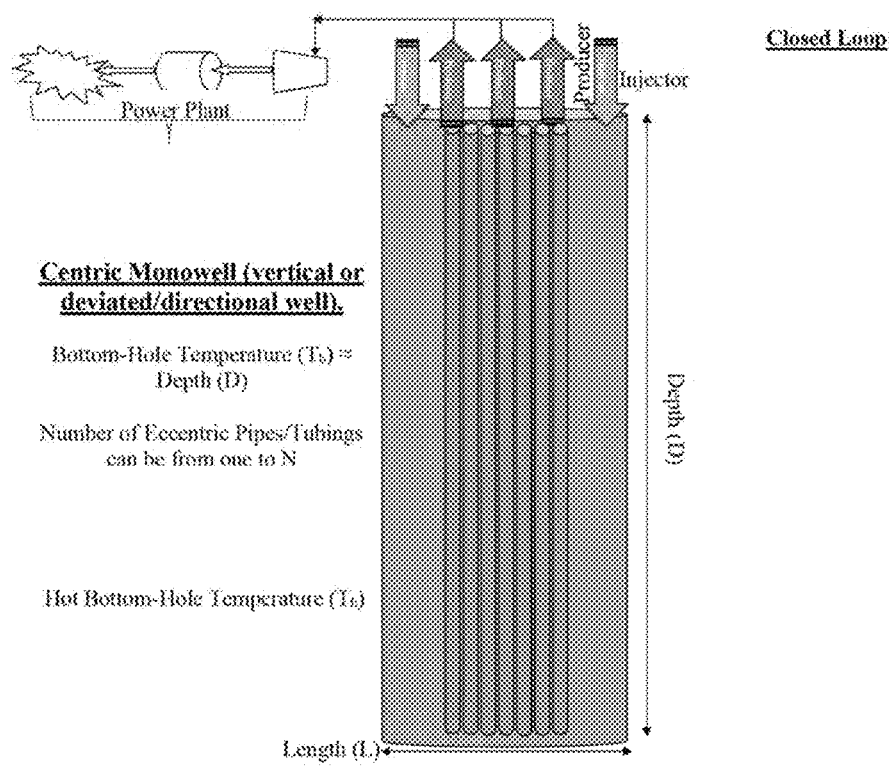
Figures 5, 6, 7, 8, 9, 10, 11, 12, 13, 14, 15, 16, 17, 18, 19, 20:
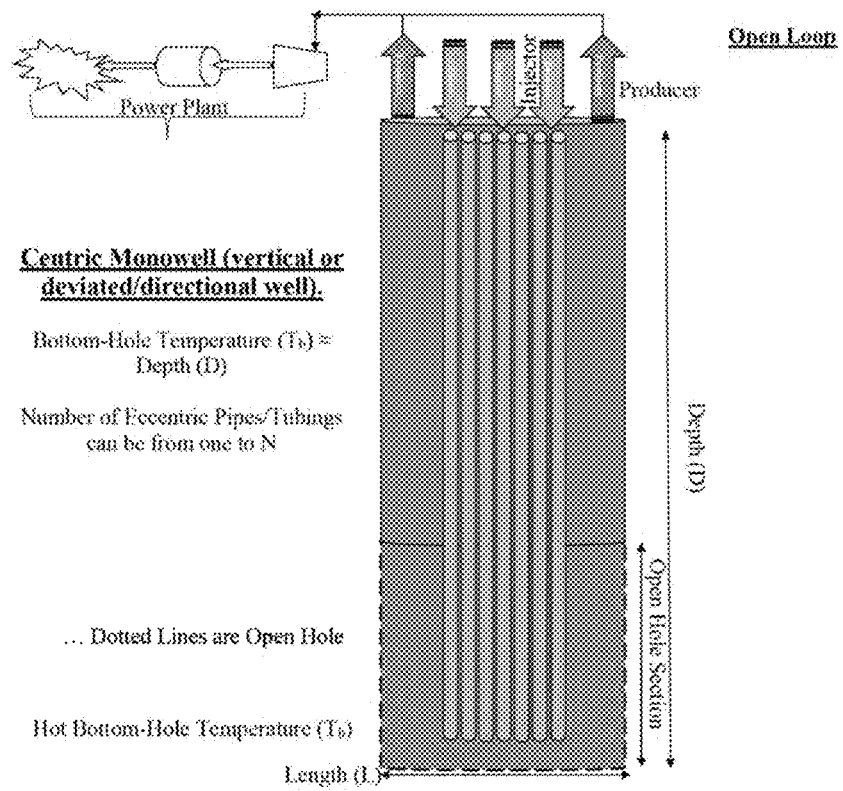
Figures 5, 6, 7, 8, 9, 10, 11, 12, 13, 14, 15, 16, 17, 18, 19, 20, 21:
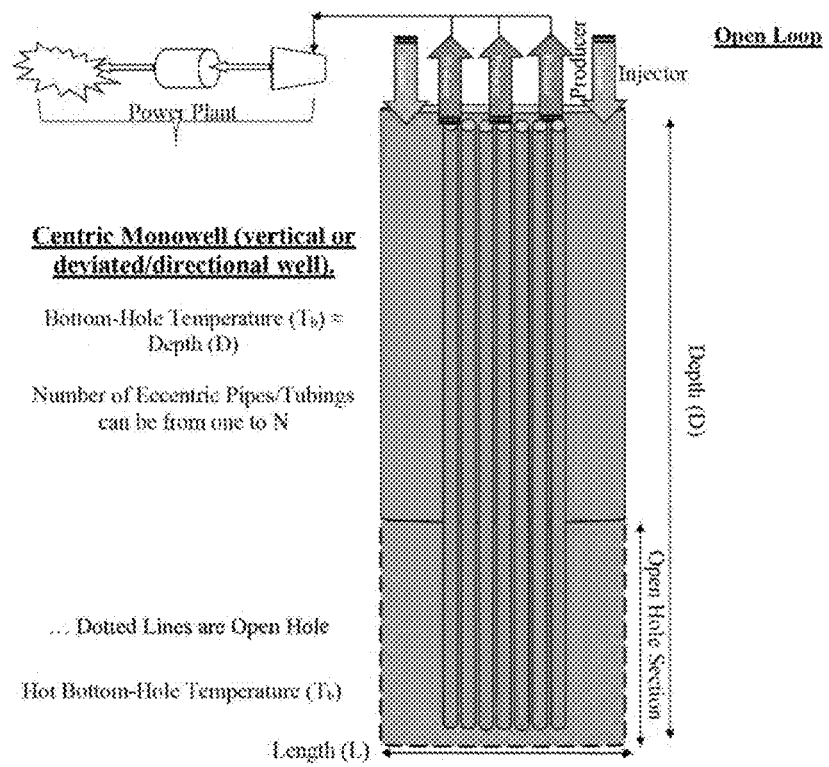
Figures 5, 6, 7, 8, 9, 10, 11, 12, 13, 14, 15, 16, 17, 18, 19, 20, 21, 22:
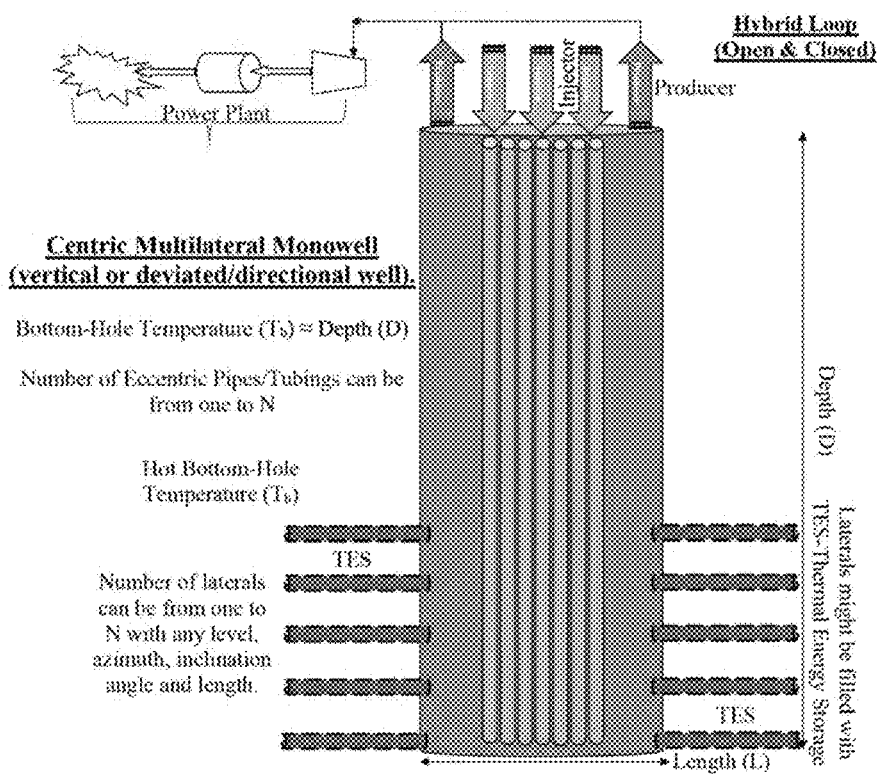
Figures 5, 6, 7, 8, 9, 10, 11, 12, 13, 14, 15, 16, 17, 18, 19, 20, 21, 22, 23:
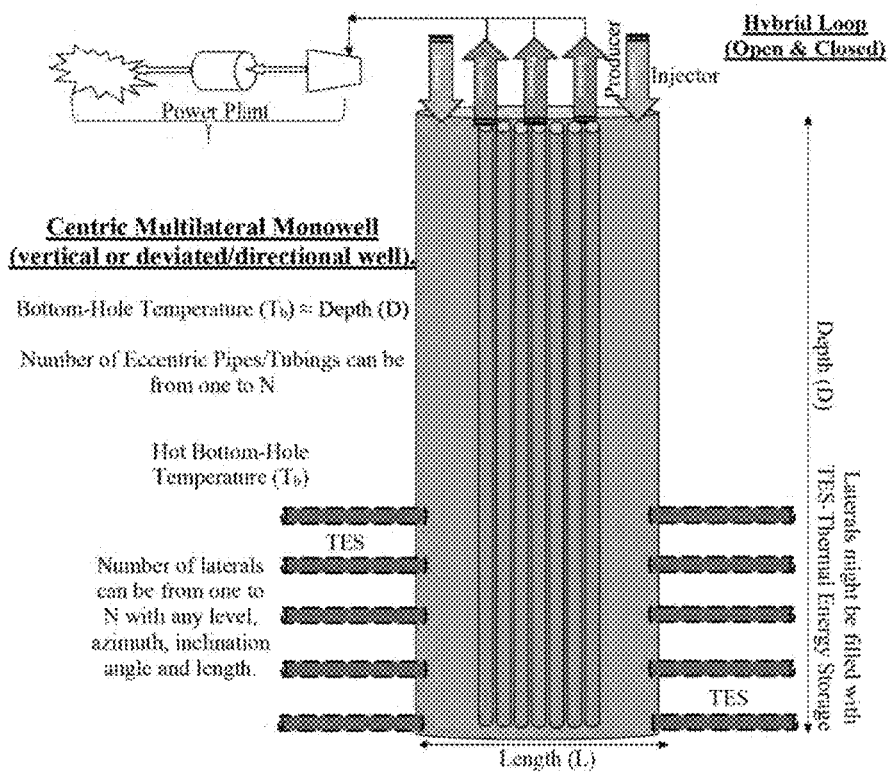
Figures 5, 6, 7, 8, 9, 10, 11, 12, 13, 14, 15, 16, 17, 18, 19, 20, 21, 22, 23, 24:
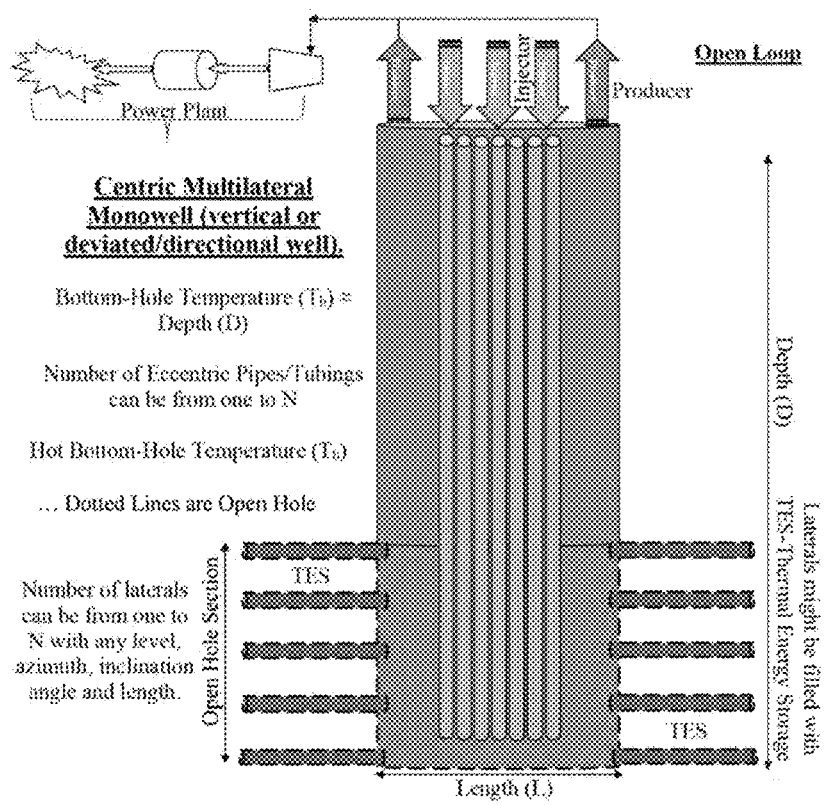
Figures 5, 6, 7, 8, 9, 10, 11, 12, 13, 14, 15, 16, 17, 18, 19, 20, 21, 22, 23, 24, 25:
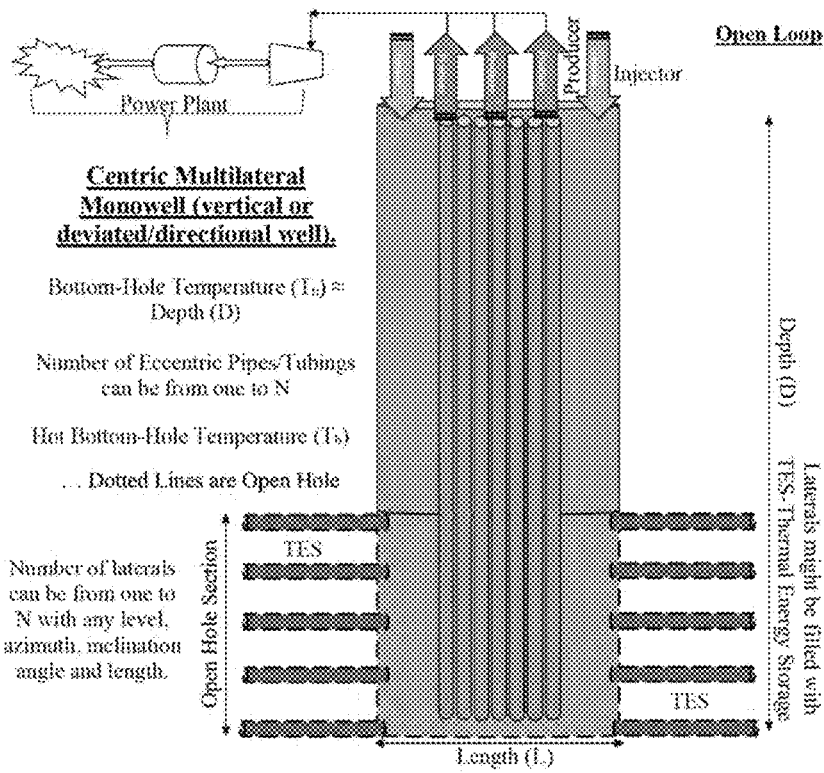
Figures 5, 6, 7, 8, 9, 10, 11, 12, 13, 14, 15, 16, 17, 18, 19, 20, 21, 22, 23, 24, 25, 26:
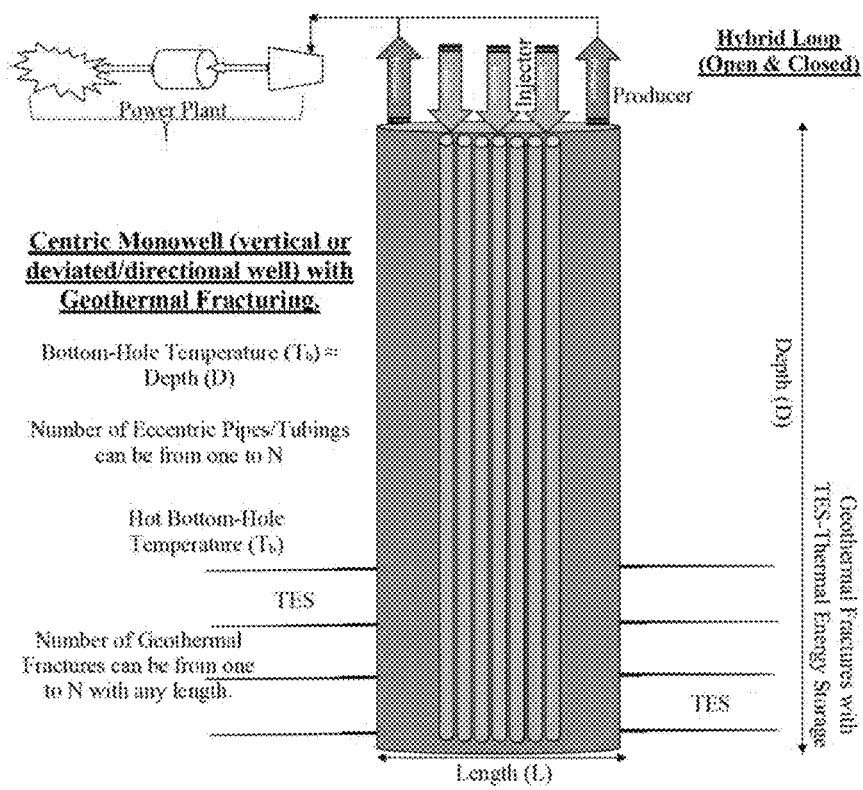
Figures 5, 6, 7, 8, 9, 10, 11, 12, 13, 14, 15, 16, 17, 18, 19, 20, 21, 22, 23, 24, 25, 26, 27:
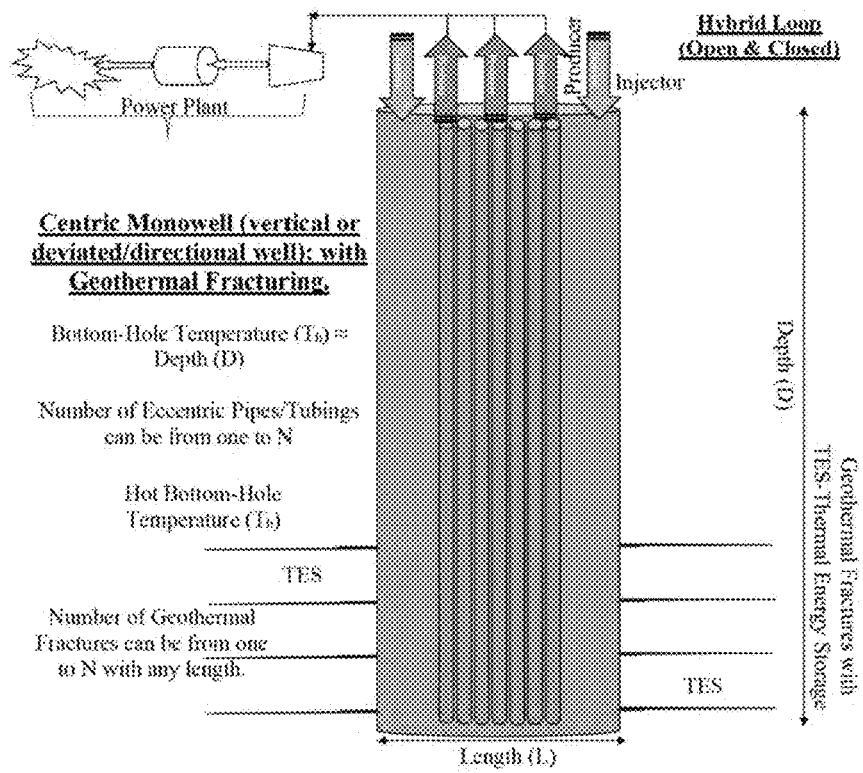
Figures 5, 6, 7, 8, 9, 10, 11, 12, 13, 14, 15, 16, 17, 18, 19, 20, 21, 22, 23, 24, 25, 26, 27, 28:
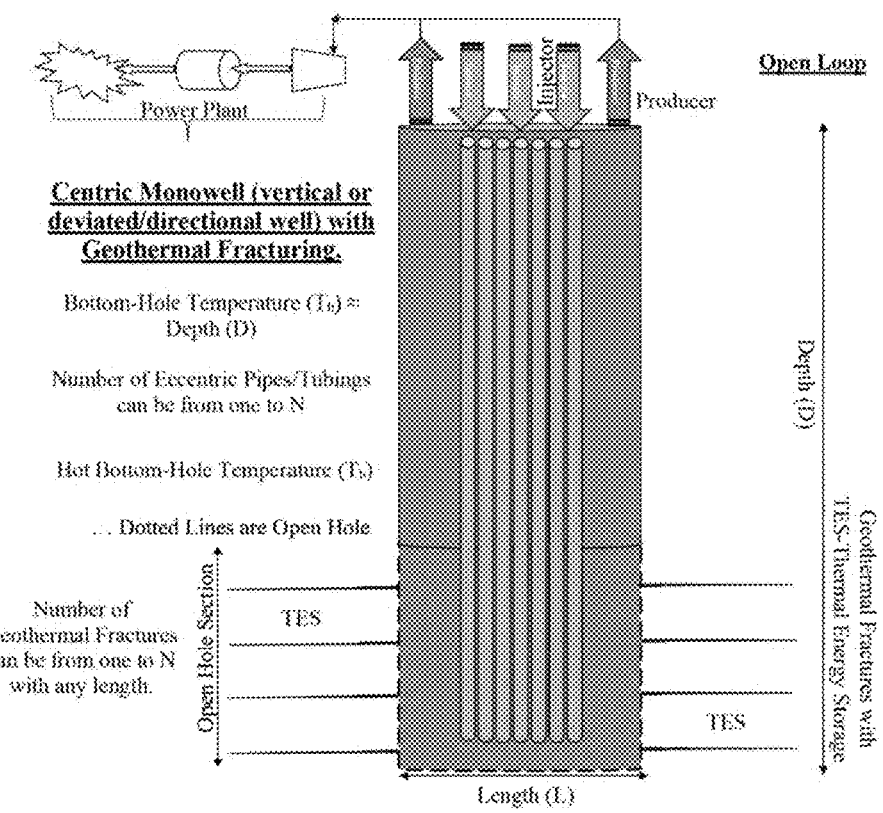
Figures 5, 6, 7, 8, 9, 10, 11, 12, 13, 14, 15, 16, 17, 18, 19, 20, 21, 22, 23, 24, 25, 26, 27, 28, 29:
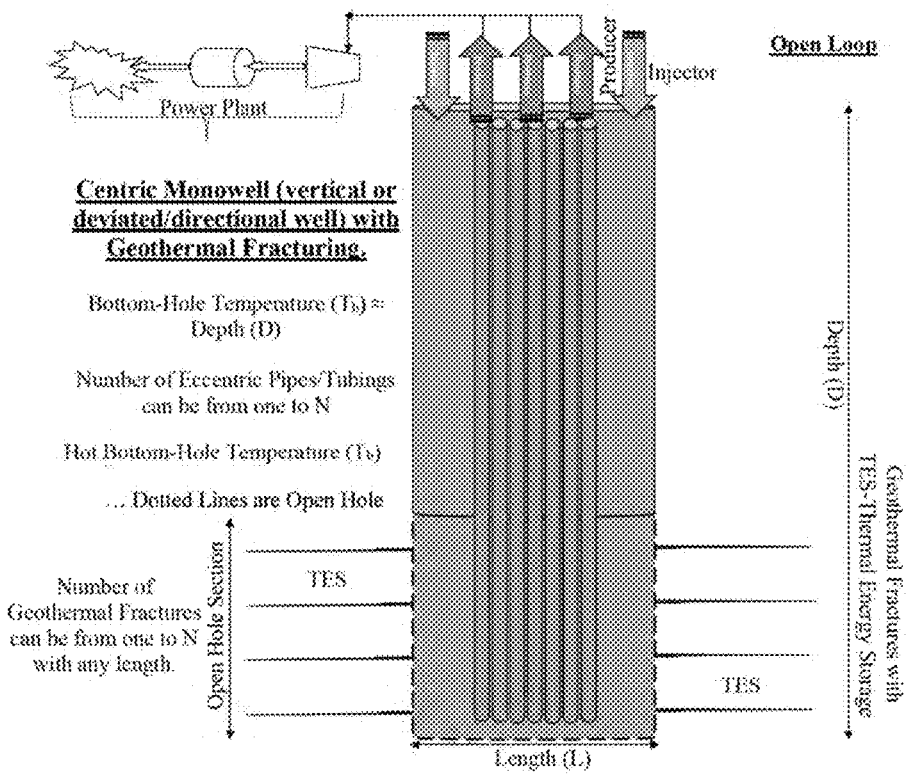
Figures 5, 6, 7, 8, 9, 10, 11, 12, 13, 14, 15, 16, 17, 18, 19, 20, 21, 22, 23, 24, 25, 26, 27, 28, 29, 30:
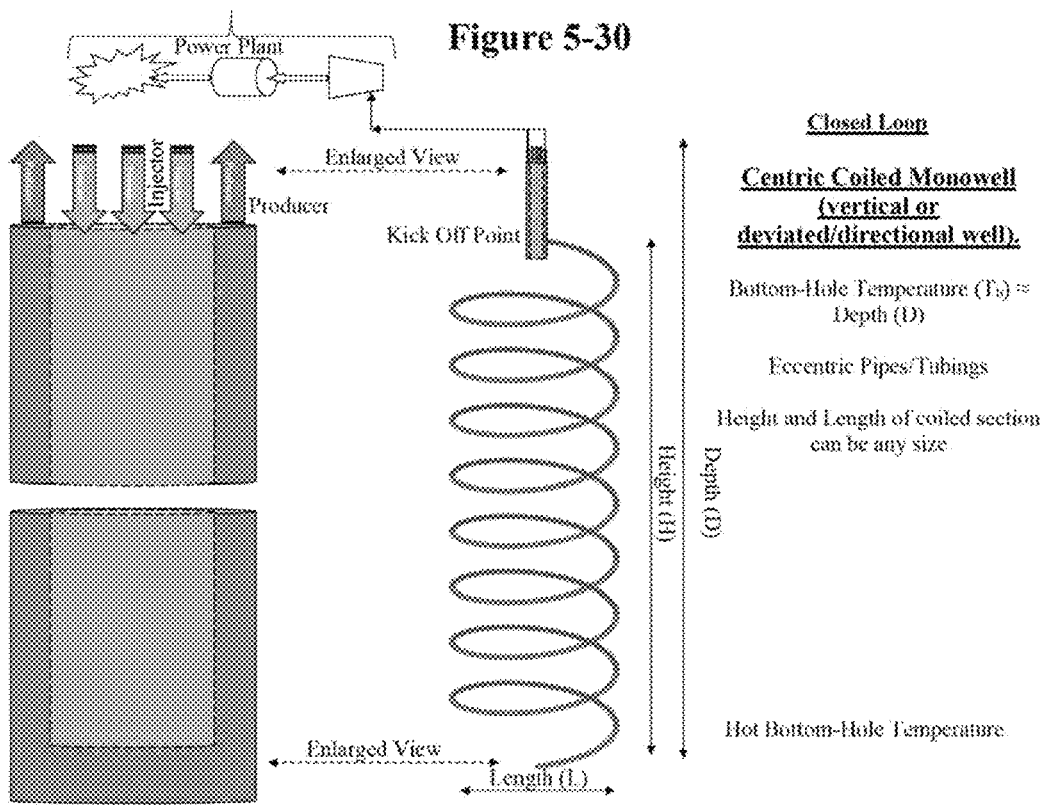
Figures 5, 6, 7, 8, 9, 10, 11, 12, 13, 14, 15, 16, 17, 18, 19, 20, 21, 22, 23, 24, 25, 26, 27, 28, 29, 30, 31:
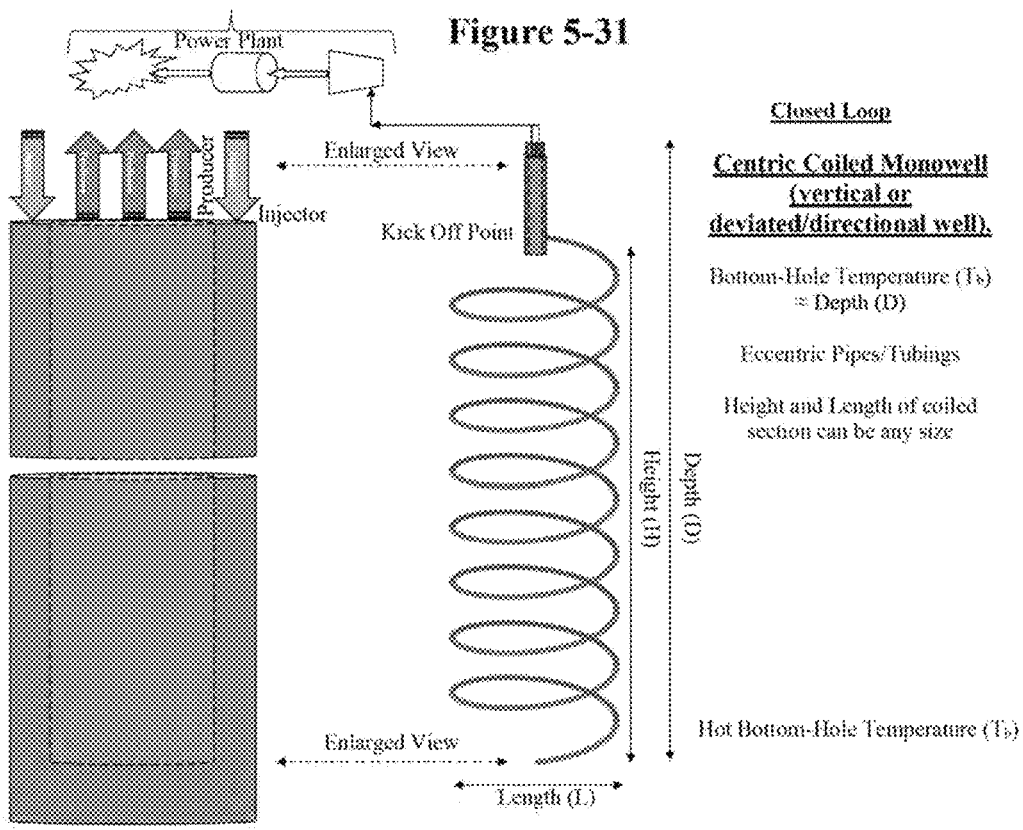
Figures 5, 6, 7, 8, 9, 10, 11, 12, 13, 14, 15, 16, 17, 18, 19, 20, 21, 22, 23, 24, 25, 26, 27, 28, 29, 30, 31, 32:
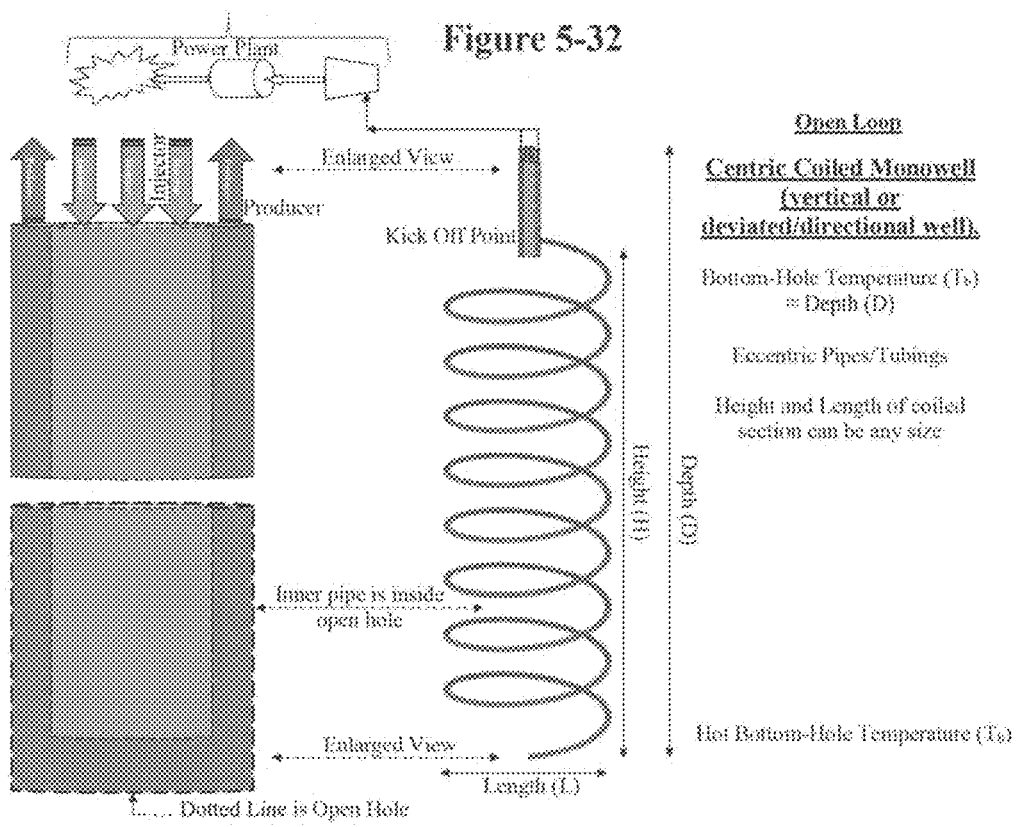
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33:
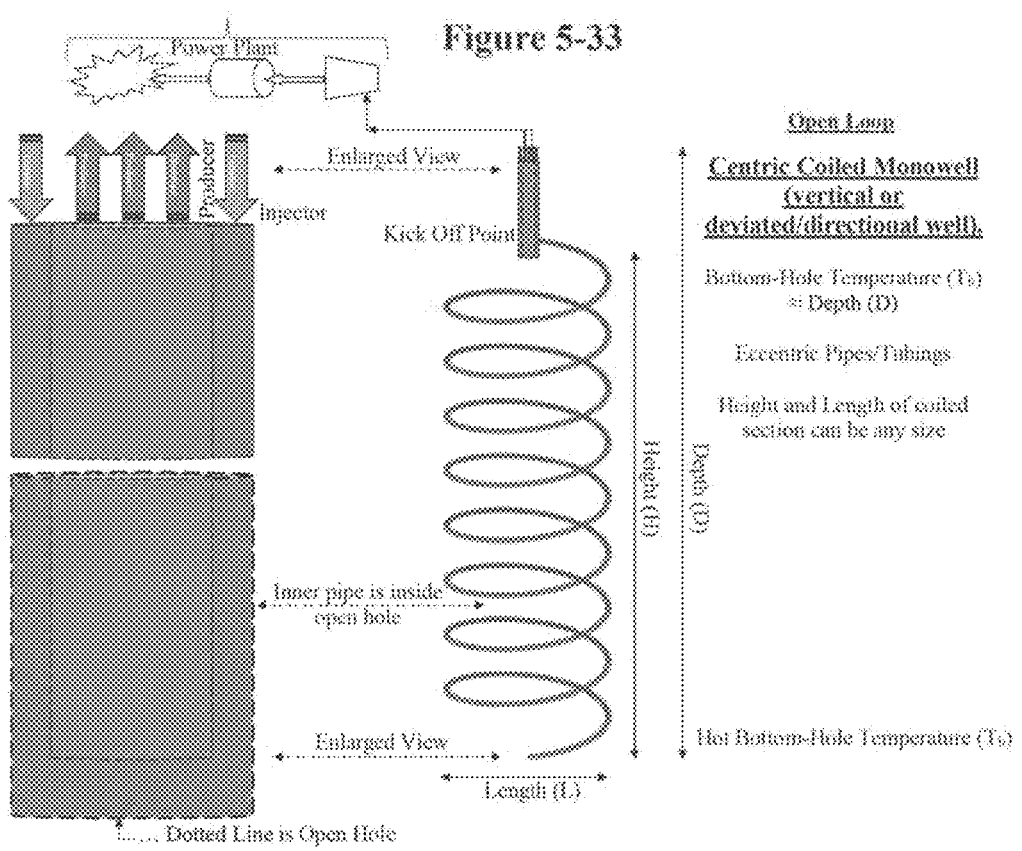
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34:
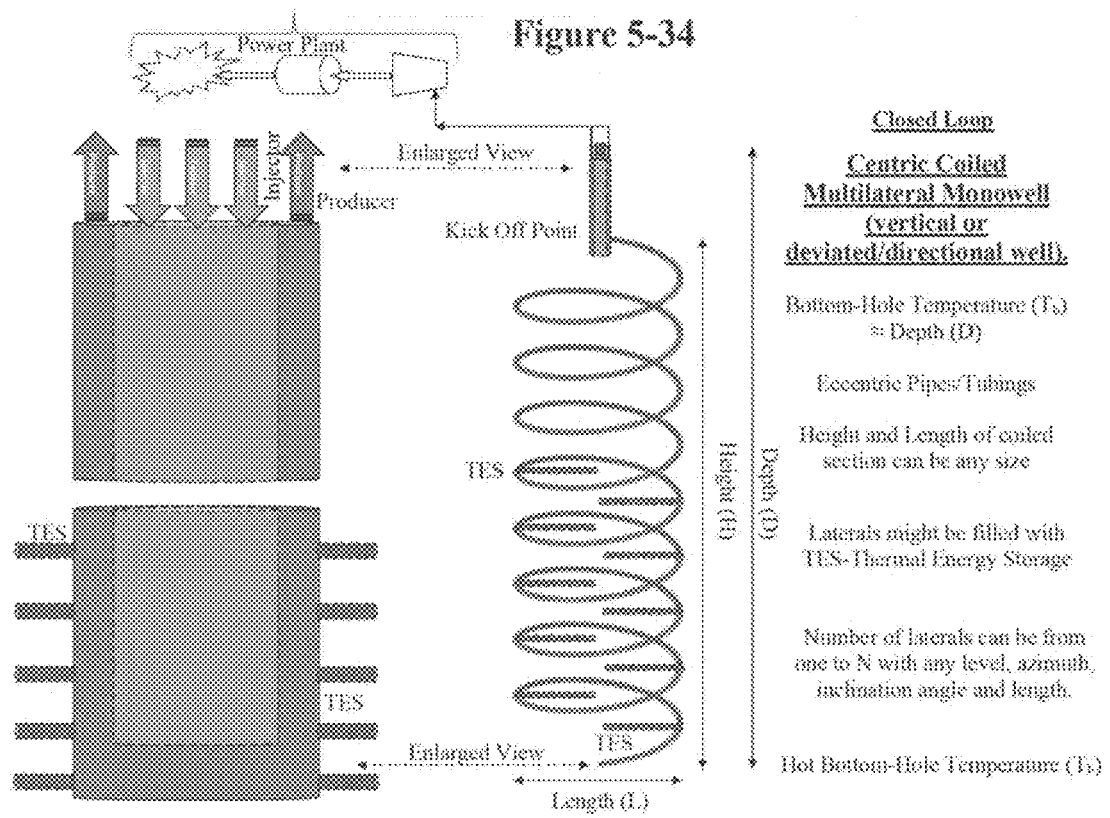
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35:
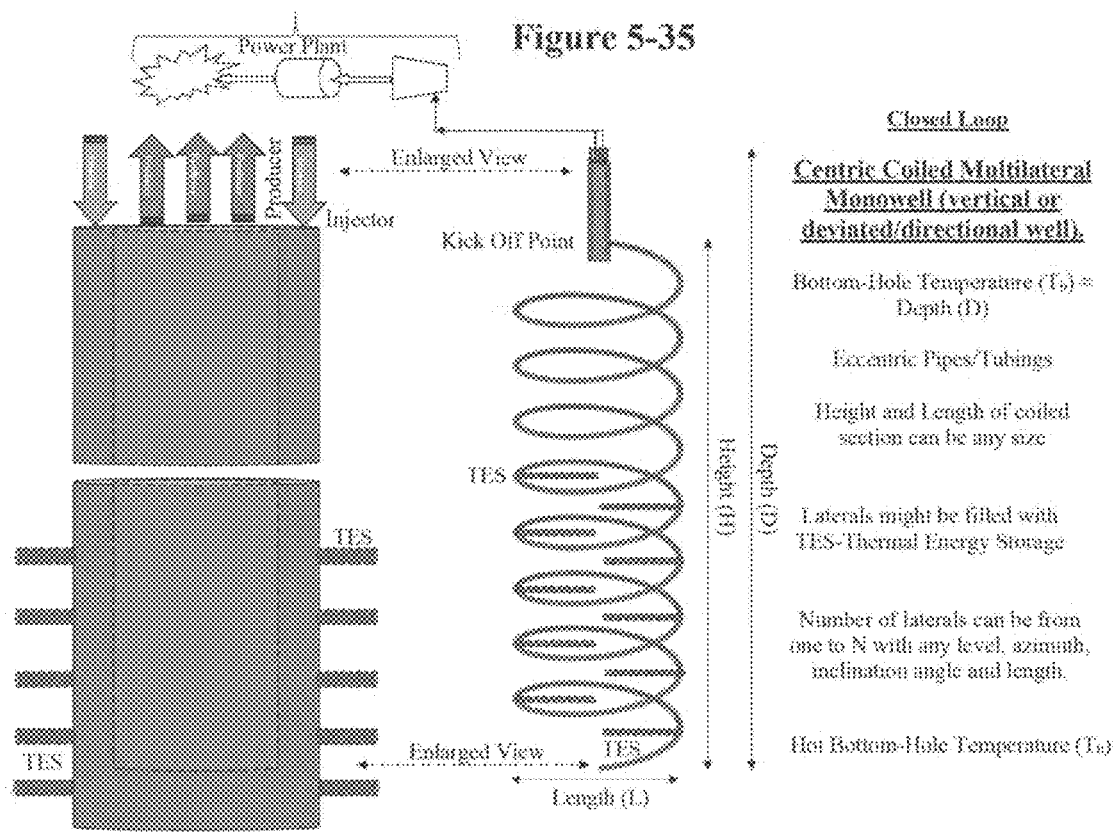
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36:
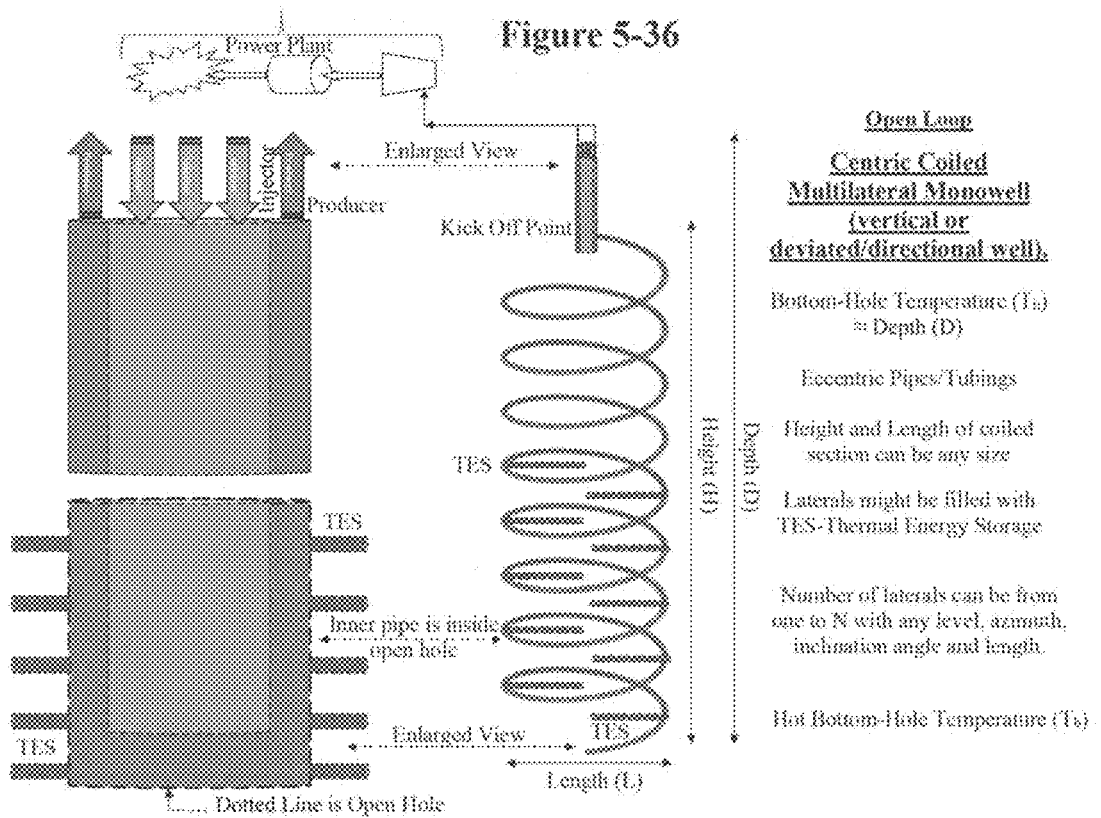
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37:
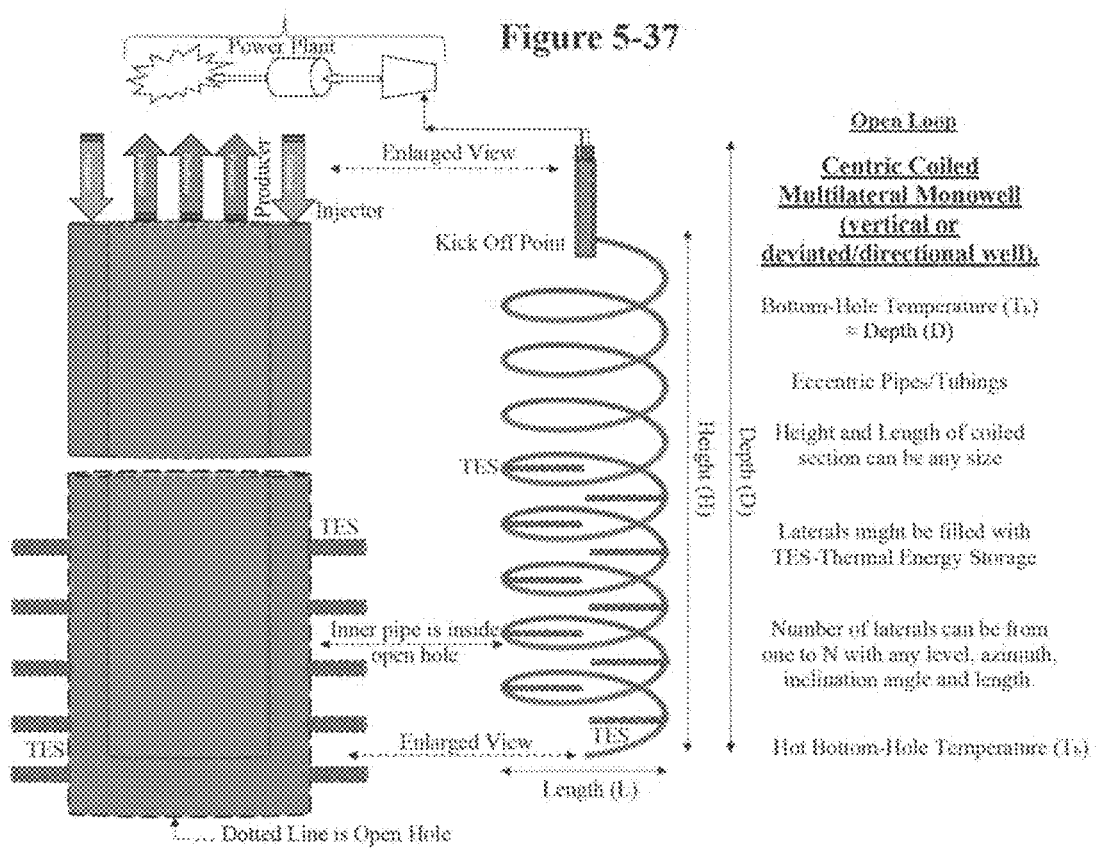
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38:
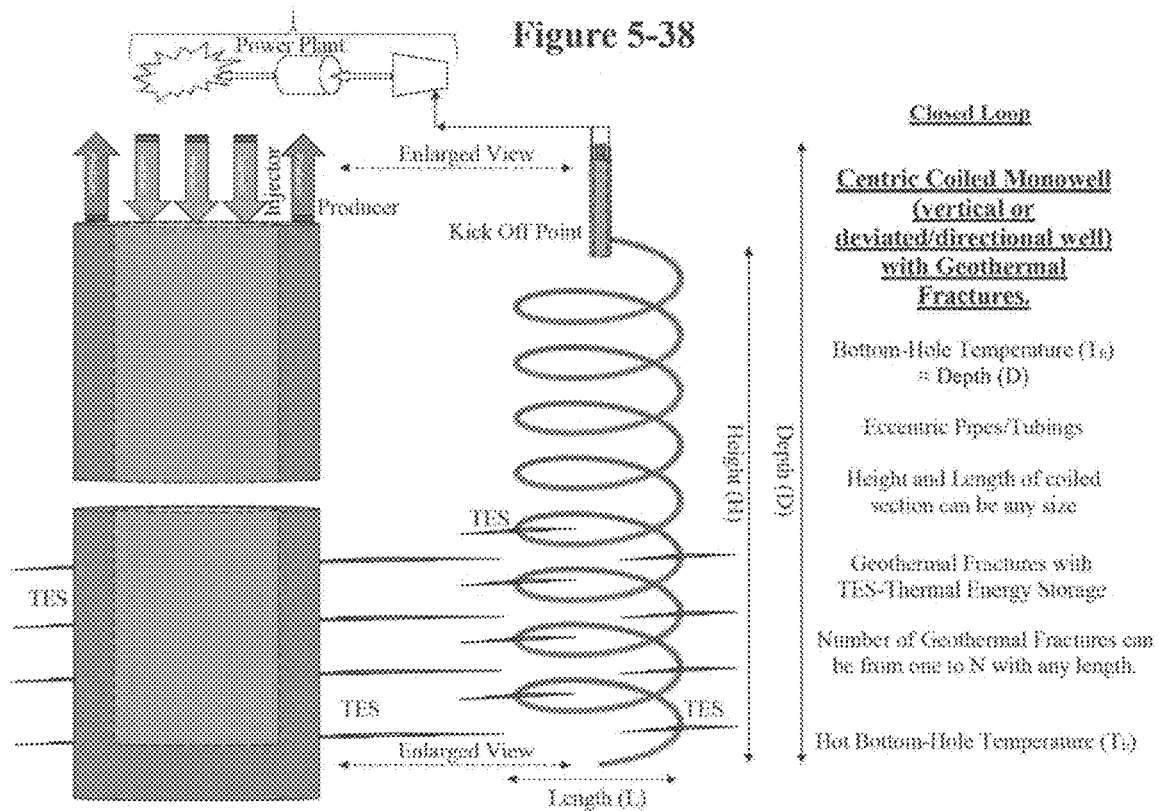
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39:
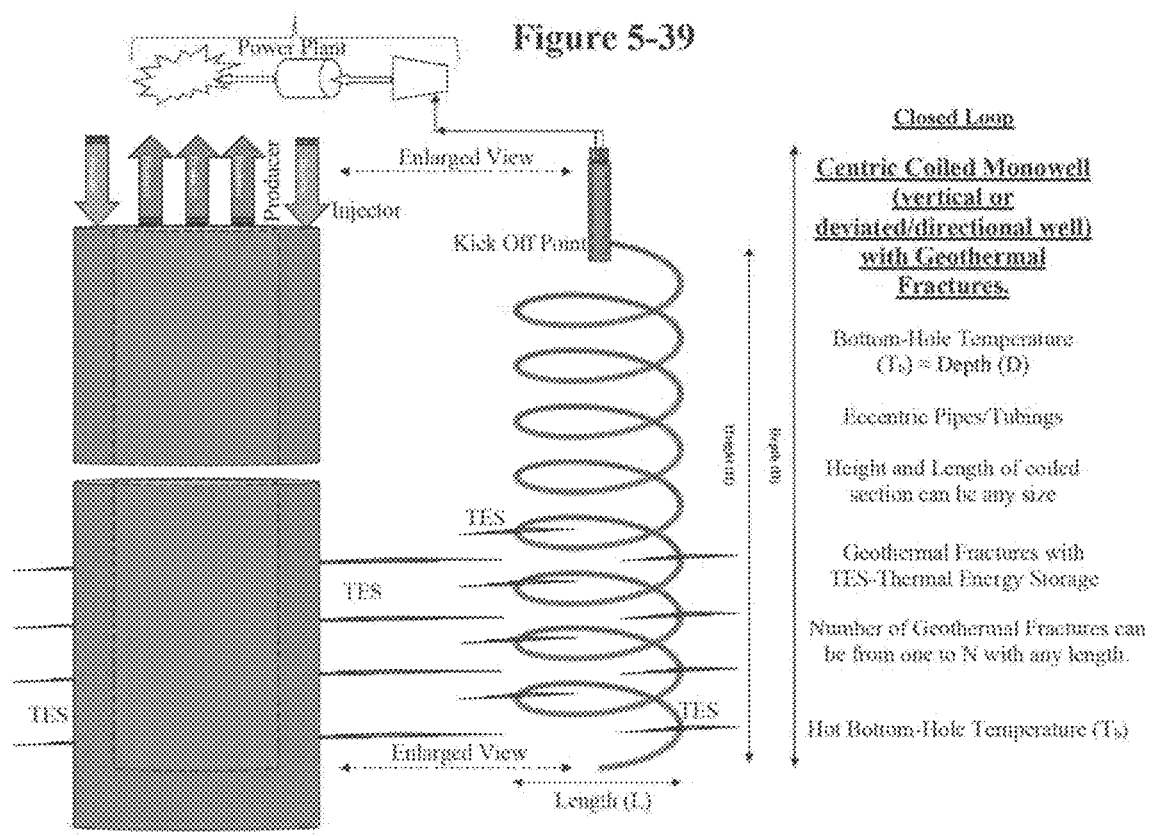
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40:
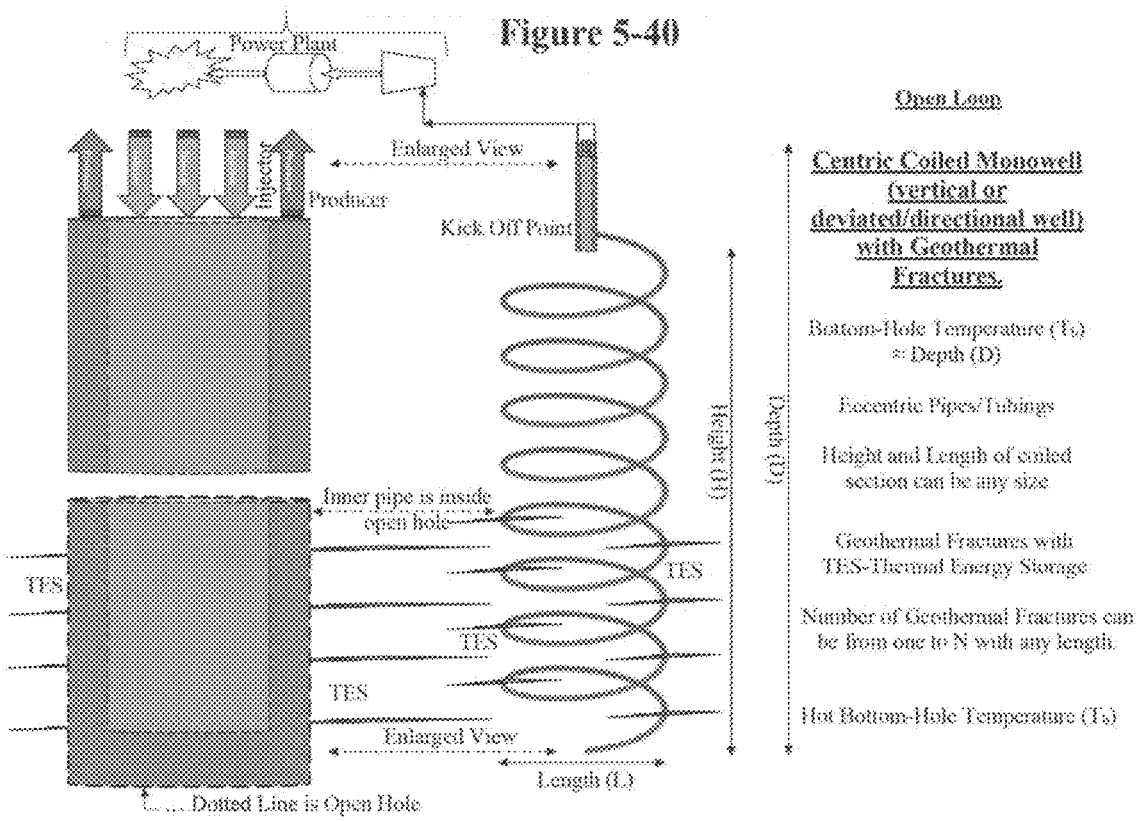
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41:
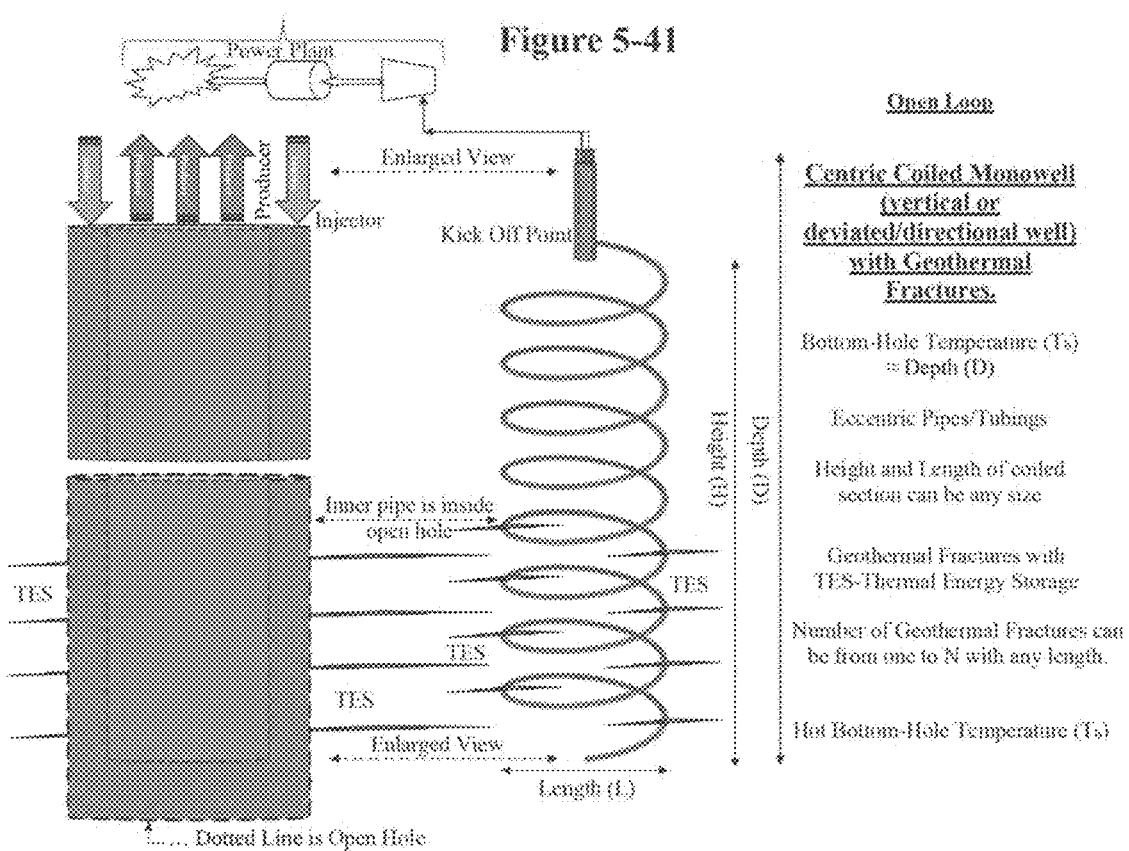
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42:
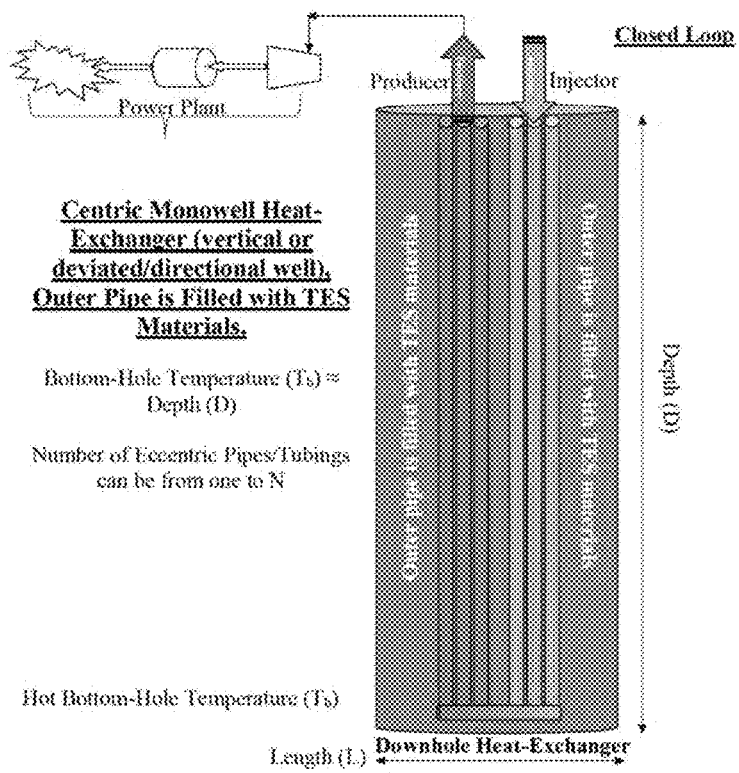
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43:
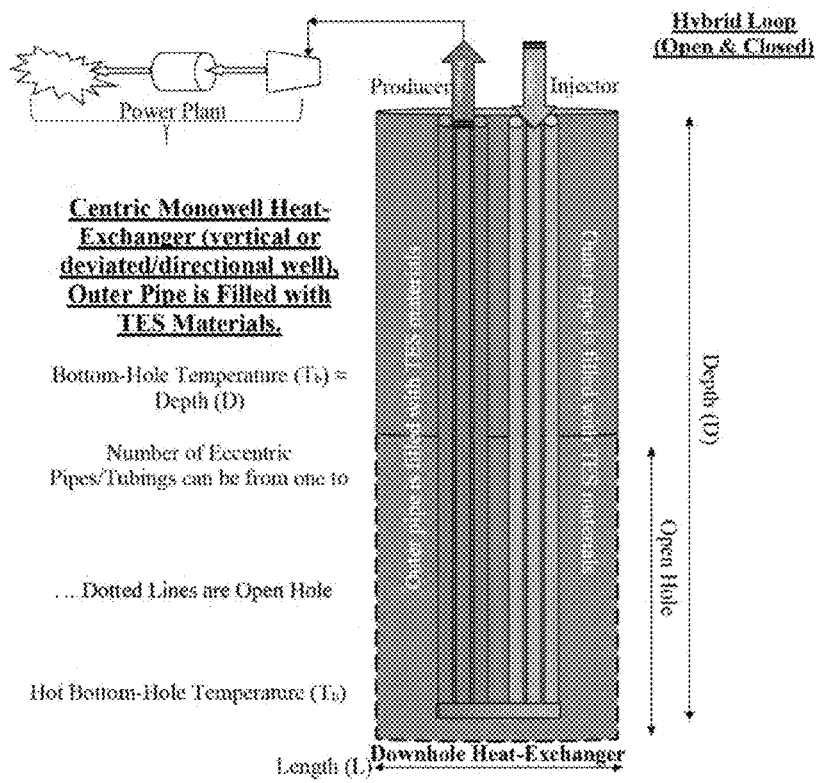
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44:
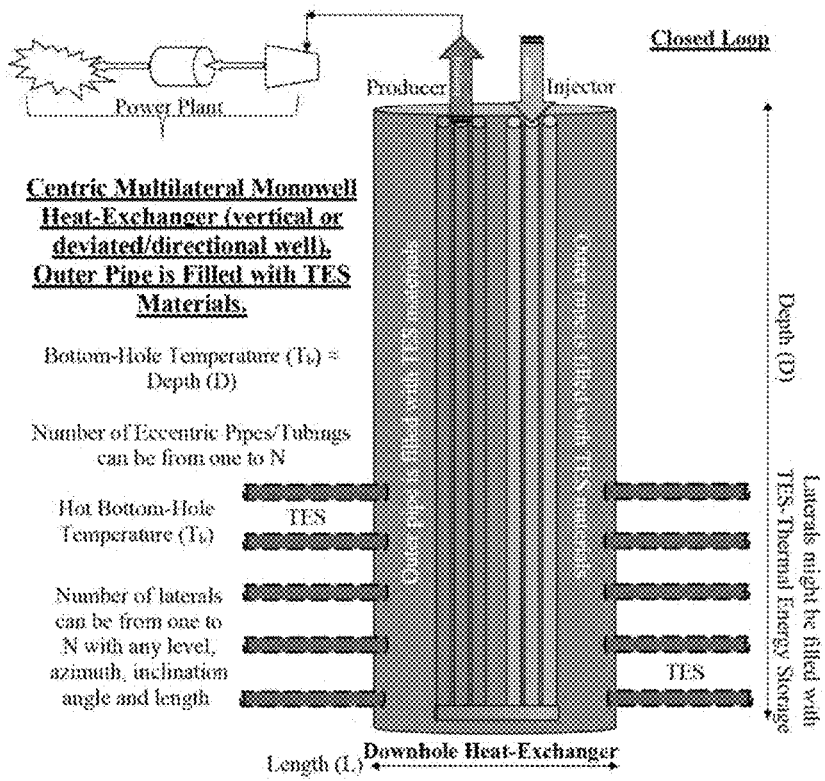
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45:
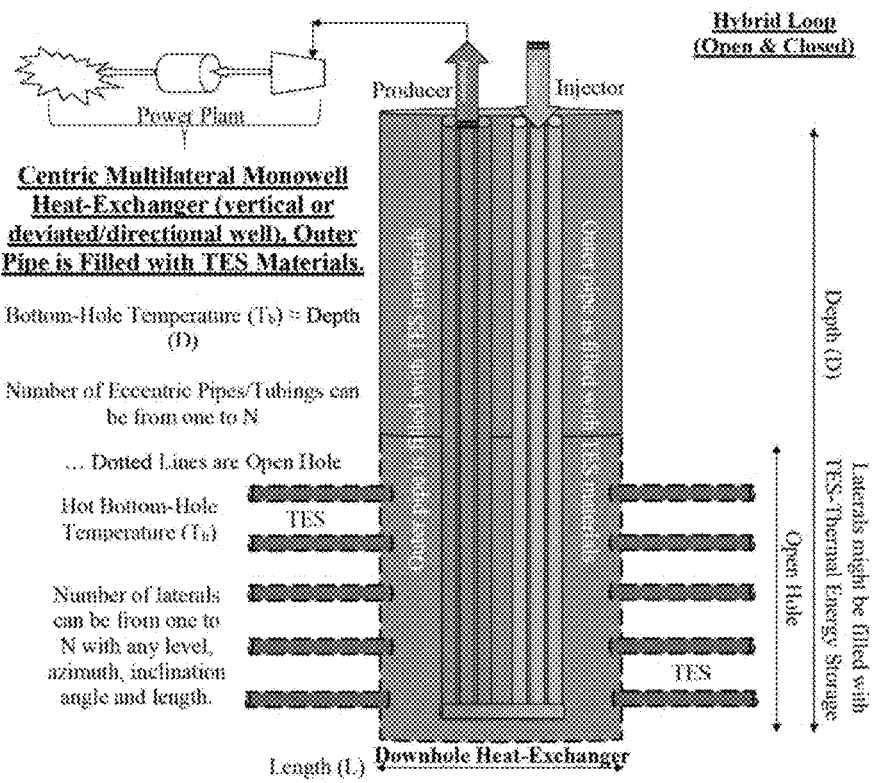
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46:
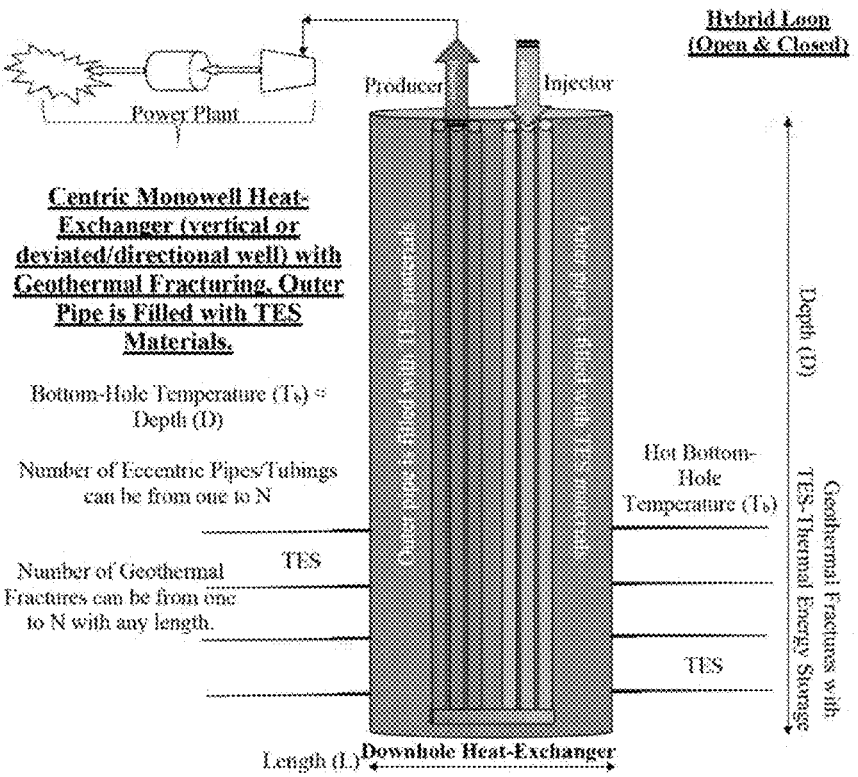
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47:
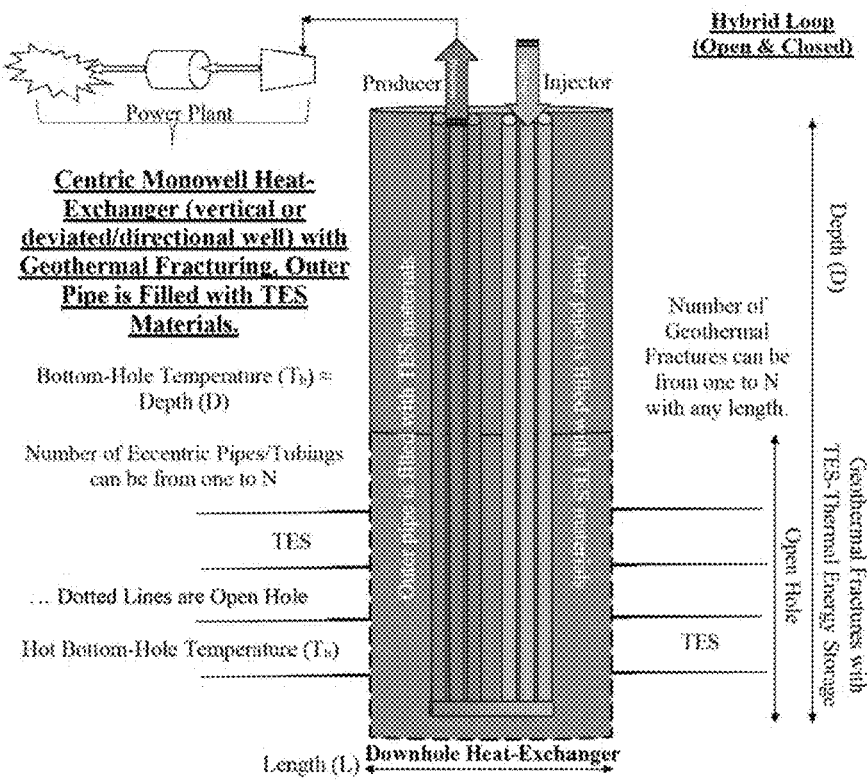
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48:
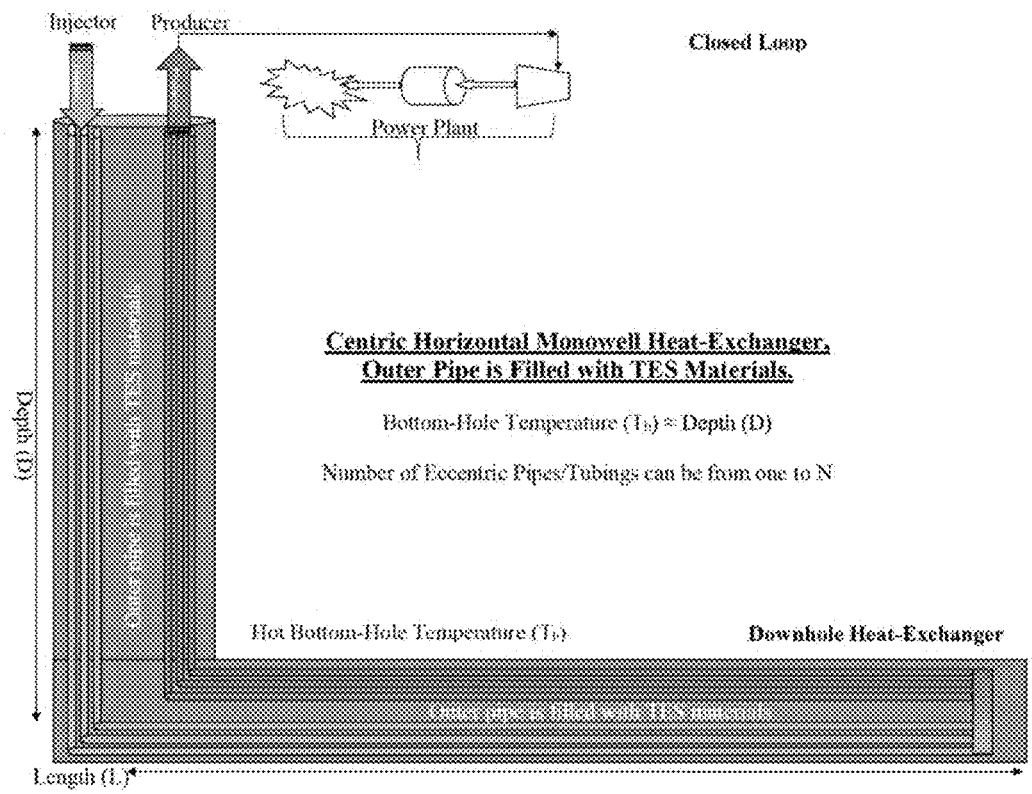
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49:
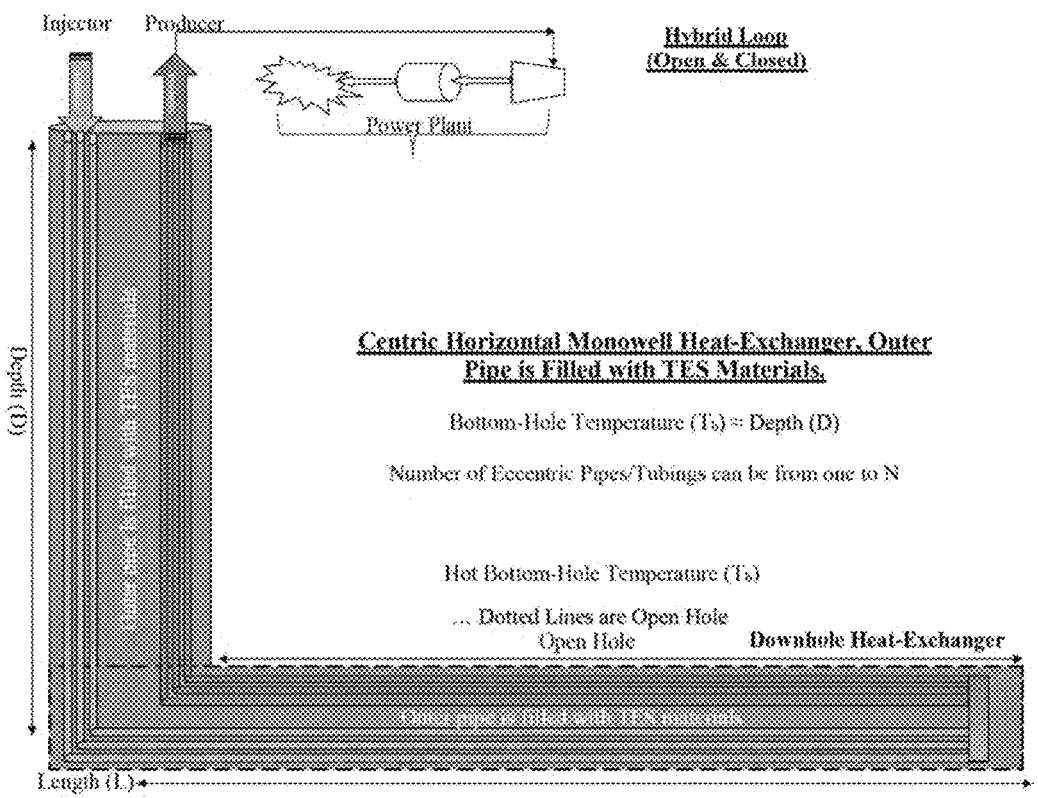
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50:
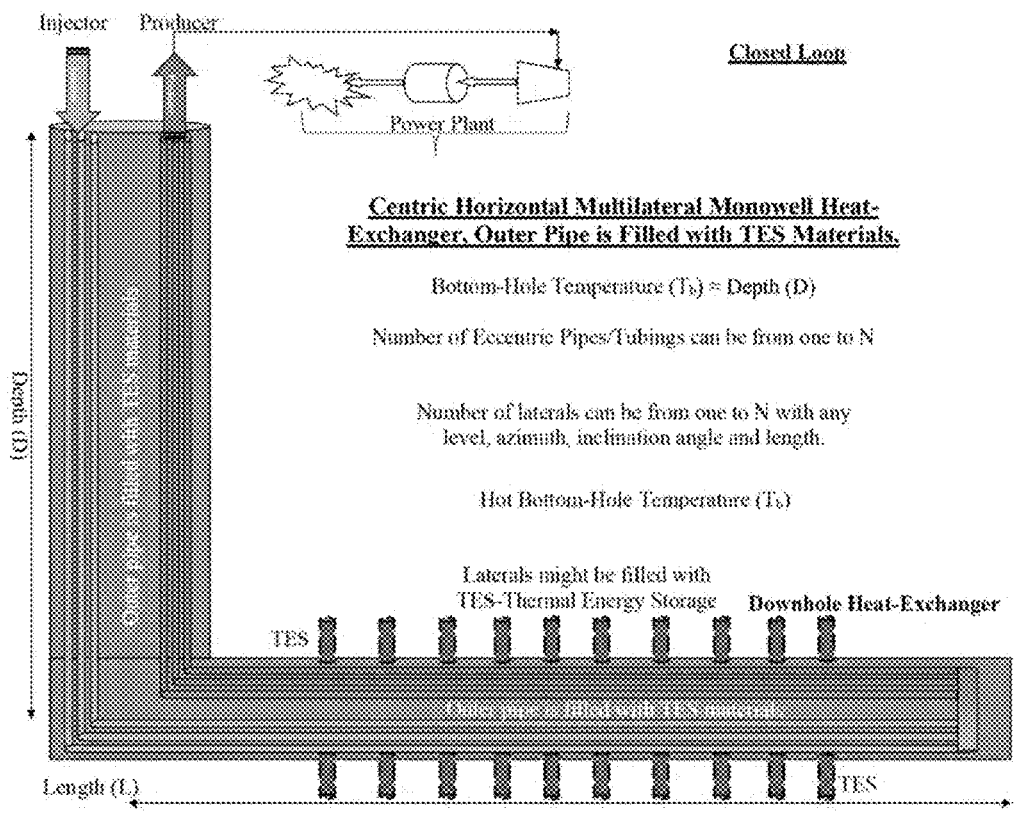
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51:
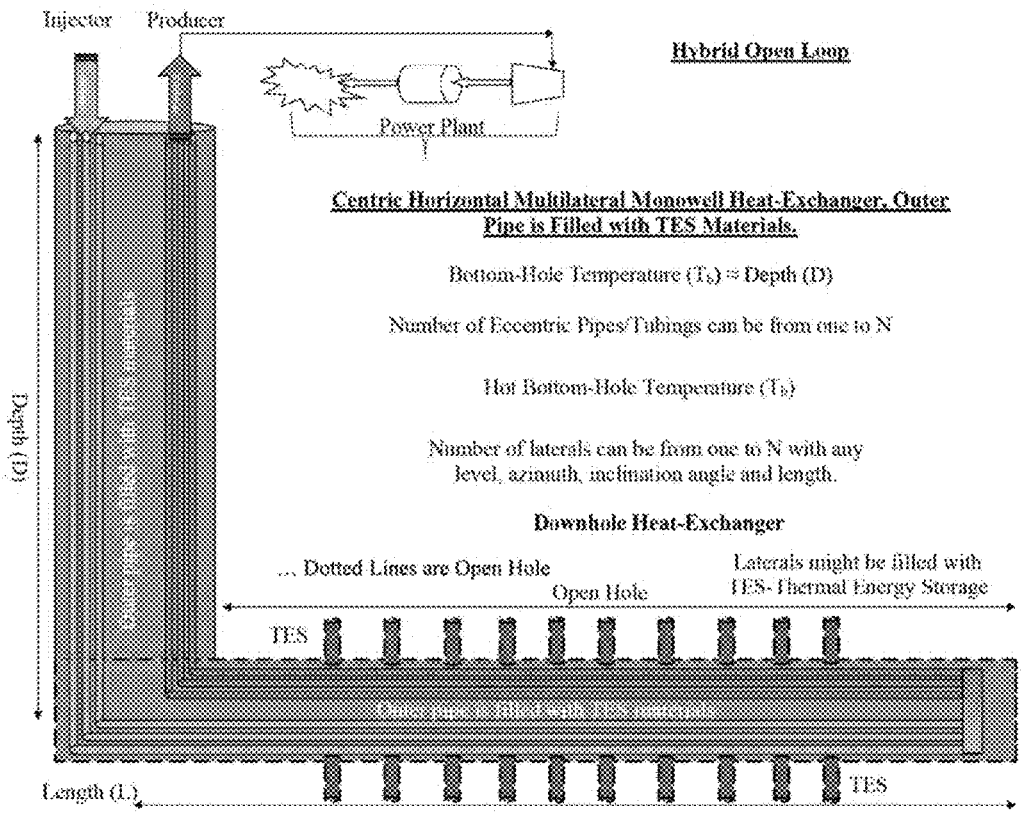
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52:
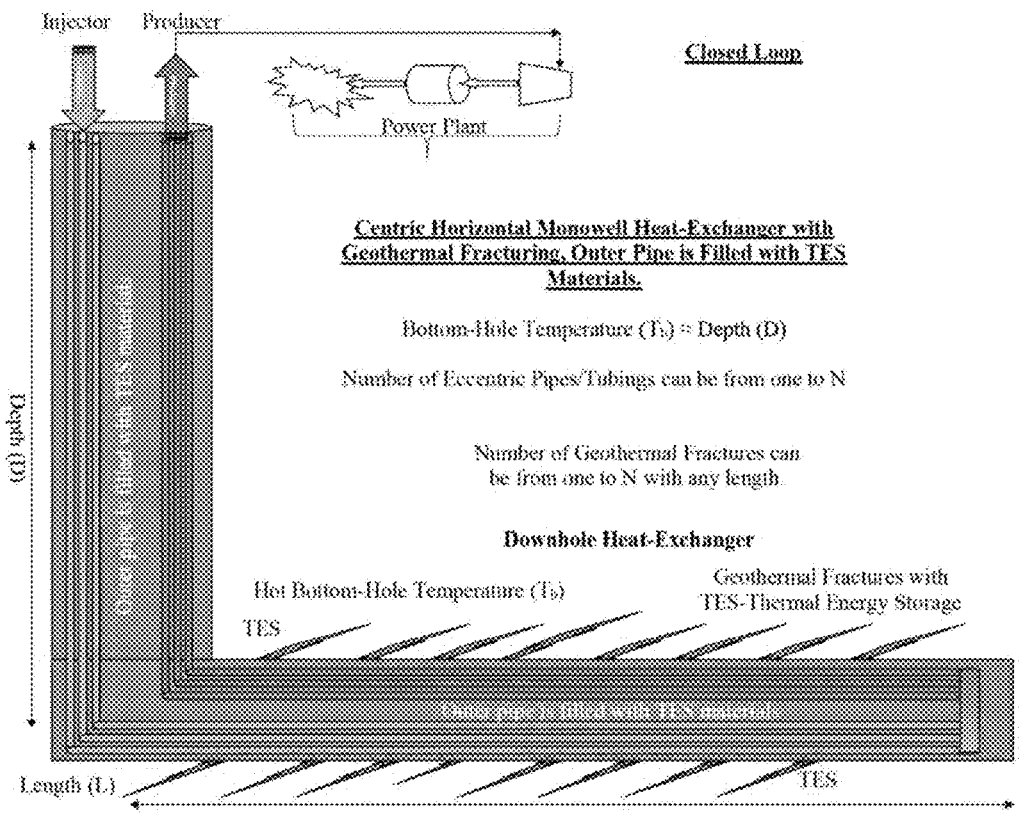
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53:
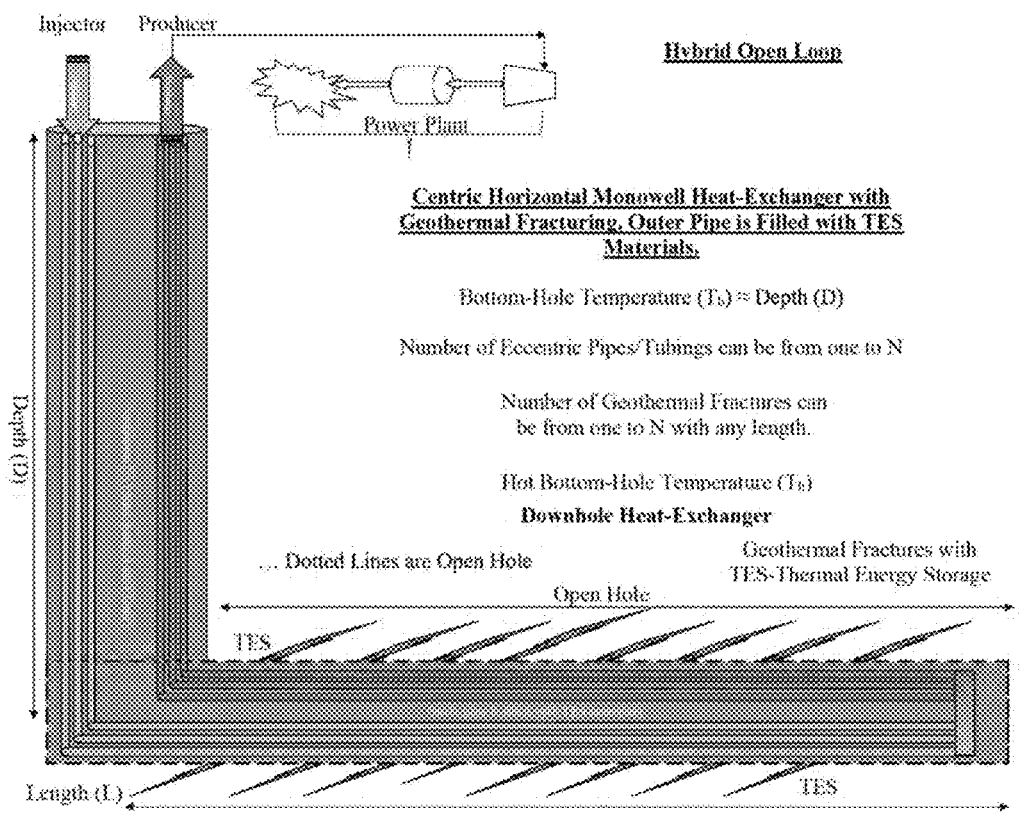
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54:
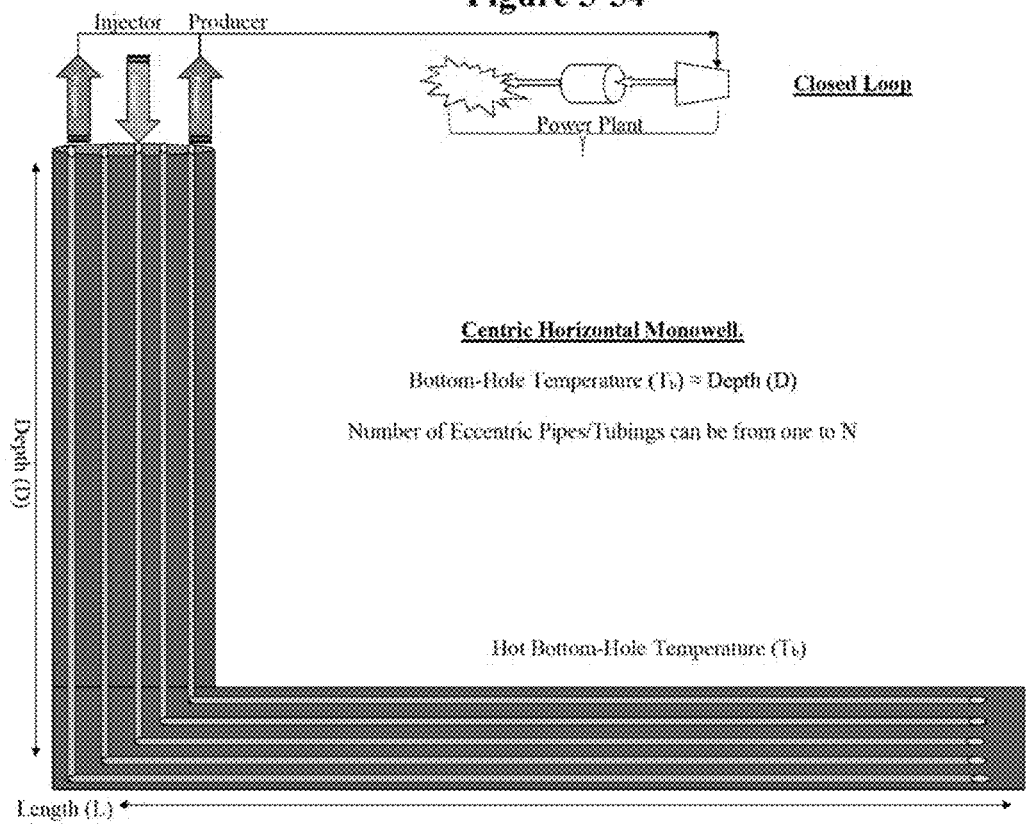
Figures 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55:
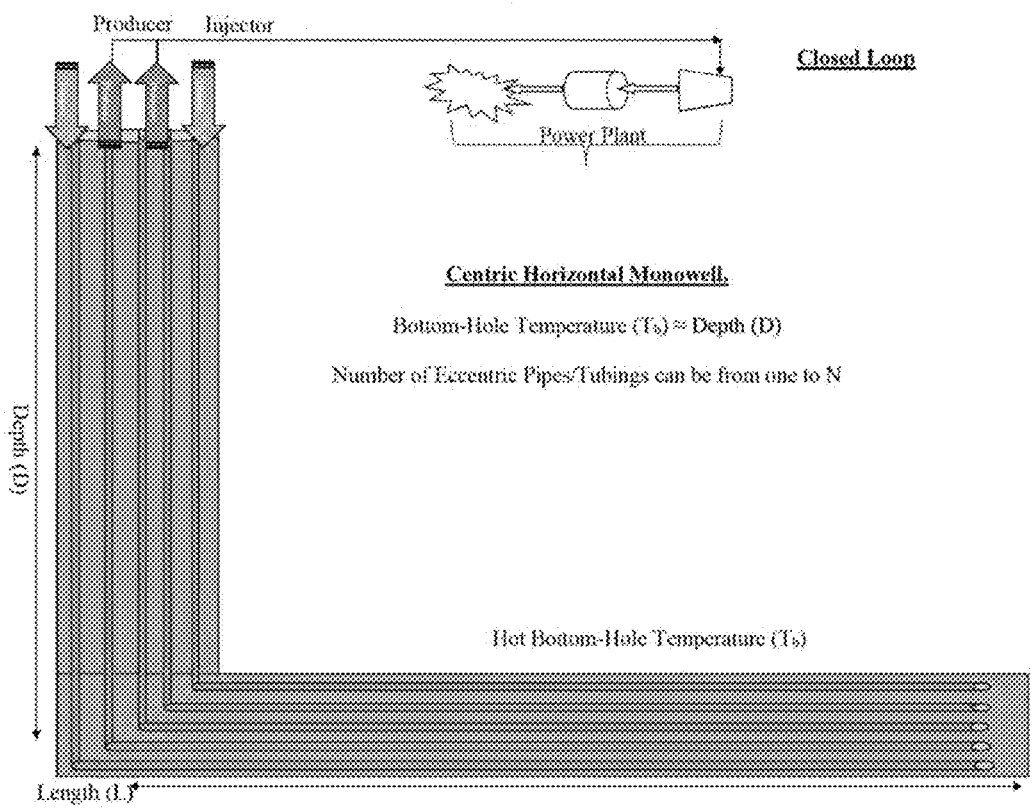
Figures 5, 56:
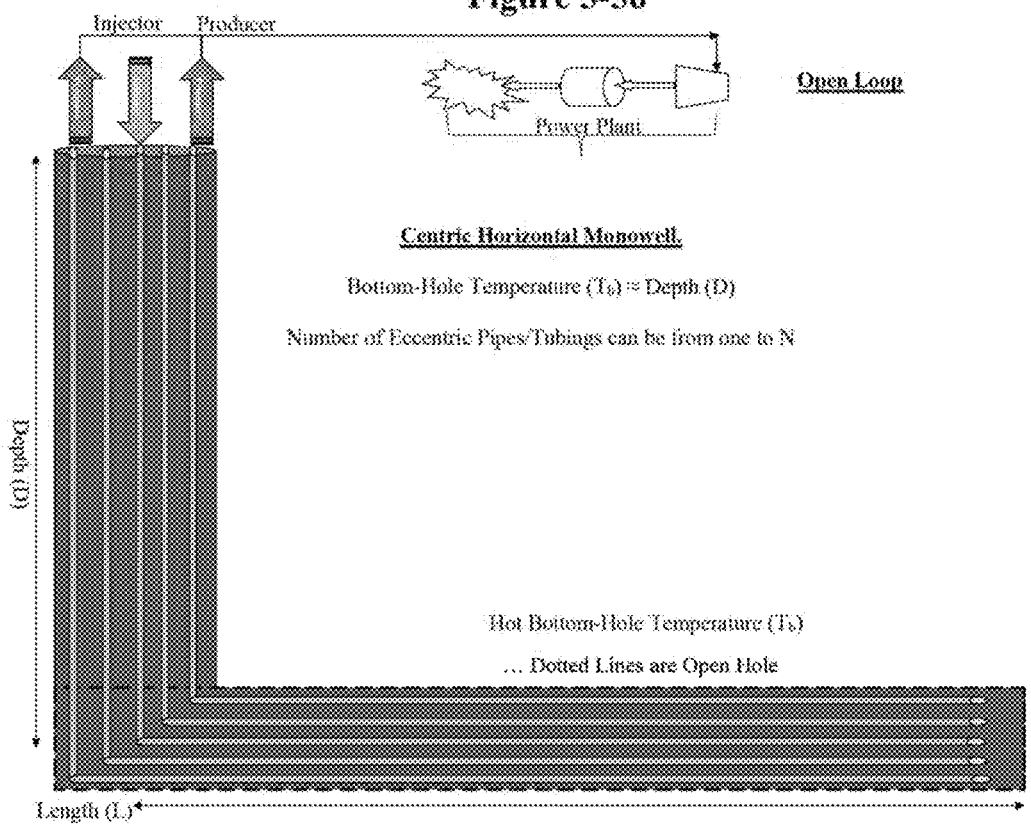
Figures 5, 57:
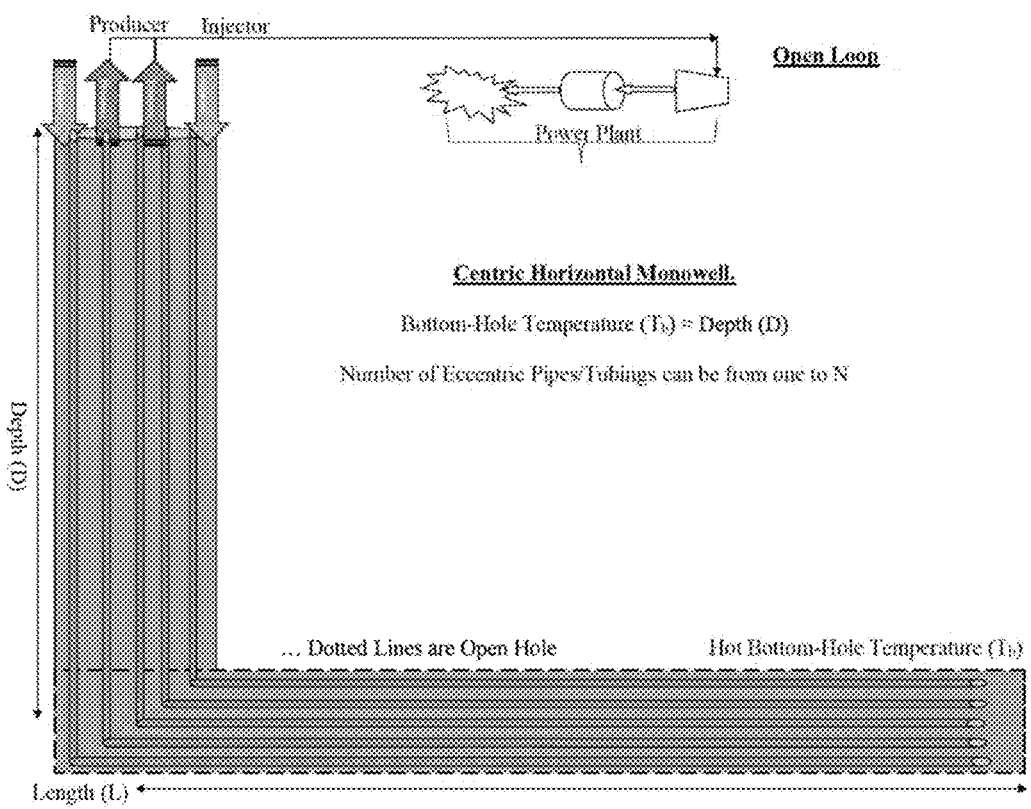
Figures 5, 58:
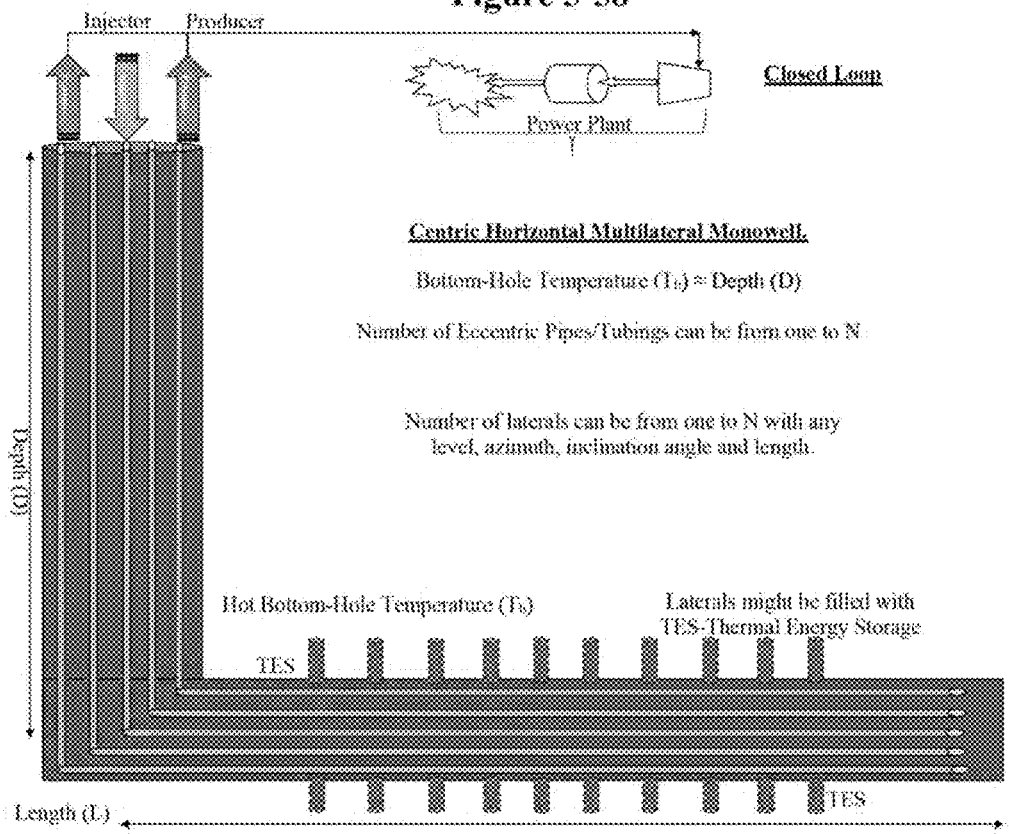
Figures 5, 59:
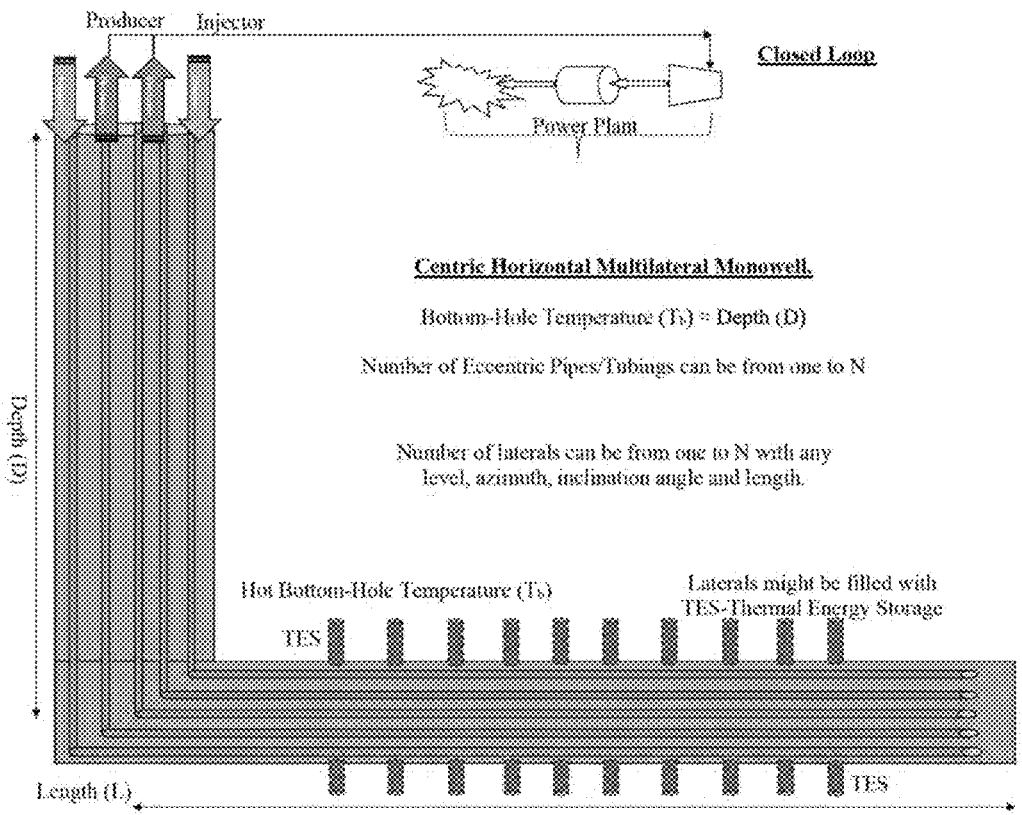
Figures 5, 60:
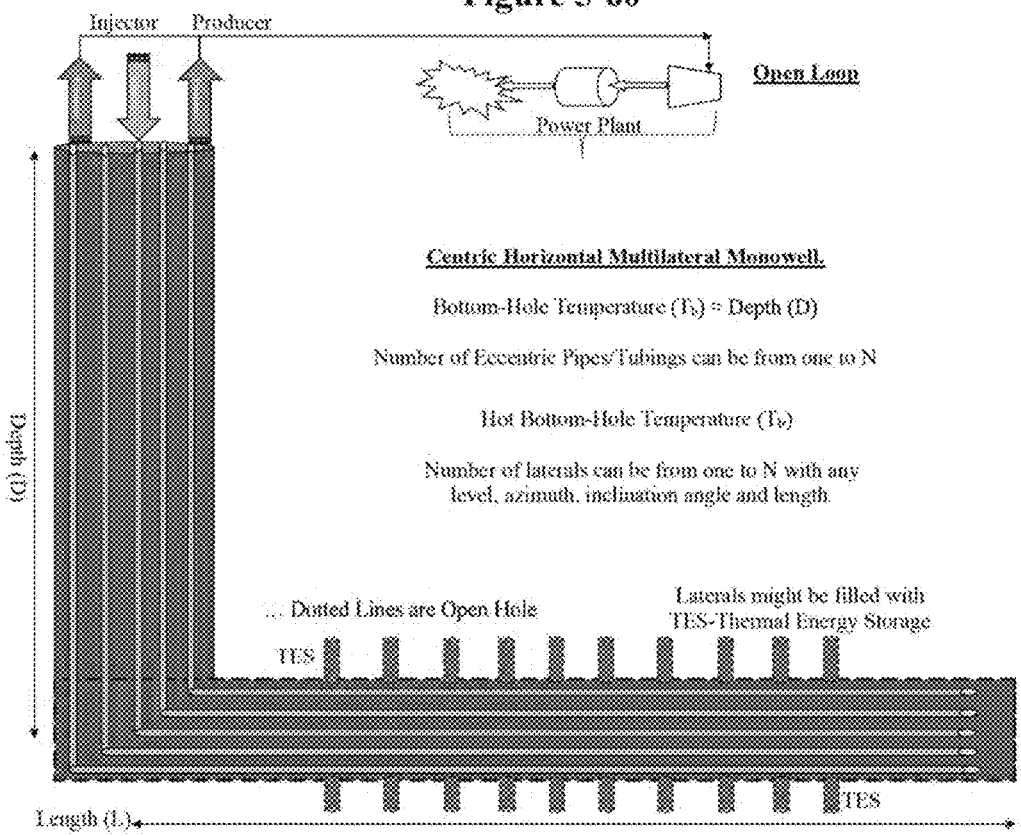
Figures 5, 61:
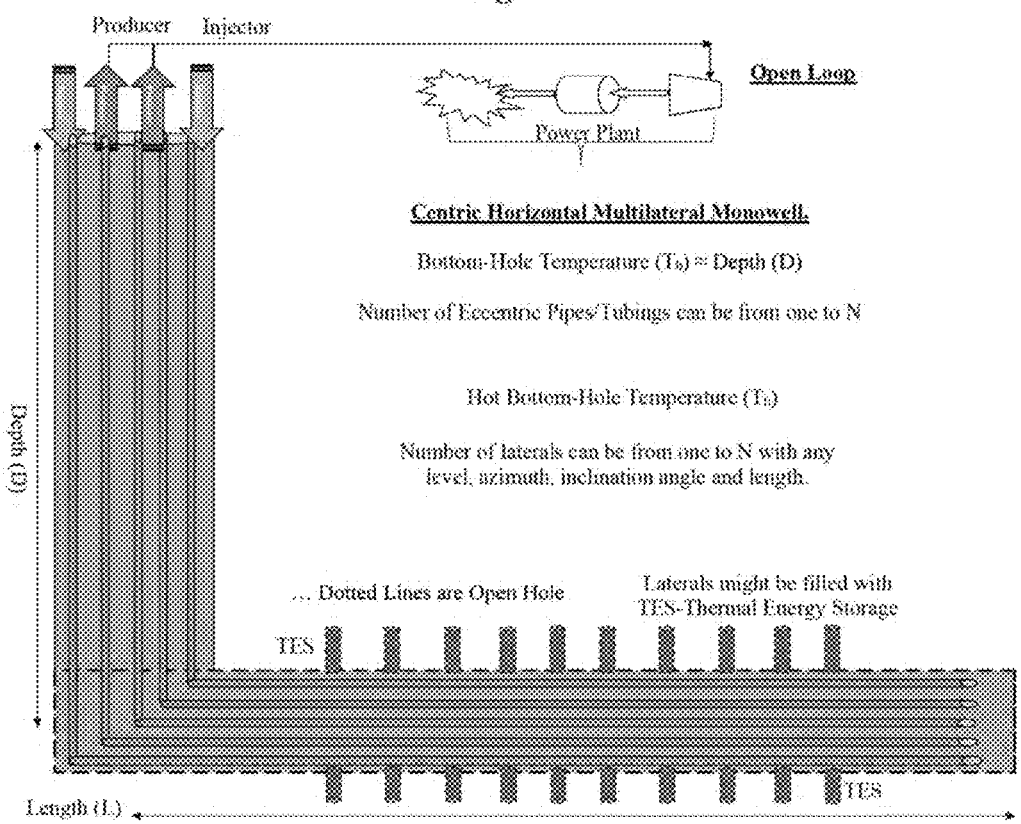
Figures 5, 62:
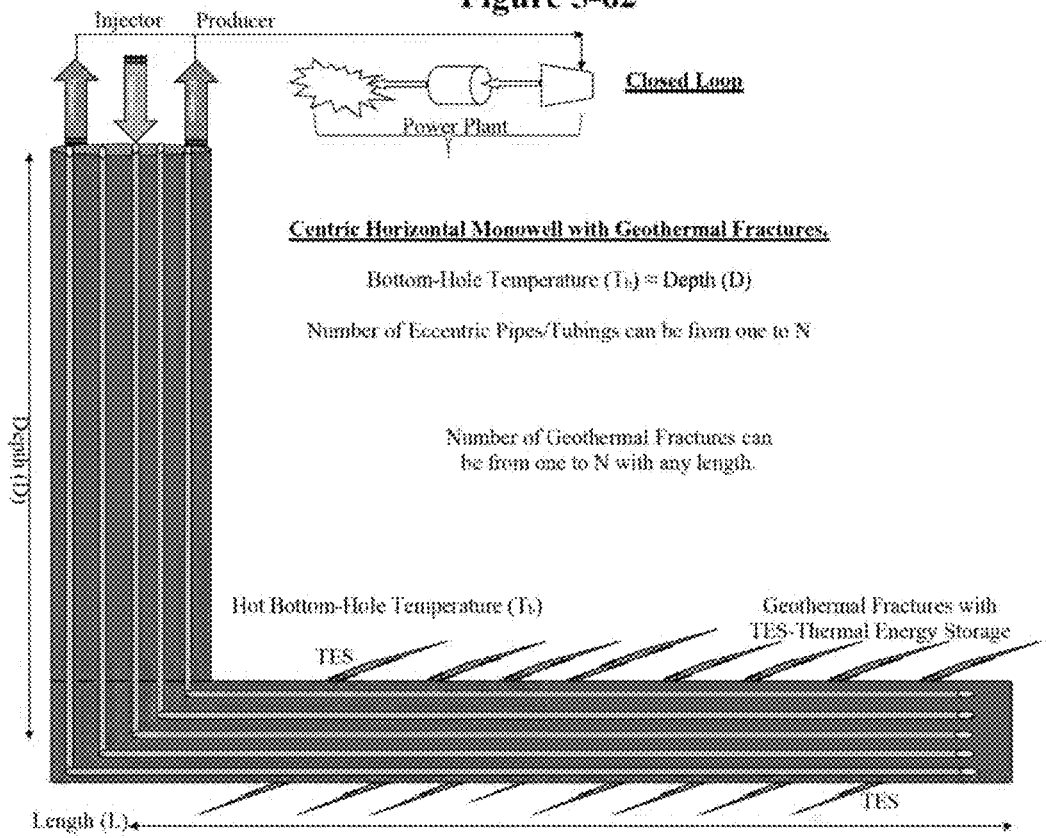
Figures 5, 63:
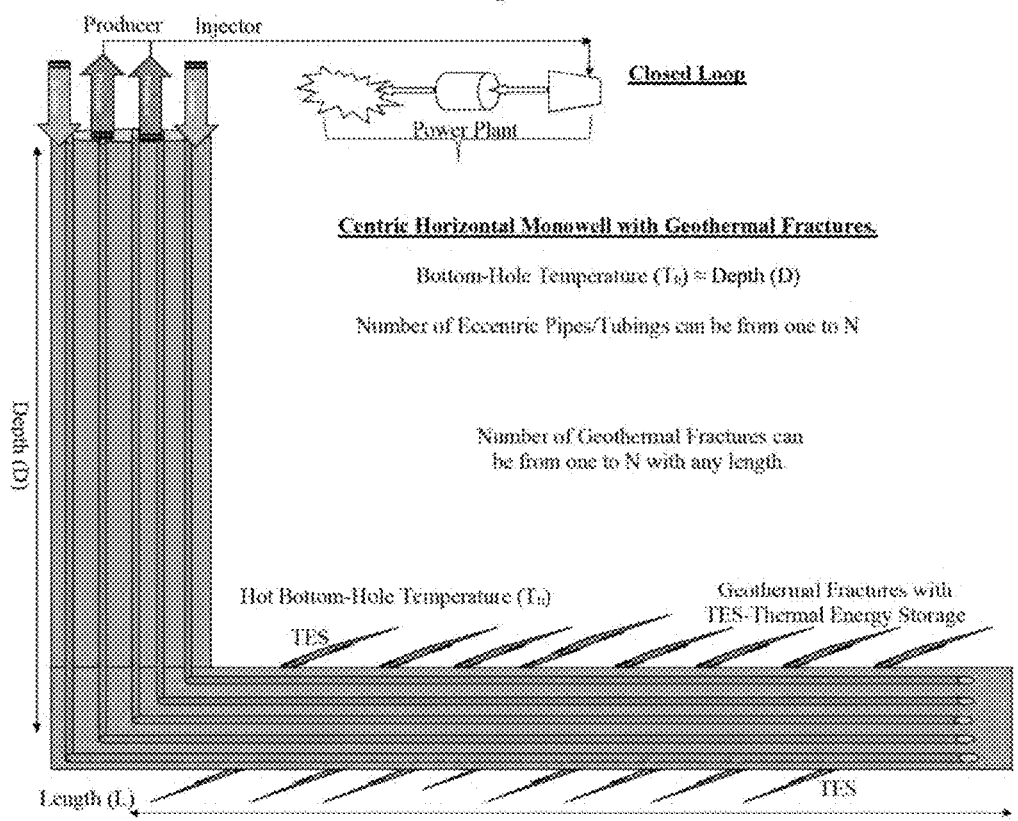
Figures 5, 64:
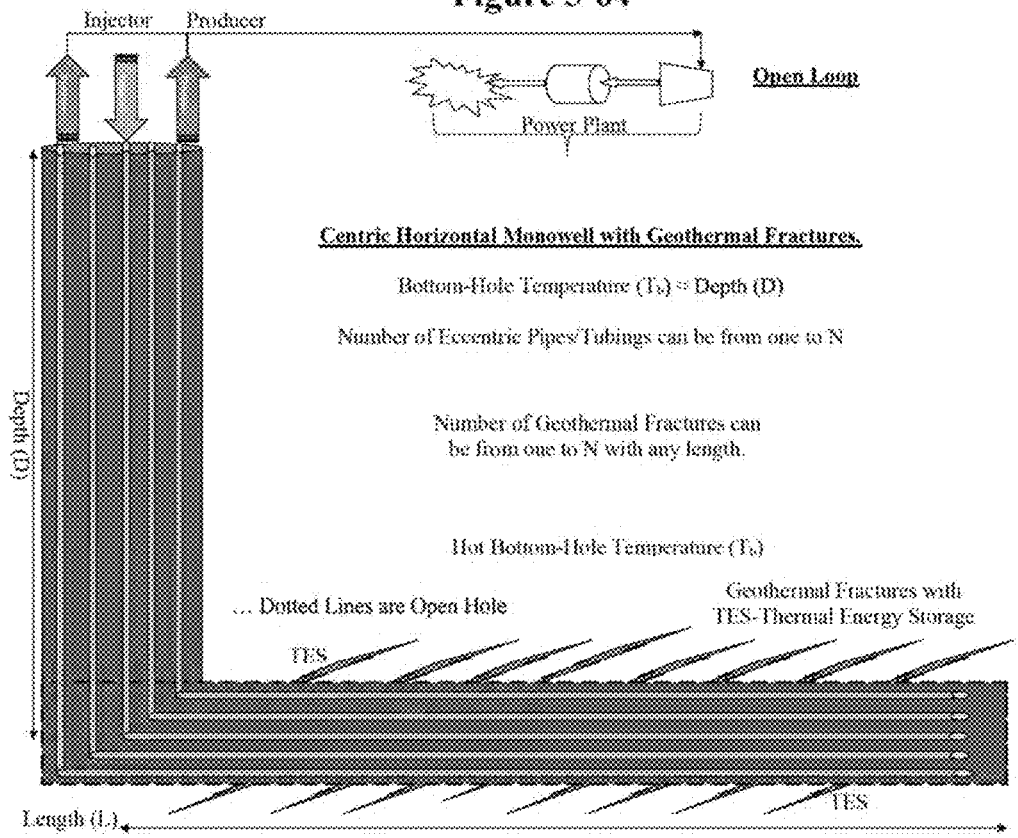
Figures 5, 65:
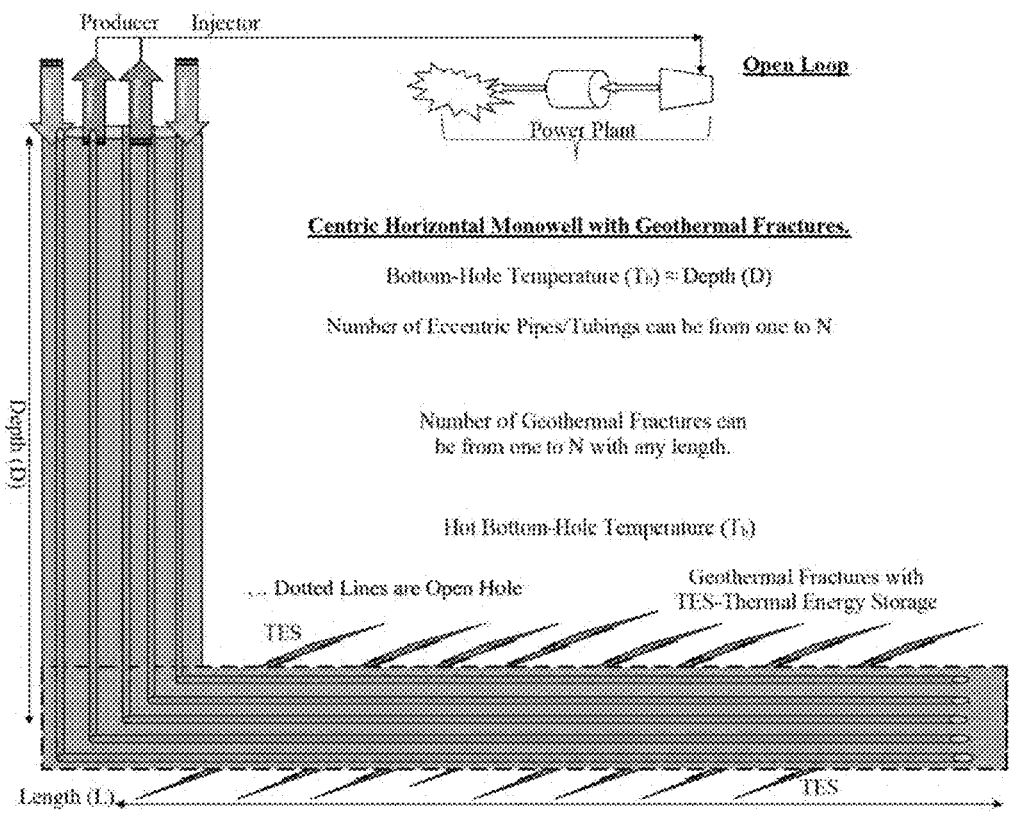
Figures 5, 66:
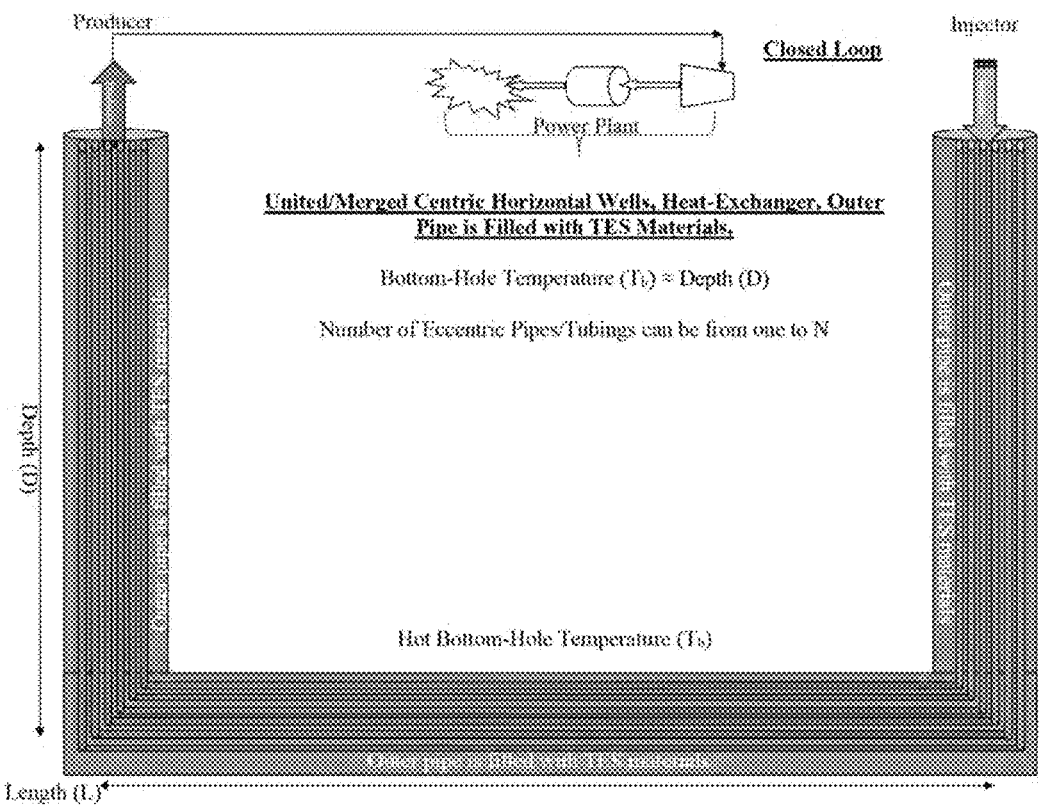
Figures 5, 67:
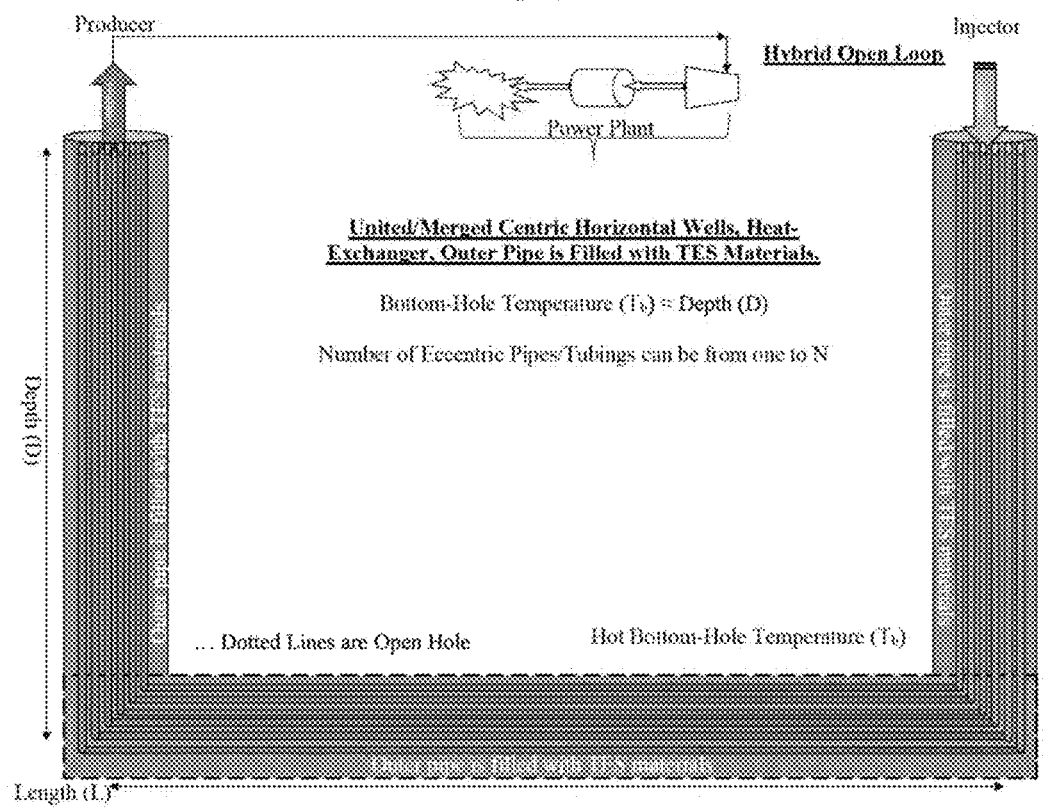
Figures 5, 68:
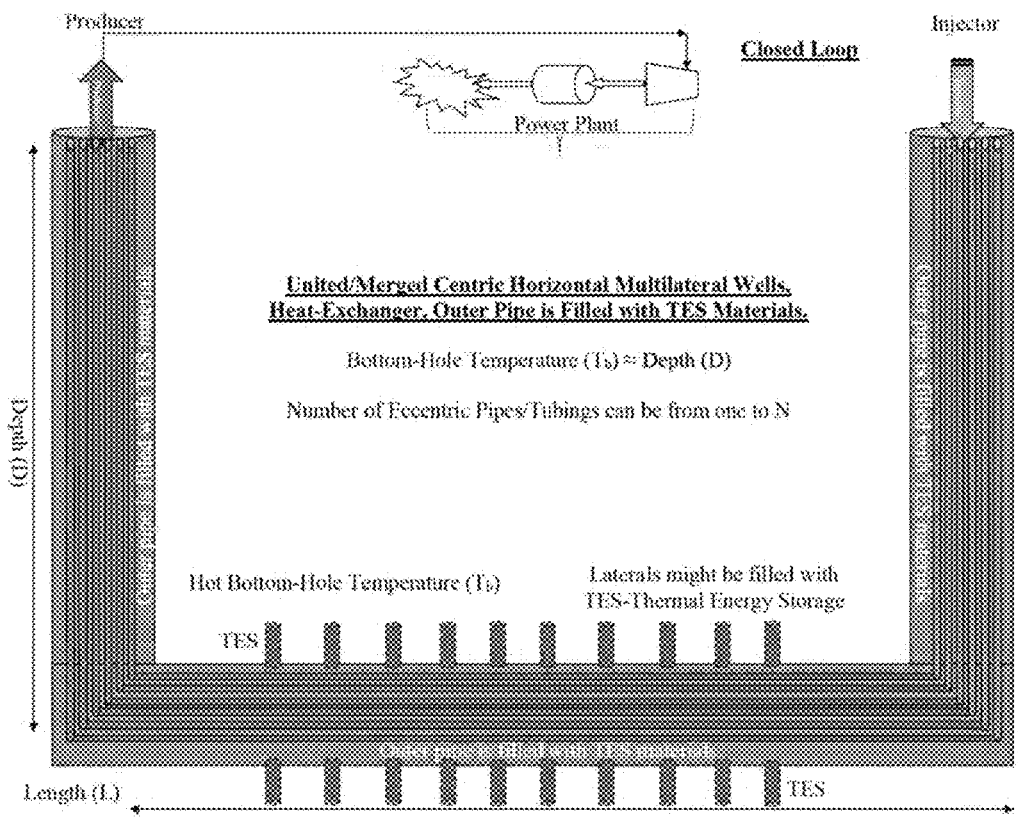
Figures 5, 69:
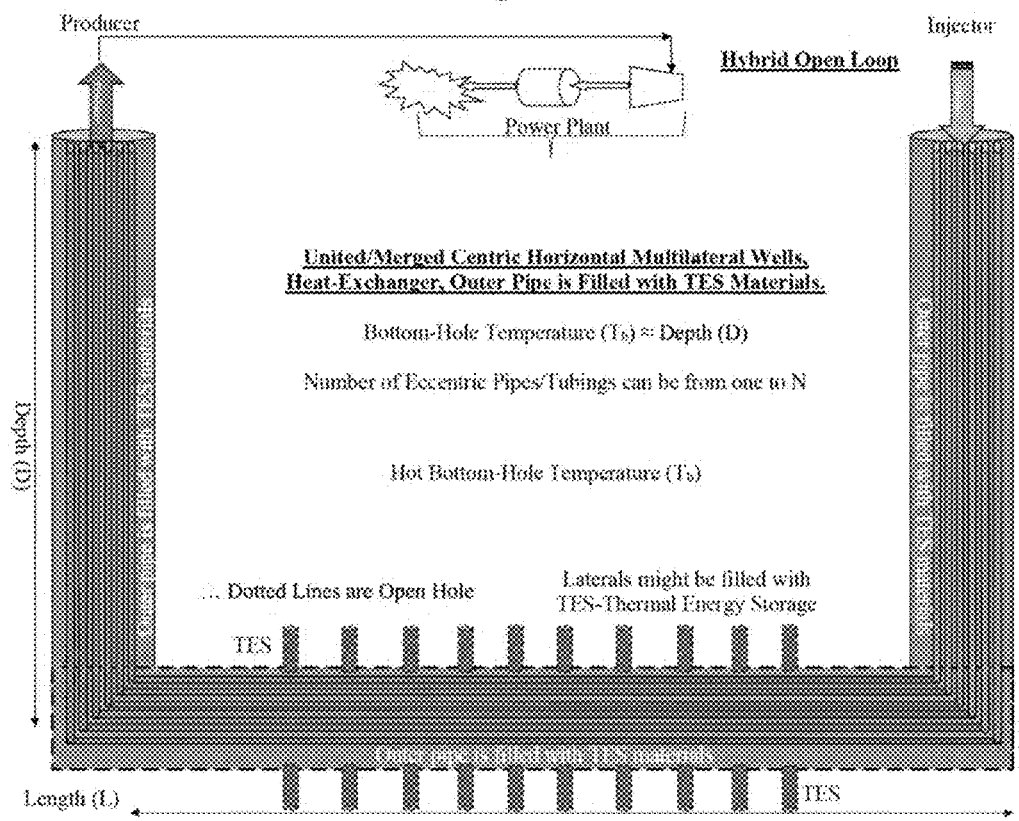
Figures 5, 70:
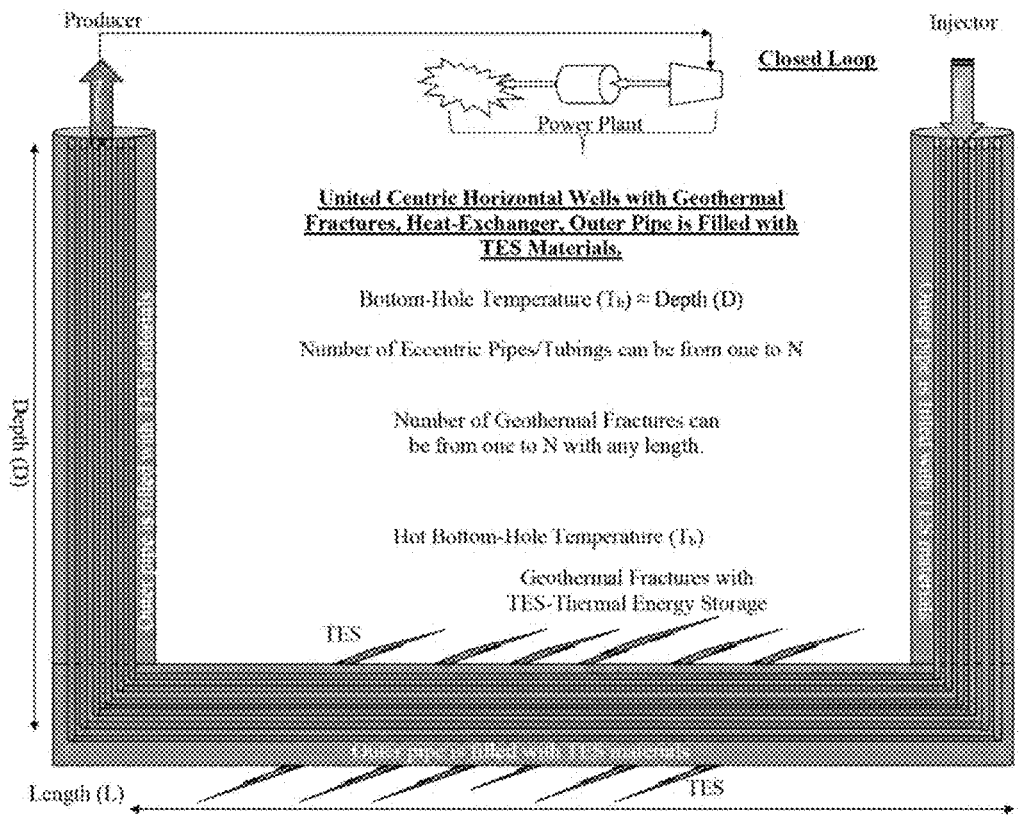
Figures 5, 71:
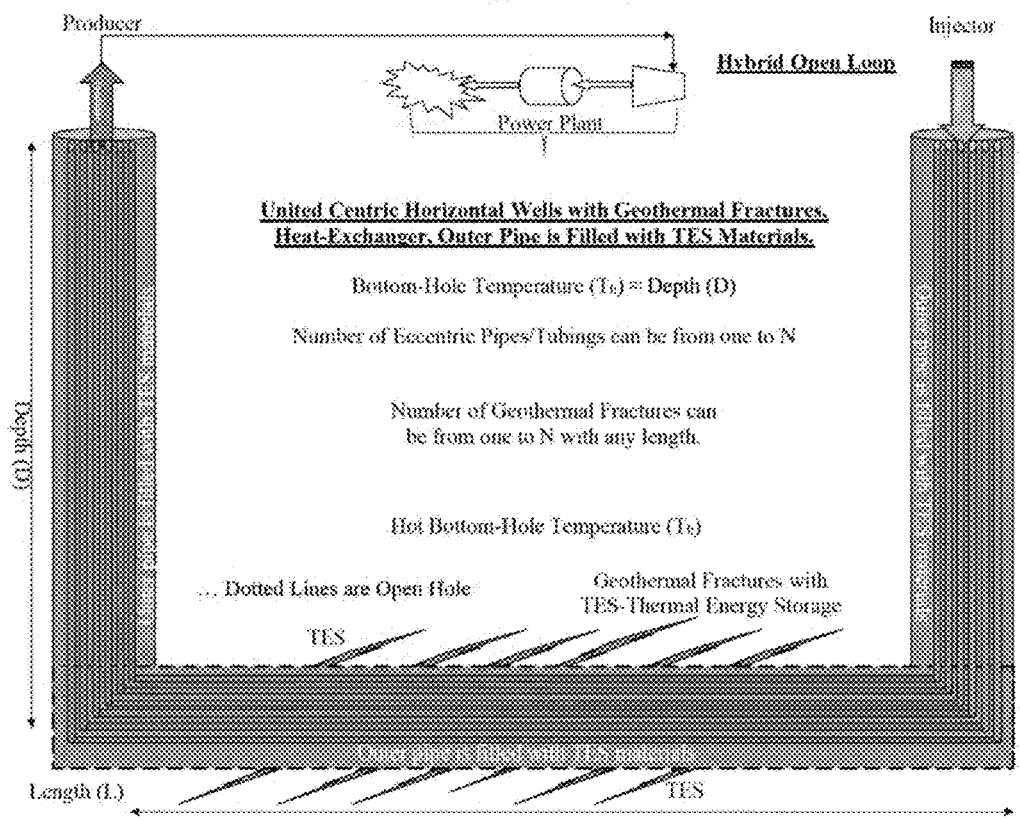
Figures 5, 72:
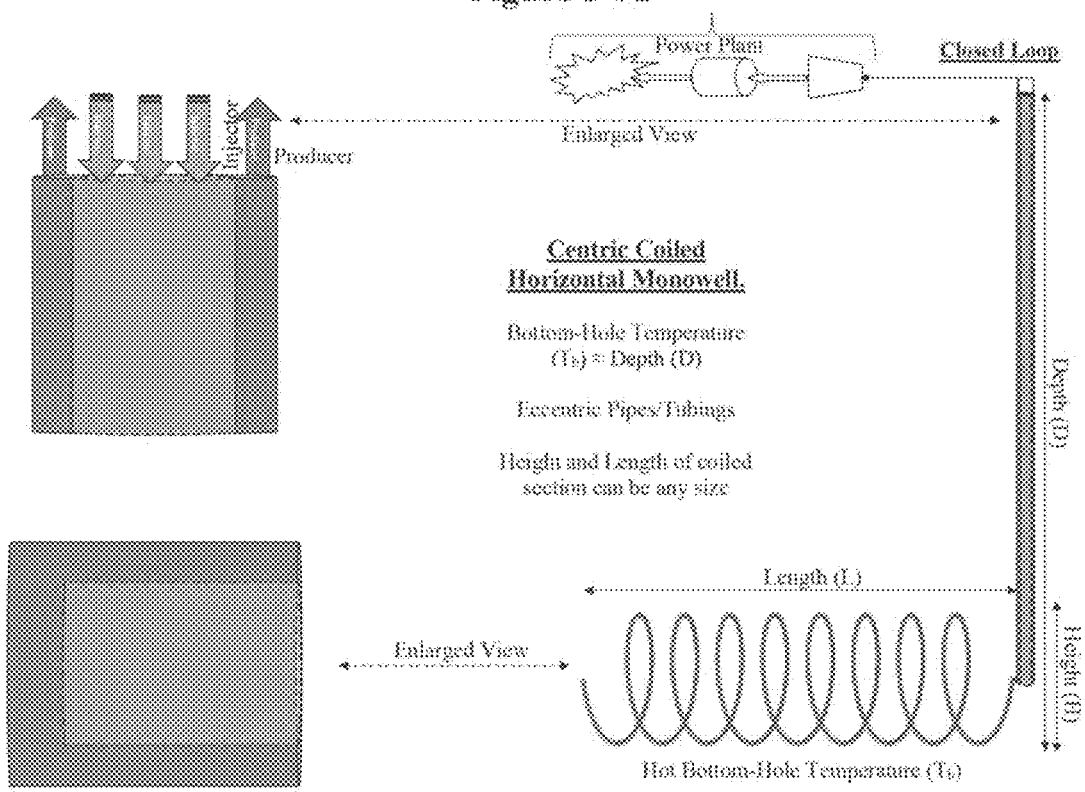
Figures 5, 73:
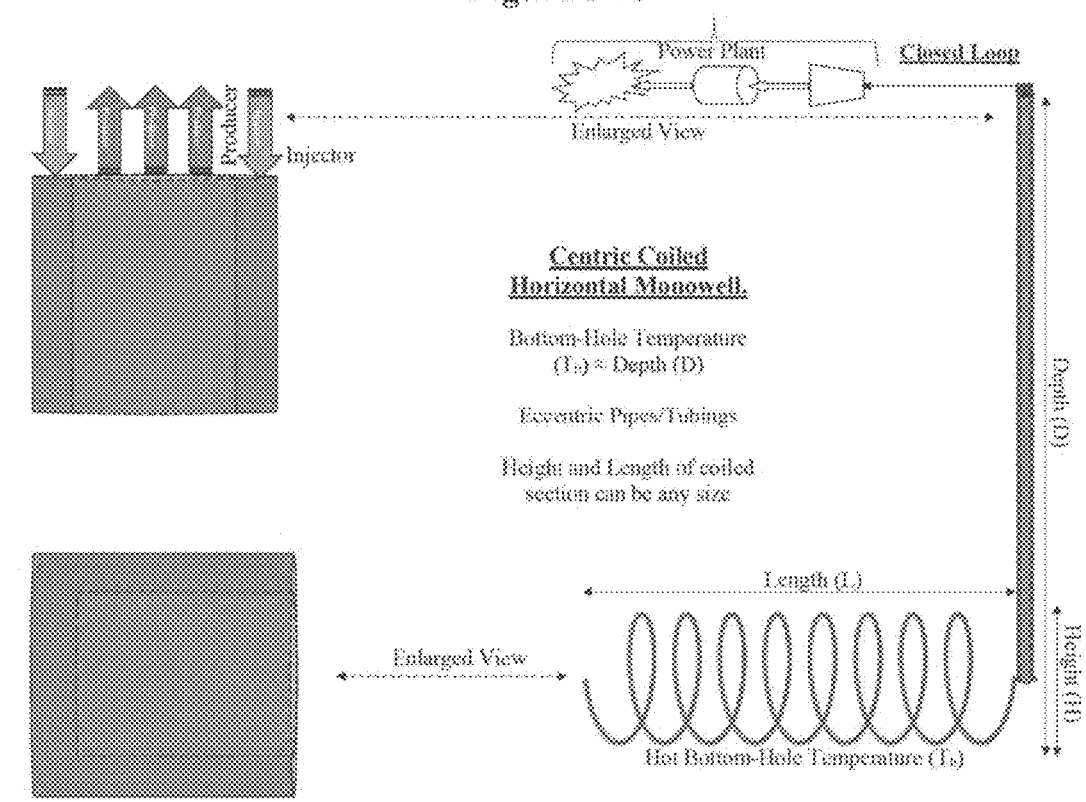
Figures 5, 74:
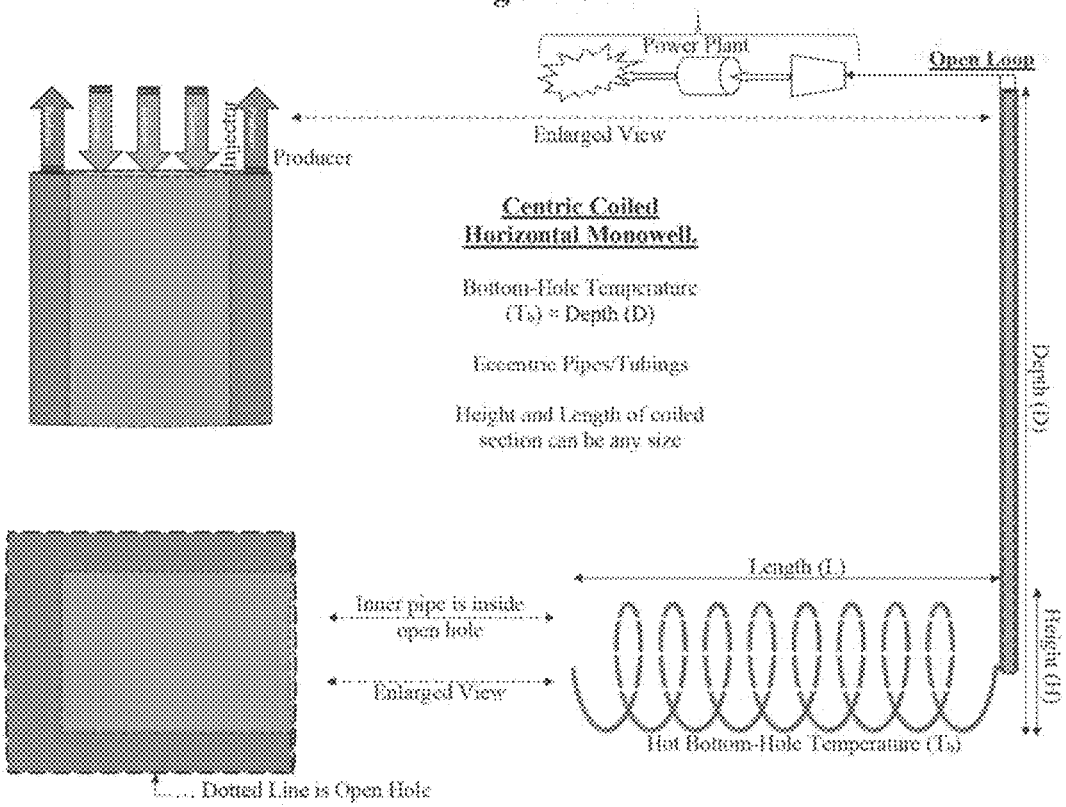
Figures 5, 75:
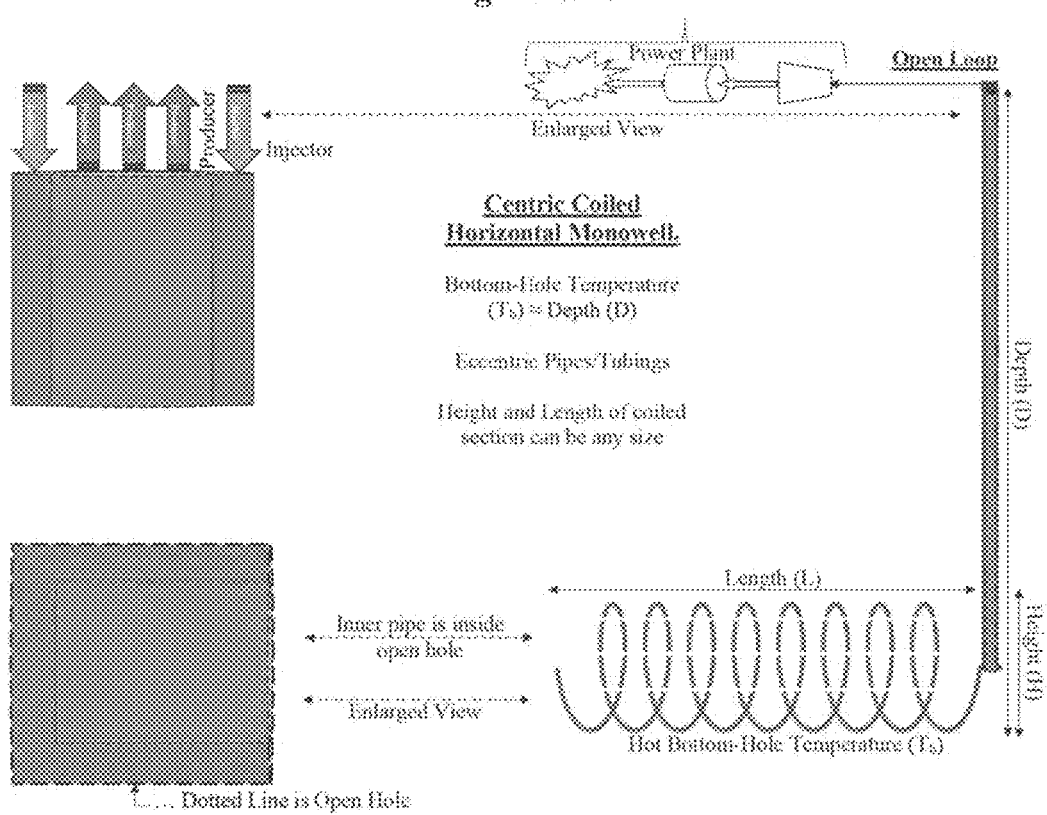
Figures 5, 76:
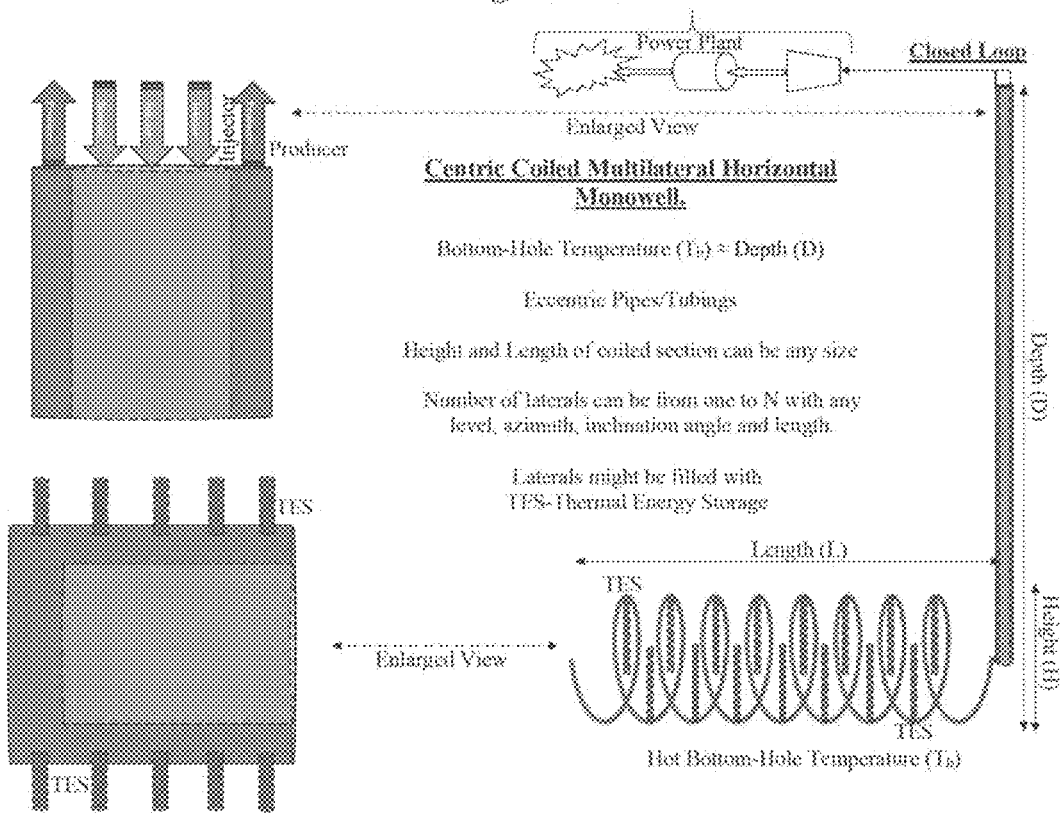
Figures 5, 77:
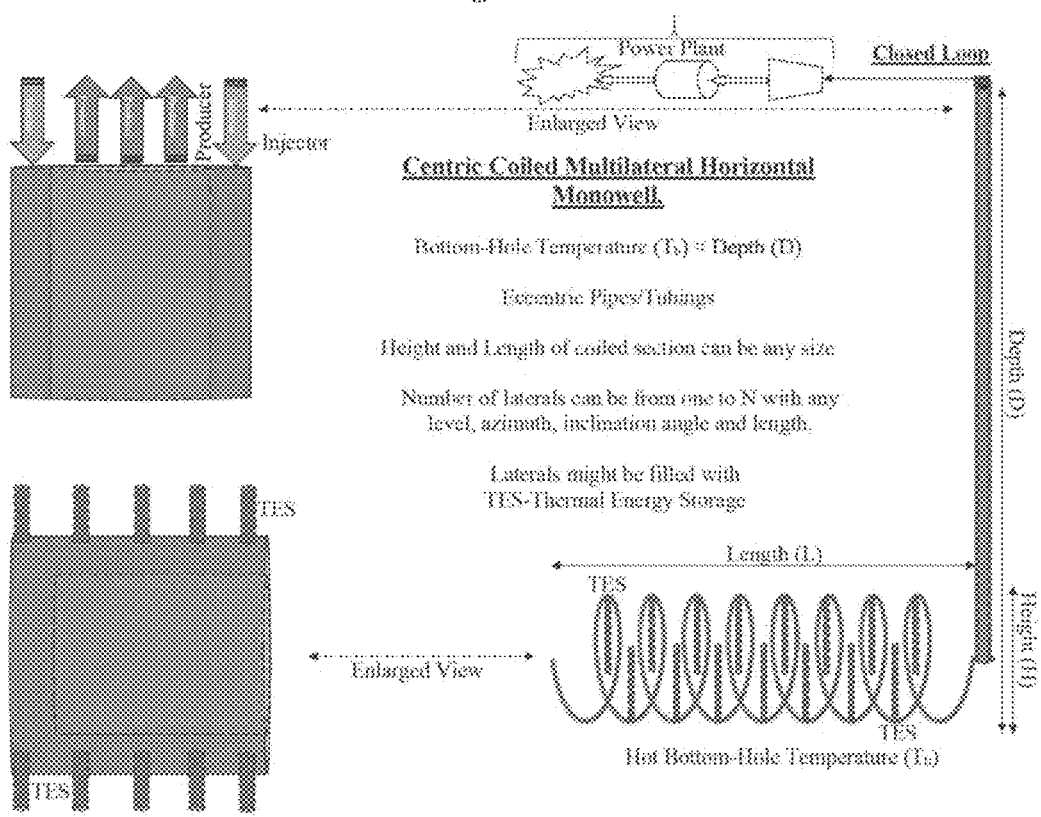
Figures 5, 78:
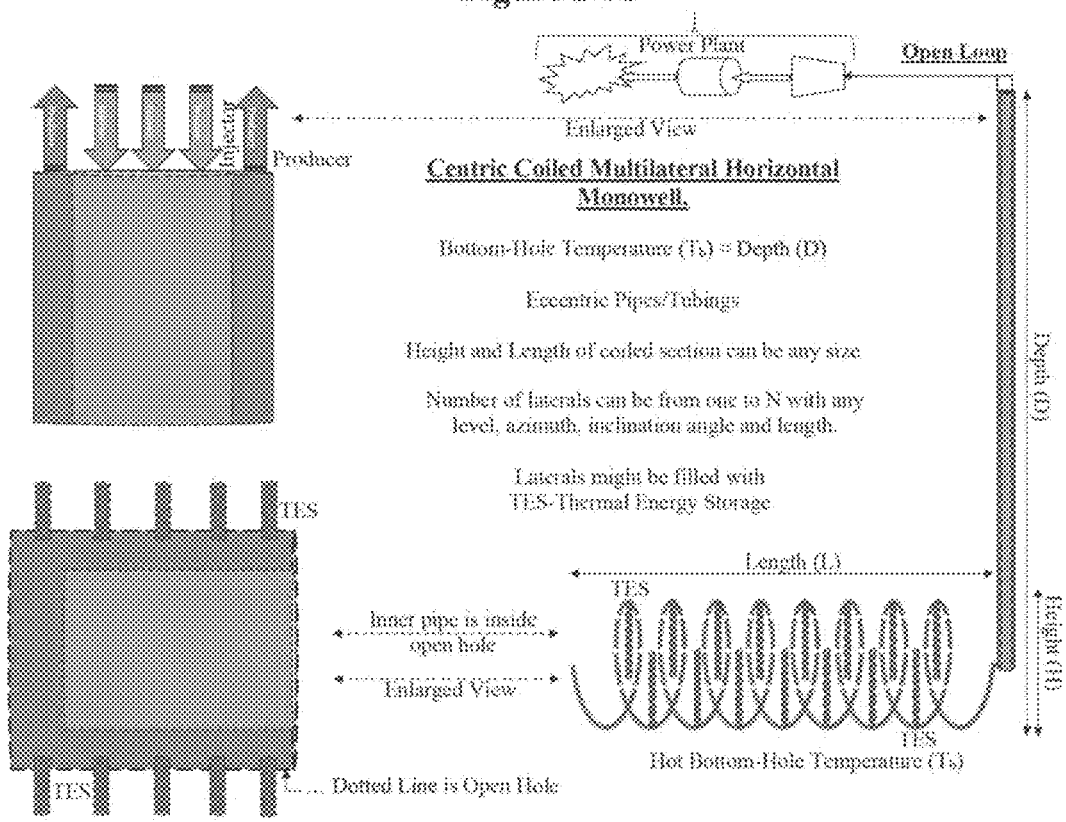
Figures 5, 79:
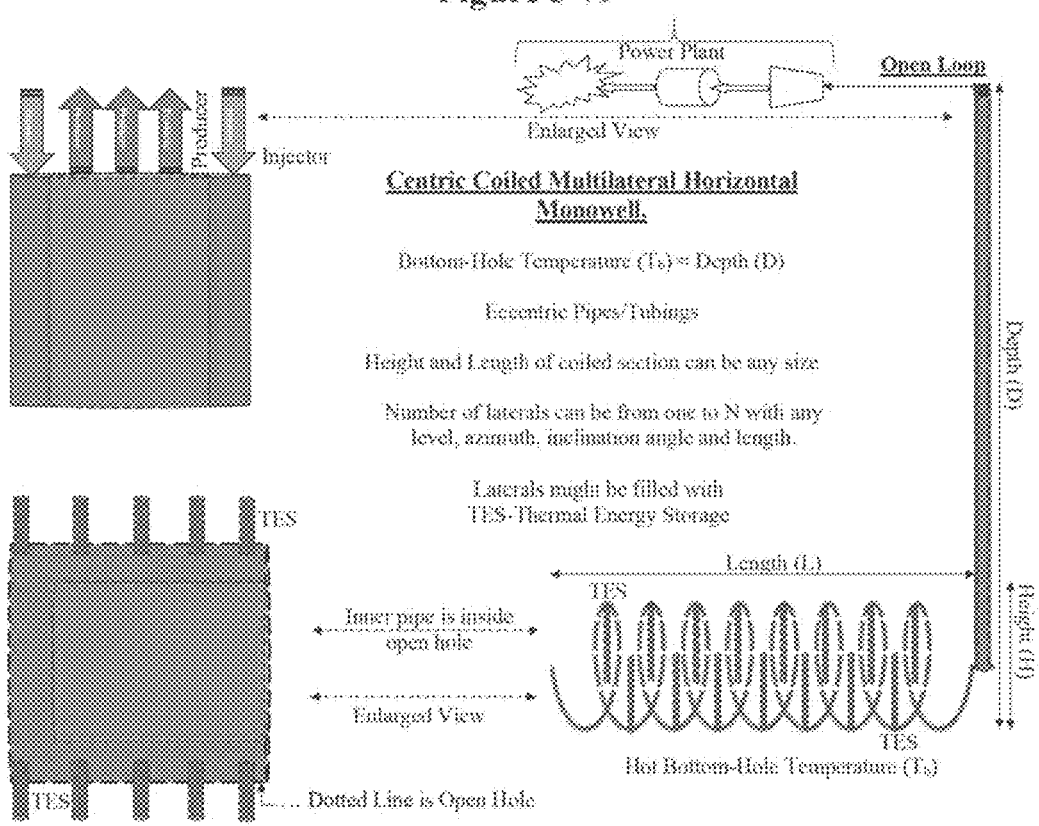
Figures 5, 80:
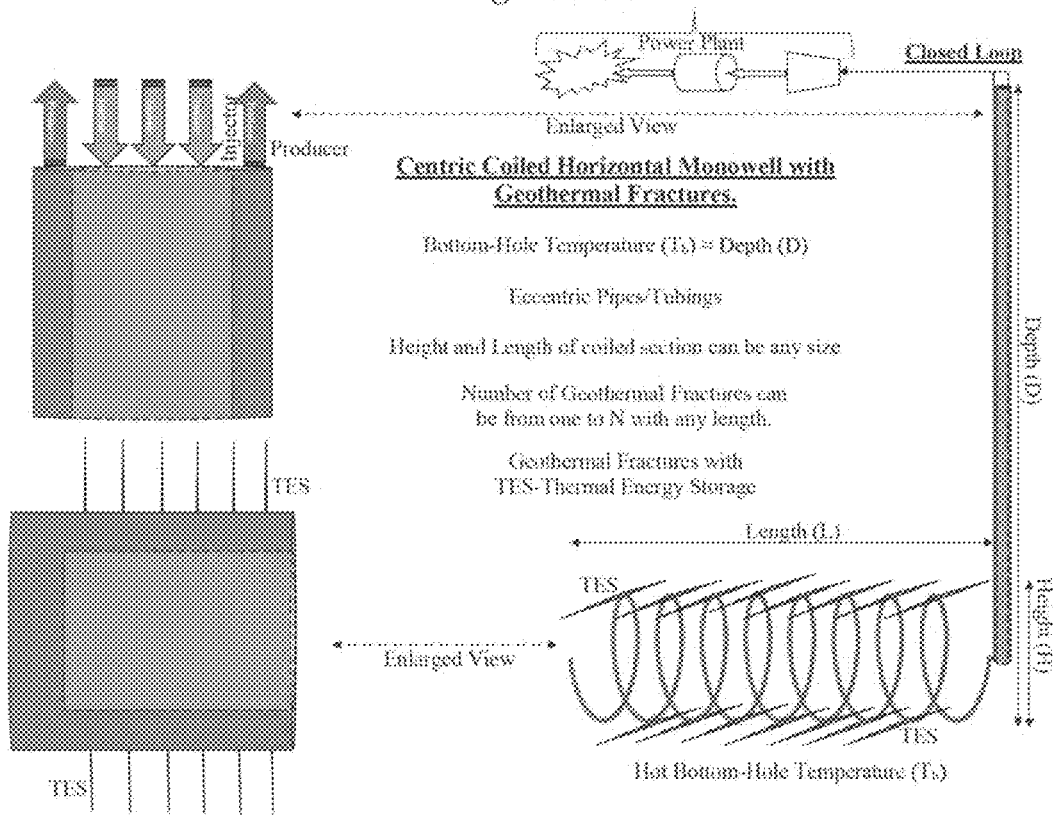
Figures 5, 81:
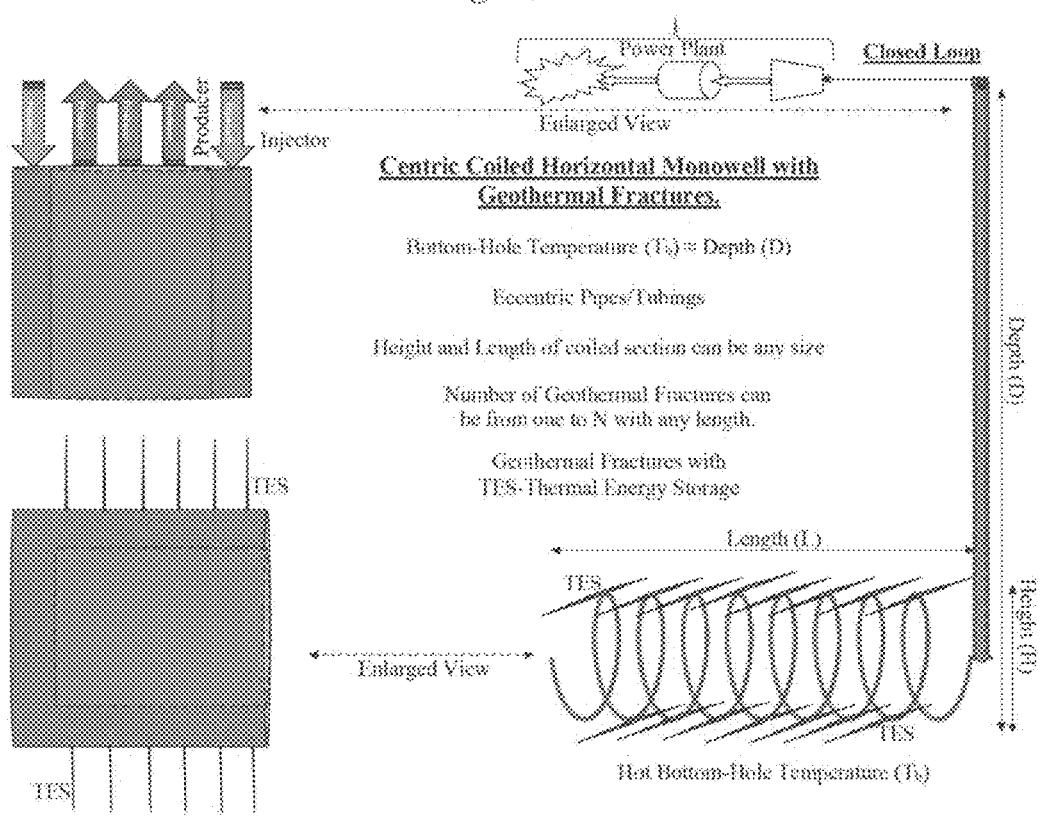
Figures 5, 82:
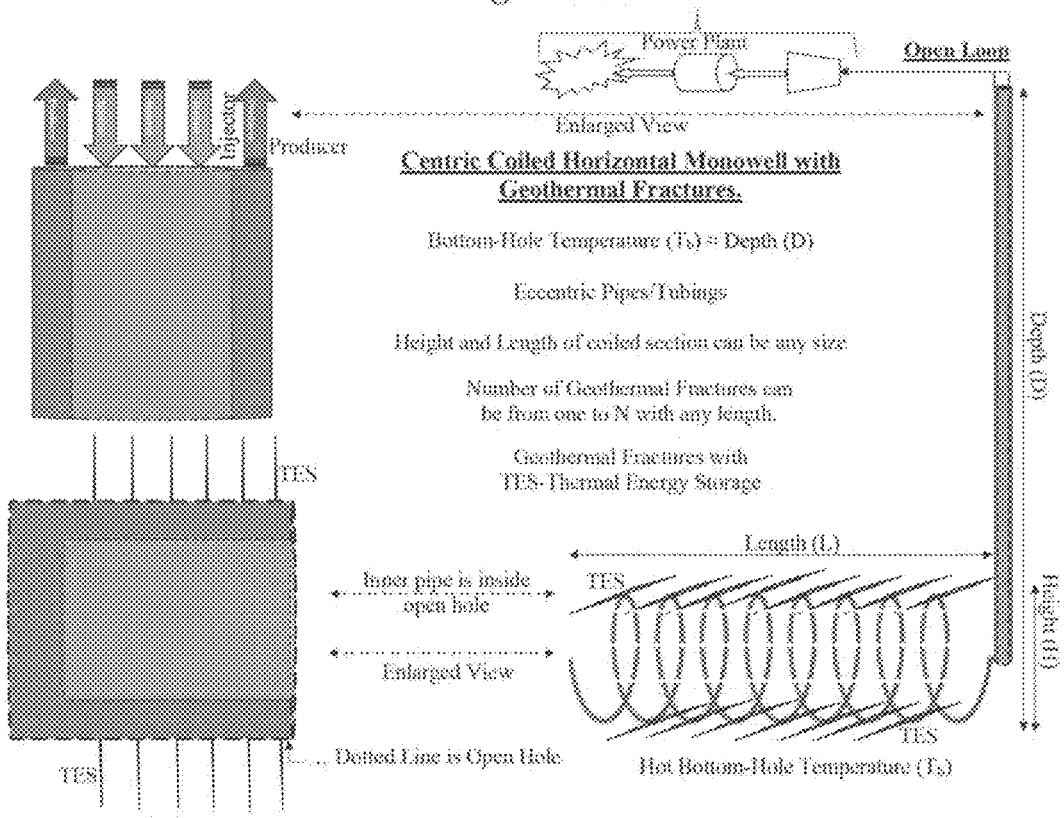
Figures 5, 83:
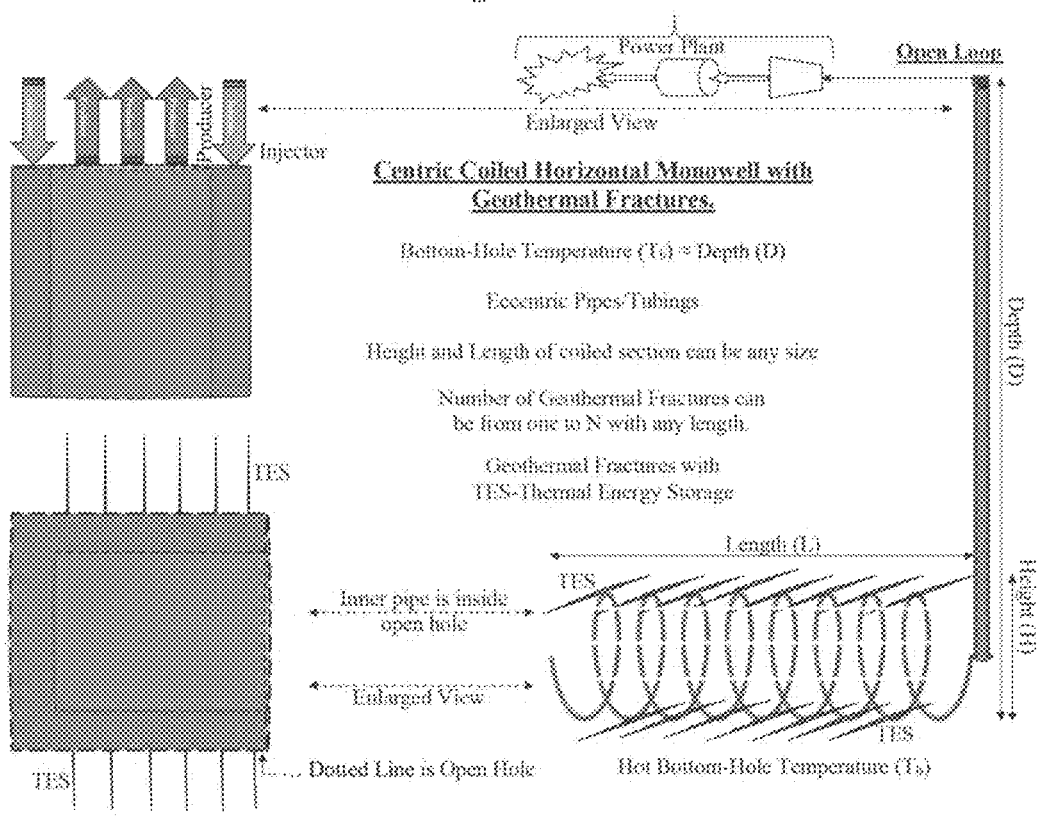
Figures 5, 84:
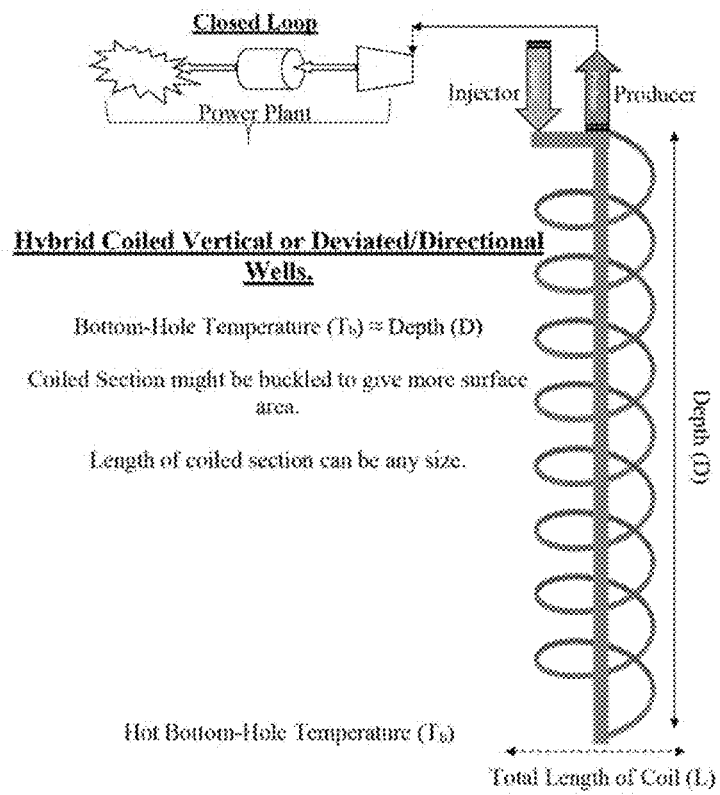
Figures 5, 85:
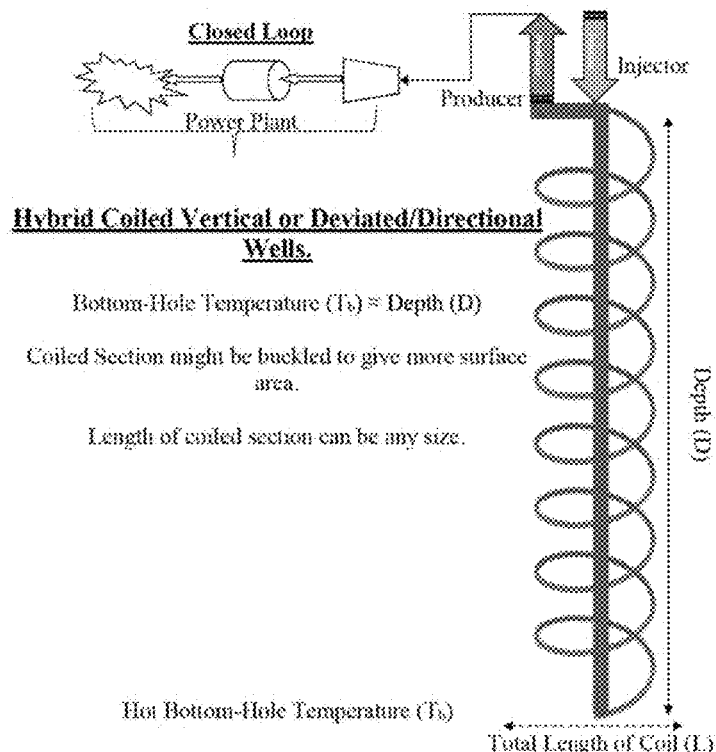
Figures 5, 86:
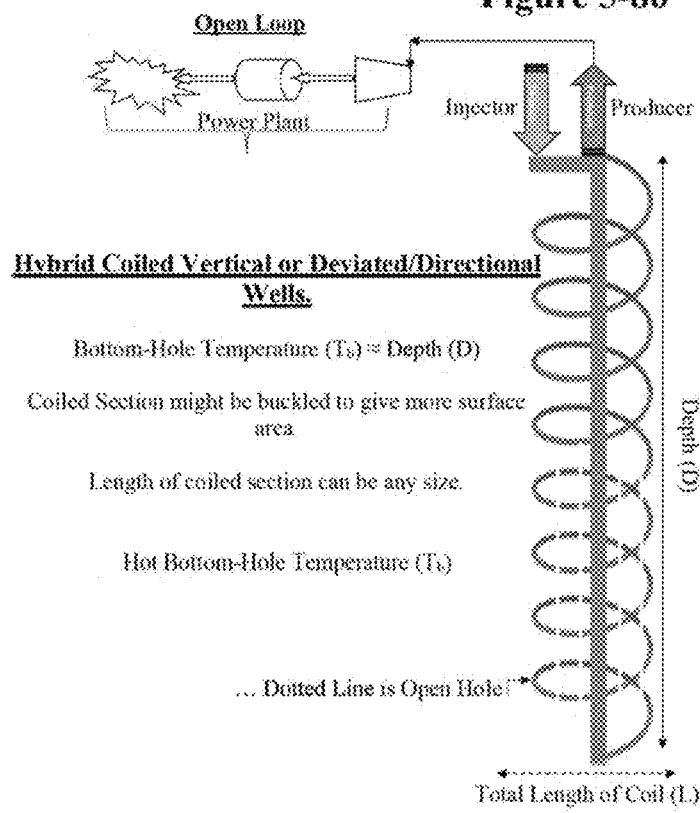
Figures 5, 87:
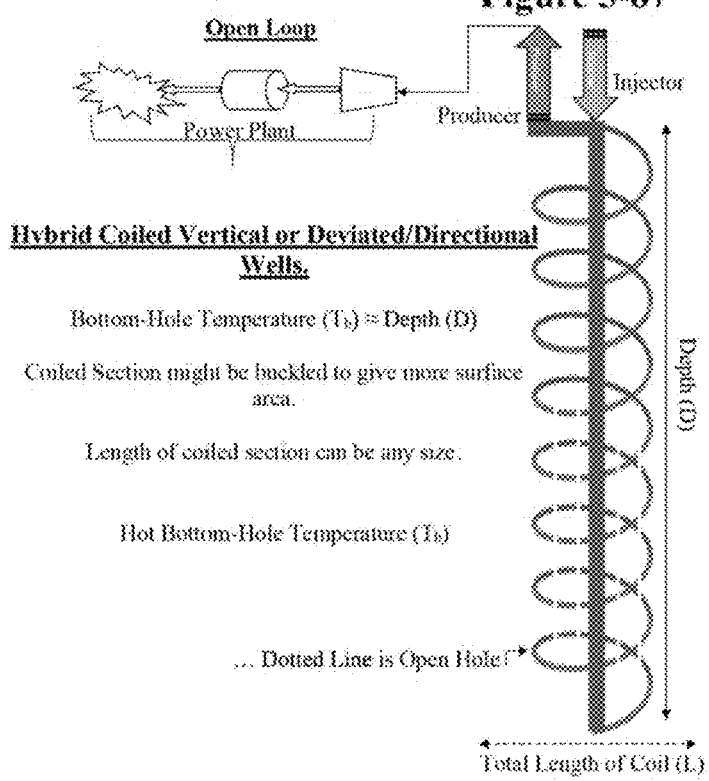
Figures 5, 88:
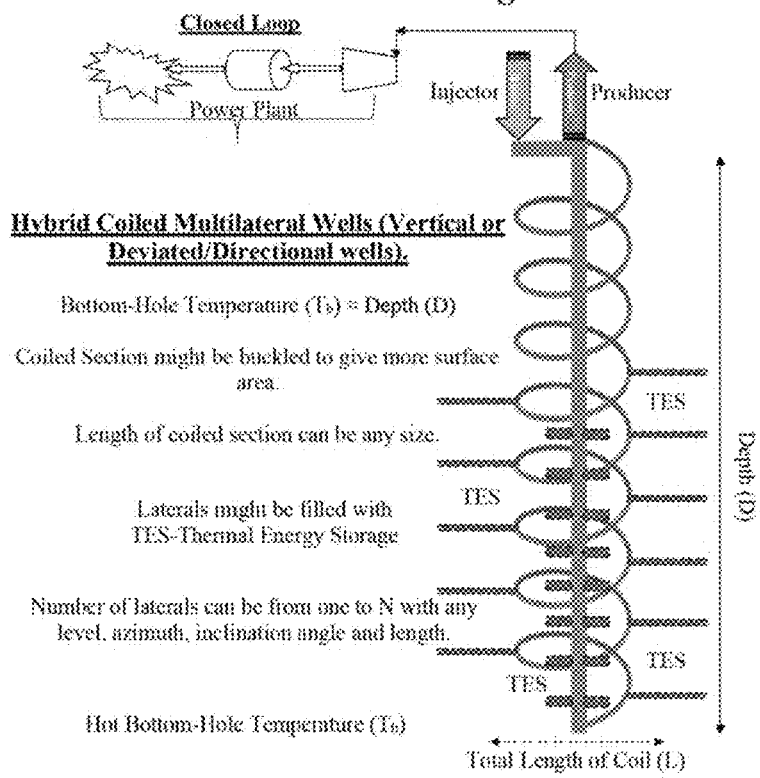
Figures 5, 89:
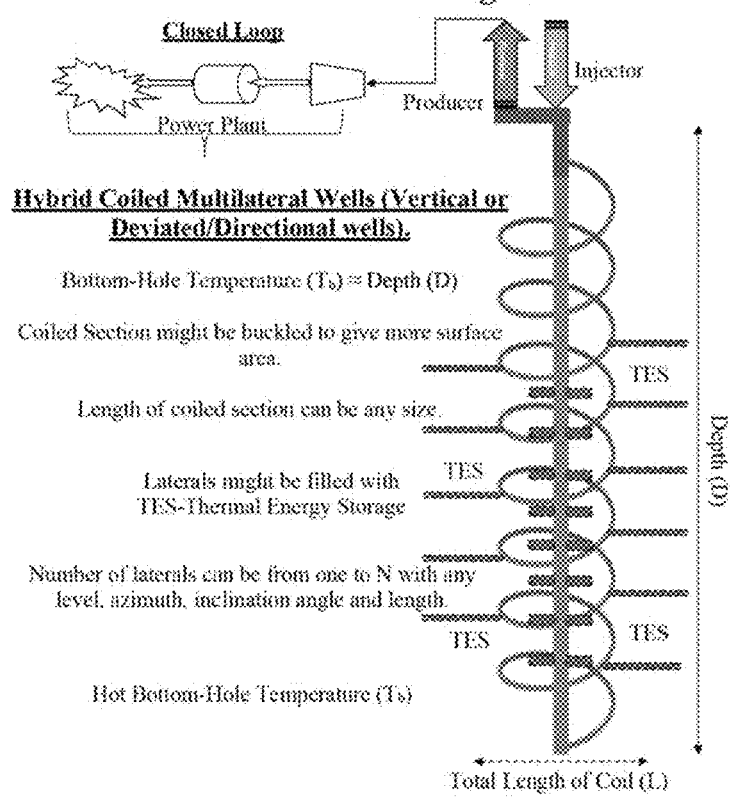
Figures 5, 90:
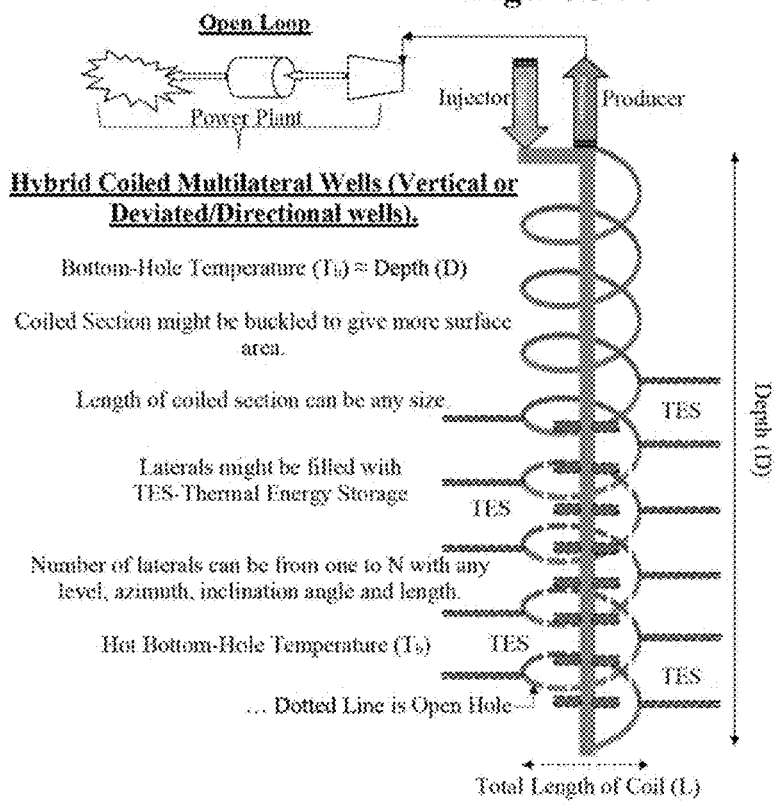
Figures 5, 91:
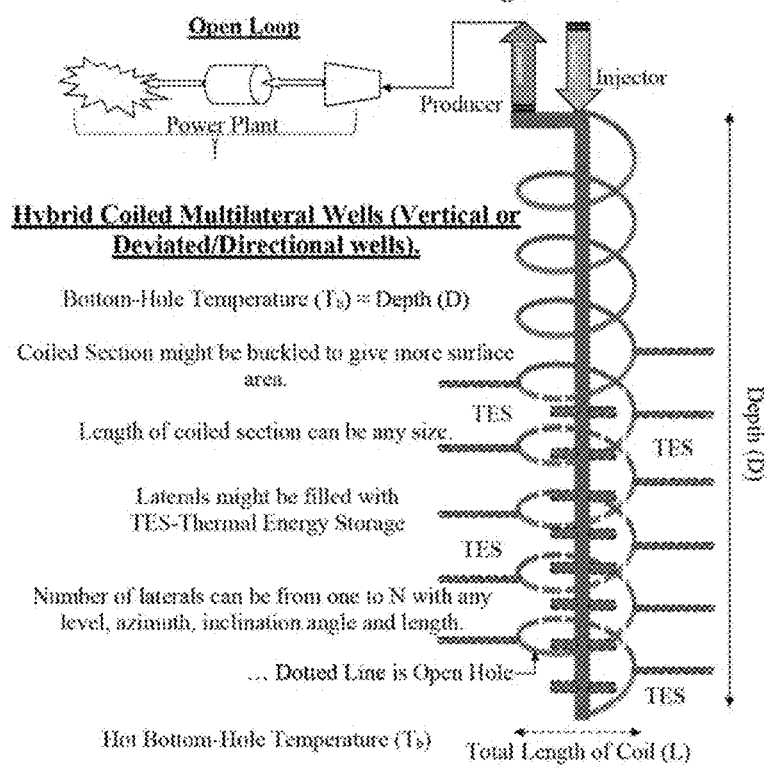
Figures 5, 92:
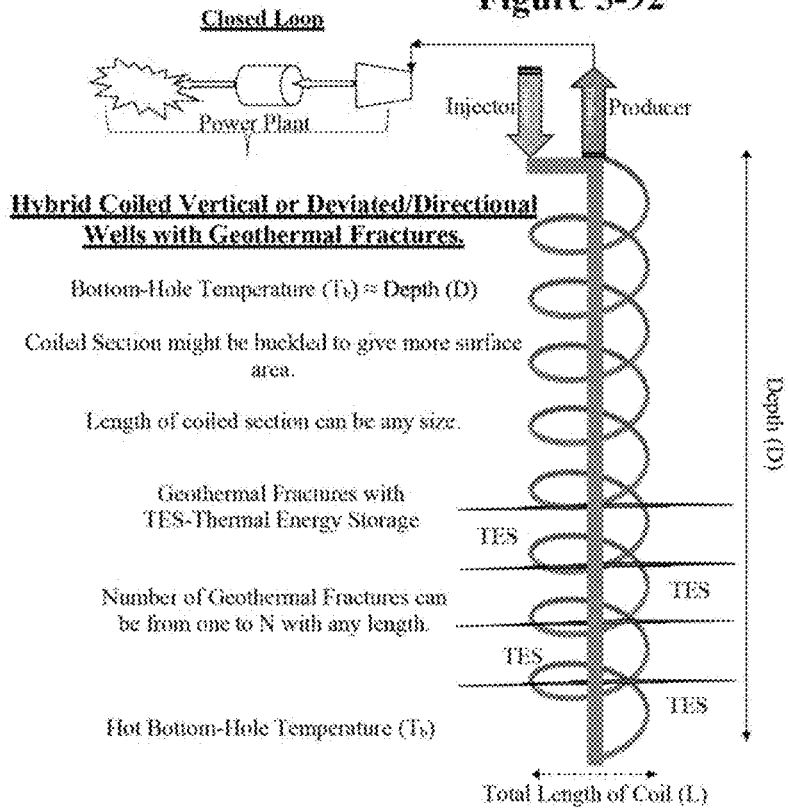
Figures 5, 93:
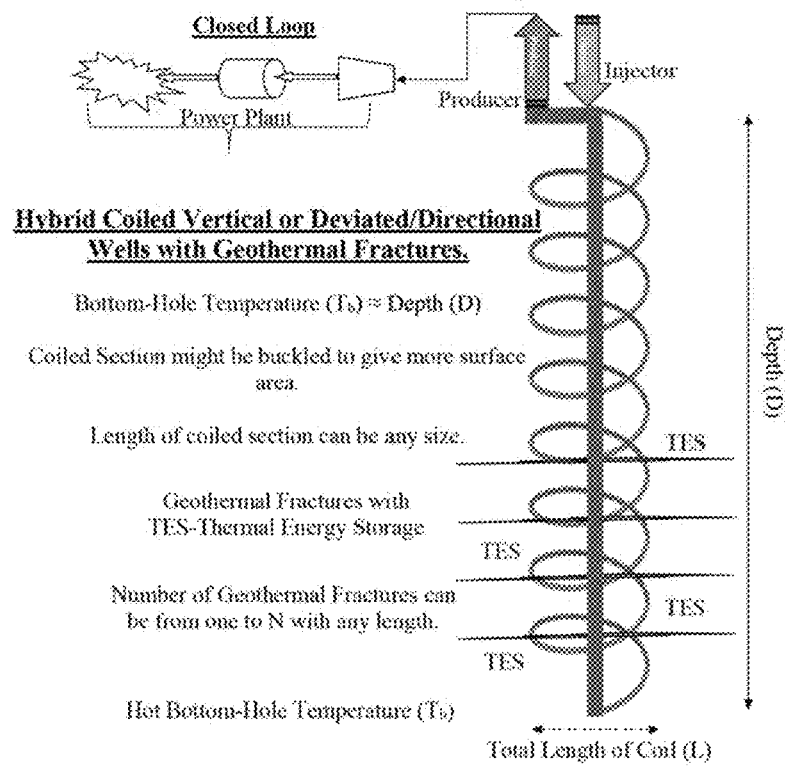
Figures 5, 94:
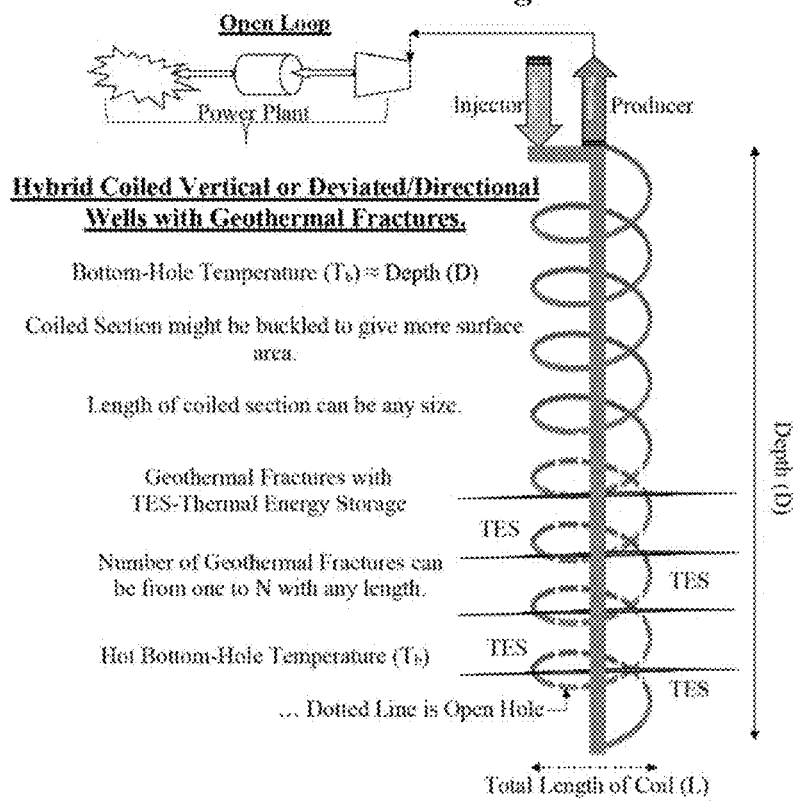
Figures 5, 95:
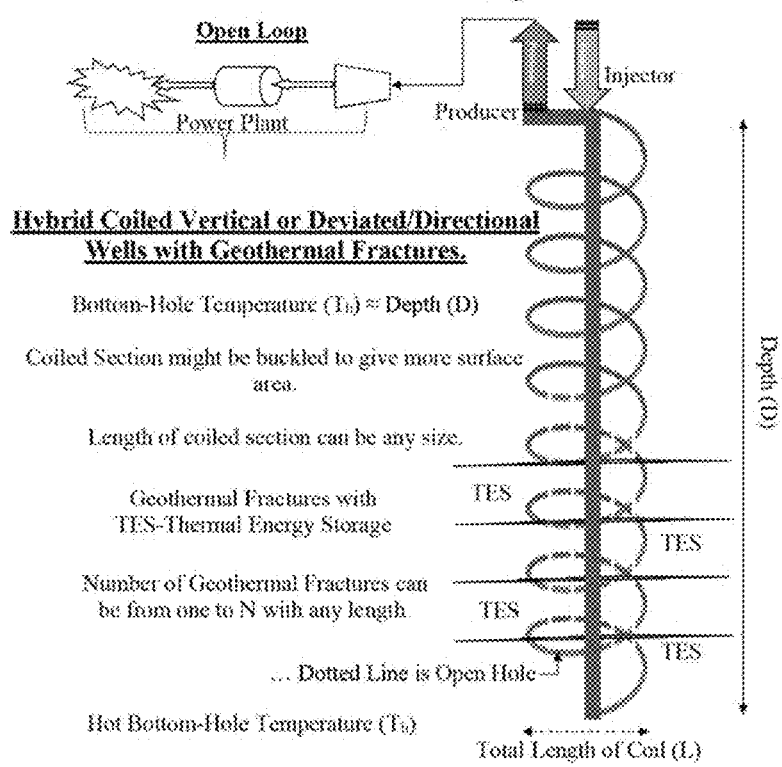
Figures 5, 96:
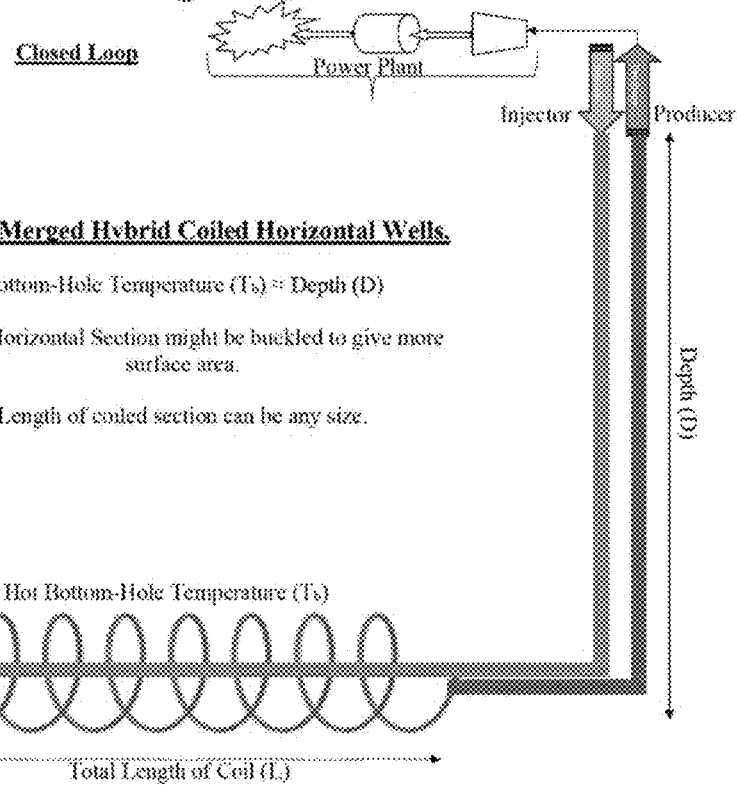
Figures 5, 97:
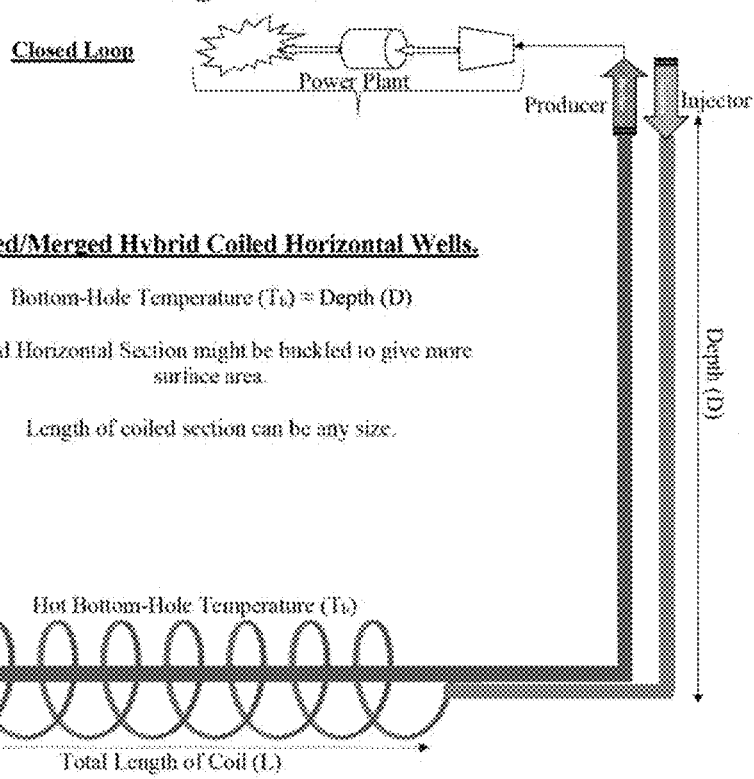
Figures 5, 98:
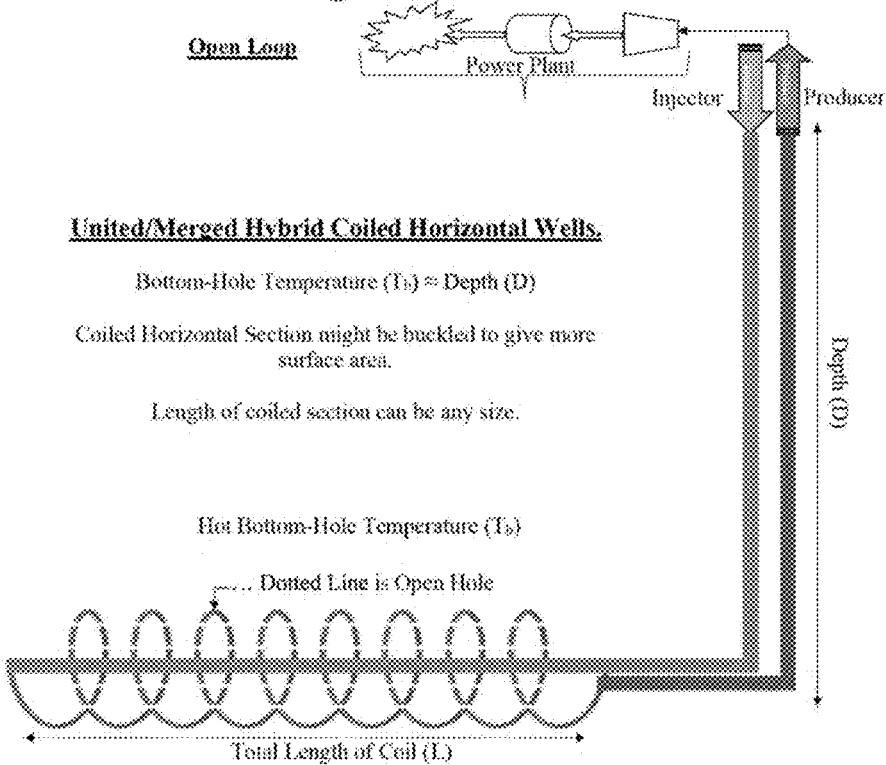
Figures 5, 99:
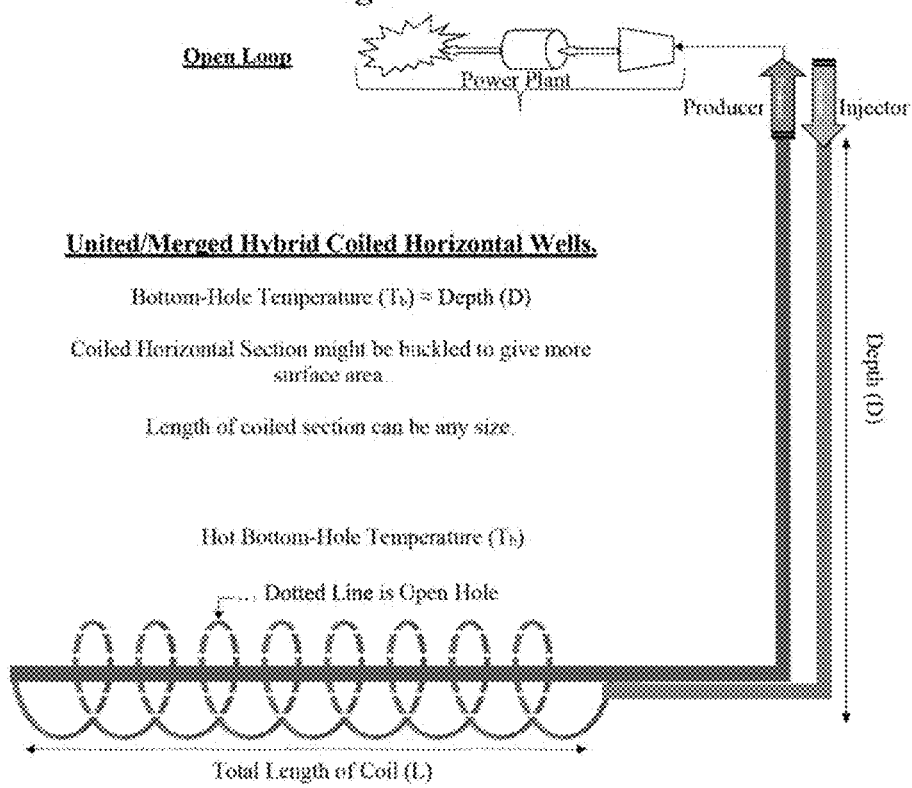
Figures 5, 100:
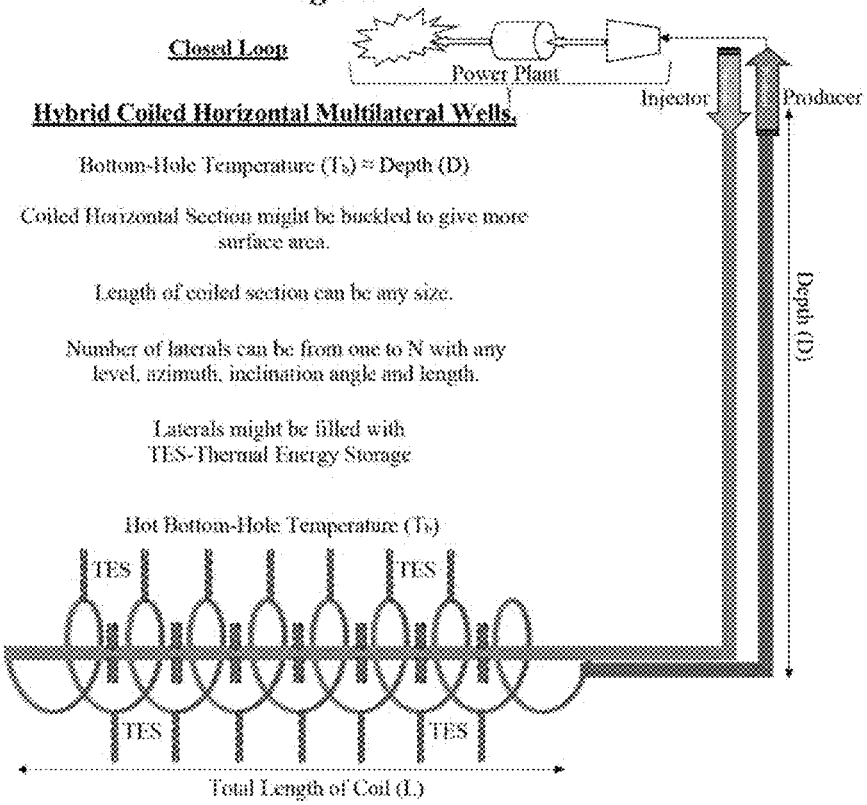
Figures 5, 101:
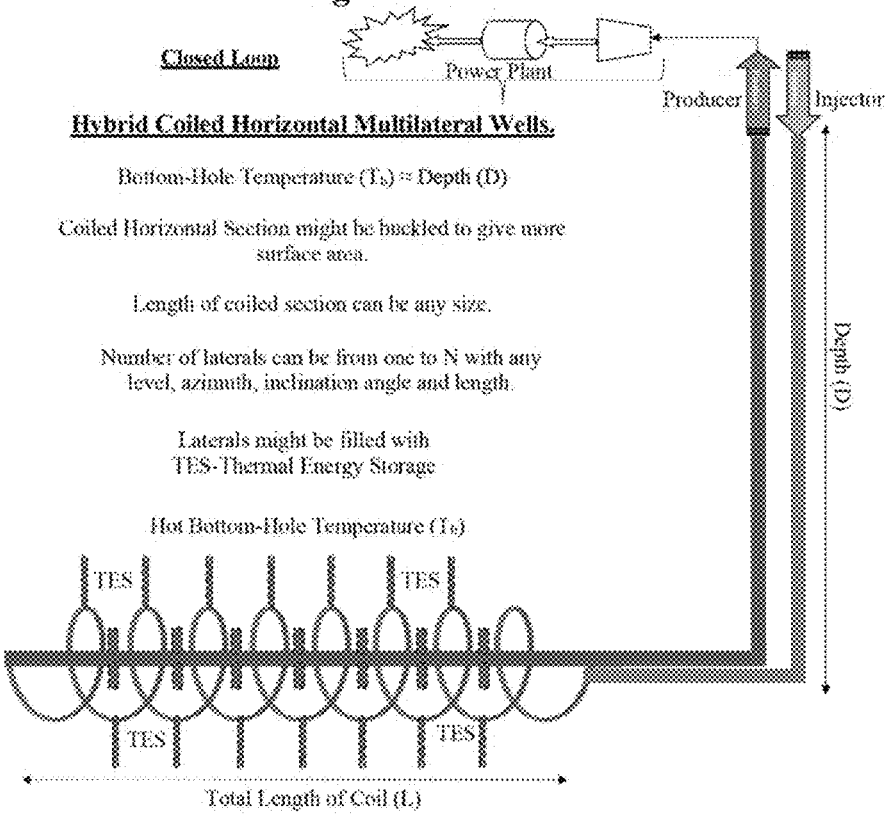
Figures 5, 102:
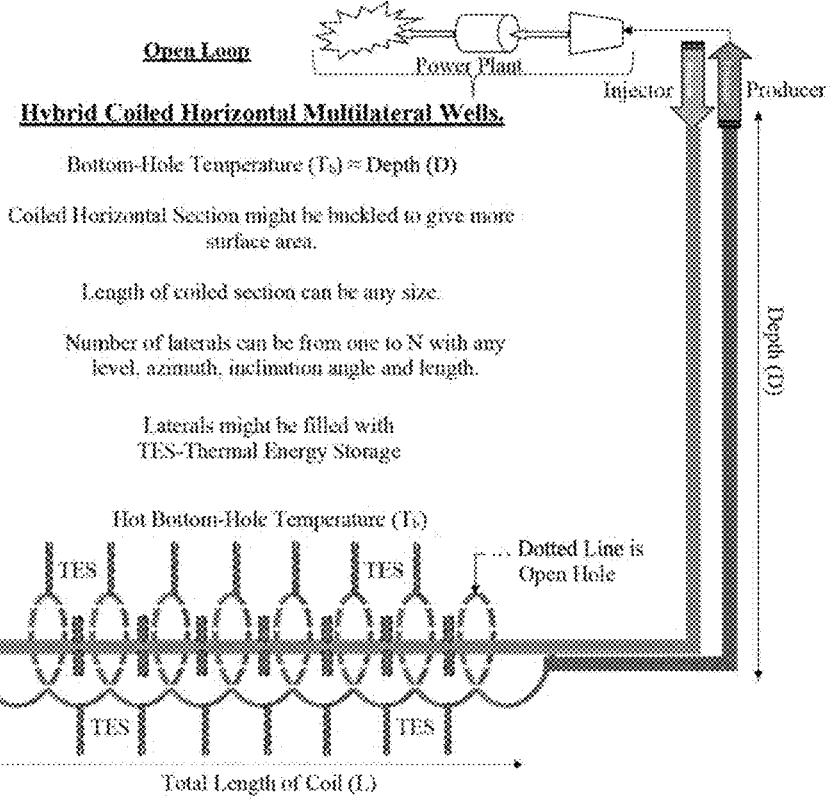
Figures 5, 103:
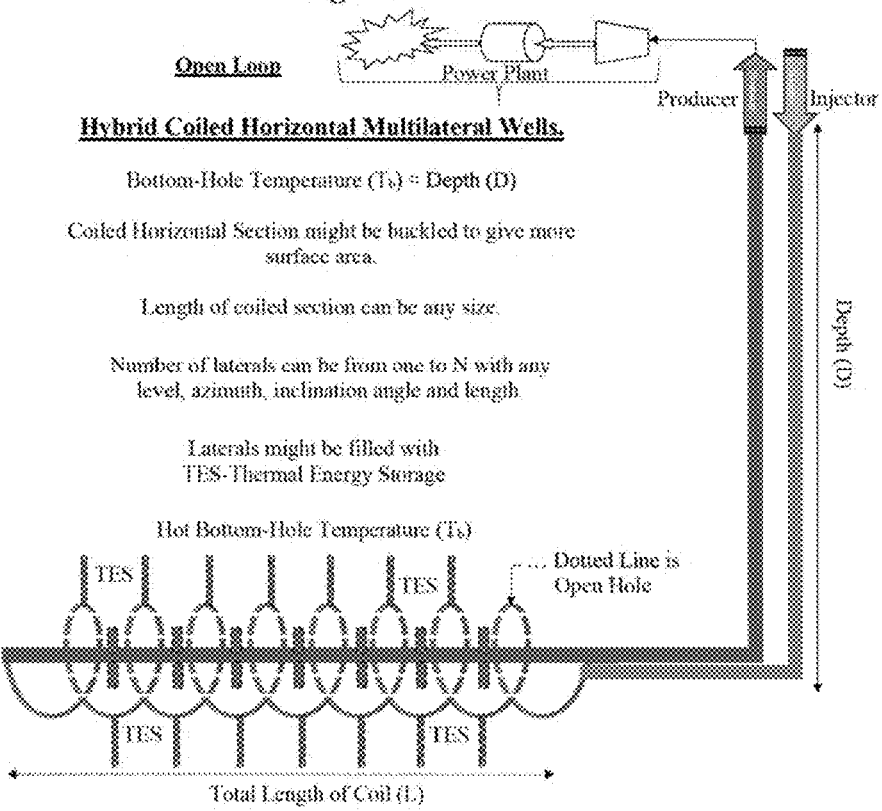
Figures 5, 104:
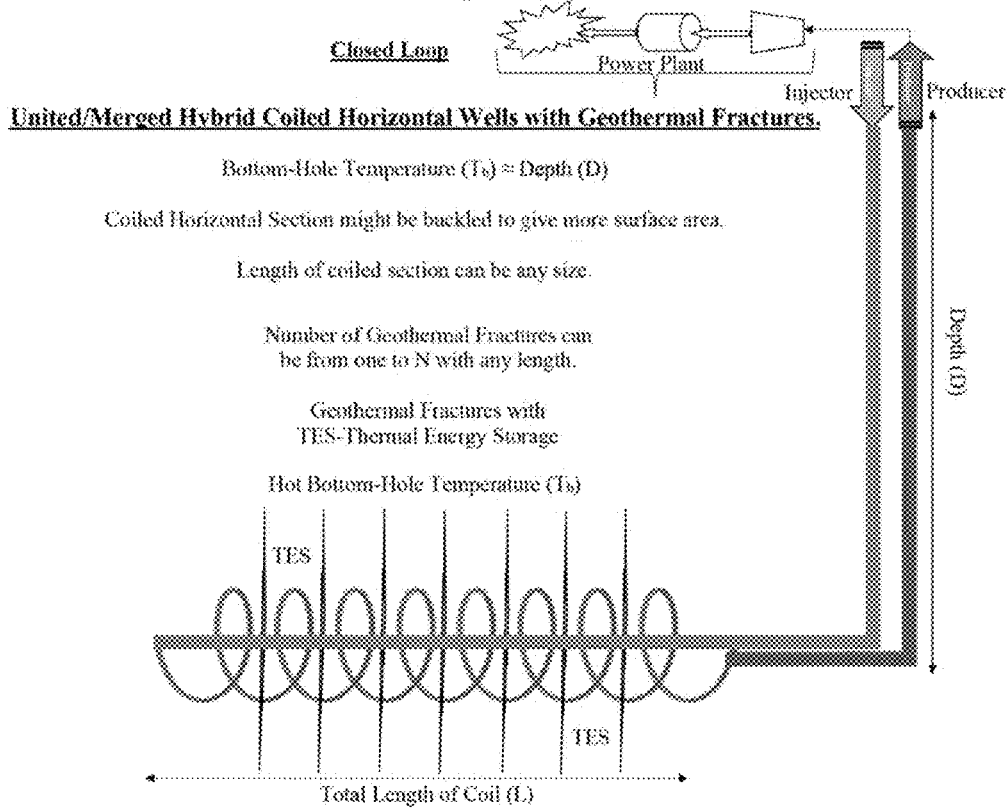
Figures 5, 105:
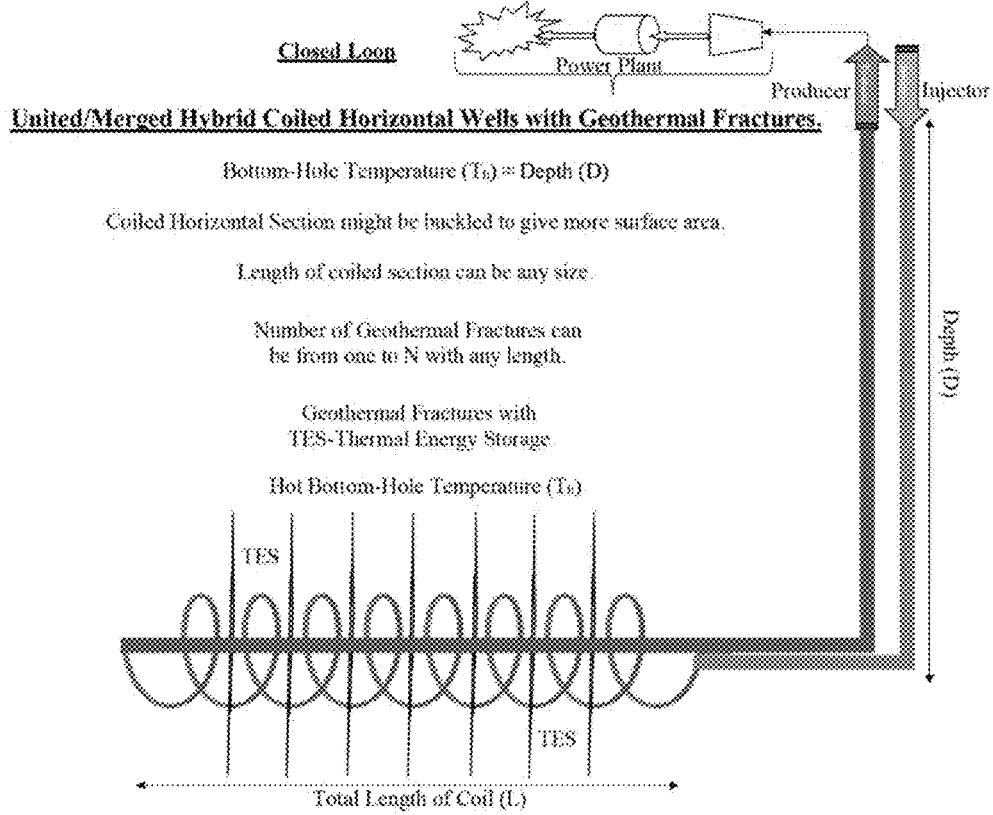
Figures 5, 106:
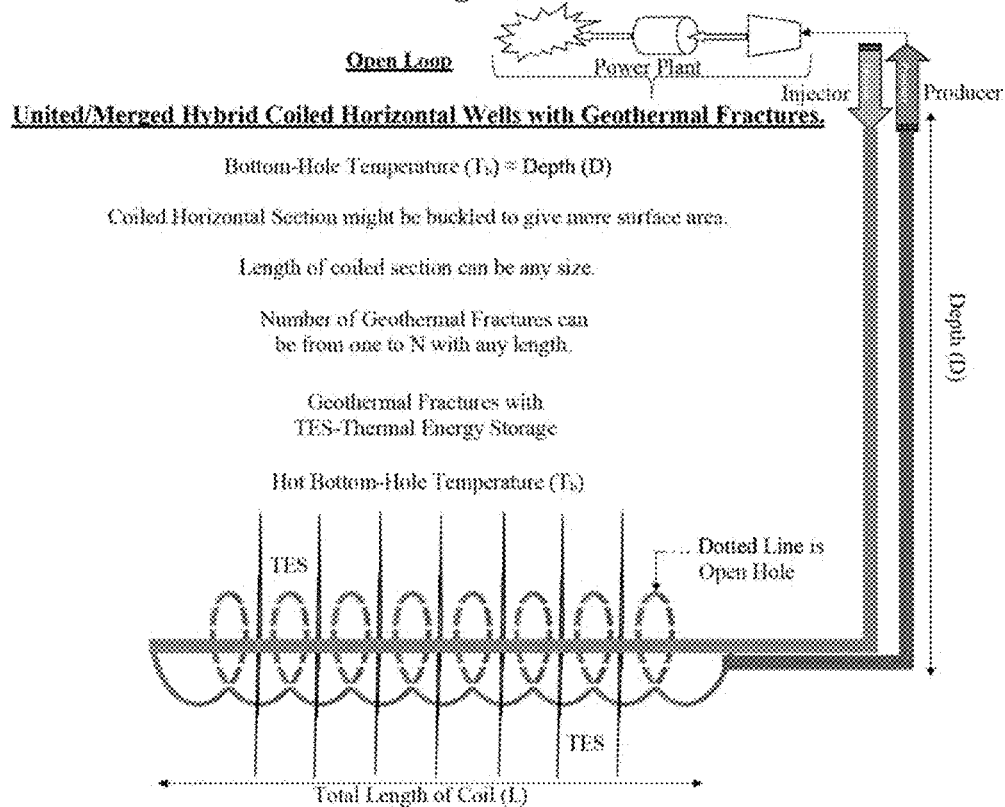
Figures 5, 107:
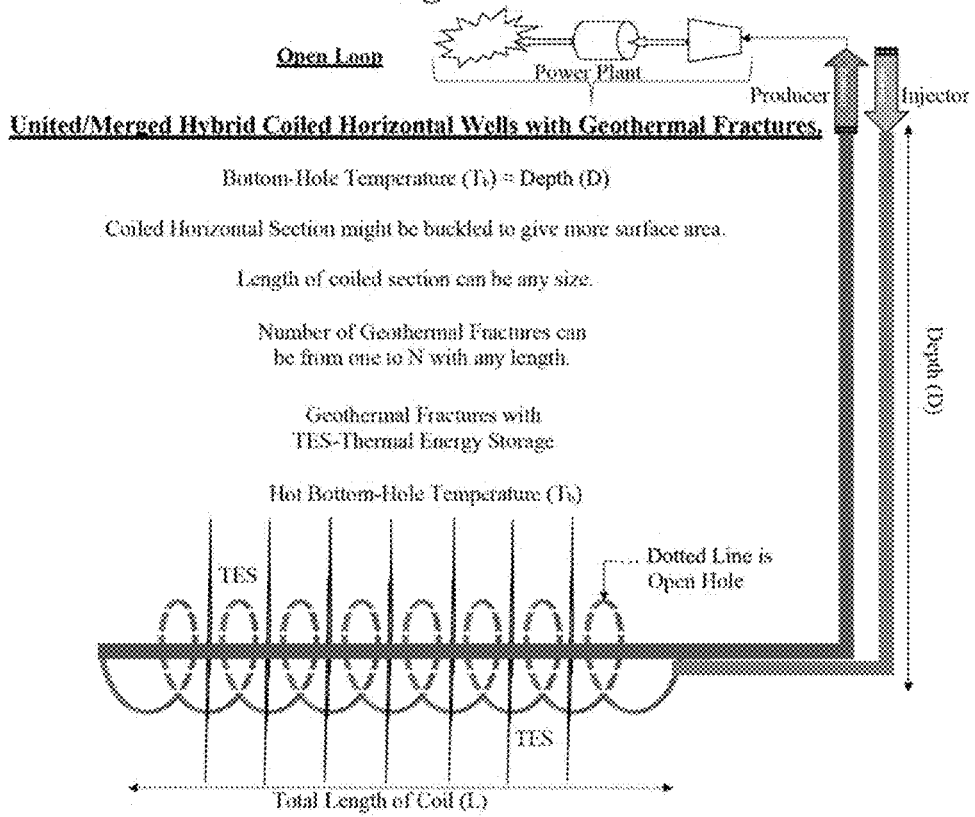
Figures 5, 108:
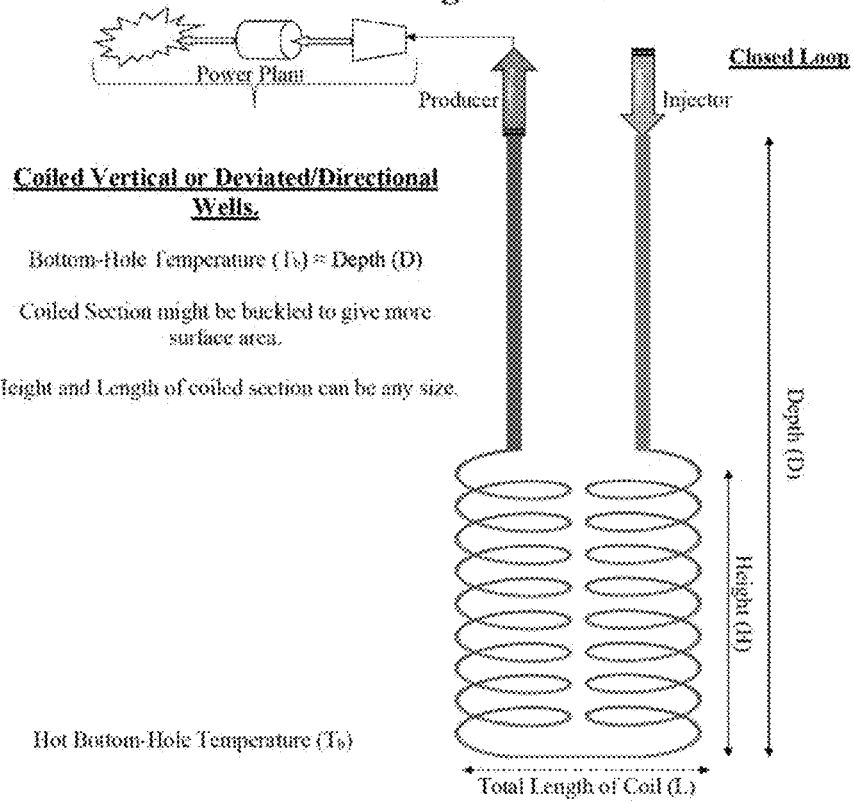
Figures 5, 109:
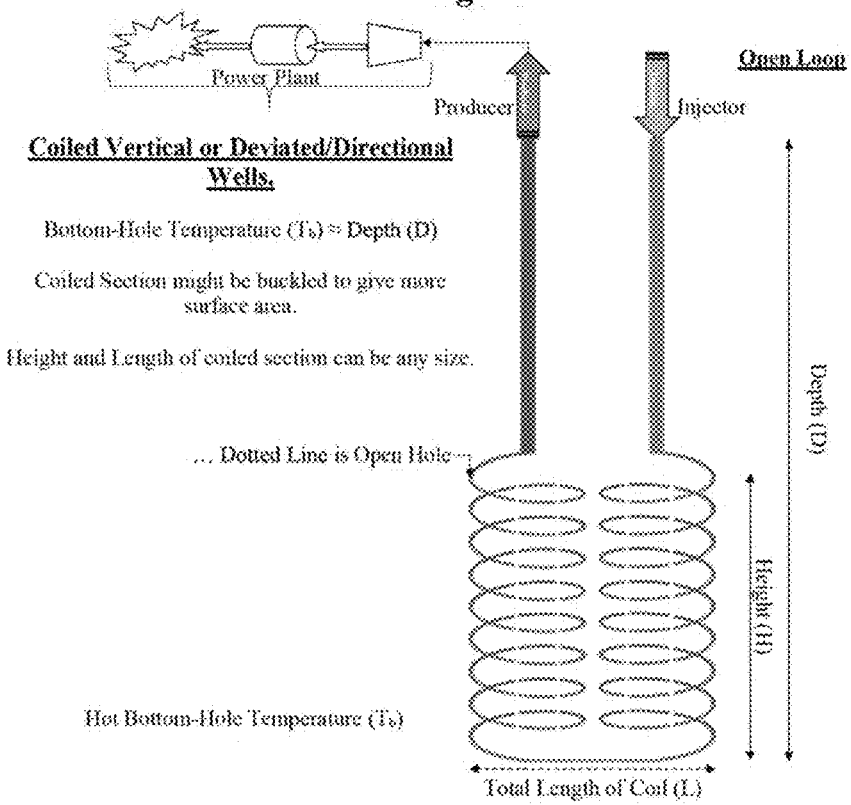
Figures 5, 110:
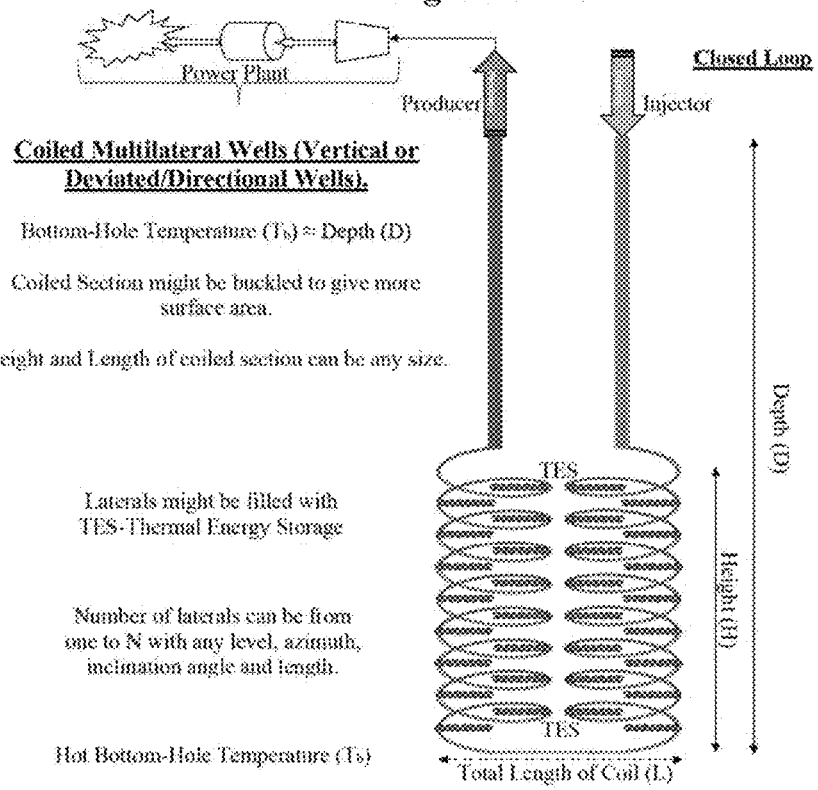
Figures 5, 111:
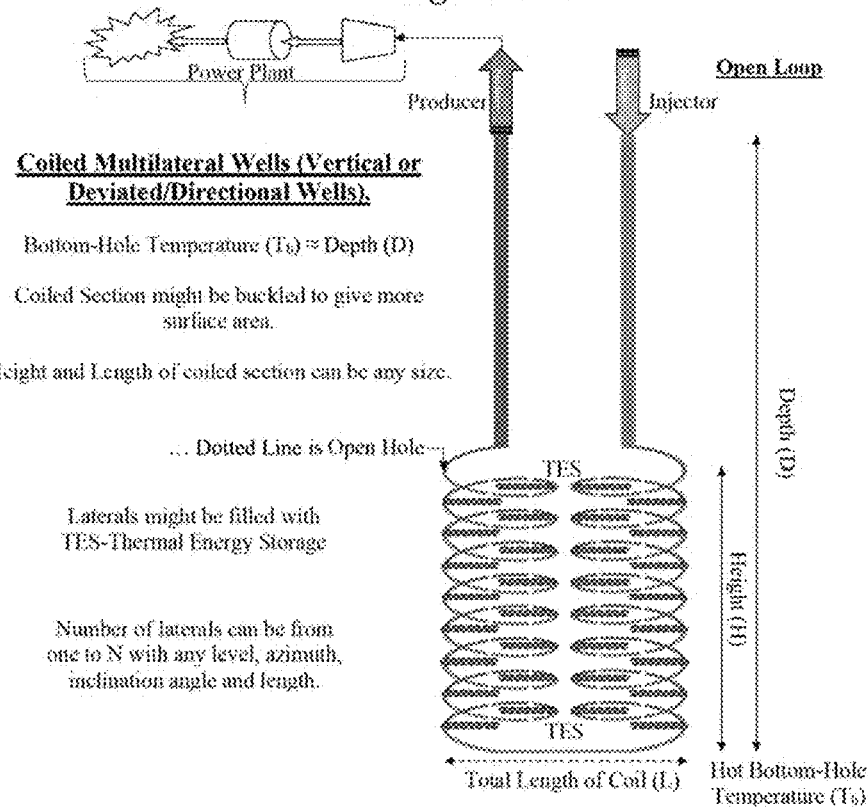
Figures 5, 112:
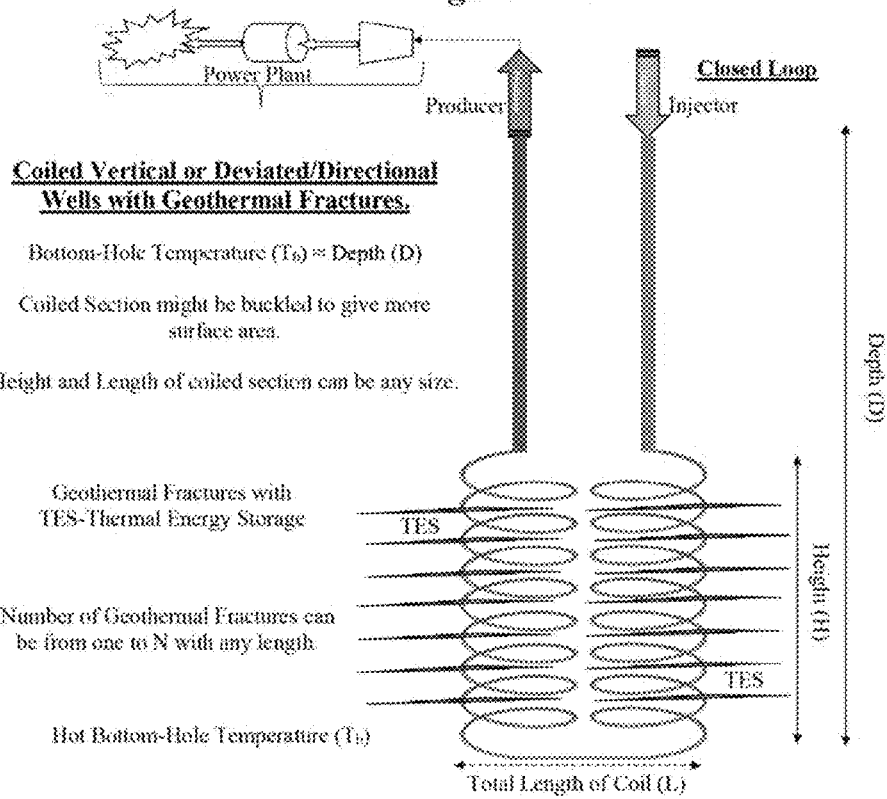
Figures 5, 113:
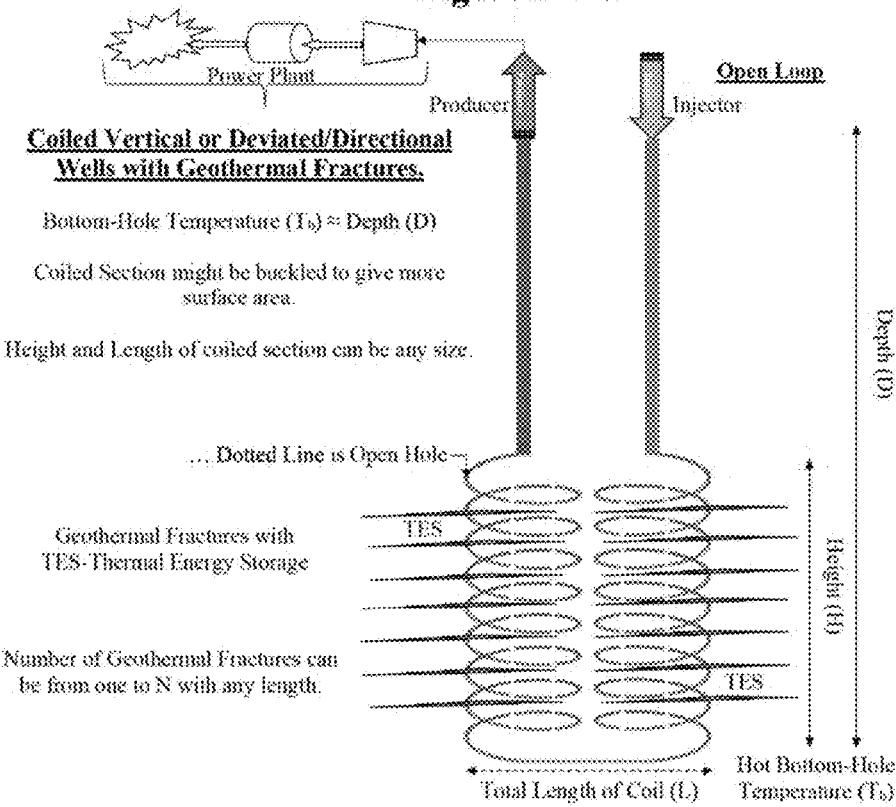
Figures 5, 116:
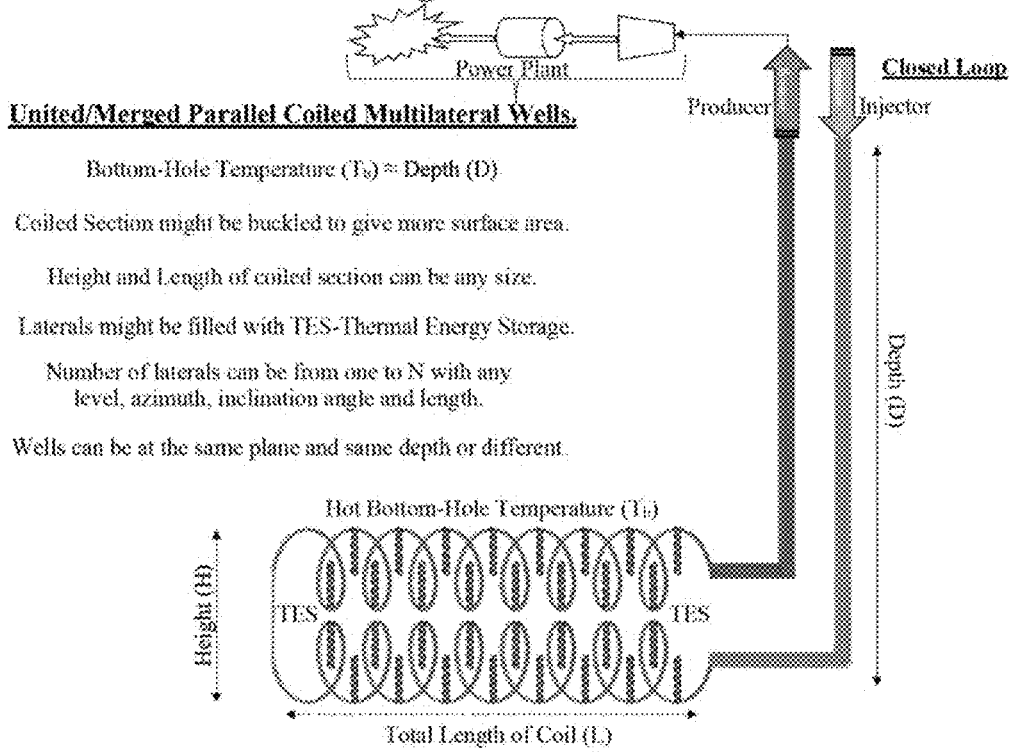
Figures 5, 117:
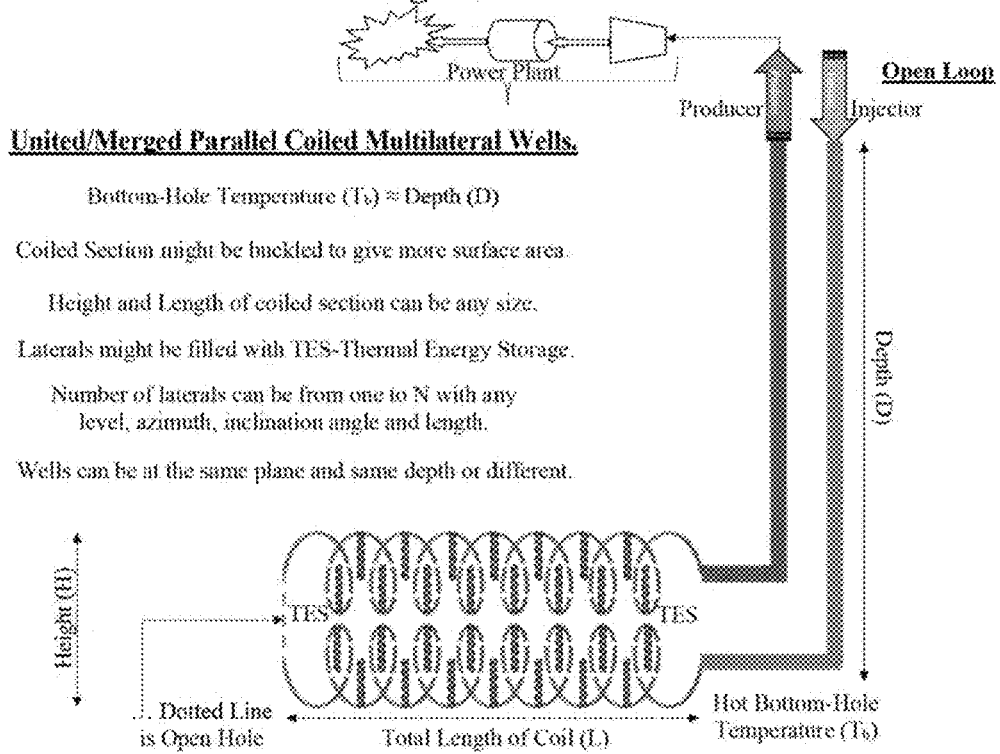
Figures 5, 118:
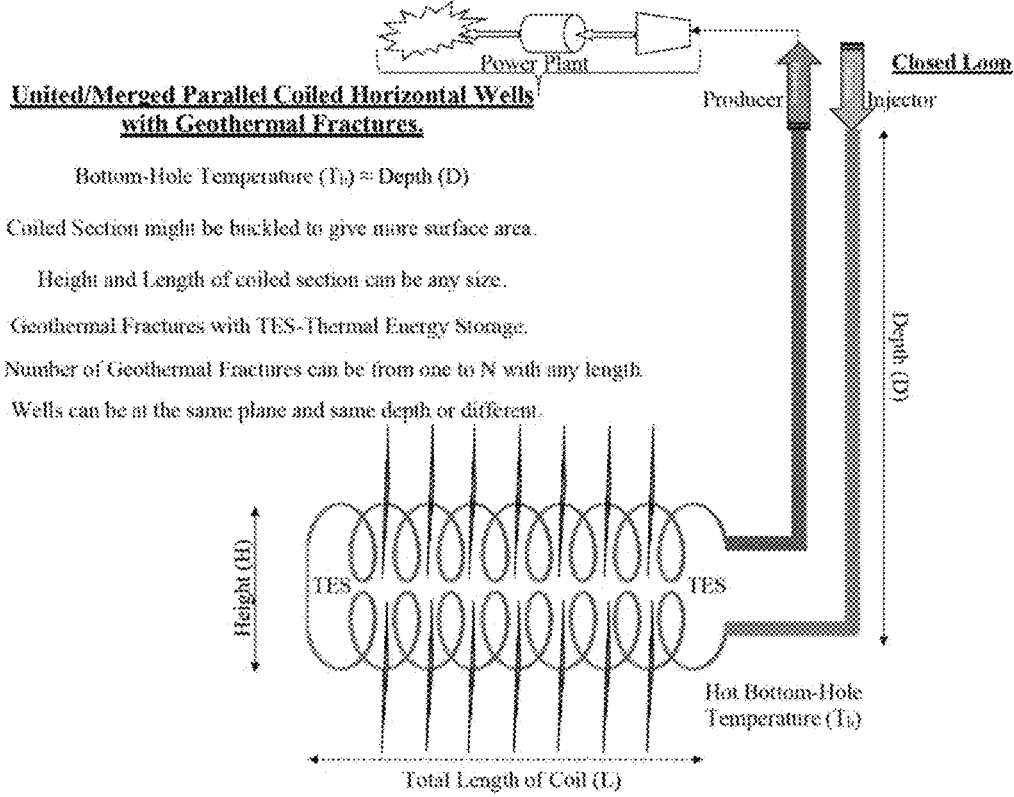
Figures 5, 119:
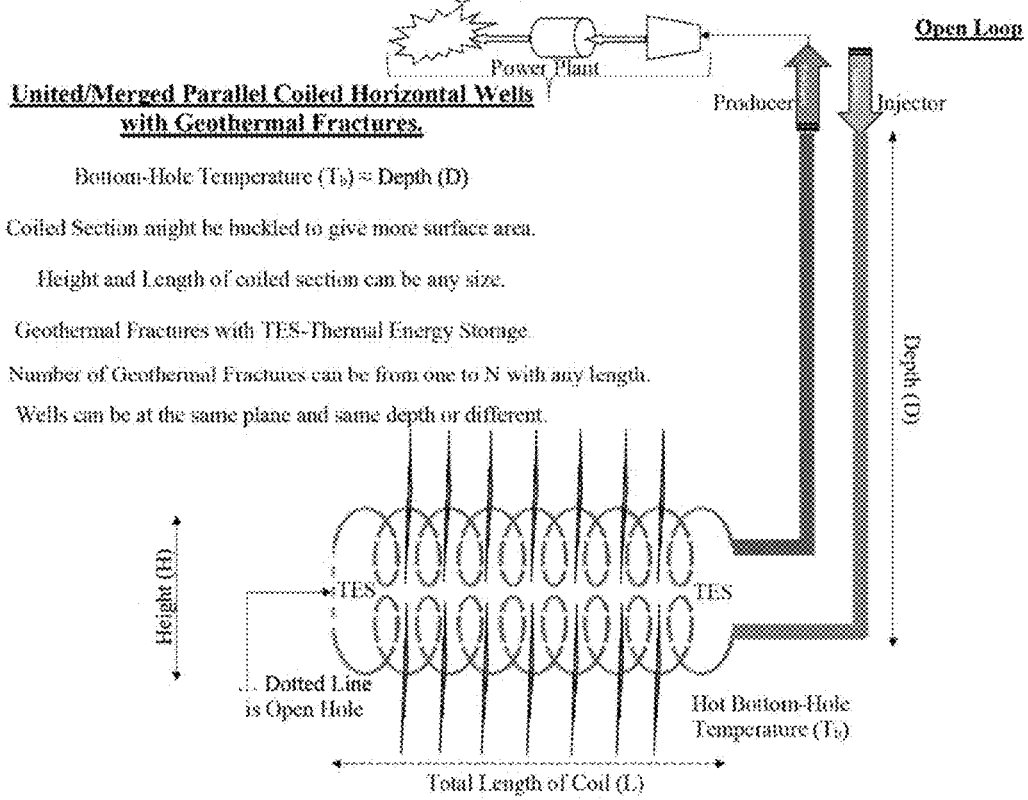
Figures 5, 120:
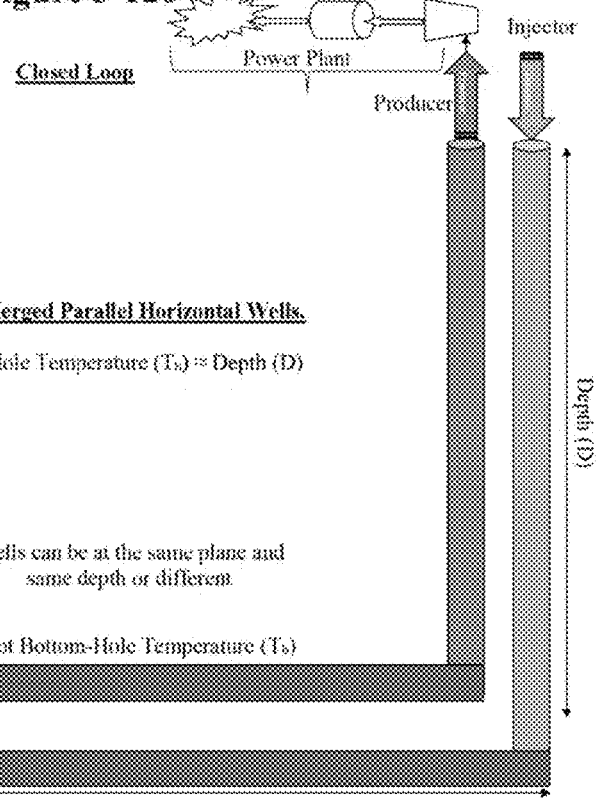
Figures 5, 121:
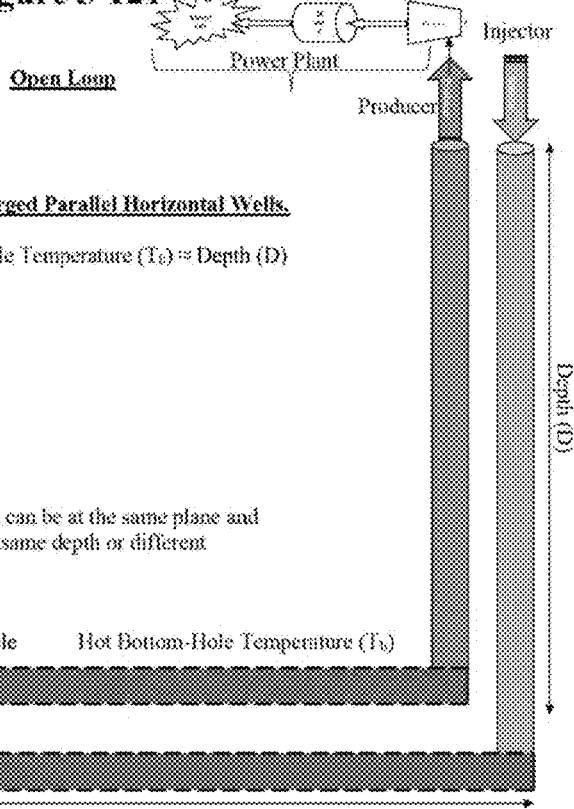
Figures 5, 122:
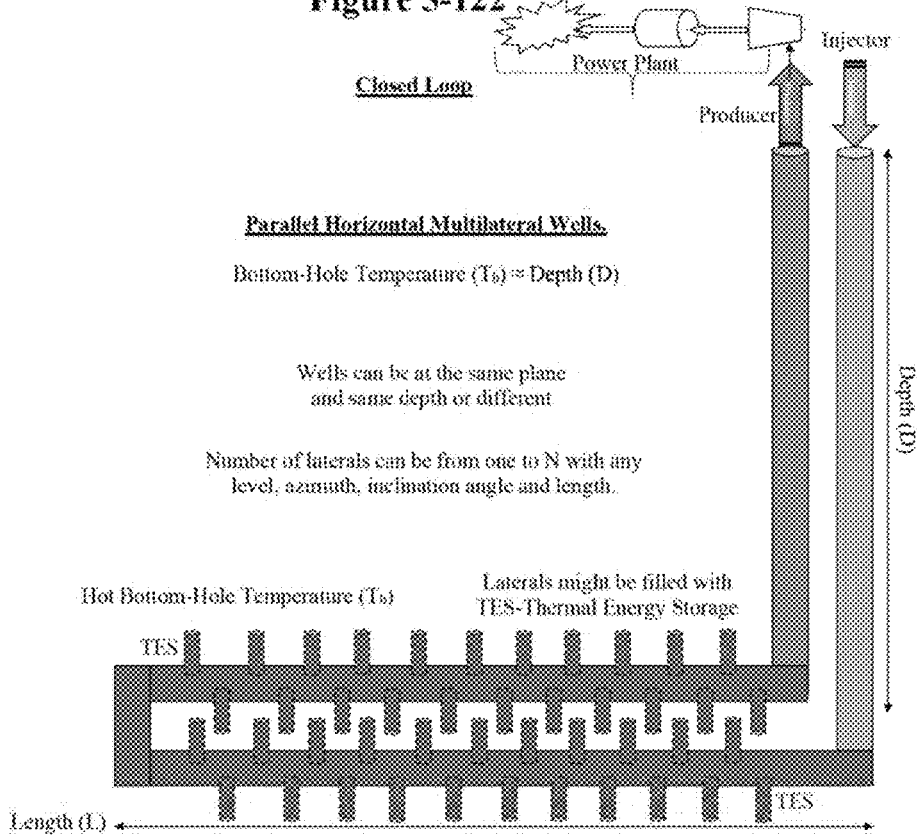
Figures 5, 123:
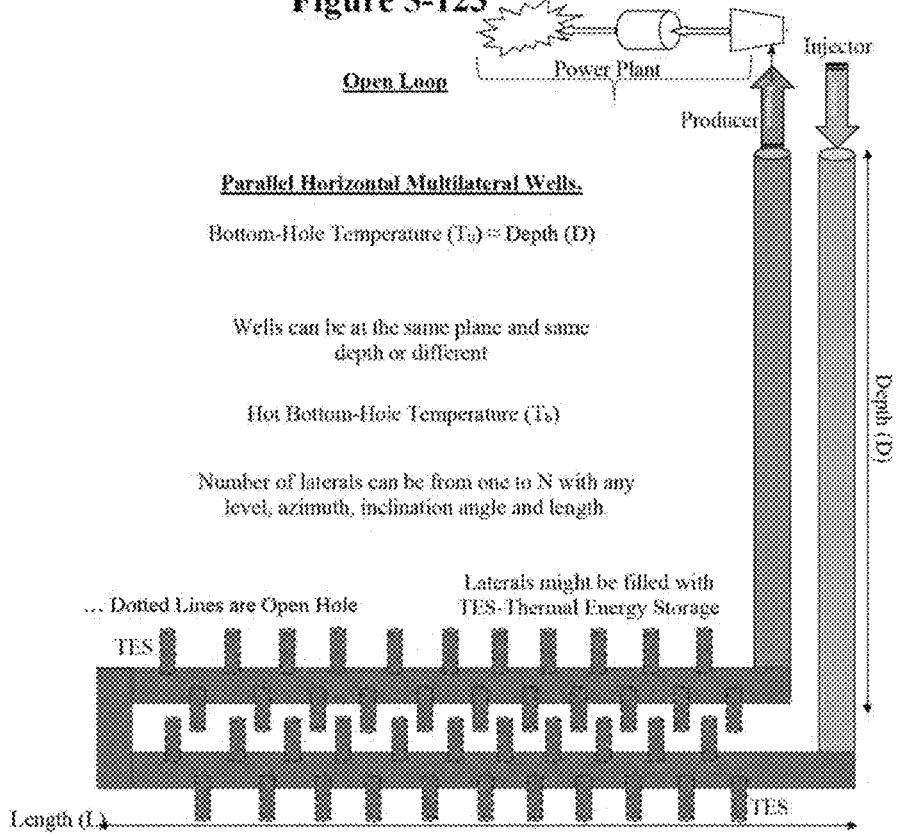
Figures 5, 126:
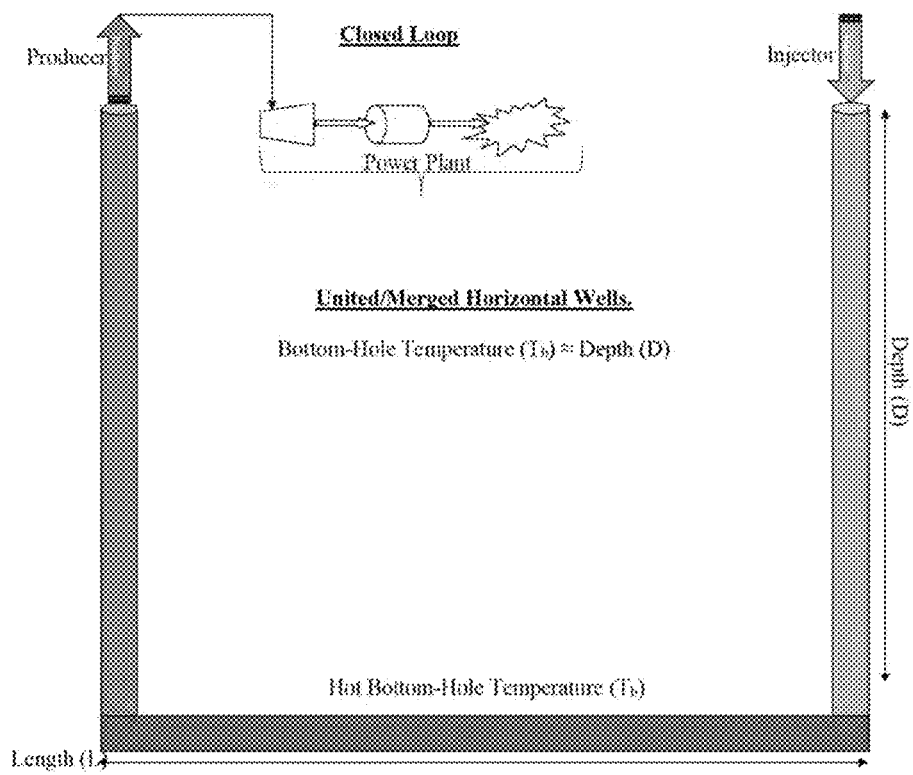
Figures 5, 127:
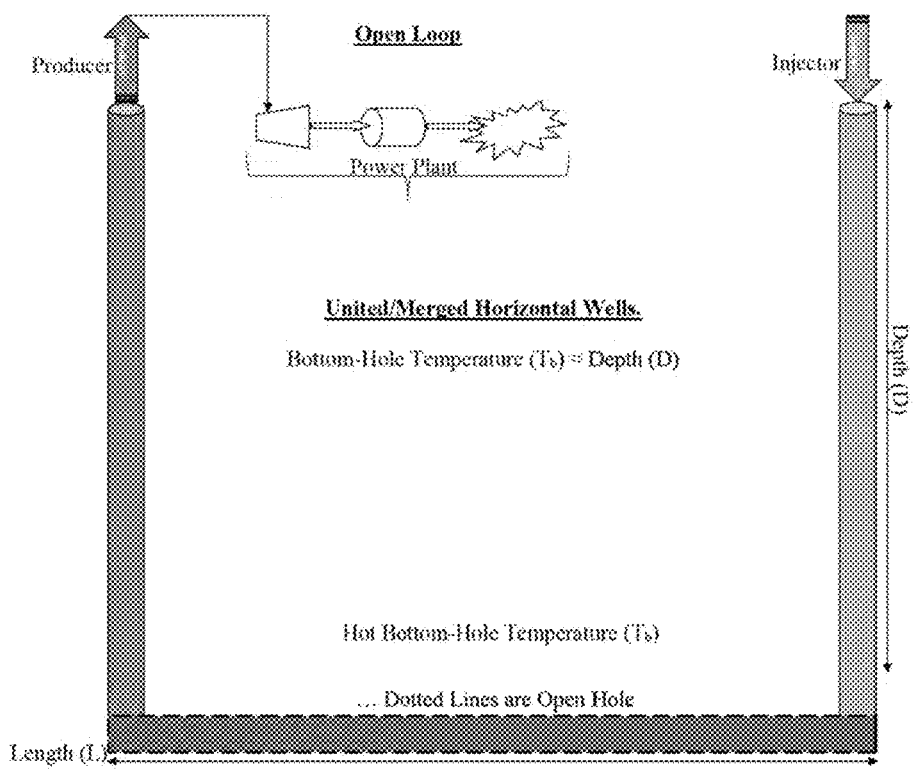
Figures 5, 128:
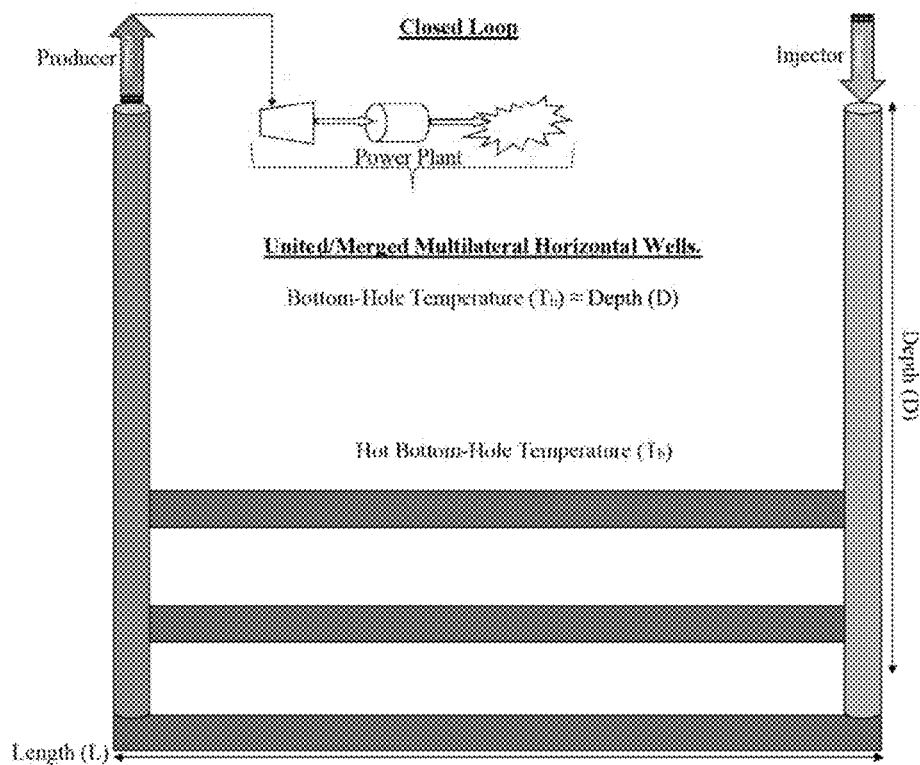
Figures 5, 129:
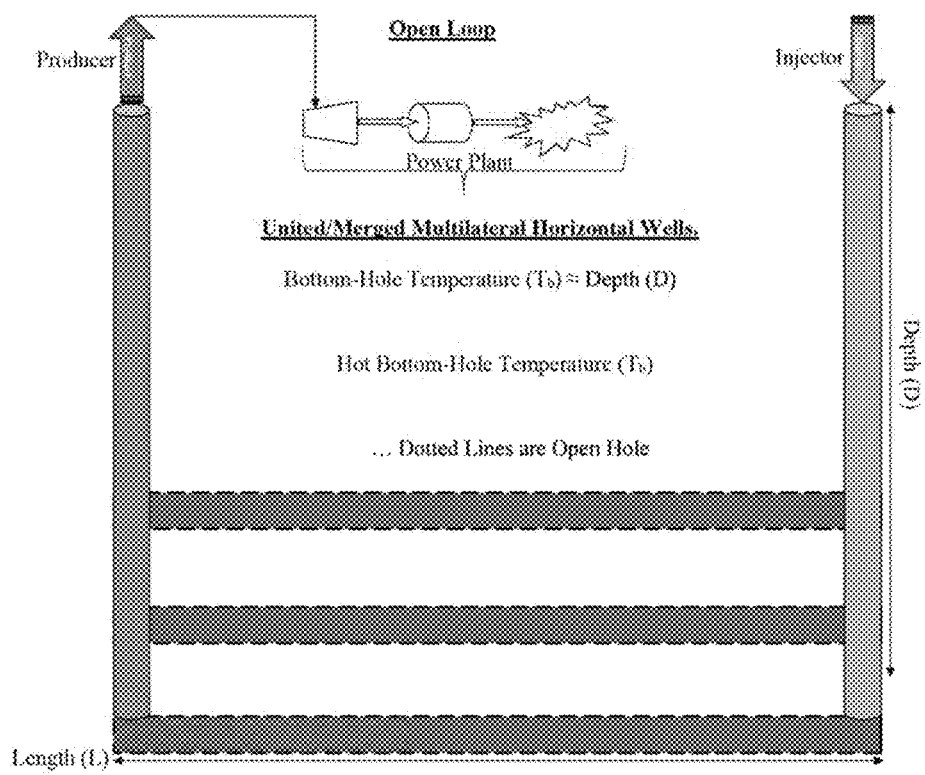
Figures 5, 130:
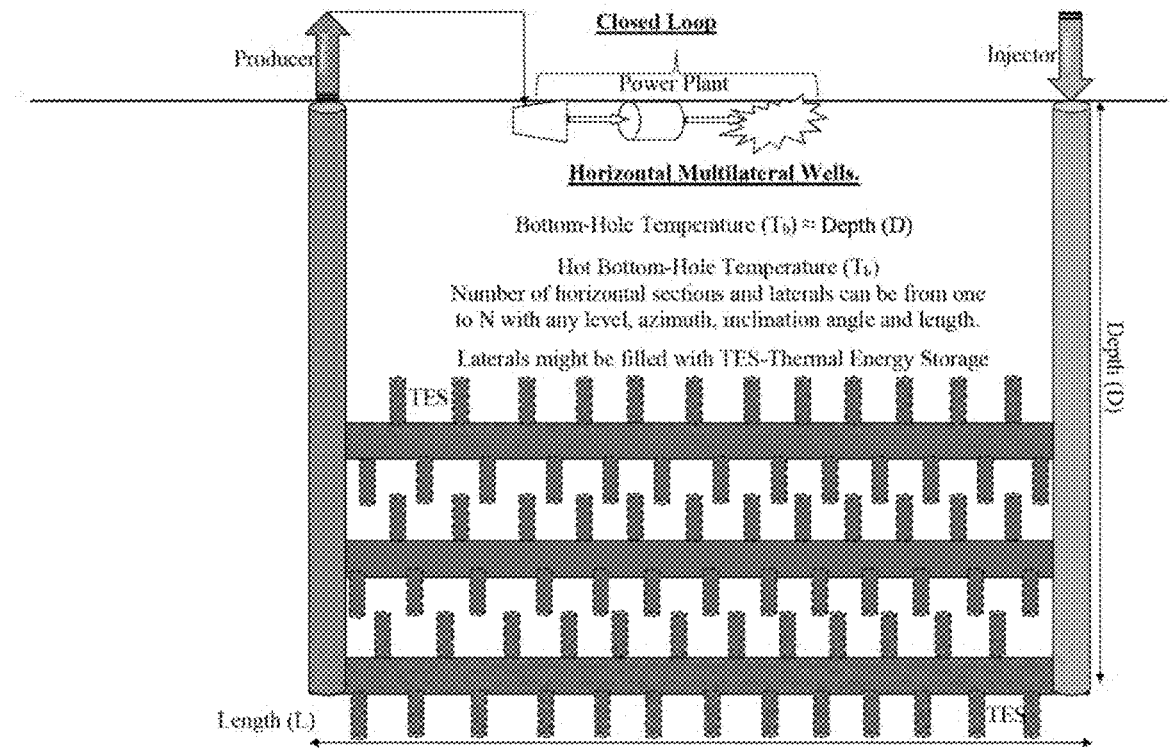
Figures 5, 131:
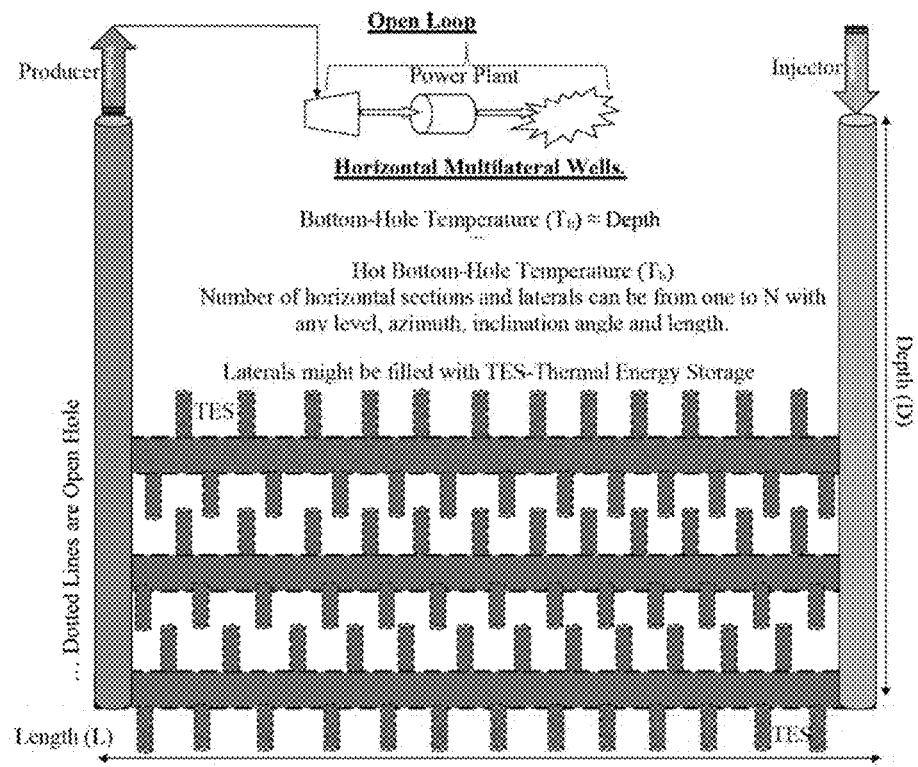
Figures 5, 132:
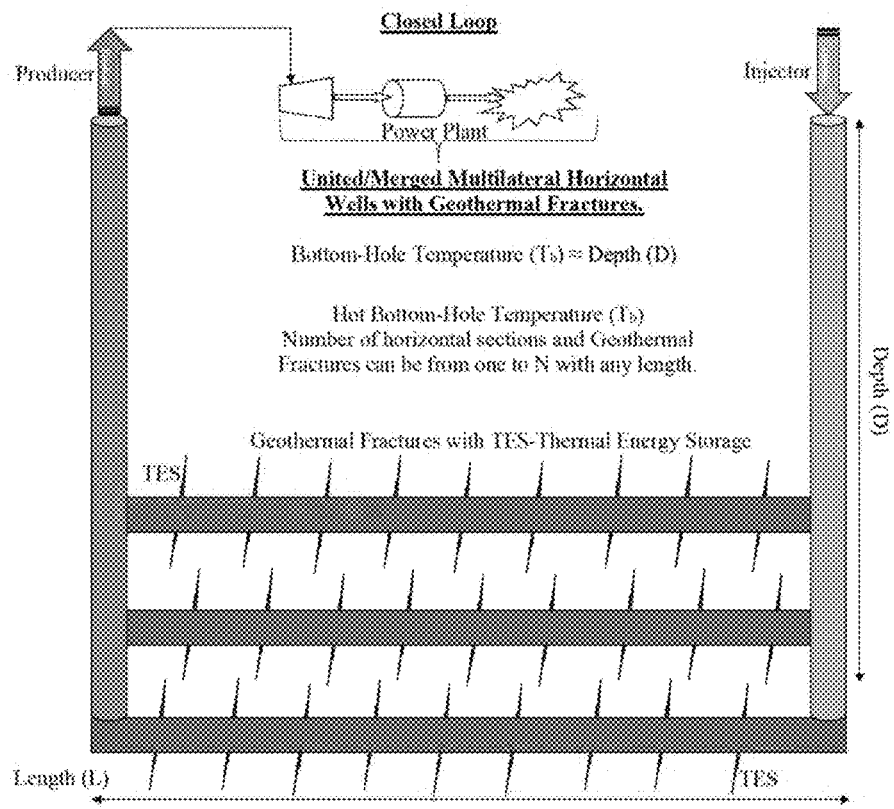
Figures 5, 133:
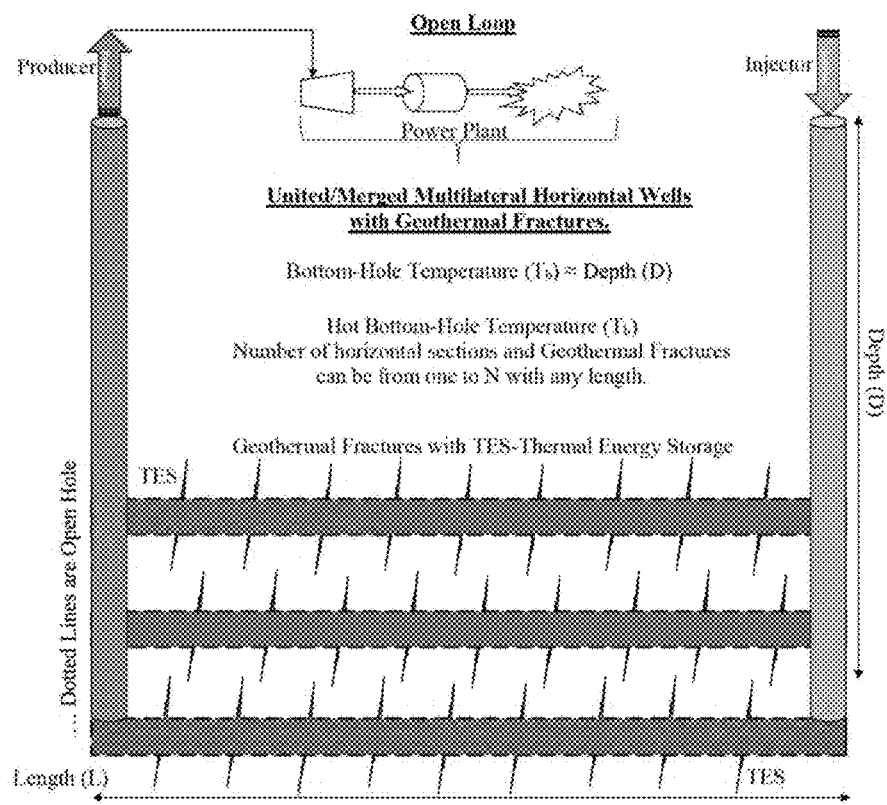
Figures 5, 134:
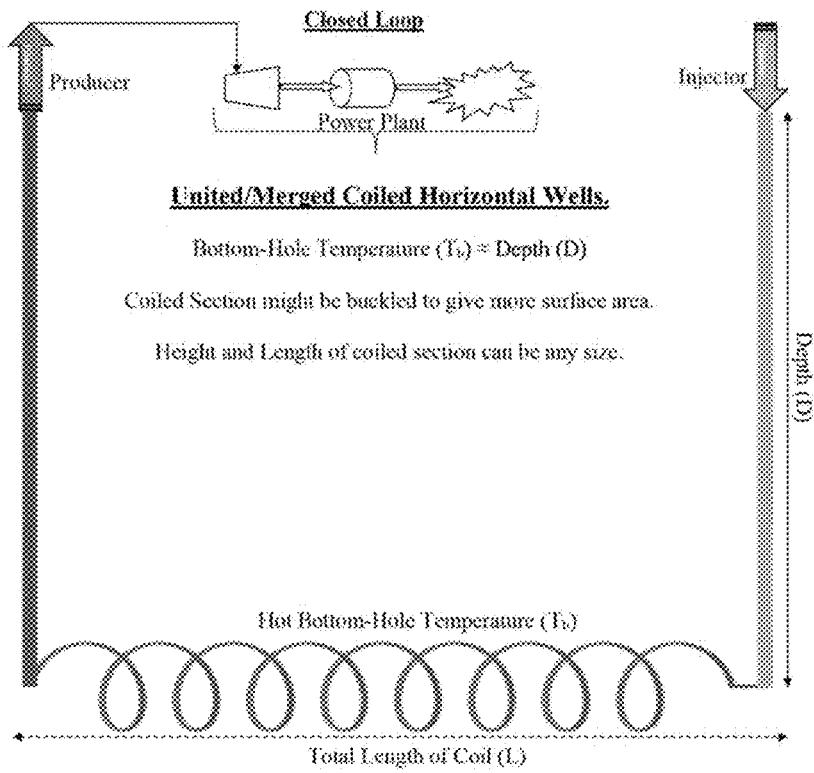
Figures 5, 135:
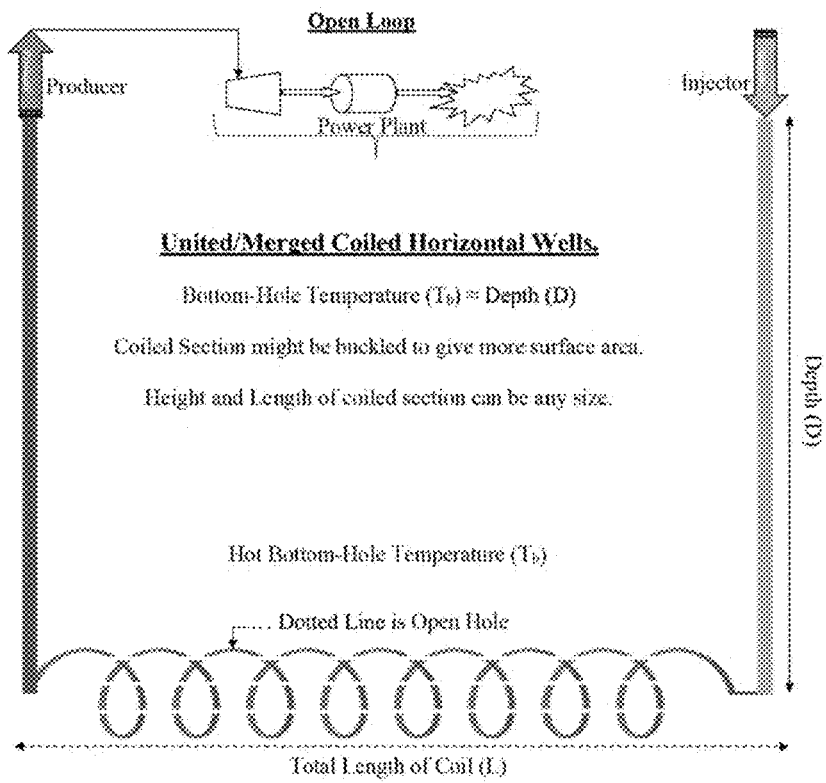
Figures 5, 136:
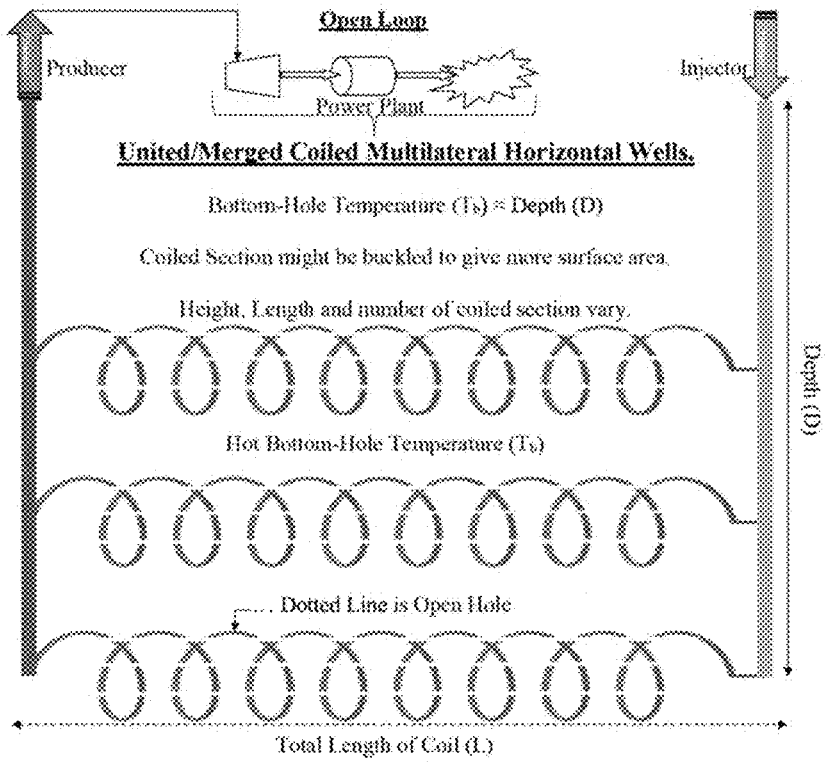
Figures 5, 137:
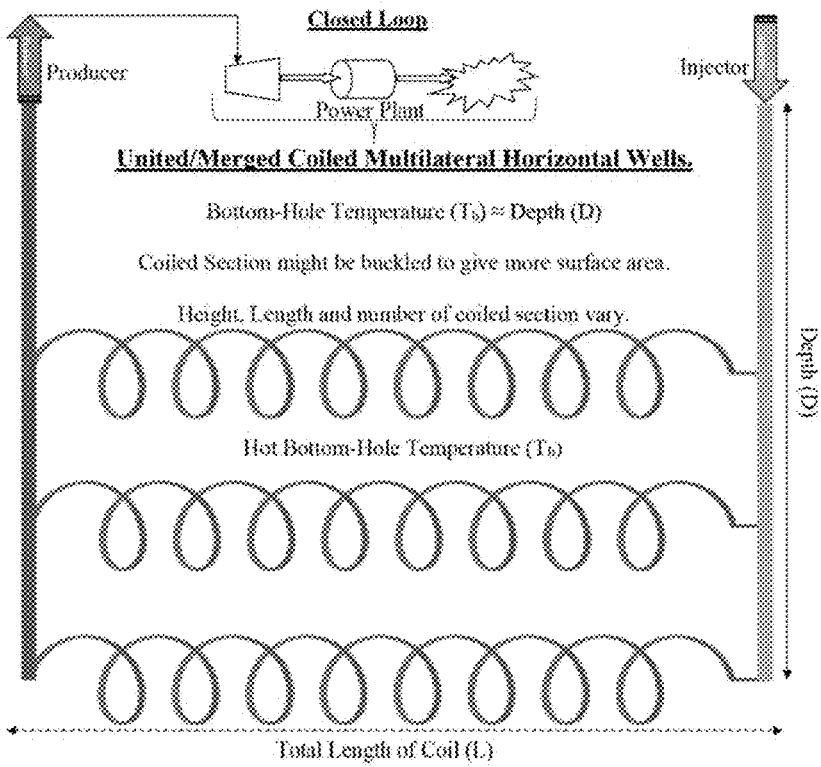
Figures 5, 138:
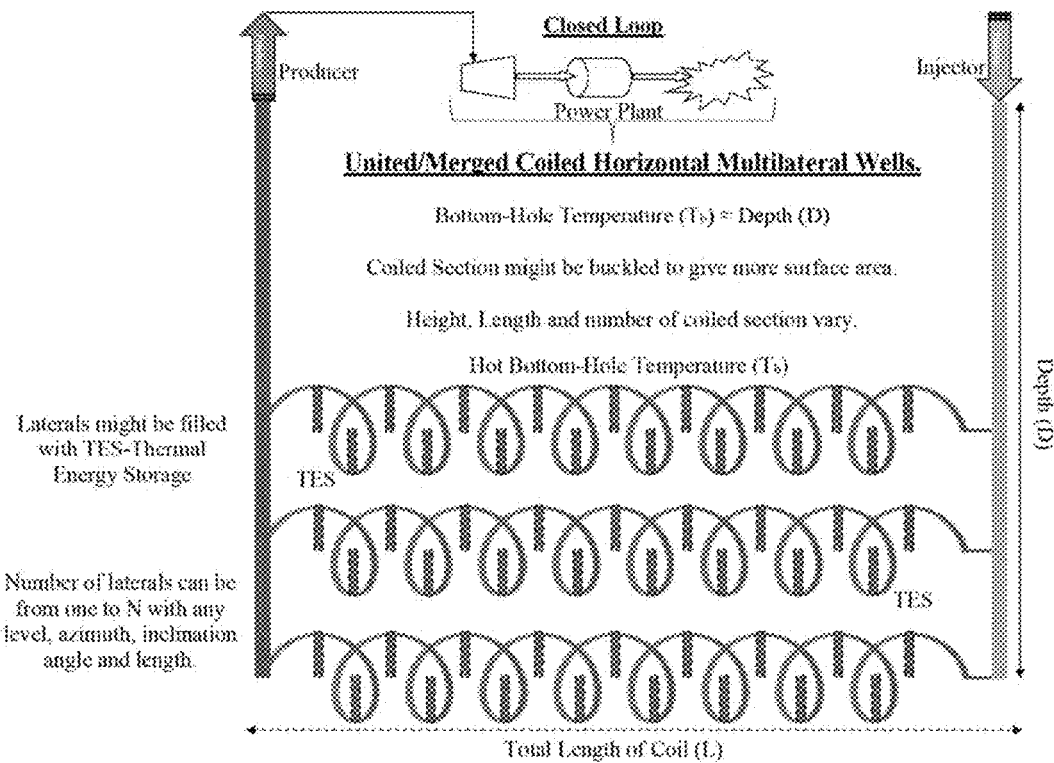
Figures 5, 139:
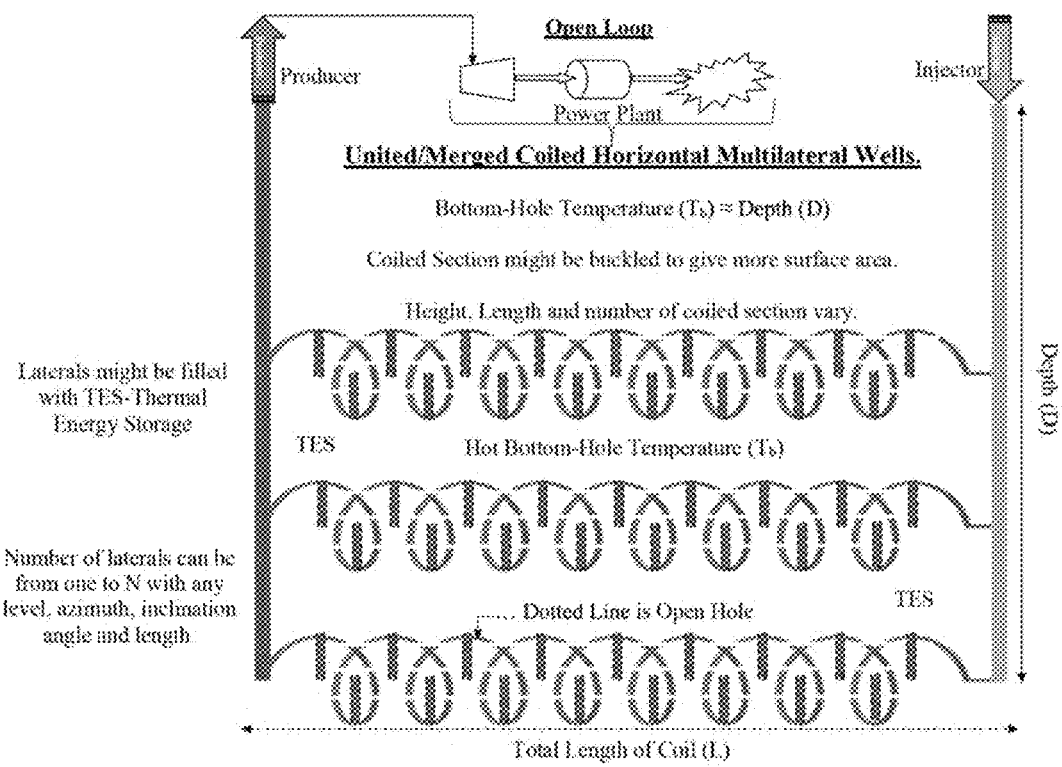
Figures 5, 142:
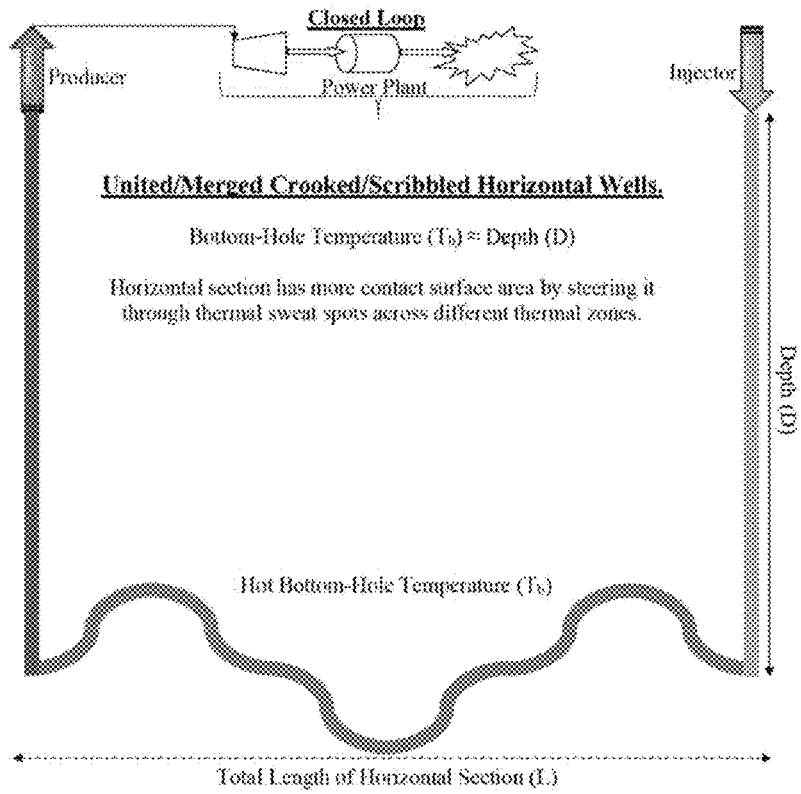
Figures 5, 143:
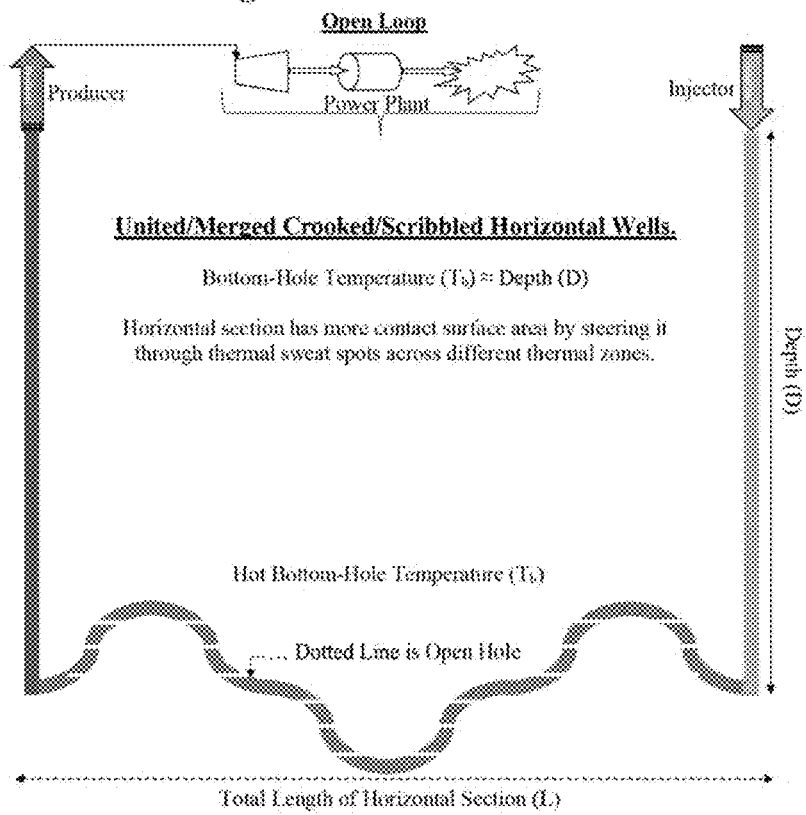
Figures 5, 144:
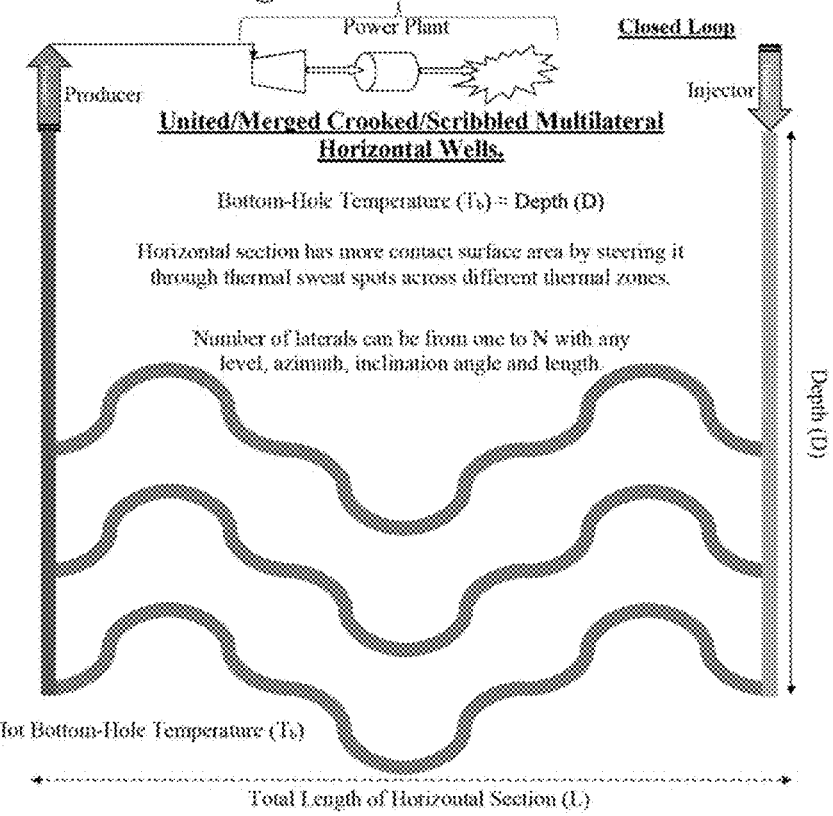
Figures 5, 145:
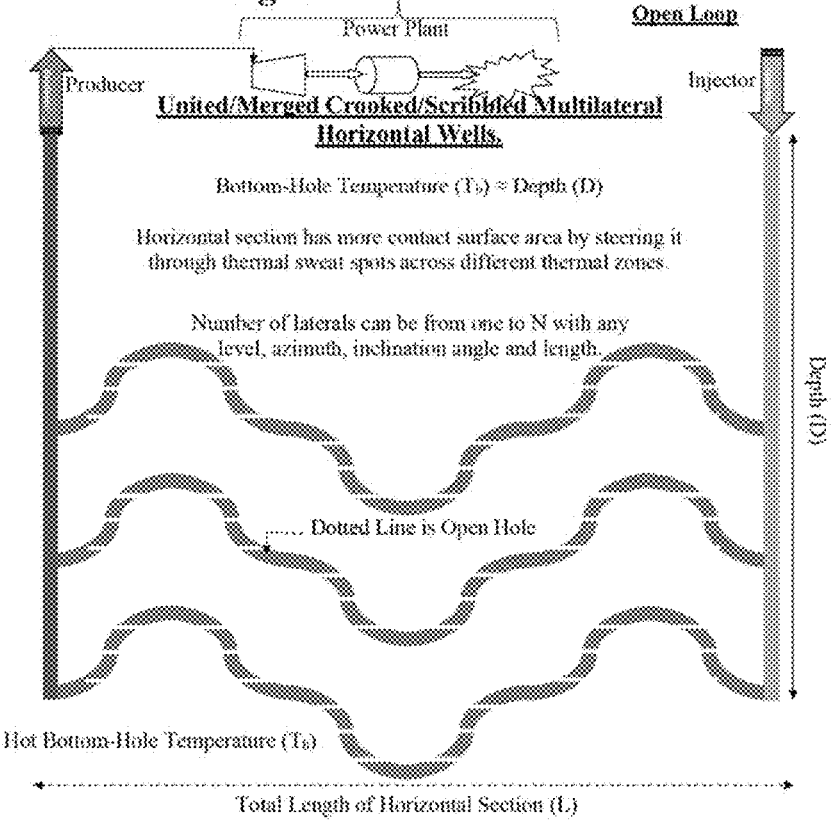
Figures 5, 146:
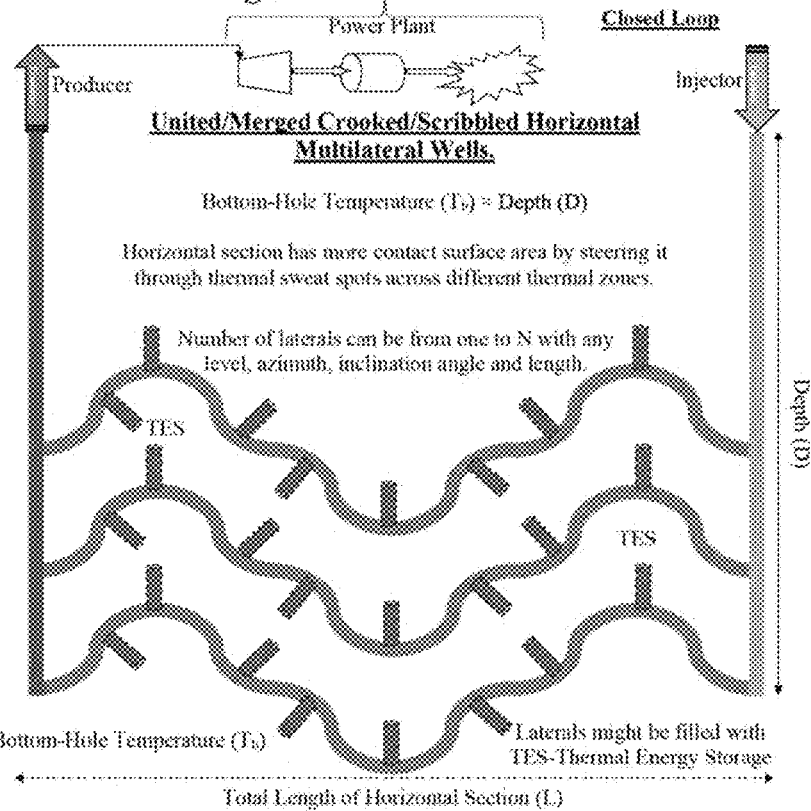
Figures 5, 147:
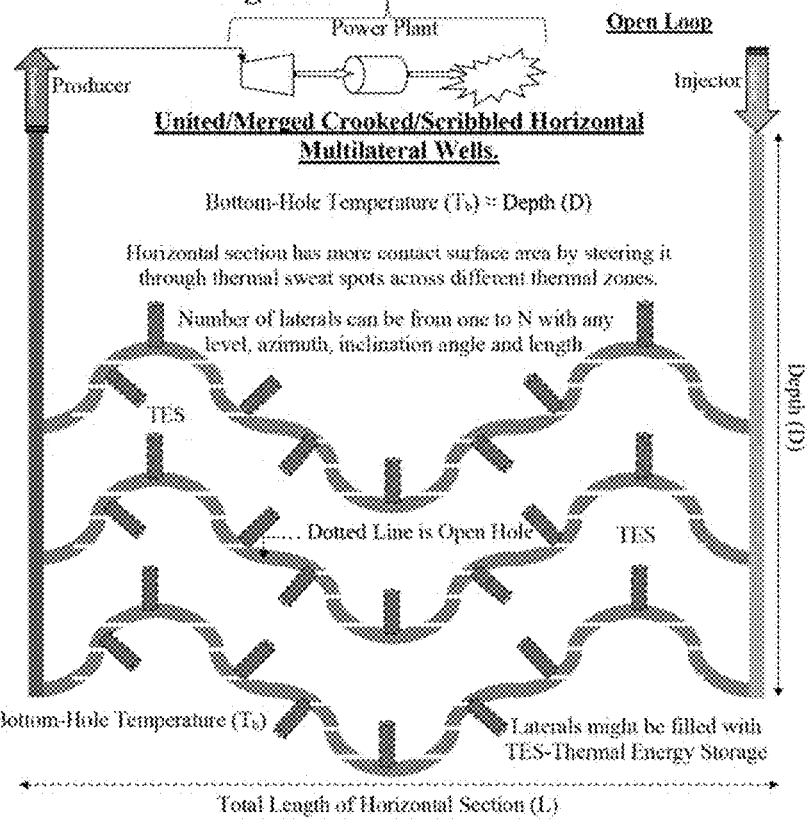
Figures 5, 148:
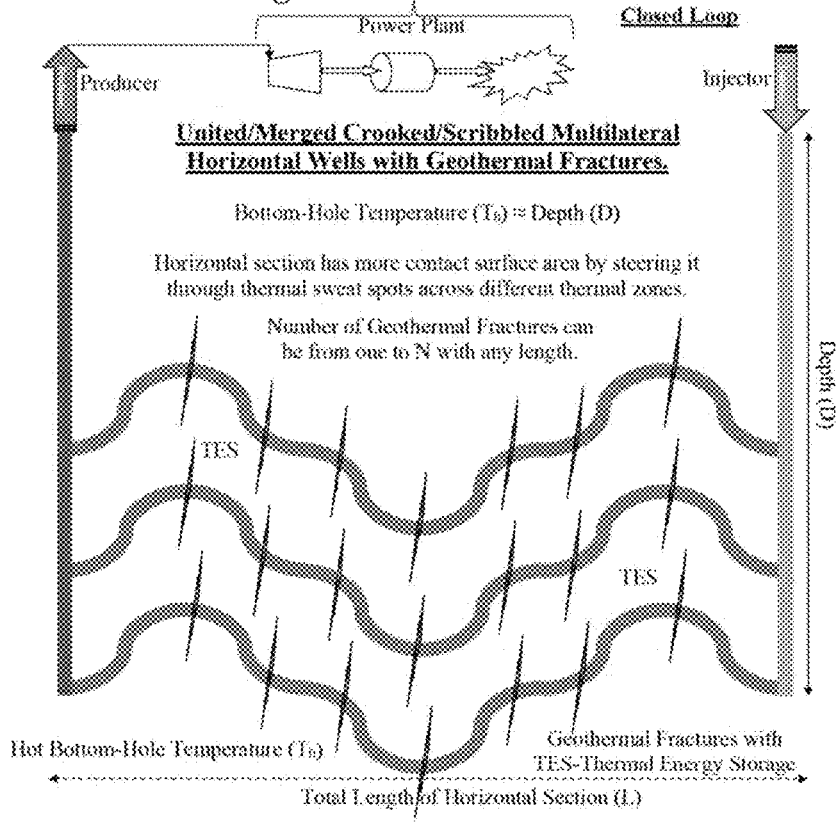
Figures 5, 149:
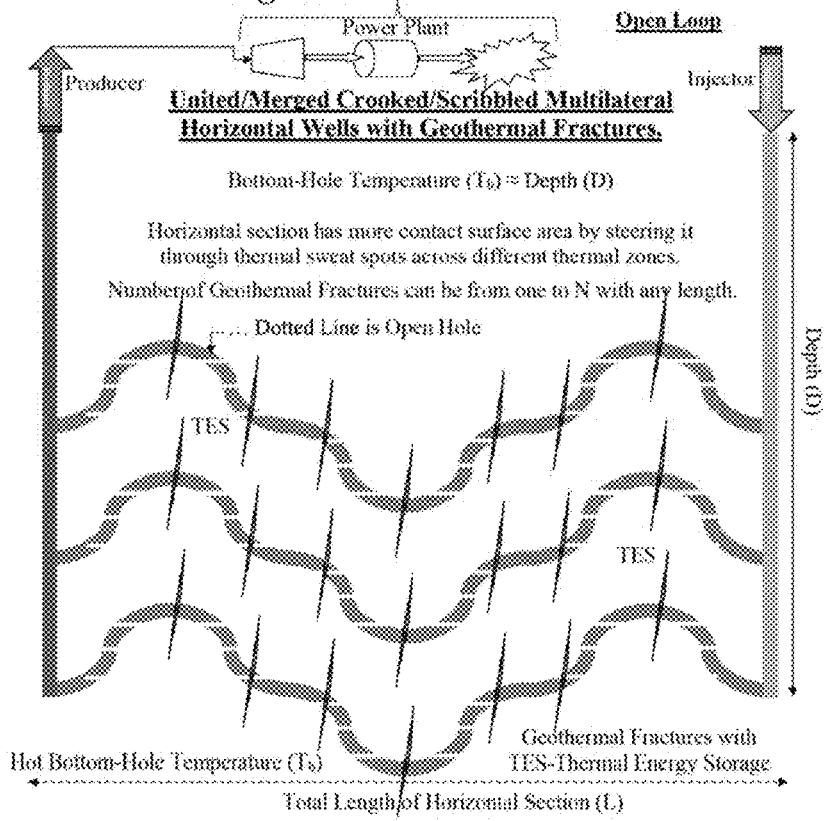
Figures 5, 150:
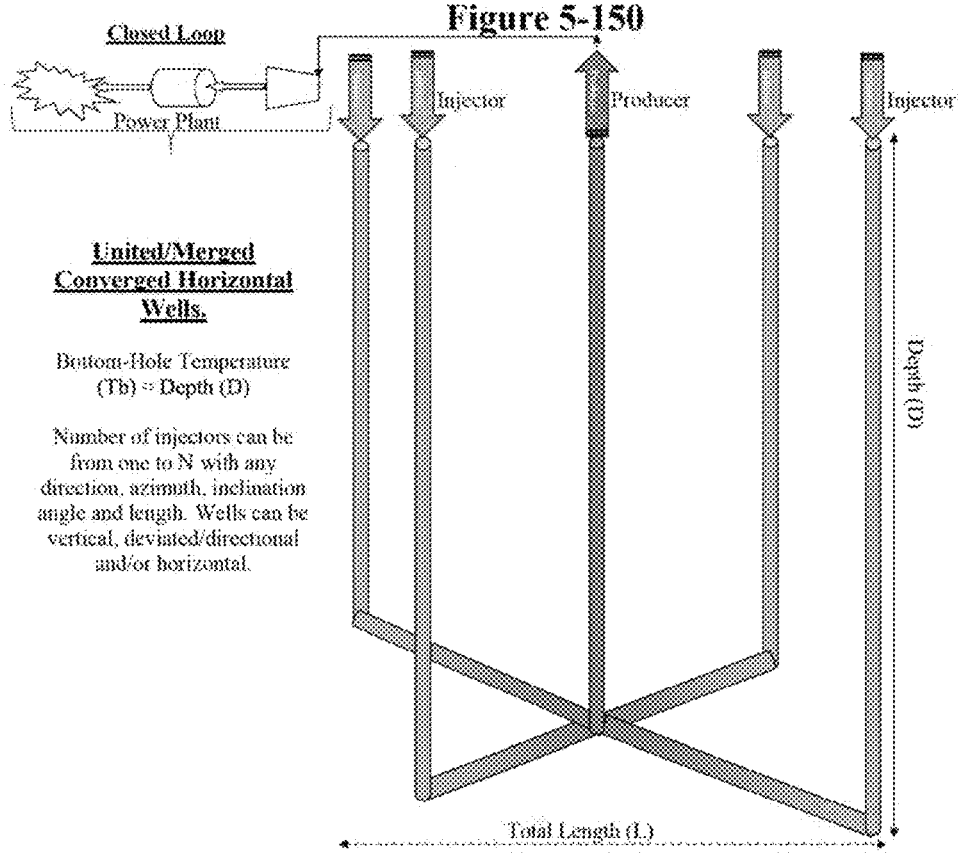
Figures 5, 151:
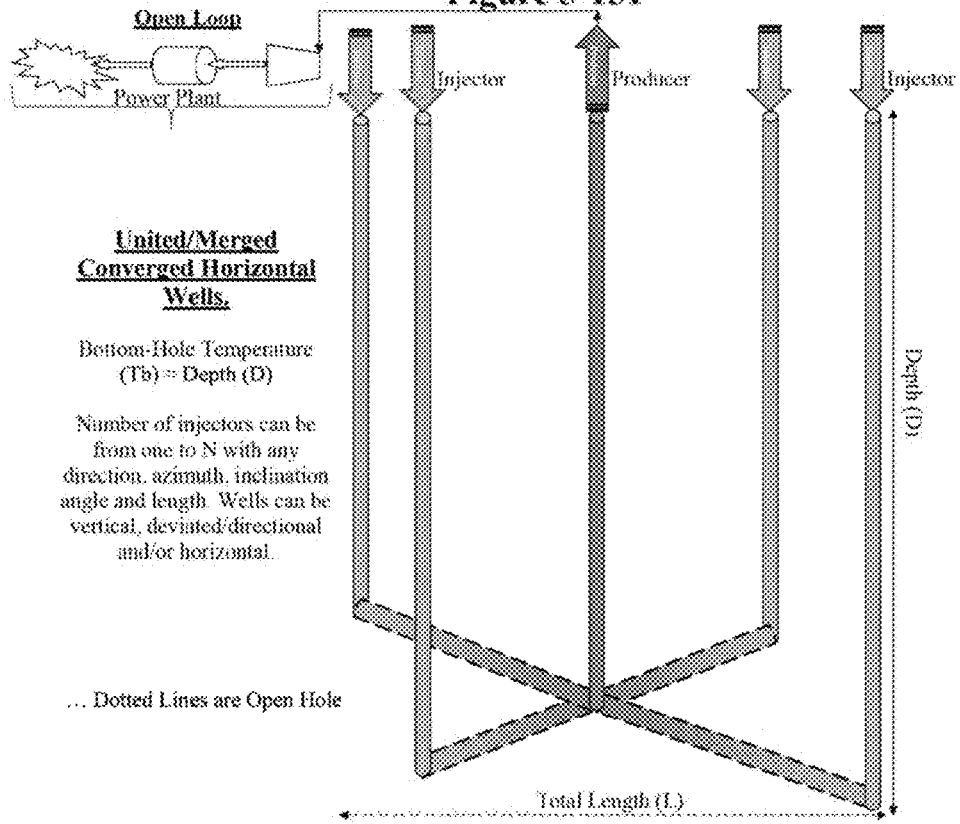
Figures 5, 152:
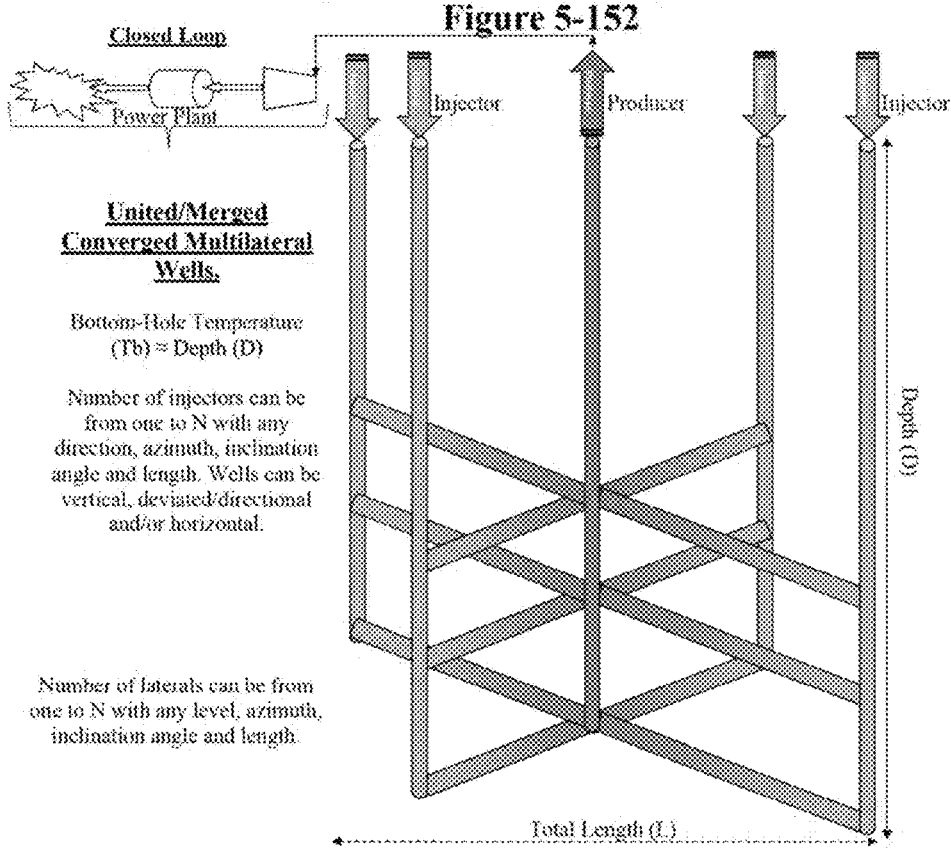
Figures 5, 153:
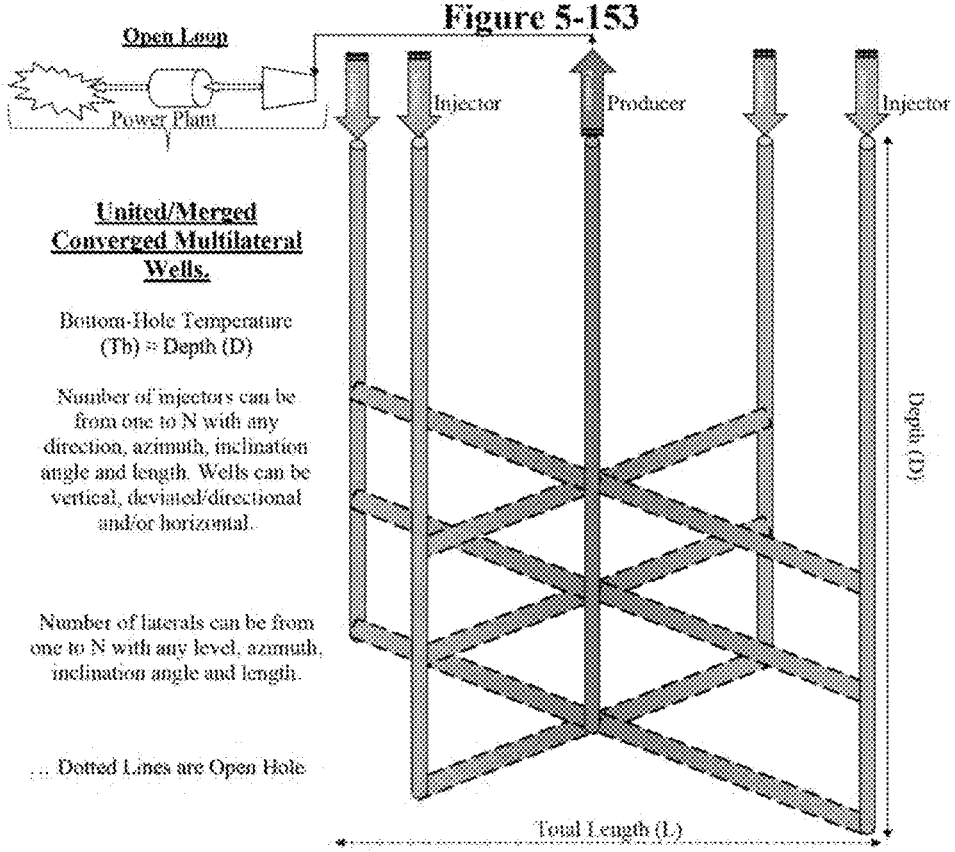
Figures 5, 154:
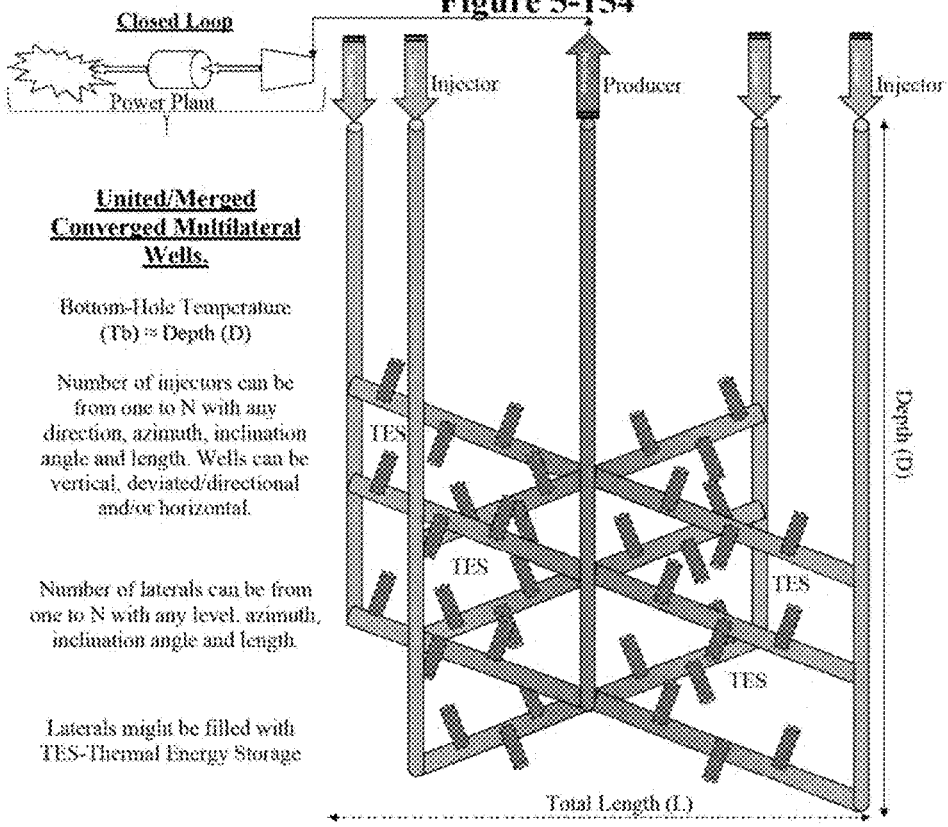
Figures 5, 155:
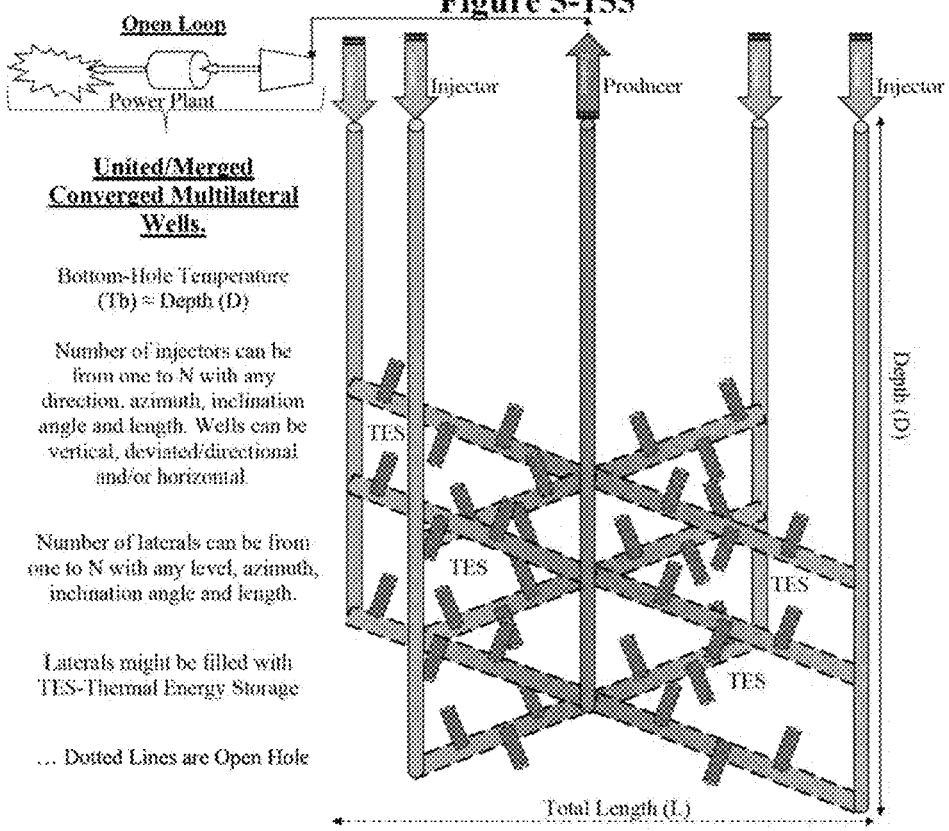
Figures 5, 156:
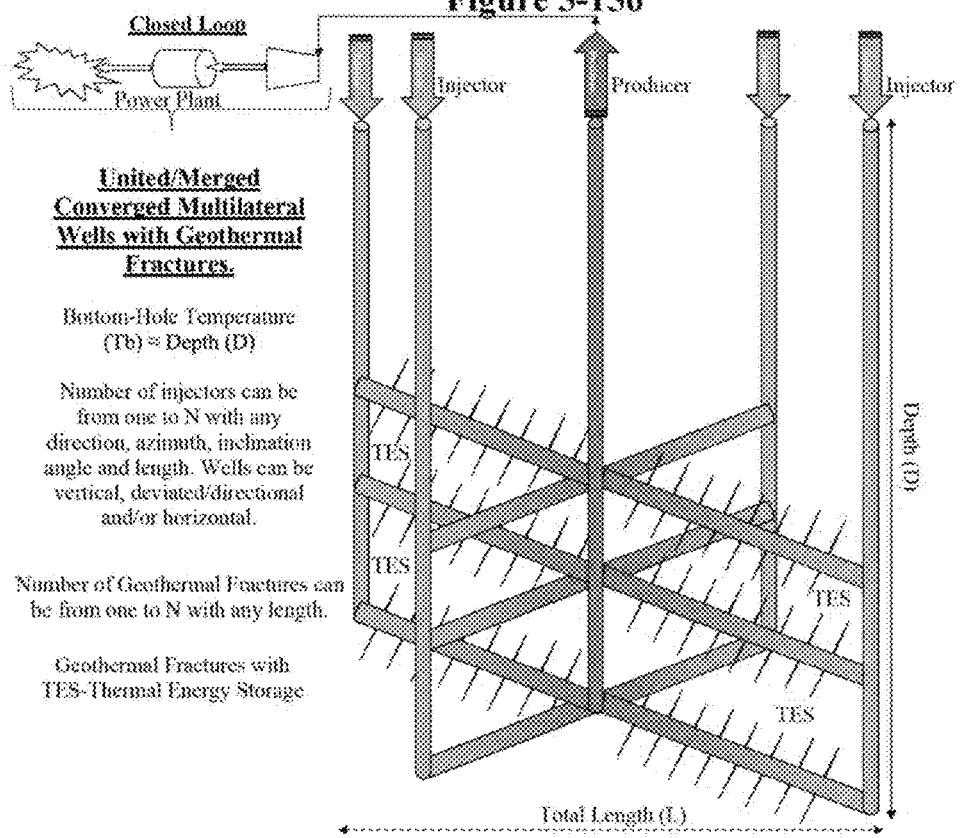
Figures 5, 157:
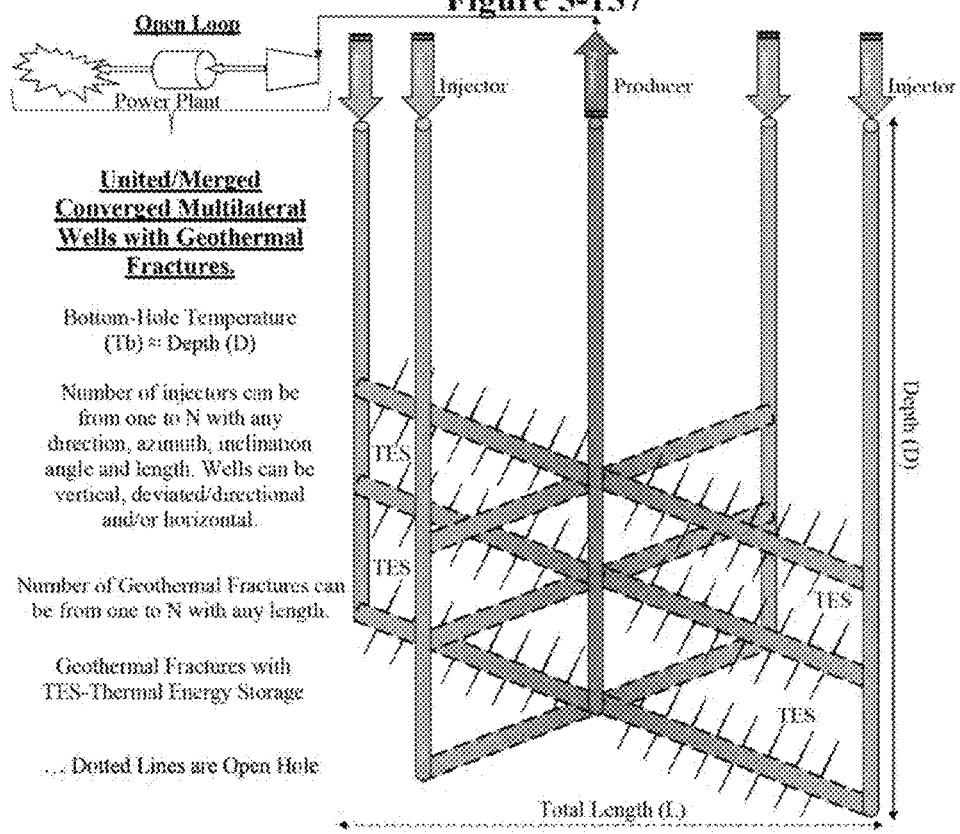
Figures 5, 158:
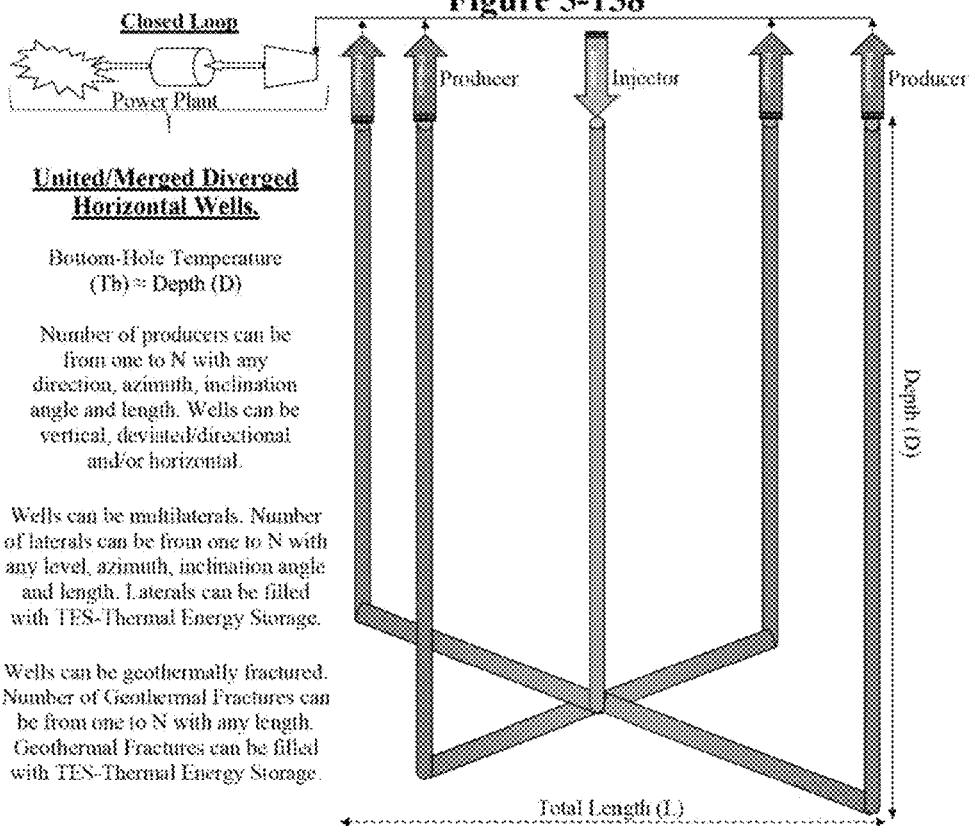
Figures 5, 159:
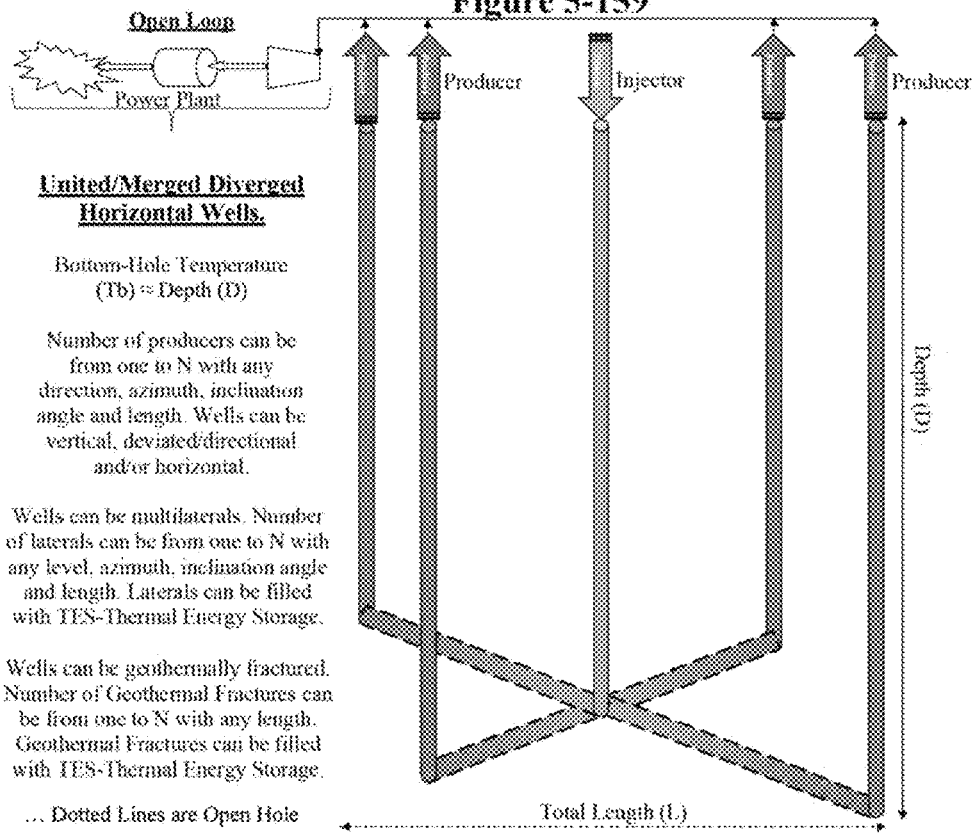
Figures 5, 160:
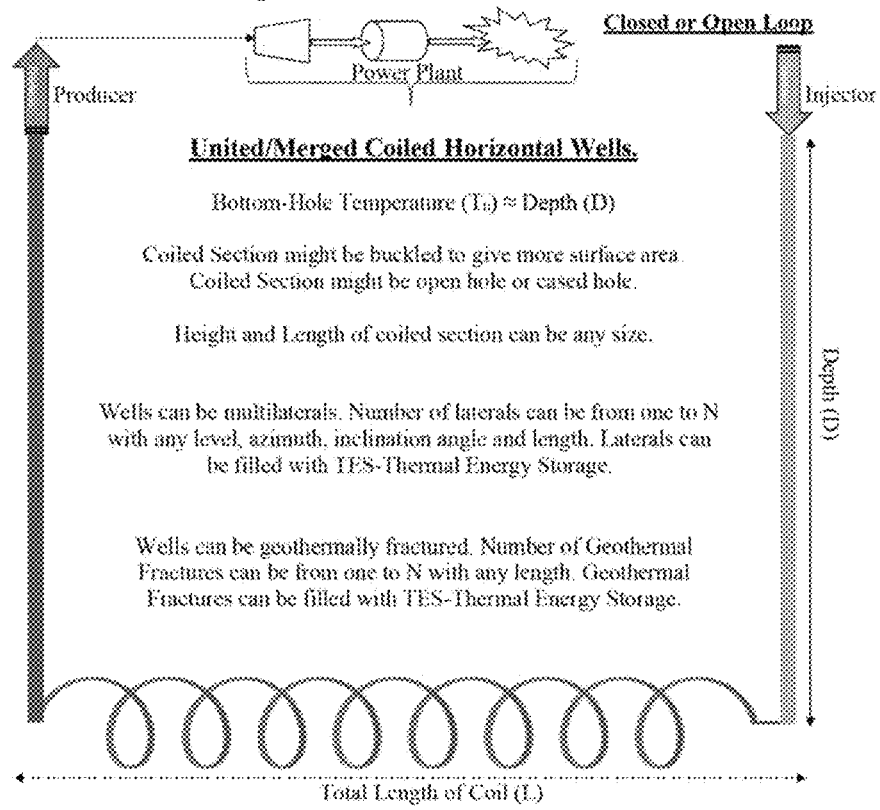
Figures 5, 161:
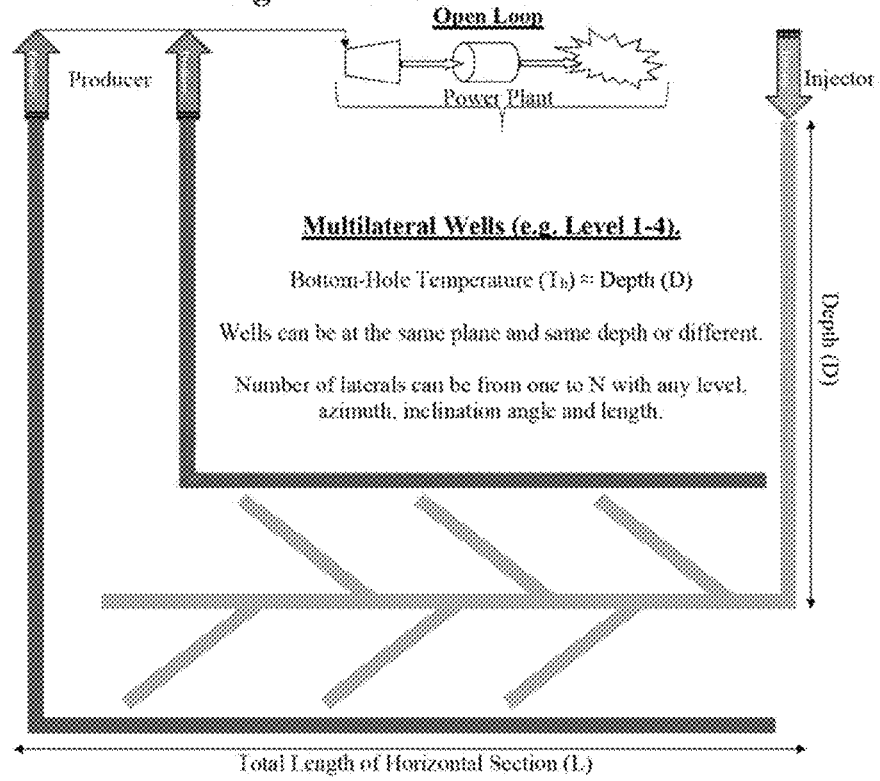
Figures 5, 162:
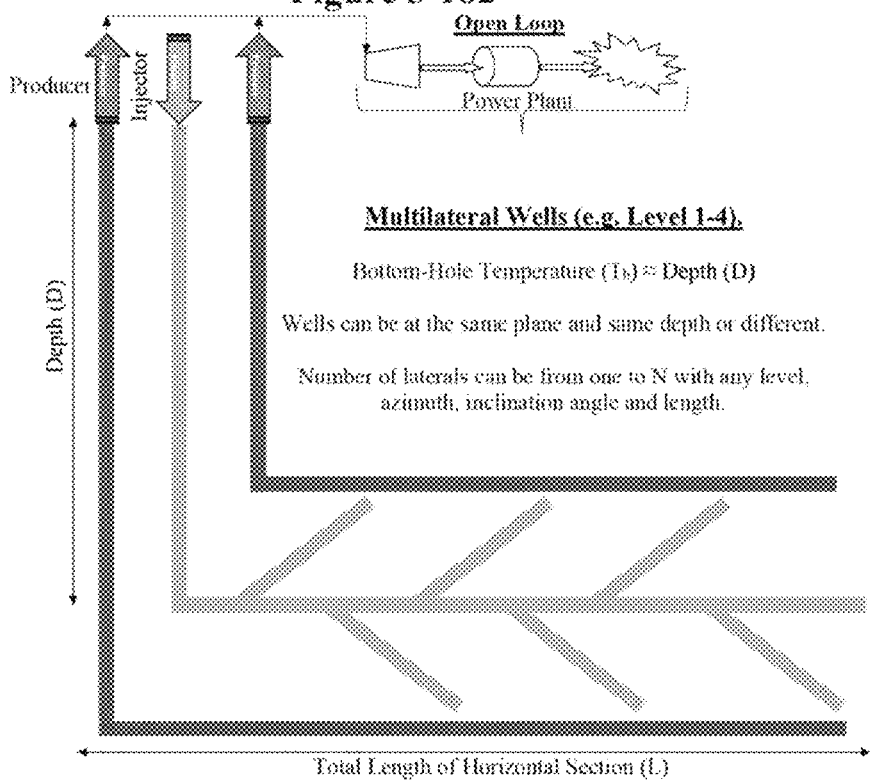
Figures 5, 163:
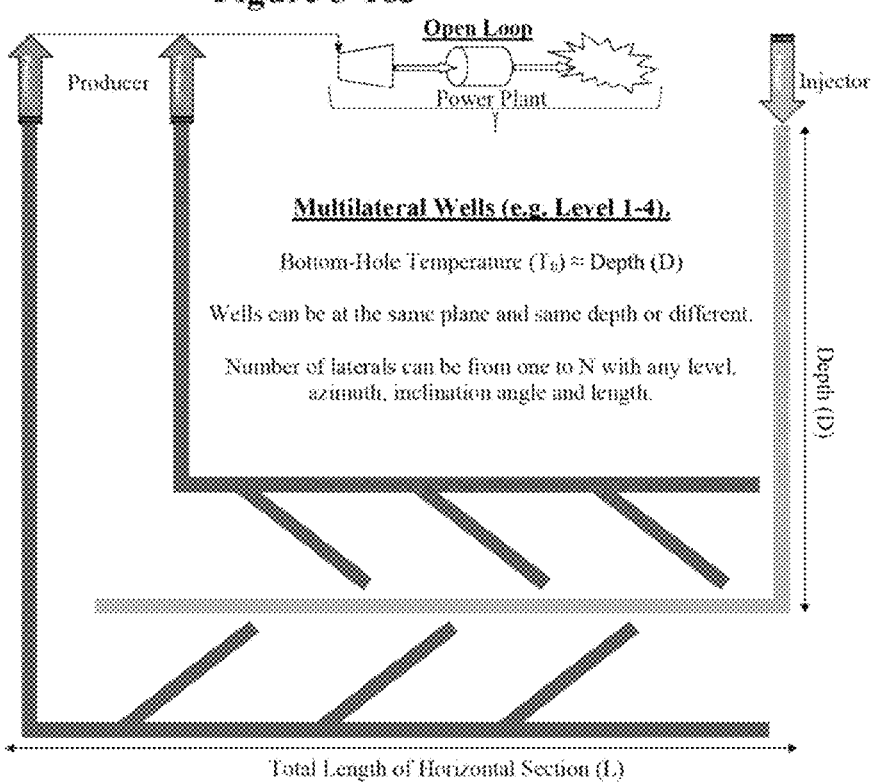
Figures 5, 164:
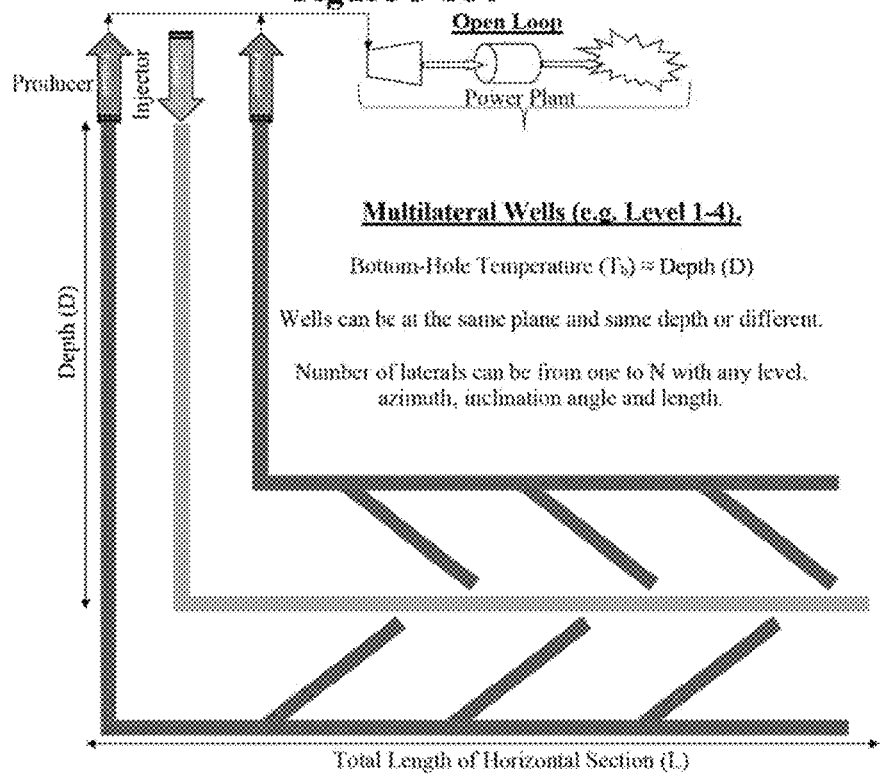
Figures 5, 165:
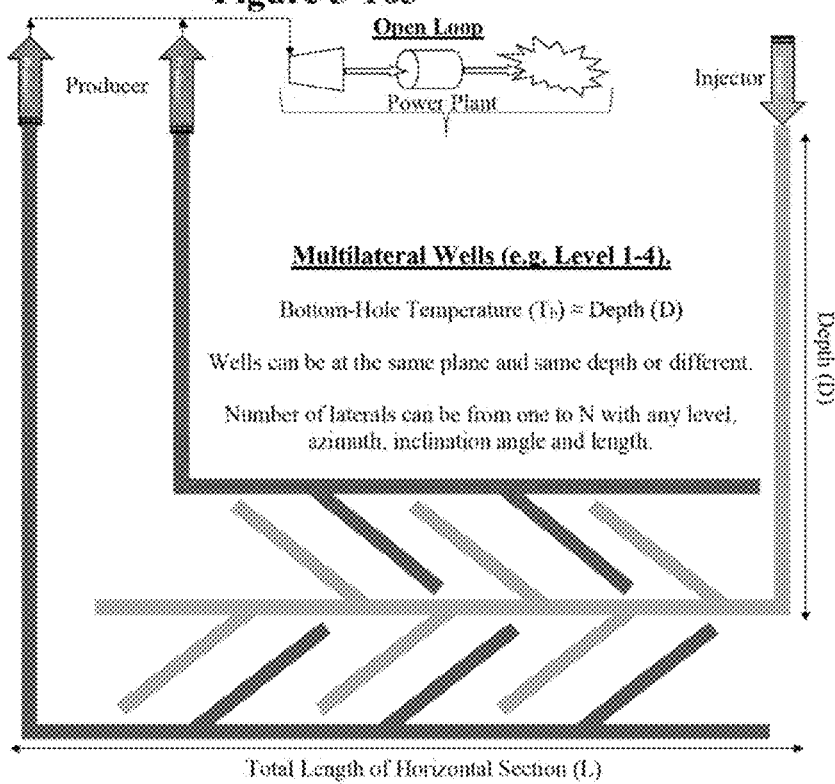
Figures 5, 166:
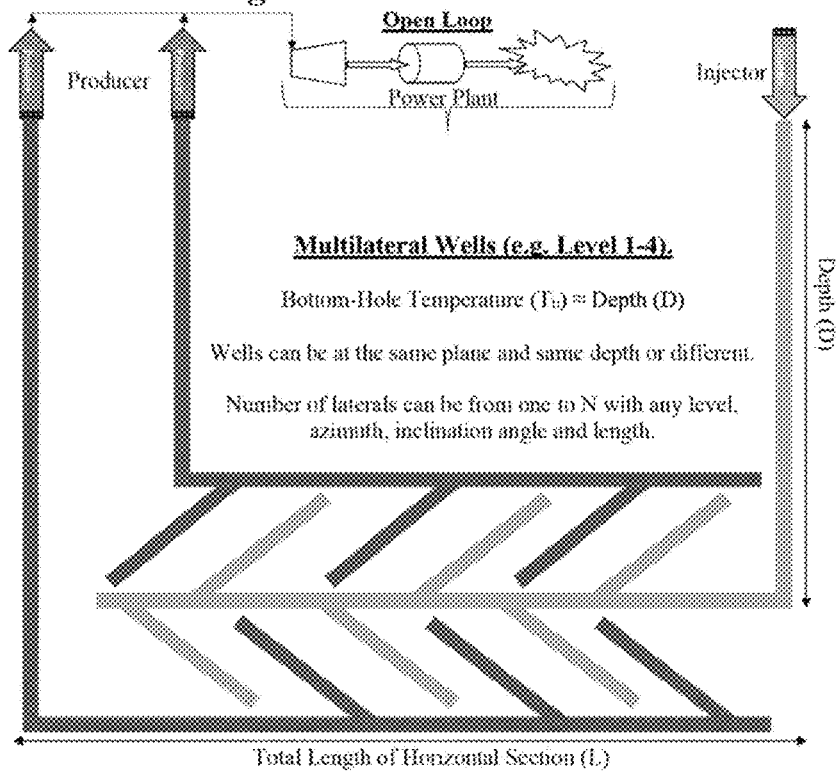
Figures 5, 167:
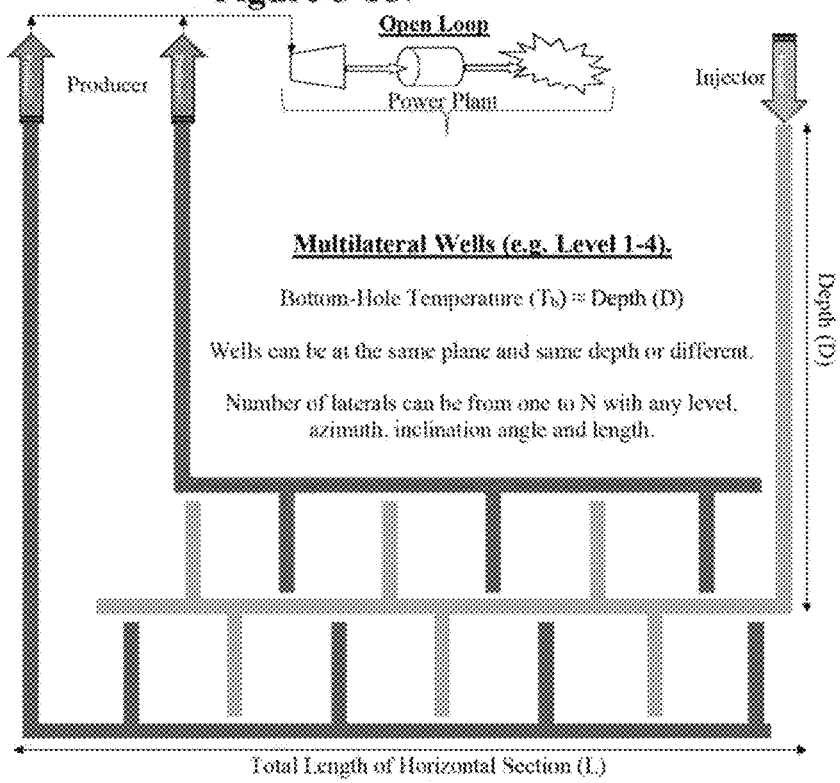
Figures 5, 168:
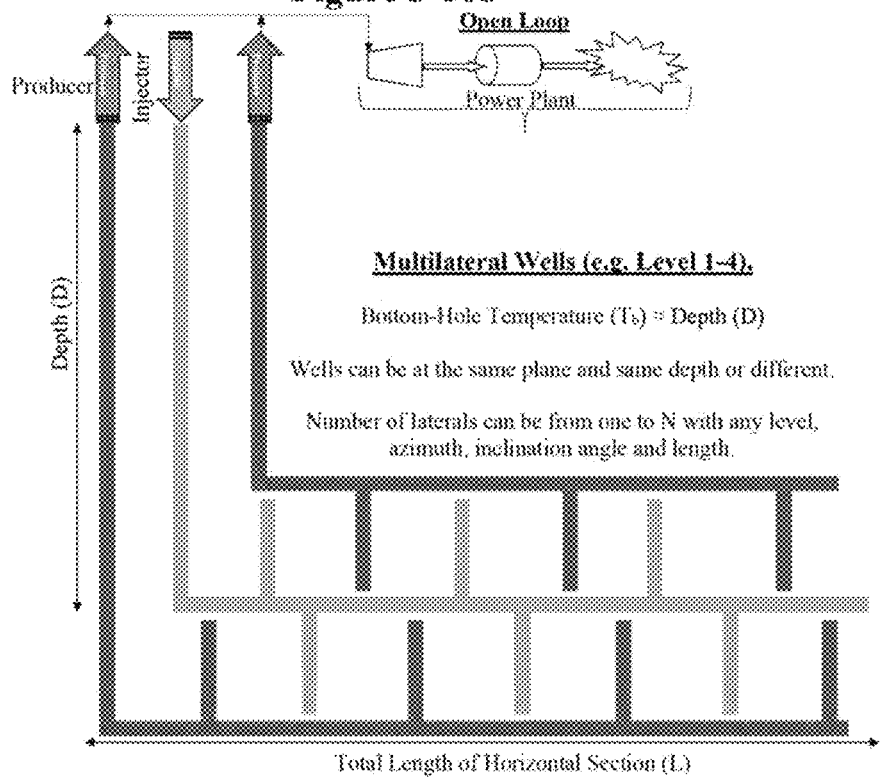
Figures 5, 169:
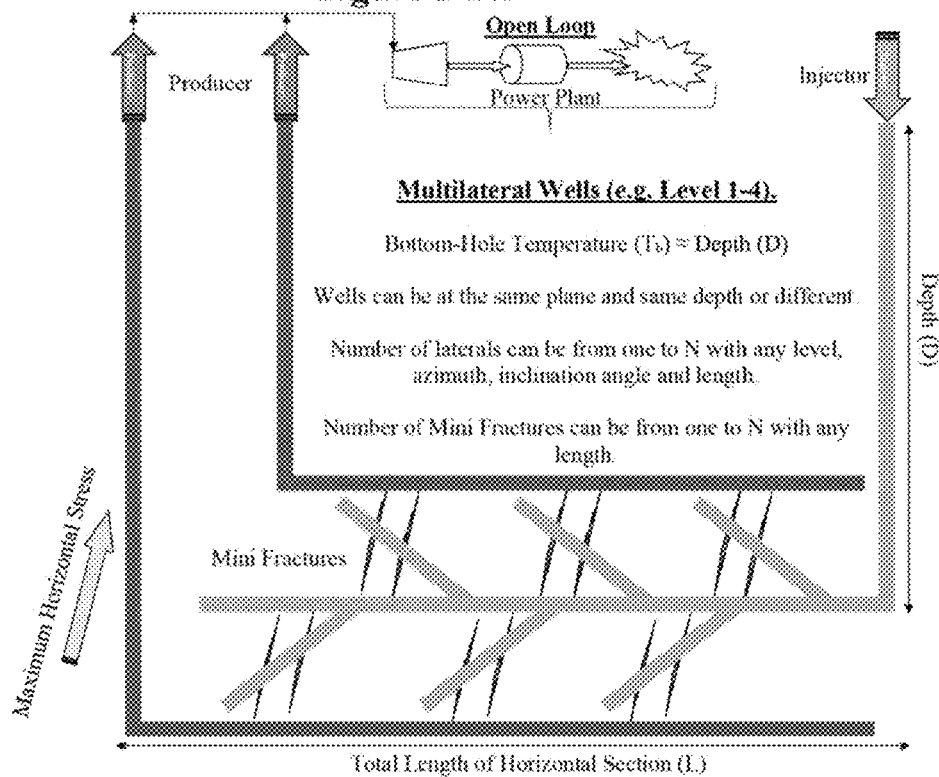
Figures 5, 170:
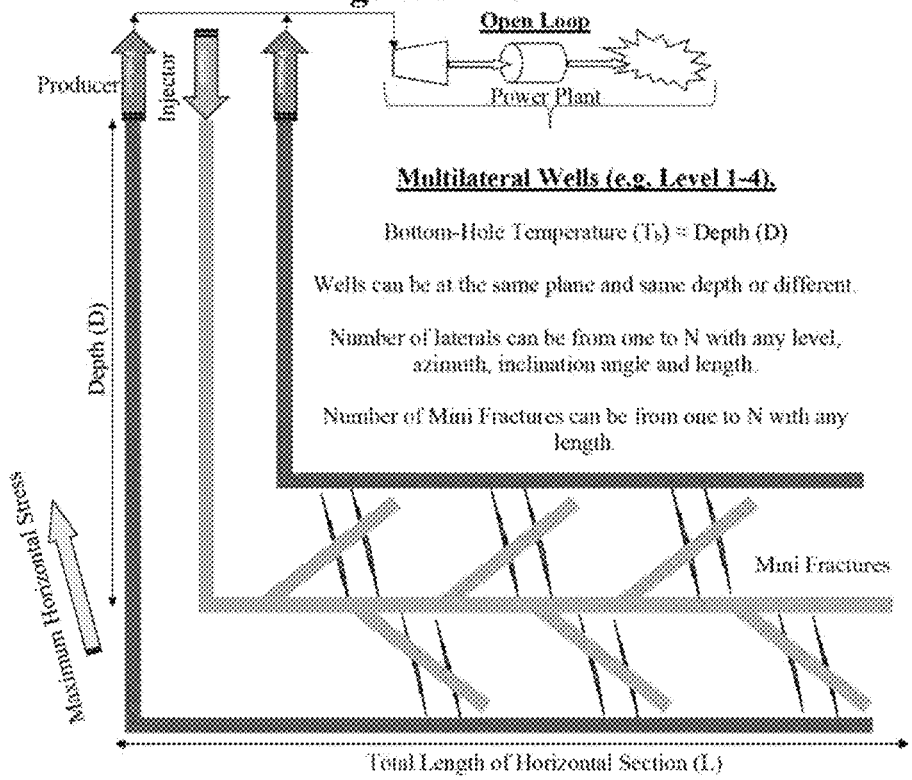
Figures 5, 171:
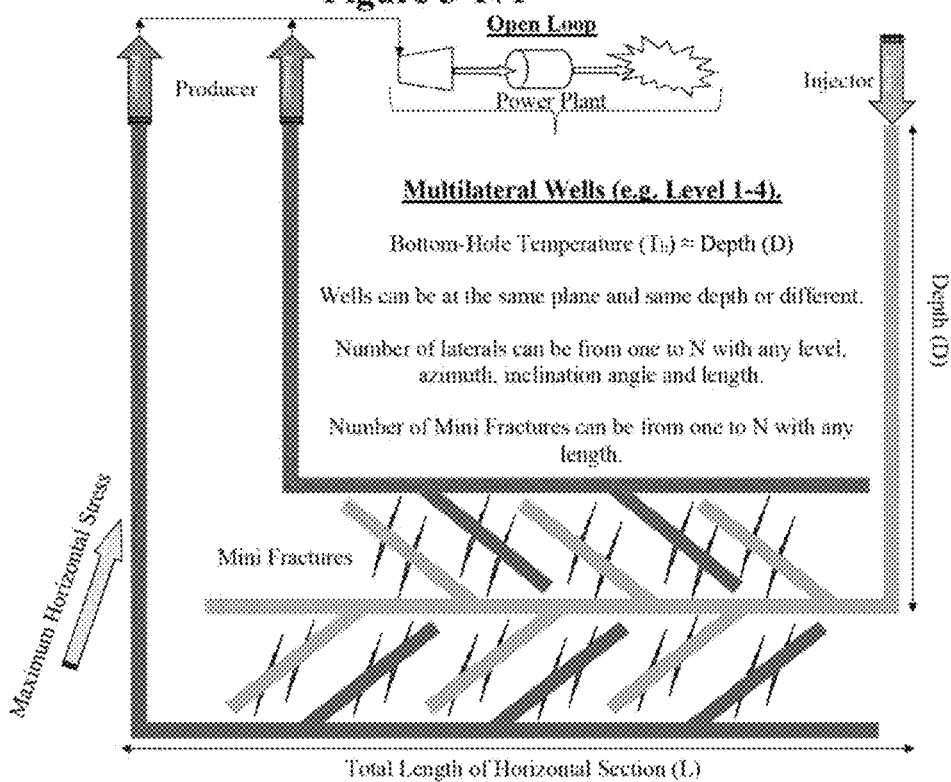
Figures 5, 172:
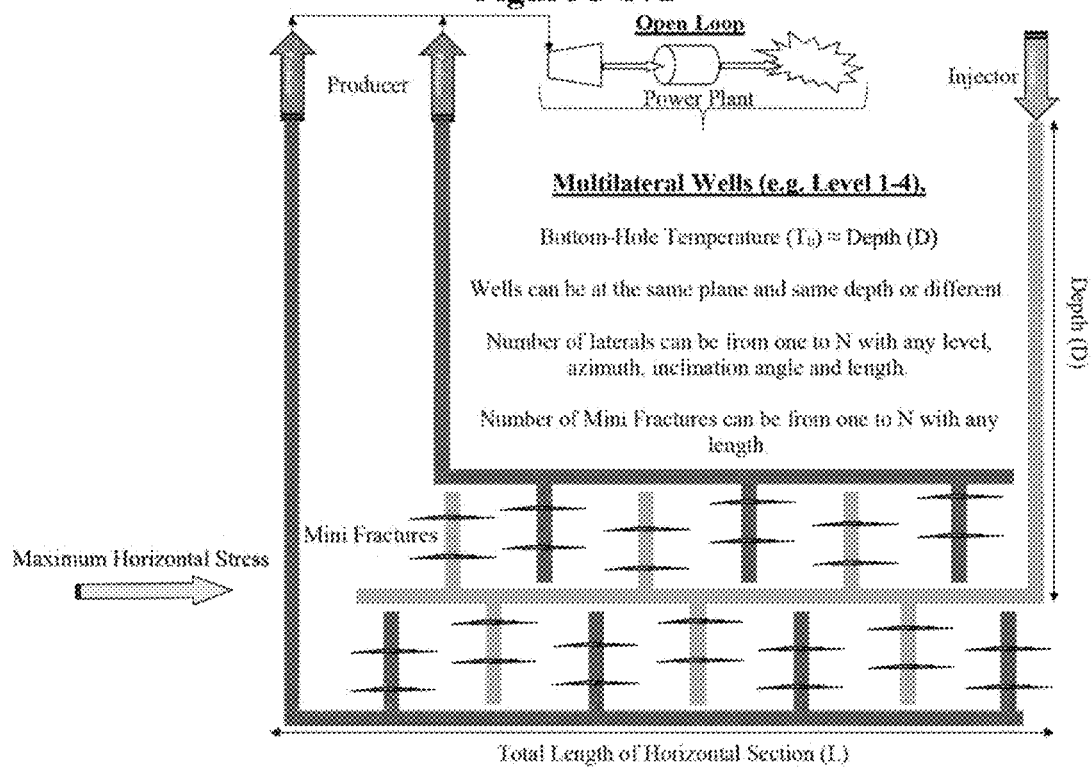
Figures 5, 173:
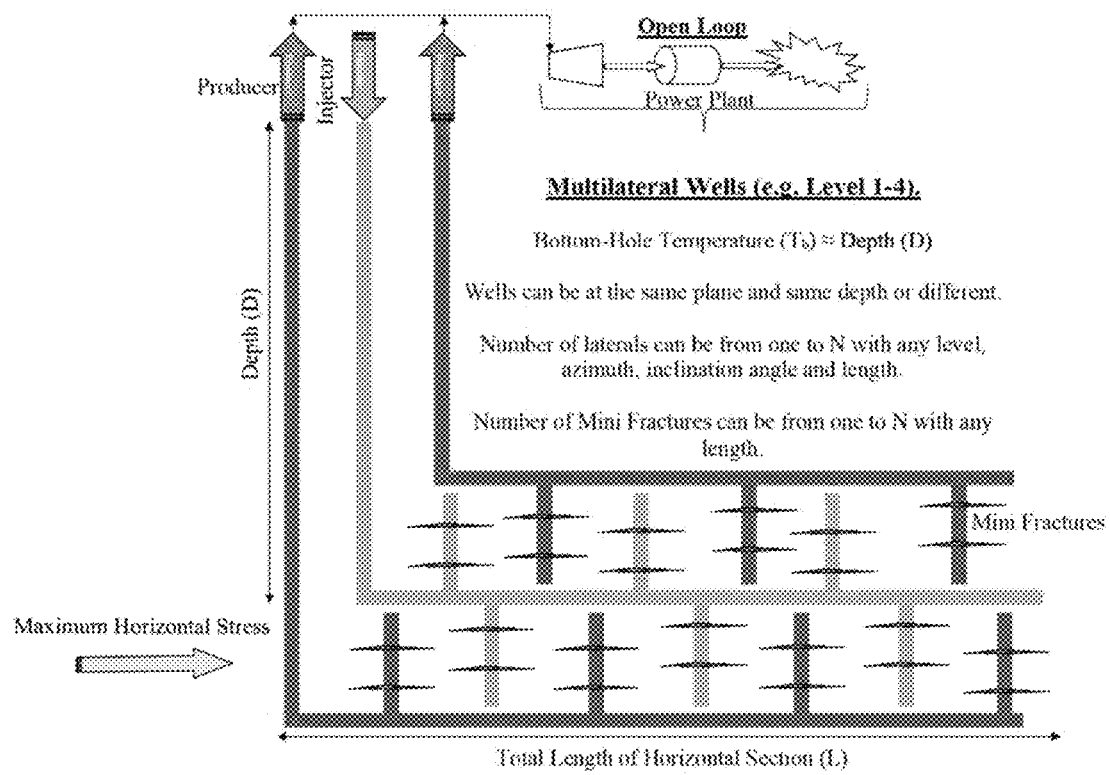
Figure 6:
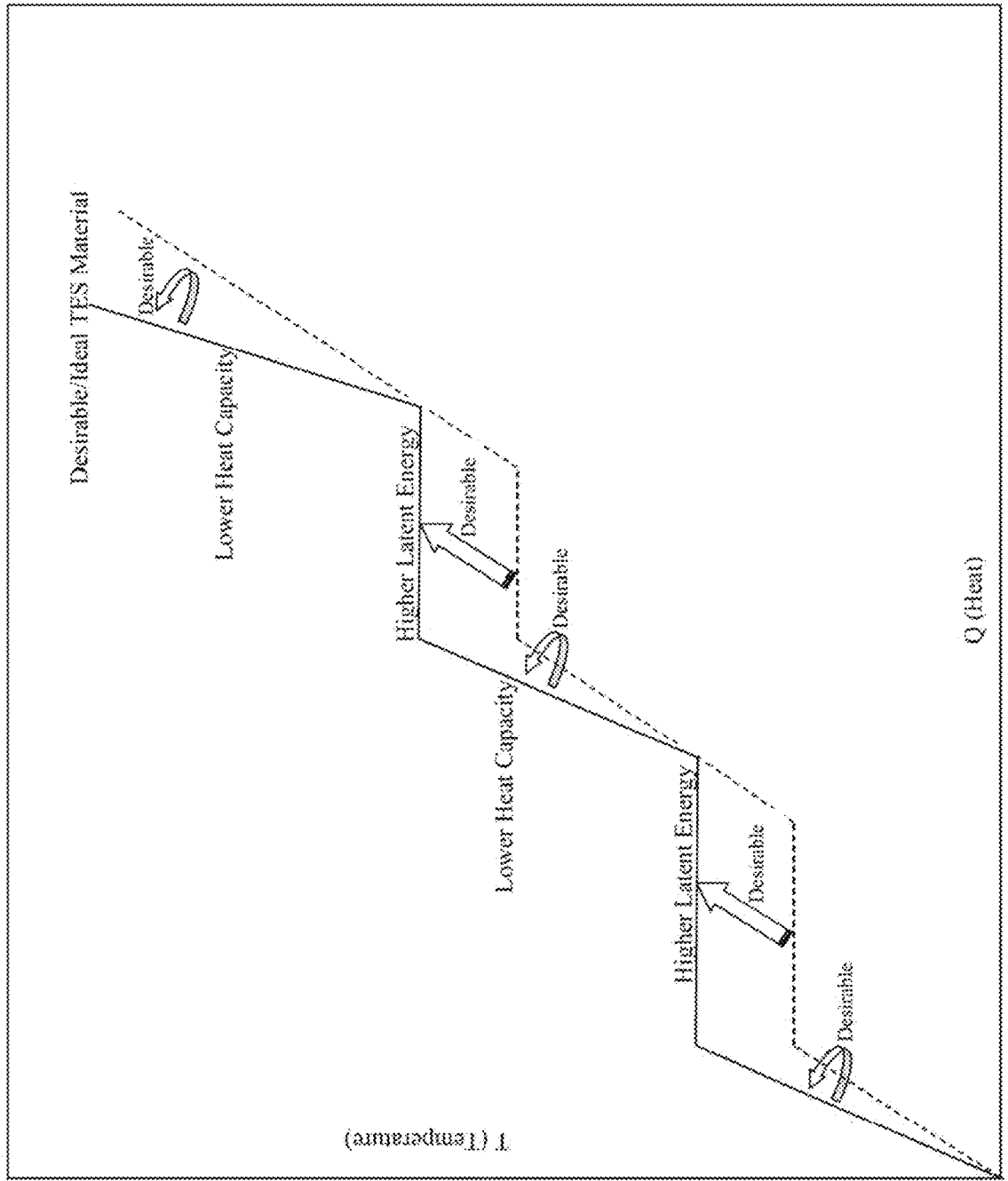
FIG. 6 is a graph showing some thermodynamic characteristics of suitable thermal energy storage (TES) materials that may be used in a geothermal heat exchanger, according to an embodiment.

FIGS. 5-1 to 5-173 illustrate further embodiments of some geothermal heat exchangers. These geothermal heat exchangers are formed as a system of one or more geothermal wells, and may be constructed according to the methods discussed herein. In an embodiment, one or more substantially homogenous sweet spots of geothermal energy of a heterogeneous geothermal reservoir are first identified. The sweet spots, which may have a temperature sufficient to boil a working fluid at a pressure, e.g., a predetermined pressure, that exists at the geothermal zones, may be identified using the processes and modeling discussed above, such as dynamically in real time.

Once the substantially homogenous sweet spots are identified, the geothermal heat exchanger can be designed to be comprised of at least one geothermal well that maximizes heat transfer from the substantially homogenous sweet spot(s) of geothermal energy to the geothermal well by at least one of: (i) selecting a predetermined shape of the geothermal well within the substantially homogenous sweet spot(s); and (ii) increasing a dimension (e.g., diameter and/or length of the geothermal well within the sweet spots) of the geothermal well within the substantially homogenous sweet spots, as discussed above. The predetermined shape and the dimension of the geothermal well are selected to in order to increase the surface area of contact "A" between the geothermal well and the substantially homogenous sweet spots of geothermal energy, according to the heat transfer equation discussed above. Different predetermined shapes of geothermal wells are shown in FIGS. 5-1 to 5-173. These shapes include, but are not limited to, a mono-well (see FIG. 5-1), U-shaped, double-U shaped, fork-shaped, L-shaped, block-shaped, L-shaped, double-L shaped, upside down T-shape, fishbone-shaped, spiral-shaped, helical-shaped, coil-shaped, double helical-shaped, double coil-shaped, triple helical-shaped, triple coil-shaped, wave-shaped, multi-wave shaped, and combinations of these shapes. Each of these shapes can increase the surface area of contact "A" between the geothermal well and the substantially homogenous sweet spots of geothermal energy. The length, direction and placement of each geothermal wells of the geothermal heat exchanger can be determined based on the dynamic subsurface models to optimize the thermal energy absorption and heat production. Depending on the geothermal reservoir characteristics and the data acquired while drilling the geothermal well (e.g., 'motherbore'), a particular shape of the ones illustrated in FIGS. 5-1 to 5-173 can be selected to maximize surface area contact of the between the geothermal well and the substantially homogenous sweet spots of geothermal energy. In some cases, data acquired while drilling the geothermal well (e.g., 'motherbore') can help identify the kick off points for sidetracks to place laterals through the geothermal sweet spots.

In addition, the mathematical best fit trajectory among the geothermal sweet spots can be followed to cover the most prolific areas. As discussed above, a mathematical best fit line can be calculated as a curve or linear line (or a combination curved and linear lines) having a best fit to the substantially homogenous sweet spot(s). The geothermal well can then be constructed to, or to a proximity of, the substantially homogenous sweet spot(s) of geothermal energy along the calculated mathematical best fit line to minimize the distance "d" between the geothermal well and the substantially homogenous sweet spot(s) of geothermal energy.

FIGS. 5-1 to 5-173 show that some of the geothermal heat exchangers may include geothermal fractures, geothermal acidized zones, and/or laterals, as discussed herein.

FIGS. 5-1 to 5-173 show examples of a geothermal heat exchanger including a system of one or more geothermal wells comprising at least one of: (i) a predetermined shape within one or more substantially homogenous sweet spots of geothermal energy of a heterogeneous geothermal reservoir; and (ii) a predetermined dimension within the one or more substantially homogenous sweet spots of geothermal energy of a heterogeneous geothermal reservoir. Each of the predetermined shape and the predetermined dimension increases a surface area of contact "A" between the one or more geothermal wells and one or more substantially homogenous sweet spots of geothermal energy, to maximize heat transfer from the one or more substantially homogenous sweet spots of geothermal energy to the one or more geothermal wells. At least a part of the one or more geothermal wells extends to, or to a proximity of, the one or more substantially homogenous sweet spots of geothermal energy of the heterogeneous geothermal reservoir along a calculated mathematical best fit line to minimize a distance "d" between the one or more geothermal wells and the one or more substantially homogenous sweet spots of geothermal energy. Each of the geothermal heat exchangers may be a real time dynamically constructed geothermal heat exchanger, as discussed herein. A working fluid heated by the absorbing thermal energy from the geothermal heat exchanger is then produced by being extracted through the geothermal well. As discussed above, the absorbed thermal energy in the heated working fluid can be converted to kinetic energy and mechanical energy for turning the blades of a turbine that rotates a shaft connected to an electricity generator. The rotating shaft drives the electricity generator to generate electricity via electromagnetic induction.

FIG. 6 is a graph showing some thermodynamic characteristics of suitable thermal energy storage (TES) materials that may be used in a geothermal heat exchanger, according to an embodiment. The graph compares the latent energy and specific heat capacity of a desirable thermal energy storage (TES) material (solid line) with that of water (dotted line) with respect to temperature (y-axis) and heat (x-axis) during phase changes. Thermal energy is measured through temperature. Accordingly, the higher the temperature of a thermal energy storage (TES) material, the more thermal energy the material. Heat is the transfer of thermal energy between two substances caused by a difference in temperature. In other words, heat is a measure of how much thermal energy is transferred between two substances. Because heat flows spontaneously from a material with higher thermal energy to a material with lower thermal energy, the minimum requirement for heat transfer between materials is the difference between their thermal energies.

As shown in FIG. 6, a desirable thermal energy storage (TES) material (solid line) should have a latent heat greater than a latent heat of water (dotted line). This would enable the thermal energy storage (TES) material to absorb a greater amount of thermal energy to transfer to the working fluid in the geothermal well. In addition, the desirable thermal energy storage (TES) material (solid line) should have a specific heat capacity less than a specific heat capacity of water to rapidly increase its temperature as high as possible as soon as the thermal energy storage (TES) material encounters the thermal energy source. This is shown in FIG. 6 by the steeper slope of the solid line representing the thermal energy storage (TES) material compared to the slope of the dotted line representing water. The slope is equal to 1/heat capacity. Thus, a smaller heat capacity results in a steeper slope, representing a higher temperature (i.e., more thermal energy). Accordingly, the desirable thermal energy storage (TES) material (solid line) should have a specific heat capacity less than a specific heat capacity of water to obtain a steeper slope in the graph of FIG. 6. As discussed above, FIG. 7-A is a Table showing specific heat capacity characteristics of some materials, and FIG. 7-B is a Table showing thermal conductivity characteristics of some materials.

FIGS. 8-A to 8-C show embodiments that implement thermal energy storage (TES) materials in a geothermal heat exchanger. FIG. 8-A shows an example of a geothermal heat exchanger in which thermal energy storage (TES) materials, such as those discussed herein, surround the geothermal well. The thermal energy storage (TES) materials absorb thermal energy from the far-field of the geothermal reservoir and keep the thermal energy around the geothermal well. While the geothermal well in the embodiment of FIG. 8-A is vertical, in other embodiments the geothermal well may be deviated, horizontal, multilateral, etc. FIG. 8-B illustrates an example of a geothermal heat exchanger including a vertical geothermal well having geothermal fractures or acidized zones that are filled with thermal energy storage (TES) materials, such as those discussed herein. The thermal energy storage (TES) materials in the geothermal fractures or acidized zones increase the effective thermal radius of the geothermal well to increase the contact surface area of the geothermal well with the geothermal reservoir. That is, the thermal energy storage (TES) materials increase the exposure, storage and transfer of thermal energy in the geothermal reservoir. FIG. 8-C is an example of a geothermal heat exchanger including a horizontal geothermal well having geothermal fractures or acidized zones that are filled with thermal energy storage (TES) materials, such as those discussed herein. The thermal energy storage (TES) materials in the geothermal fractures or acidized zones increase the effective thermal radius of the geothermal well to increase the contact surface area of the geothermal well with the geothermal reservoir, as discussed herein.

Geothermal fracturing with thermal energy storage (TES) materials may form a geothermal energy pool, i.e., a pool of geothermal fractures that include embedded thermal energy storage (TES) materials. Similarly, geothermal acidizing with thermal energy storage (TES) materials may form a pool of geothermal acidized zones that include embedded thermal energy storage (TES) materials. Furthermore, forming a lateral of a geothermal multilateral well and embedding thermal energy storage (TES) materials therein may form a geothermal energy pool in the lateral. Another way to form a geothermal energy pool is to pump behind the thermal production casing with the thermal energy storage (TES) materials so that a pool of the thermal energy storage (TES) materials is created all around the production casing. These geothermal energy pools form an entire region of consistent heat transfer with the same rate. The geothermal energy pools can absorb the thermal energy from the far-field of the geothermal reservoir and store the thermal energy within themselves around the geothermal well (see, e.g., FIG. 8-A). The geothermal energy pool may acts like a thermal accumulator and a buffer between the geothermal reservoir and the geothermal well. In addition, the geothermal energy pool may have a higher thermal conductivity ('K' in the heat transfer equation) to pass the heat to the geothermal well smoothly. This accumulator/buffer can enable consistent heat transfer rate and better quality heat transfer to a geothermal energy system that generates electricity.

As discussed herein, maximum, consistent heat transfer can be achieved by proper construction and placement of a geothermal well within geothermal sweet spots of a geothermal reservoir. This can be accomplished by maximizing the contact surface area of the geothermal well and the geothermal reservoir, and/or by minimizing the distance between the geothermal well and the geothermal reservoir. Multilaterals and geothermal fracturing/acidizing can increase of effective thermal radius of the geothermal well with thermal energy storage (TES) materials to store and keep the thermal energy from the far-field of the geothermal reservoir. These principles can increase the consistency and continuity thermal energy that is produced to generate electrical power.

It is within the scope of the present disclosure that different aspects of the methods of constructing a geothermal heat exchanger formed of a geothermal well as discussed herein may be combined, and that different components of the geothermal heat exchangers as discussed herein may be combined.

It should be understood that the foregoing description provides embodiments of the present invention which can be varied and combined without departing from the spirit of this disclosure. Although several embodiments have been illustrated in the accompanying drawings and describe in the foregoing specification, it will be understood by those of skill in the art that additional embodiments, modifications and alterations may be constructed from the principles disclosed herein. Those skilled in the art should, in light of the present disclosure, appreciate that many changes can be made in the specific embodiments which are disclosed and still obtain a like or similar result without departing from the concept, spirit and scope of the present disclosure.

What is claimed is:

1. A method of constructing a geothermal heat exchanger, comprising:
   identifying one or more geothermal zones of thermal energy as sweet spots of a geothermal reservoir having a temperature sufficient to boil a working fluid at a predetermined pressure;
   forming a geothermal well extending to, or to a proximity of, the one or more geothermal zones of thermal energy of the geothermal reservoir;
   increasing an effective thermal radius of the geothermal well by at least one of: (i) fracturing from the geothermal well to form at least one geothermal fracture into the geothermal reservoir; (ii) acidizing from the geothermal well into the geothermal reservoir to form at least one geothermal acidized zone in the geothermal reservoir; and (iii) forming at least one lateral from the geothermal well into the geothermal reservoir to form a geothermal multilateral well; and embedding one or more thermal energy storage (TES) materials into one of the at least one geothermal fracture, the at least one geothermal acidized zone, and the at least one lateral of the multilateral well, wherein increasing the effective thermal radius of the geothermal well increases a surface area of contact of the geothermal well with the one or more geothermal zones of thermal energy, and the thermal energy storage (TES) materials absorb the thermal energy and a far-field thermal energy of the geothermal reservoir, store the thermal energy and the far-field thermal energy, and conduct the thermal energy and the far-field thermal energy to the geothermal well.

2. The method according to claim 1, wherein the one or more thermal energy storage (TES) materials is one or more phase change materials (PCM).

3. The method according to claim 1, wherein the one or more thermal energy storage (TES) materials comprises at least one of: salt, sodium nitrate, potassium nitrate, and calcium nitrate, silicon, and graphene.

4. The method according to claim 1, wherein the one or more thermal energy storage (TES) materials comprises a specific heat capacity that is less than water, and comprises a specific thermal conductivity that is greater than water.

5. A geothermal heat exchanger comprising:
a geothermal well extending to, or to a proximity of, one or more geothermal zones of thermal energy as sweet spots of a geothermal reservoir;

at least one of: (i) at least one geothermal fracture into the geothermal reservoir from the geothermal well; (ii) at least one geothermal acidized zone into the geothermal reservoir from the geothermal well; and (iii) at least one lateral from the geothermal well into the geothermal reservoir, wherein each of the at least one geothermal fracture, the at least one acidized zone, and the at least one lateral increases an effective thermal radius of the geothermal well to increase a surface area of contact of the geothermal well with the one or more geothermal zones of thermal energy; and one or more thermal energy storage (TES) materials embedded into one of the at least one geothermal fracture, the at least one acidized zone, and the at least one lateral of the multilateral well, wherein the thermal energy storage (TES) materials absorb the thermal energy and a far-field thermal energy of the geothermal reservoir, store the thermal energy and the far-field thermal energy, and conduct the thermal energy and the far-field thermal energy to the geothermal well.

6. The geothermal heat exchanger according to claim 5, wherein the one or more thermal energy storage (TES) materials is one or more phase change materials (PCM).

7. The geothermal heat exchanger according to claim 5, wherein the one or more thermal energy storage (TES) materials comprises at least one of: salt, sodium nitrate, potassium nitrate, and calcium nitrate, silicon, and graphene.

8. The geothermal heat exchanger according to claim 5, wherein the one or more thermal energy storage (TES) materials comprises a specific heat capacity that is less than water, and comprises a specific thermal conductivity that is greater than water.

\* \* \* \* \*